(12) United States Patent
Takenaka et al.

(10) Patent No.: US 8,271,175 B2
(45) Date of Patent: Sep. 18, 2012

(54) VEHICLE CONTROL DEVICE

(75) Inventors: Toru Takenaka, Wako (JP); Yasuji Shibahata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1359 days.

(21) Appl. No.: 11/912,957

(22) PCT Filed: Aug. 7, 2006

(86) PCT No.: PCT/JP2006/315615
§ 371 (c)(1),
(2), (4) Date: Oct. 29, 2007

(87) PCT Pub. No.: WO2007/018188
PCT Pub. Date: Feb. 15, 2007

(65) Prior Publication Data
US 2009/0088918 A1   Apr. 2, 2009

(30) Foreign Application Priority Data
Aug. 5, 2005   (JP) ................. 2005-228292

(51) Int. Cl.
*B60W 30/02* (2006.01)
*G06F 7/00* (2006.01)
*B60G 17/015* (2006.01)
*B60G 17/00* (2006.01)
(52) U.S. Cl. ............... 701/71; 701/70; 701/72; 701/74; 701/75
(58) Field of Classification Search ............... 701/1, 29, 701/41–47, 65–66, 70–98; 703/8; 303/139–456, 303/163–167
See application file for complete search history.

(56) References Cited

U.S. PATENT DOCUMENTS 5,408,411 A   4/1995   Nakamura et al.
(Continued)

FOREIGN PATENT DOCUMENTS
JP   07-047970   2/1995
(Continued)

OTHER PUBLICATIONS

Automotive Engineering Handbook—Basics and Theory (vol. 1), Date of publication: Jun. 15, 1992, published by: Society of Automotive Engineers of Japan, Inc., p. 225.

*Primary Examiner* — Khoi Tran
*Assistant Examiner* — Dale Moyer
(74) *Attorney, Agent, or Firm* — Rankin, Hill & Clark LLP

(57) ABSTRACT

A control means for controlling actuators of a vehicle creates a time series of a future behavior of the vehicle using a vehicle model. A state amount of the vehicle model is initialized on the basis of a state amount of the vehicle, and the future behavior is created starting from the initial state amount. The future behavior is created such that operation commands of the actuators in the vehicle model at the current time coincide with or approximate basic values based on operation of a manipulating device, such as a steering wheel of the vehicle. It is evaluated whether vehicle motion, road surface reaction force, and wheel sliding, in the created future behavior satisfy predetermined restrictive conditions. Based on the evaluation result, the operation commands of the actuators are successively decided. This permits ideal travel of the vehicle to be achieved by properly predicting future behaviors of the vehicle.

51 Claims, 26 Drawing Sheets

U.S. PATENT DOCUMENTS

| | | |
|---|---|---|
| 5,577,812 A | 11/1996 | Hirano et al. |
| 5,671,143 A * | 9/1997 | Graber .......................... 701/72 |
| 5,701,248 A * | 12/1997 | Wanke .......................... 701/70 |
| 6,508,102 B1 * | 1/2003 | Margolis et al. .................... 73/8 |
| 6,556,908 B1 * | 4/2003 | Lu et al. ........................ 701/38 |
| 2002/0109402 A1 * | 8/2002 | Nakamura .................. 303/146 |
| 2003/0187578 A1 * | 10/2003 | Nishira et al. ................ 701/301 |
| 2004/0034460 A1 | 2/2004 | Folkerts et al. |
| 2004/0158377 A1 * | 8/2004 | Matsumoto et al. ........... 701/48 |
| 2004/0262991 A1 | 12/2004 | Anwar |
| 2005/0004731 A1 | 1/2005 | Bohm et al. |
| 2006/0158031 A1 * | 7/2006 | Kummel et al. ............. 303/146 |

FOREIGN PATENT DOCUMENTS

| | | |
|---|---|---|
| JP | 10-254505 | 9/1998 |
| JP | 11-099848 | 4/1999 |
| JP | 11-321690 | 11/1999 |
| JP | 2000-302055 | 10/2000 |
| JP | 2001-250176 | 9/2001 |
| JP | 2002-019485 | 1/2002 |
| JP | 2003-312319 | 11/2003 |
| WO | 2004/074059 | 9/2004 |

* cited by examiner

RESETTING SCENARIO a1 SCENARIO a2 SCENARIO a3 SCENARIO

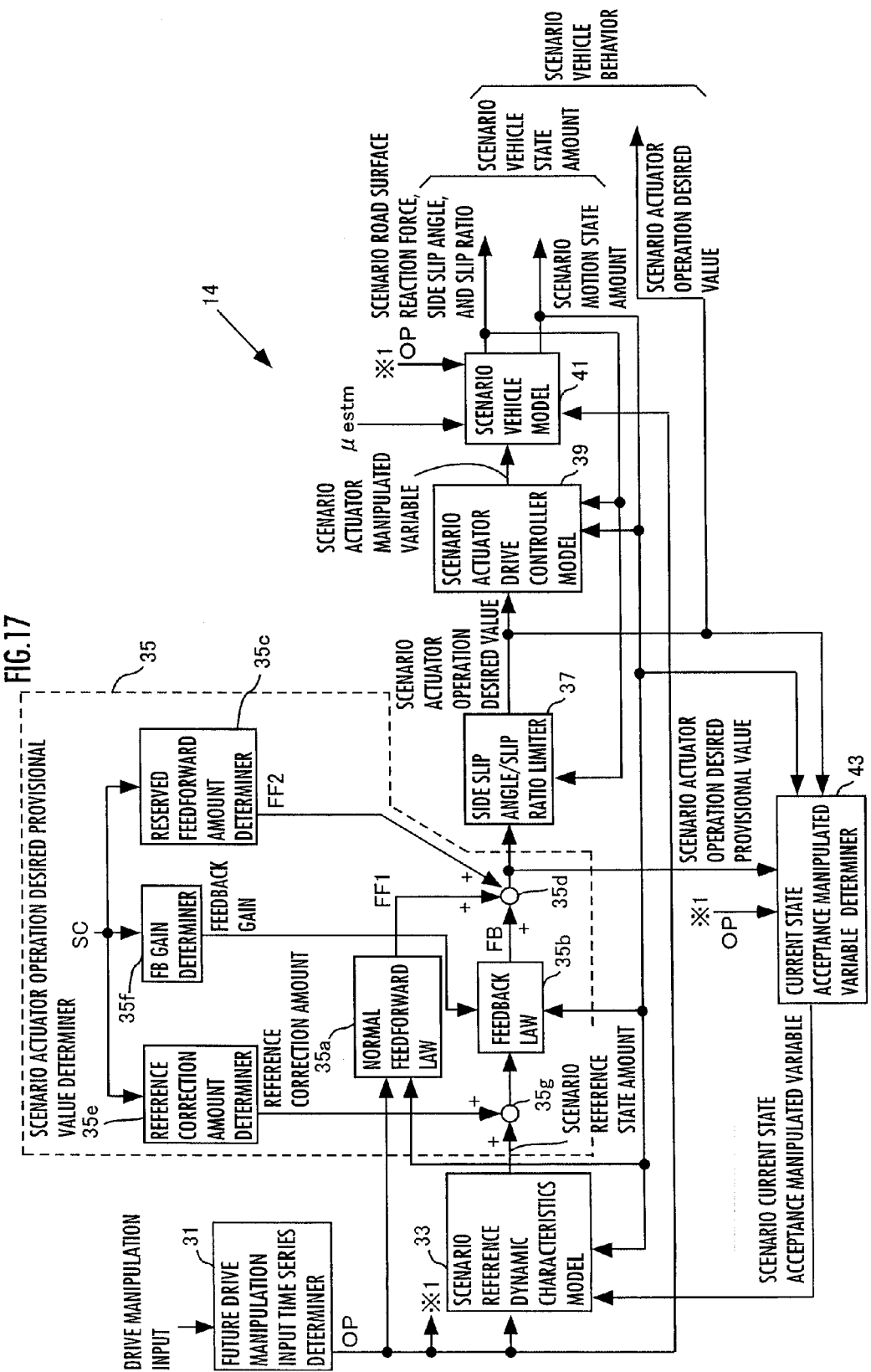

CURVATURE OF REFERENCE COURSE

REFERENCE COURSE CORRECTION AMOUNT (CURVATURE CORRECTION AMOUNT)

CURVATURE OF REFERENCE COURSE AFTER CORRECTION
CURVATURE OF REFERENCE COURSE BEFORE CORRECTION

VEHICLE CONTROL DEVICE

TECHNICAL FIELD

The present invention relates to a vehicle control device for a vehicle having a plurality of wheels, such as an automobile (engine automobile), a hybrid car, an electric car, and a motorcycle.

BACKGROUND ART

There has been known a vehicle, such as an automobile, which is provided with a variety of actuators to actively control behaviors of the vehicle through the intermediary of the variety of actuators according to diverse state amounts of the vehicle or external environmental conditions as well as passively controlling (according to operations of operating devices performed by a driver) the behaviors of the vehicle in response to man-caused operations of the operating devices, such as a steering wheel, an accelerator (gas) pedal, a brake pedal, and a shift lever.

The present applicant has proposed in, for example, Japanese Unexamined Patent Application Publication No. 2000-302055 (hereinafter referred to as "patent document 1"), a technology for controlling the steering of a vehicle, which can be steered by actuators, such that the vehicle follows a desired course. The technology predicts a future lateral displacement of the vehicle with respect to a desired course determined on the basis of the information obtained by a CCD camera or the like. Further, a control input for controlling the steering of the vehicle is determined such that the lateral displacement and a temporal change amount of a steering angle are minimized as much as possible is determined. Then, the steering of the vehicle is performed through the intermediary of the actuators by the control input.

Furthermore, a control technique called "the model following method" has been disclosed in, for example, FIG. 6-99(a) on page 225 of "Automotive Engineering Handbook—Basics and Theory (Vol. 1)/The Society of Automotive Engineers of Japan (published on Jun. 15, 1992)" (hereinafter referred to as non-patent document 1)). According to the control technique, a steering angle of a steering wheel operated by a driver is input to a reference model for which steering response characteristics have been set beforehand, and a control input for a vehicle model is determined such that an output of the vehicle model follows an output of the reference model. Then, the control input of the vehicle model is input to the actual vehicle so as to cause the actual vehicle to follow the reference model.

DISCLOSURE OF INVENTION

However, the technology shown in the aforesaid patent document 1 controls the steering of the vehicle by linear predictive processing and it does not consider the nonlinearity of the friction characteristics of wheels (the saturation characteristic of a frictional force). Therefore, depending on a road surface condition (if the frictional force saturates), the divergence of a control system occurs, making it difficult for the vehicle to actually follow the desired course in some cases.

According to the technology shown in the aforesaid non-patent document 1, when determining a control input to the vehicle model and consequently an input to the actual vehicle, the control input to the vehicle model is determined merely on the basis of a difference between an output of the vehicle model and an output of the reference model at the instant. Thus, no considerations are given to a behavior of the vehicle in the future, frequently leading to a case where it is difficult to continuously perform ideal drive of the vehicle. Furthermore, if a disturbance or the like (e.g., unexpected change in the friction coefficient of a road surface) not assumed on the reference model or the vehicle model occurs, then a situation wherein a behavior of the model separates from a behavior of the actual vehicle takes place. In such a case, it becomes difficult to properly control the behavior of the vehicle.

The present invention has been made with a view of the aforesaid background and it is an object of the invention to provide a vehicle control device that allows ideal drive of a vehicle to be accomplished while properly predicting a future behavior of the vehicle and also permits improved vehicle control robustness by properly preventing divergence of a control system.

To fulfill such an object, according to the present invention (a first invention), there is provided a vehicle control device comprising:

an operating device with which a driver of a vehicle having a plurality of wheels drives the vehicle;

a drive manipulated variable detecting means which detects a drive manipulated variable expressing an operation state of the operating device by the driver;

an actuator provided in the vehicle so as to permit a predetermined motion of the vehicle to be made in response to a predetermined operation command;

an actuator controlling means which sequentially determines the operation command to the actuator on the basis of at least the drive manipulated variable and controls the operation of the actuator according to the determined operation command; and an actual state amount grasping means which detects or estimates an actual state amount, which is a predetermined first state amount related to an actual motion of the vehicle, wherein the actuator controlling means comprises:

a vehicle model which includes at least a friction model showing a relationship between slippage of the wheels and road surface reaction forces acting on the wheels, a dynamic model showing a relationship between motions of the vehicle and the road surface reaction forces, and a model showing the operating characteristics of the actuator;

a vehicle model initializing means which defines at least the first state amount related to a motion of the vehicle on the vehicle model as a state amount to be initialized, and initializes a value of the state amount to be initialized at current time or at predetermined time in the vicinity thereof (e.g., at time one control processing cycle before the current time) to a value determined on the basis of at least the actual state amount before the current time;

a future drive manipulated variable determining means which determines a time series of a future drive manipulated variable after current time on the basis of at least the drive manipulated variable before the current time;

a first future vehicle behavior determining means which determines a future vehicle behavior, which is a future time series after the current time of a set of the operation command to the actuator of the vehicle model, a motion of the vehicle that takes place on the vehicle model to which the operation command has been given, a road surface reaction force, and the slippage of wheels, according to a predetermined first control law by using an initialized vehicle model, which is the vehicle model wherein at least the determined time series of the future drive manipulated variable and the value of the state amount to be initialized have been initialized; and an evaluating means which defines, as an evaluation object, at least one of a motion of the vehicle, a road surface reaction force, and the slippage of wheels in the future vehicle behavior, and evaluates whether the evaluation object satisfies a predetermined restrictive condition, wherein, when determining the operation command anew, the processing by the vehicle model initializing means, the future drive manipulated variable determining means, and the first future vehicle behavior determining means is carried out to determine the future vehicle behavior, and the processing by the evaluating means is also carried out on the evaluation object of the determined future vehicle behavior so as to determine a new operation command for the actuator on the basis of at least an evaluation result given by the evaluating means.

In the present invention, time after the current time means time in the future, including the current time. Further, time before the current time means time in the past that includes the current time or time in the past that does not include the current time.

According to the first invention, the future vehicle behavior is determined by the first future vehicle behavior determining means. At this time, the vehicle model used to determine the future vehicle behavior is the initialized vehicle model. This makes it possible to determine a future vehicle behavior based on an actual vehicle behavior up to the current time. Moreover, the vehicle model includes the friction model and the dynamic model, thus making it possible to determine highly reliable future vehicle behavior that takes into account non-linearity, such as the characteristic of a friction between a vehicle wheel and a road surface. Further, according to the first invention, at least one of a motion of the vehicle, a road surface reaction force, and slippage of a wheel in the future vehicle behavior is taken as an evaluation object, and whether the evaluation object satisfies the predetermined restrictive condition is evaluated by the evaluating means. Further, based on the evaluation result, a new operation command for the actuator is sequentially determined.

With this arrangement, a behavior of the vehicle can be controlled through the intermediary of the actuator such that the evaluation object of the actual vehicle satisfies the predetermined restrictive condition as much as possible.

Thus, according to the first invention, ideal drive of a vehicle can be accomplished while properly predicting a future behavior of the vehicle, and the robustness of control of the vehicle can be enhanced by properly preventing divergence of a control system.

The first state amount may be, for example, a position of a vehicle, a traveling velocity, the direction (azimuth) of the vehicle, and a changing velocity (angular velocity) of the azimuth (an angle about an axis, such as a yaw axis, a pitch axis, and a roll axis). Regarding a motion of the vehicle, the evaluation object may be, for example, a yaw rate or a position of the vehicle, and a spatial track of the position (traveling path). Regarding a road surface reaction of the vehicle, an evaluation object may be, for example, a horizontal road surface reaction force (drive/brake force or lateral force) of the road surface reaction force. In this case, it may be a component in the direction of any one axis of the road surface reaction force or components in the directions of two axes. Regarding the slippage of a wheel, an evaluation object may be, for example, a side slip angle or a slip ratio.

According to the first invention, when determining, for example, the operation command anew, the actuator controlling means determines, as the new operation command, an operation command at the current time in a future vehicle behavior if an evaluation object of the future vehicle behavior determined by the first future vehicle behavior determining means satisfies the predetermined restrictive condition, or determines, as the new operation command, an operation command obtained by correcting the operation command at the current time in the future vehicle behavior according to a predetermined correction rule if the evaluation object of the future vehicle behavior does not satisfy the predetermined restrictive condition (a second invention).

According to the second invention, if an evaluation object of the future vehicle behavior satisfies the predetermined restrictive condition or even if it does not satisfy the predetermined restrictive condition, an appropriate operation command can be sequentially determined such that the evaluation object at each instant of the actual vehicle satisfies the predetermined restrictive condition as much as possible by properly establishing the predetermined correction rule.

Further, in the first invention, the actuator controlling means may be provided with a second future vehicle behavior determining means which defines, for example, the aforesaid future vehicle behavior determined by the first future vehicle behavior determining means as a first future vehicle behavior, and if an evaluation object of the first future vehicle behavior does not satisfy the predetermined restrictive condition, then the second future vehicle behavior determining means determines a second future vehicle behavior having a time series of an operation command of a pattern different from that of the time series of an operation command in the first future vehicle behavior according to a predetermined second control law by using at least the initialized vehicle model, wherein, when determining the operation command anew, if the evaluation object of the first future vehicle behavior satisfies the predetermined restrictive condition, then an operation command at the current time out of the first future vehicle behavior may be determined as the new operation command, or if the evaluation object of the first future vehicle behavior does not satisfy the predetermined restrictive condition, then the processing of the evaluating means may be carried out on the evaluation object of the second future vehicle behavior determined by the second future vehicle behavior determining means so as to determine the new operation command on the basis of at least an evaluation result of the evaluation object of the second future vehicle behavior (a third invention).

According to the third invention, if the evaluation object of the first future vehicle behavior does not satisfy the predetermined restrictive condition, then the second future vehicle behavior having the time series of the operation command of a pattern different from that of the time series of the operation command of the first future vehicle behavior is determined by the second future vehicle behavior determining means. Then, a new operation command is determined on the basis of the evaluation result given by the evaluating means on the evaluation object of the second future vehicle behavior. Thus, properly setting the second control law beforehand makes it possible to sequentially determine an operation command that is ideal for causing an evaluation object of an actual vehicle to satisfy the predetermined restrictive condition as much as possible while predicting future vehicle behaviors.

Alternatively, more preferably, in the first invention, the actuator controlling means is equipped with a control law selecting means which defines, as a first future vehicle behavior, the future vehicle behavior determined by the first future vehicle behavior determining means, and selects a second control law for determining a second future vehicle behavior having a time series of an operation command of a pattern different from the time series of an operation command of the first future vehicle behavior from among a predetermined plurality of types of control laws on the basis of a state of deviation of an evaluation object of the first future vehicle behavior from the restrictive condition if the evaluation object of the first future vehicle behavior does not satisfy the predetermined restrictive condition, and a second future vehicle behavior determining means which determines the second future vehicle behavior by using at least the initialized vehicle model according to the selected second control law, wherein, when determining the operation command anew, if the evaluation object of the first future vehicle behavior satisfies the predetermined restrictive condition, then an operation command at the current time in the first future vehicle behavior may be determined as the new operation command, or if the evaluation object of the first future vehicle behavior does not satisfy the predetermined restrictive condition, then the processing by the evaluating means may be carried out on the evaluation object of the second future vehicle behavior determined by the second future vehicle behavior determining means so as to determine the new operation command on the basis of at least an evaluation result of the evaluation object of the second future vehicle behavior that has been determined (a fourth invention).

According to the fourth invention, if the evaluation object of the first future vehicle behavior does not satisfy the predetermined restrictive condition, then the second control law for determining the second future vehicle behavior is determined on the basis of the state of the deviation of the evaluation object from the restrictive condition. Hence, a second future vehicle behavior suited for eliminating the state of the deviation of the evaluation object of the first future vehicle behavior from the predetermined restrictive condition can be determined. As a result, the fourth invention makes it possible to sequentially determine an operation command that is further preferred in causing an evaluation object of the actual vehicle to satisfy the predetermined restrictive condition as much as possible while predicting future vehicle behaviors.

According to the aforesaid first invention, more generally, the actuator controlling means may be provided with an m-th future vehicle behavior determining means which defines, as a first future vehicle behavior, the aforesaid future vehicle behavior determined by the first future vehicle behavior determining means, and defines M as a predetermined integer value of 2 or more, and if the evaluation object of an (m−1)th (m: any integer that is $2 \leq m \leq M$) future vehicle behavior does not satisfy the predetermined restrictive condition, then the m-th future vehicle behavior determining means determines the m-th future vehicle behavior having a time series of an operation command of a pattern different from that of the time series of an operation command of each of the first to the (m−1)th future vehicle behaviors according to a predetermined m-th control law by using at least the initialized vehicle model, wherein, when determining the operation command anew, if the evaluation object of the (m−1)th future vehicle behavior satisfies the predetermined restrictive condition, then an operation command at the current time in the (m−1)th future vehicle behavior may be determined as the new operation command, or if the evaluation object of the (m−1)th future vehicle behavior does not satisfy the predetermined restrictive condition, then the processing for determining the m-th future vehicle behavior is carried out in order from m=2 by the m-th future vehicle behavior determining means, or if an M-th future vehicle behavior has been determined, then the new operation command may be determined on the basis of at least an evaluation result given by the evaluating means on the evaluation object of the M-th future vehicle behavior (a fifth invention).

According to the fifth invention, if the evaluation objects of the first to the (m−1)th future vehicle behaviors do not satisfy the predetermined restrictive condition, then the m-th future vehicle behavior having the time series of the operation command of a pattern different from that of the time series of the operation command of the first to the (m−1)th future vehicle behaviors is determined by the m-th future vehicle behavior determining means. If the evaluation object of the (m−1)th future vehicle behavior satisfies the predetermined restrictive condition, then an operation command at the current time out of the (m−1)th future vehicle behavior is determined as a new operation command. Further, when the M-th future vehicle behavior has been determined by such processing, a new operation command is determined on the basis of the evaluation result given by the evaluating means on the evaluation object of the M-th future vehicle behavior.

With this arrangement, the possibility for finding out a future vehicle behavior that allows the evaluation object to satisfy the predetermined restrictive condition can be enhanced. Thus, it is possible to sequentially determine an operation command that is further preferred in causing an evaluation object of the actual vehicle to satisfy the predetermined restrictive condition as much as possible while predicting future vehicle behaviors.

In the fifth invention, preferably, a plurality of sets of the second to the M-th control laws is prepared beforehand, the second to the M-th future vehicle behavior determining means select, from among the plurality of sets, a set of the second to the M-th control laws on the basis of the state of deviation of the determined first future vehicle behavior evaluation object from the predetermined restrictive condition, and any m-th future vehicle behavior determining means among the second to the M-th future vehicle behavior determining means determines the m-th future vehicle behavior according to the m-th control law out of the second to the M-th control laws of the selected set (a sixth invention).

According to the sixth invention, if the evaluation object of the first future vehicle behavior does not satisfy the predetermined restrictive condition, then the set of the second to the M-th control laws is selected according to the state of deviation of the evaluation object from the restrictive condition. This makes it possible to determine the m-th future vehicle behavior (m=2, 3, . . . , M) suited for eliminating the state of the deviation of the evaluation object of the first future vehicle behavior from the predetermined restrictive condition. As a result, the sixth invention makes it possible to sequentially determine an operation command that is further preferred in causing an evaluation object of the actual vehicle to satisfy the predetermined restrictive condition as much as possible while predicting future vehicle behaviors.

In the first invention or the second invention described above, preferably, the first future vehicle behavior determining means is provided with a means for determining a future basic operation command, which is a time series of a basic value of the operation command in the future after the current time, on the basis of at least the time series of the future drive manipulated variable that has been determined, wherein the first control law according to which the first future vehicle behavior determining means determines the future vehicle behavior is a control law for determining the future vehicle behavior such that at least the difference between an operation command at the current time in the future vehicle behavior and the basic value at the current time in the determined future basic operation command approximates zero or coincides with zero (a seventh invention).

In the seventh invention, the basic value of the operation command means an operation command of an actuator showing a vehicle behavior based on a request from driver of the vehicle indicated by the drive manipulated variable. If an evaluation object of a future vehicle behavior determined by the first future vehicle behavior determining means satisfies the predetermined restrictive condition, then an operation command that is close to or coincides with the future basic operation command will be sequentially determined. Hence, in a situation wherein an evaluation object of an actual vehicle is predicted to satisfy the predetermined restrictive condition in the future, the vehicle can be driven according to the driver's request.

In the aforesaid second invention, preferably, the first future vehicle behavior determining means is provided with a means for determining a future basic operation command, which is a time series of a basic value of the operation command in the future after the current time, on the basis of at least the time series of the future drive manipulated variable that has been determined, wherein the first control law according to which the first future vehicle behavior determining means determines the future vehicle behavior is a control law for determining the future vehicle behavior such that at least the difference between an operation command at the current time in the future vehicle behavior and the basic value at the current time in the determined future basic operation command approximates zero or coincides with zero, and the correction rule based on which the operation command at the current time in the future vehicle behavior is corrected if the evaluation object of the determined future vehicle behavior does not satisfy the predetermined restrictive condition is a rule for correcting the value of the operation command at the current time in the future vehicle behavior such that the difference between an operation command obtained by correcting the operation command at the current time in the future vehicle behavior and the basic value at the current time in the determined future basic operation command is farther away from zero than the difference between a before-correction operation command at the current time in the future vehicle behavior and the basic value at the current time in the determined future basic operation command (an eighth invention).

According to the eighth invention, if an evaluation object of the future vehicle behavior determined by the first future vehicle behavior determining means satisfies the predetermined restrictive condition, then the same operations and advantages as those of the aforesaid seventh invention can be obtained. On the other hand, if an evaluation object of the future vehicle behavior determined by the first future vehicle behavior determining means does not satisfy the predetermined restrictive condition, then the value of the operation command at the current time in the future vehicle behavior is corrected such that the difference between an operation command obtained by correcting the operation command at the current time in the future vehicle behavior and the basic value at the current time in the future basic operation command is farther away from zero than the difference between the before-correction operation command at the current time in the future vehicle behavior and the basic value at the current time in the future basic operation command. Thus, in a situation wherein an evaluation object of the vehicle is predicted not to satisfy the predetermined restrictive condition in the future when an actuator is operated according to a driver's request, it is possible to determine an operation command of the actuator that is appropriate for preventing the occurrence of the situation.

Further, in the third invention or the fourth invention described above, preferably, the first future vehicle behavior determining means is provided with a means for determining a future basic operation command, which is a time series of a basic value of the operation command in the future after the current time, on the basis of at least the time series of the future drive manipulated variable that has been determined, wherein the first control law according to which the first future vehicle behavior determining means determines the first future vehicle behavior is a control law for determining the first future vehicle behavior such that at least the difference between an operation command at the current time in the first future vehicle behavior and the basic value at the current time in the determined future basic operation command approximates zero or coincides with zero, and the second control law for the second future vehicle behavior determining means to determine the second future vehicle behavior is a control law which defines the difference between an operation command at the current time in the second future vehicle behavior and the basic value at the current time in the determined future basic operation command as $\Delta 2(1)$, defines the difference between an operation command at the next time following the current time in the second future vehicle behavior and the basic value at the next time following the current time in the determined future basic operation command as $\Delta 2(2)$, defines the difference between an operation command at the current time in the first future vehicle behavior and the basic value at the current time in the determined future basic operation command as $\Delta 1(1)$, defines the difference between an operation command at the next time following the current time in the first future vehicle behavior and the basic value at the next time following the current time in the determined future basic operation command as $\Delta 1(2)$, and determines the second future vehicle behavior such that at least $\Delta 2(1)$ is farther away from zero than $\Delta 1(1)$ or $\Delta 2(2)$ is farther away from zero than $\Delta 1(2)$ (a ninth invention).

According to the ninth invention, if an evaluation object of the first future vehicle behavior satisfies the predetermined restrictive condition, then the same operations and advantages as those of the seventh invention or the eighth invention described above can be obtained. On the other hand, if the evaluation object of the first future vehicle behavior does not satisfy the predetermined restrictive condition, then the second future vehicle behavior is determined such that at least the aforesaid $\Delta 2(1)$ is farther away from zero than $\Delta 1(1)$ or the aforesaid $\Delta 2(2)$ is farther away from zero than $\Delta 1(2)$. Hence, in a situation wherein an evaluation object of a vehicle is predicted not to satisfy the predetermined restrictive condition in the future if the actuator is operated according to a driver's request, the second future vehicle behavior can be determined such that the occurrence of the situation can be prevented from the current time or from the next time following the current time. Thus, an appropriate actuator operation command for preventing the occurrence of the aforesaid situation can be determined by determining the operation command at the current time of the actuator on the basis of the evaluation by the evaluating means on the evaluation object of the second future vehicle behavior.

In the ninth invention, preferably, the second control law for the second future vehicle behavior determining means to determine the second future vehicle behavior is a control law for determining the second future vehicle behavior such that the difference between an operation command at arbitrary time k of the second future vehicle behavior and the basic value at the time k in the determined future basic operation command gradually moves away from zero as the time k proceeds (a tenth invention).

According to the tenth invention, in a situation wherein an evaluation object of a vehicle is predicted not to satisfy the predetermined restrictive condition in the future if the actuator is operated according to a driver's request, an operation command of the actuator can be determined such that it gradually moves away from an operation command based on the driver's request (the aforesaid basic value). This means that a sudden change of an operation command of the actuator can be prevented.

As with the aforesaid ninth invention, in the fifth invention or the sixth invention described above, the first future vehicle behavior determining means is provided with a means for determining a future basic operation command, which is a time series of a basic value of the operation command in the future after the current time, on the basis of at least the time series of the future drive manipulated variable that has been determined, wherein the first control law according to which the first future vehicle behavior determining means determines the first future vehicle behavior is a control law for determining the first future vehicle behavior such that at least the difference between an operation command at the current time in the first future vehicle behavior and the basic value at the current time in the determined future basic operation command approximates zero or coincides with zero, the m-th control law for the m-th future vehicle behavior determining means to determine the m-th future vehicle behavior is a control law which defines the difference between an operation command at the current time in the m-th future vehicle behavior and the basic value at the current time in the determined future basic operation command as $\Delta m(1)$, defines the difference between an operation command at the next time following the current time in the m-th future vehicle behavior and the basic value at the next time following the current time in the determined future basic operation command as $\Delta m(2)$, defines the difference between an operation command at the current time in the (m−1)th future vehicle behavior and the basic value at the current time in the determined future basic operation command as $\Delta m{-}1(1)$, defines the difference between an operation command at the next time following the current time in the (m−1)th future vehicle behavior and the basic value at the next time following the current time in the determined future basic operation command as $\Delta m{-}1(2)$, and determines the m-th future vehicle behavior such that at least $\Delta m(1)$ is farther away from zero than $\Delta m{-}1(1)$ or $\Delta m(2)$ is farther away from zero than $\Delta m{-}1(2)$ (an eleventh invention).

According to the eleventh invention, if an evaluation object of the first future vehicle behavior satisfies the predetermined restrictive condition, then the same operations and advantages as those of the seventh invention or the eighth invention described above can be obtained. On the other hand, if the evaluation object of the (m−1)th future vehicle behavior does not satisfy the predetermined restrictive condition, then the m-th future vehicle behavior is determined such that at least the aforesaid $\Delta m(1)$ is farther away from zero than $\Delta m{-}1(1)$ or the aforesaid $\Delta m(2)$ is farther away from zero than $\Delta m{-}1(2)$. Hence, in a situation wherein an evaluation object is predicted not to satisfy the predetermined restrictive condition in the future if the actuator is operated according to an operation command of the (m−1)th future vehicle behavior, the m-th future vehicle behavior can be determined such that the occurrence of the situation can be prevented from the current time or from the next time following the current time. Thus, an appropriate actuator operation command can be determined to prevent the occurrence of the situation wherein an evaluation object of an actual vehicle does not satisfy the predetermined restrictive condition.

In the eleventh invention, as with the aforesaid tenth invention, the m-th control law for the m-th future vehicle behavior determining means to determine the m-th future vehicle behavior is preferably a control law for determining the m-th future vehicle behavior such that the difference between an operation command at arbitrary time k of the m-th future vehicle behavior and the basic value at the time k in the determined future basic operation command gradually moves away from zero as the time k proceeds (a twelfth invention).

According to the twelfth invention, in a situation wherein an evaluation object of a vehicle is predicted not to satisfy the predetermined restrictive condition in the future if the actuator is operated according to a driver's request, an operation command of the actuator can be determined such that it gradually moves away from an operation command based on the driver's request (the aforesaid basic value).

In the first invention or the second invention, the first control law for the first future vehicle behavior determining means to determine the future vehicle behavior preferably includes processing for restricting each value of the time series of an operation command in the future vehicle behavior such that, when each value of the time series of an operation command in the future vehicle behavior is input to the initialized vehicle model in a time series manner from the current time side to carry out arithmetic processing of the initialized vehicle model, at least one of the road surface reaction force and the slippage of a wheel determined by the arithmetic processing falls within a predetermined permissible range (a thirteenth invention).

More specifically, in the first invention or the second invention described above, the first control law for the first future vehicle behavior determining means to determine the future vehicle behavior preferably includes processing for determining each provisional value of the time series of the operation command in the future vehicle behavior according to a predetermined 1a-th rule on the basis of at least the time series of the future drive manipulated variable that has been determined, processing for inputting at least each provisional value of the determined operation command in the time series manner from the current time side into the initialized vehicle model and carrying out the arithmetic processing of the initialized vehicle model thereby to determine, as a restriction object, at least one of the road surface reaction force and the slippage of a wheel to be combined with each provisional value of the time series of the operation command into a set, processing for determining whether the determined restriction object deviates from a predetermined permissible range, and processing for determining the provisional value as a value constituting the time series of an operation command in the future vehicle behavior if the restriction object to be combined with the provisional value into a set with respect to each of the provisional values does not deviate from the predetermined permissible range, or for determining a value obtained by correcting the provisional value according to a predetermined 1b-th rule such that the restriction object that has deviated falls within or approaches to a state to fall within the predetermined permissible range as a value constituting the time series of the operation command in the future vehicle behavior if the restriction object to be combined with the provisional value into a set deviates from the predetermined permissible range (a fourteenth invention).

According to the thirteenth invention and the fourteenth invention, a future vehicle behavior can be determined such that the restriction object (at least one of a road surface reaction force and the slippage of a wheel) does not become inappropriate, such as becoming excessive, in the future vehicle behavior. Consequently, an operation command that allows an evaluation object of an actual vehicle to satisfy the restrictive condition as much as possible can be properly determined. In particular, according to the fourteenth invention, a road surface reaction force or the slippage of a wheel (restriction object) is determined using the vehicle model on the basis of a provisional value of the operation command, thus making it possible to determine an operation command of a future vehicle behavior that permits the prevention of the restriction object from deviating from the permissible range as much as possible.

Further, according to the same concept of the thirteenth invention or the fourteenth invention described above, in the third invention or the fourth invention described above, preferably, the first control law for the first future vehicle behavior determining means to determine the first future vehicle behavior includes processing for restricting each value of the time series of an operation command in the first future vehicle behavior such that, when each value of the time series of an operation command in the first future vehicle behavior is input to the initialized vehicle model in a time series manner from the current time side to carry out arithmetic processing of the initialized vehicle model, at least one of the road surface reaction force and the slippage of a wheel determined by the arithmetic processing falls within a predetermined permissible range, and the second control law for the second future vehicle behavior determining means to determine the second future vehicle behavior includes processing for restricting each value of the time series of an operation command in the second future vehicle behavior such that, when each value of the time series of an operation command in the second future vehicle behavior is input to the initialized vehicle model in a time series manner from the current time side to carry out arithmetic processing of the initialized vehicle model, at least one of the road surface reaction force and the slippage of a wheel determined by the arithmetic processing falls within a predetermined permissible range (a fifteenth invention).

More specifically, in the third invention or the fourth invention described above, preferably, the first control law for the first future vehicle behavior determining means to determine the first future vehicle behavior includes processing for determining each provisional value of the time series of the operation command in the first future vehicle behavior according to a predetermined 1a-th rule on the basis of at least the time series of the future drive manipulated variable that has been determined, processing for inputting each provisional value of the determined operation command of the first future vehicle behavior in the time series manner from the current time side into the initialized vehicle model and carrying out the arithmetic processing of the initialized vehicle model thereby to determine, as a restriction object, at least one of the road surface reaction force and the slippage of a wheel to be combined with each provisional value of the time series of the operation command into a set, processing for determining whether the determined restriction object deviates from a predetermined permissible range, and processing for determining the provisional value as a value constituting the time series of an operation command in the first future vehicle behavior if the restriction object to be combined with the provisional value into a set with respect to each provisional value of the time series of the operation command in the first future vehicle behavior does not deviate from the predetermined permissible range, or for determining a value obtained by correcting the provisional value according to a predetermined 1b-th rule such that the restriction object that has deviated falls within or approaches to a state to fall within the predetermined permissible range as a value constituting the time series of the operation command in the first future vehicle behavior if the restriction object to be combined with the provisional value into a set deviates from the predetermined permissible range, and the second control law for the second future vehicle behavior determining means to determine the second future vehicle behavior includes processing for determining each provisional value of the time series of the operation command in the second future vehicle behavior according to a predetermined 2a-th rule, processing for inputting each provisional value of the determined operation command of at least the second future vehicle behavior in the time series manner from the current time side into the initialized vehicle model and carrying out the arithmetic processing of the initialized vehicle model thereby to determine, as a restriction object, at least one of the road surface reaction force and the slippage of a wheel to be combined with each provisional value of the time series of the operation command of the second future vehicle behavior into a set, processing for determining whether the determined restriction object deviates from a predetermined permissible range, and processing for determining the provisional value as a value constituting the time series of an operation command in the second future vehicle behavior if the restriction object to be combined with the provisional value into a set with respect to each provisional value of the time series of the operation command in the second future vehicle behavior does not deviate from the predetermined permissible range, or for determining a value obtained by correcting the provisional value according to a predetermined 2b-th rule such that the restriction object that has deviated falls within or approaches to a state to fall within the predetermined permissible range as a value constituting the time series of the operation command in the second future vehicle behavior if the restriction object to be combined with the provisional value into a set deviates from the predetermined permissible range (a sixteenth invention).

According to the fifteenth invention and the sixteenth invention, the second future vehicle behavior can be determined such that the restriction object (at least one of a road surface reaction force and the slippage of a wheel) does not become inappropriate, such as becoming excessive, in not only the first future vehicle behavior but also the second future vehicle behavior. Consequently, an operation command that allows an evaluation object of an actual vehicle to satisfy the restrictive condition as much as possible can be properly determined. In particular, according to the sixteenth invention, a road surface reaction force or the slippage of a wheel (restriction object) is determined using the vehicle model on the basis of a provisional value of the operation command, thus making it possible to determine operation commands of the first and the second future vehicle behaviors that permit the prevention of restriction objects from deviating from the permissible ranges as much as possible.

Similarly, in the fifth invention or the sixth invention described above, preferably, the first control law for the first future vehicle behavior determining means to determine the first future vehicle behavior includes processing for restricting each value of the time series of an operation command in the first future vehicle behavior such that, when each value of the time series of an operation command in the first future vehicle behavior is input to the initialized vehicle model in a time series manner from the current time side to carry out arithmetic processing of the initialized vehicle model, at least one of the road surface reaction force and the slippage of a wheel determined by the arithmetic processing falls within a predetermined permissible range, and the m-th control law for the m-th future vehicle behavior determining means to determine the m-th future vehicle behavior includes processing for restricting each value of the time series of an operation command in the m-th future vehicle behavior such that, when each value of the time series of an operation command in the m-th future vehicle behavior is input to the initialized vehicle model in a time series manner from the current time side to carry out arithmetic processing of the initialized vehicle model, at least one of the road surface reaction force and the slippage of a wheel determined by the arithmetic processing falls within a predetermined permissible range (a seventeenth invention).

More specifically, in the fifth invention or the sixth invention described above, preferably, the first control law for the first future vehicle behavior determining means to determine the first future vehicle behavior includes processing for determining each provisional value of the time series of the operation command in the first future vehicle behavior according to a predetermined 1a-th rule on the basis of at least the time series of the future drive manipulated variable that has been determined, processing for inputting each provisional value of the determined operation command of the first future vehicle behavior in the time series manner from the current time side into the initialized vehicle model and carrying out the arithmetic processing of the initialized vehicle model thereby to determine, as a restriction object, at least one of the road surface reaction force and the slippage of a wheel to be combined with each provisional value of the time series of the operation command into a set, processing for determining whether the determined restriction object deviates from a predetermined permissible range, and processing for determining the provisional value as a value constituting the time series of an operation command in the first future vehicle behavior if the restriction object to be combined with the provisional value into a set with respect to each provisional value of the time series of an operation command in the first future vehicle behavior does not deviate from the predetermined permissible range, or for determining a value obtained by correcting the provisional value according to a predetermined 1b-th rule such that the restriction object that has deviated falls within or approaches to a state to fall within the predetermined permissible range as a value constituting the time series of the operation command in the first future vehicle behavior if the restriction object to be combined with the provisional value into a set deviates from the predetermined permissible range, and the m-th control law for the m-th future vehicle behavior determining means to determine the m-th future vehicle behavior includes processing for determining each provisional value of the time series of the operation command in the m-th future vehicle behavior according to a predetermined ma-th rule, processing for inputting at least each provisional value of the determined operation command of the m-th future vehicle behavior in the time series manner from the current time side into the initialized vehicle model and carrying out the arithmetic processing of the initialized vehicle model thereby to determine, as a restriction object, at least one of the road surface reaction force and the slippage of a wheel to be combined with each provisional value of the time series of the operation command of the m-th future vehicle behavior into a set, processing for determining whether the determined restriction object deviates from a predetermined permissible range, and processing for determining the provisional value as a value constituting the time series of an operation command in the m-th future vehicle behavior if the restriction object to be combined with the provisional value into a set with respect to each provisional value of the time series of an operation command in the m-th future vehicle behavior does not deviate from the predetermined permissible range, or for determining a value obtained by correcting the provisional value according to a predetermined mb-th rule such that the restriction object that has deviated falls within or approaches to a state to fall within the predetermined permissible range as a value constituting the time series of the operation command in the second future vehicle behavior if the restriction object to be combined with the provisional value into a set deviates from the predetermined permissible range (an eighteenth invention).

According to the seventeenth invention and the eighteenth invention, the m-th future vehicle behavior can be determined such that the restriction object (at least one of a road surface reaction force and the slippage of a wheel) does not become inappropriate, such as becoming excessive, in not only the first future vehicle behavior but also the m-th future vehicle behavior. Consequently, an operation command that allows an evaluation object of an actual vehicle to satisfy the restrictive condition as much as possible can be properly determined. In particular, according to the eighteenth invention, a road surface reaction force or the slippage of a wheel (restriction object) is determined using the vehicle model on the basis of a provisional value of the operation command, thus making it possible to determine operation commands of the first and the m-th future vehicle behaviors that permit the prevention of restriction objects from deviating from the permissible ranges as much as possible.

In the aforesaid fourteenth invention, as with the aforesaid seventh invention, preferably, the first future vehicle behavior determining means is provided with a means for determining a future basic operation command, which is the time series of a basic value of the operation command in the future after the current time, on the basis of at least the time series of the determined future drive manipulated variable, wherein the 1a-th rule for the first future vehicle behavior determining means to determine each provisional value of an operation command in the future vehicle behavior is a rule for determining the future vehicle behavior such that at least the difference between an operation command at the current time in the future vehicle behavior and the basic value at the current time in the determined future basic operation command approaches to zero or coincides with zero (a nineteenth invention).

In the aforesaid sixteenth invention, as with the aforesaid ninth invention, preferably, the first future vehicle behavior determining means is equipped with a means for determining a future basic operation command, which is the time series of a basic value of the operation command in the future after the current time, on the basis of at least the time series of the determined future drive manipulated variable, wherein the 1a-th rule for the first future vehicle behavior determining means to determine each provisional value of a time series of an operation command in the first future vehicle behavior is a rule for determining each provisional value of the time series of the operation command in the first future vehicle behavior such that at least the difference between an operation command at the current time in the first future vehicle behavior and the basic value at the current time in the determined future basic operation command approaches to zero or coincides with zero, and the 2a-th rule for the second future vehicle behavior determining means to determine each provisional value of a time series of an operation command of the second future vehicle behavior is a rule which defines the difference between an operation command at the current time in the second future vehicle behavior and the basic value at the current time in the determined future basic operation command as $\Delta 2(1)$, defines the difference between an operation command at the next time following the current time in the second future vehicle behavior and the basic value at the next time following the current time in the determined future basic operation command as $\Delta 2(2)$, defines the difference between an operation command at the current time in the first future vehicle behavior and the basic value at the current time in the determined future basic operation command as $\Delta 1(1)$, defines the difference between an operation command at the next time following the current time in the first future vehicle behavior and the basic value at the next time following the current time in the determined future basic operation command as $\Delta 1(2)$, and determines each provisional value of the time series of the operation command of the second future vehicle behavior such that at least $\Delta 2(1)$ is farther away from zero than $\Delta 1(1)$ or $\Delta 2(2)$ is farther away from zero than $\Delta 1(2)$ (a twentieth invention).

In the twentieth invention, as with the tenth invention, the 2a-th rule for the second future vehicle behavior determining means to determine each provisional value of the time series of the operation command of the second future vehicle behavior is preferably a rule for determining each provisional value of the time series of the operation command of the second future vehicle behavior such that the difference between an operation command at arbitrary time k of the second future vehicle behavior and the basic value at the time k in the determined future basic operation command gradually moves away from zero as the time k proceeds (a twenty-first invention).

Further, in the aforesaid eighteenth invention, as with the eleventh invention, preferably, the first future vehicle behavior determining means is equipped with a means for determining a future basic operation command, which is the time series of a basic value of the operation command in the future after the current time on the basis of at least the time series of the determined future drive manipulated variable, wherein the 1a-th rule for the first future vehicle behavior determining means to determine each provisional value of a time series of an operation command in the first future vehicle behavior is a rule for determining each provisional value of the time series of the operation command in the first future vehicle behavior such that at least the difference between an operation command at the current time in the first future vehicle behavior and the basic value at the current time in the determined future basic operation command approaches to zero or coincides with zero, and the ma-th rule for the m-th future vehicle behavior determining means to determine each provisional value of a time series of an operation command of the m-th future vehicle behavior is a rule which defines the difference between an operation command at the current time in the m-th future vehicle behavior and the basic value at the current time in the determined future basic operation command as $\Delta m(1)$, defines the difference between an operation command at the next time following the current time in the m-th future vehicle behavior and the basic value at the next time following the current time in the determined future basic operation command as $\Delta m(2)$, defines the difference between an operation command at the current time in the (m−1)th future vehicle behavior and the basic value at the current time in the determined future basic operation command as $\Delta m-1(1)$, defines the difference between an operation command at the next time following the current time in the (m−1)th future vehicle behavior and the basic value at the next time following the current time in the determined future basic operation command as $\Delta m-1(2)$, and determines each provisional value of the time series of the operation command of the m-th future vehicle behavior such that at least $\Delta m(1)$ is farther away from zero than $\Delta m-1(1)$ or $\Delta m(2)$ is farther away from zero than $\Delta m-1(2)$ (a twenty-second invention).

In the twenty-second invention, as with the twelfth invention, the ma-th rule for the m-th future vehicle behavior determining means to determine each provisional value of the time series of the operation command of the m-th future vehicle behavior is preferably a rule for determining each provisional value of the time series of the operation command of the m-th future vehicle behavior such that the difference between an operation command at arbitrary time k of the m-th future vehicle behavior and the basic value at the time k in the determined future basic operation command gradually moves away from zero as the time k proceeds (a twenty-third invention).

According to the nineteenth invention to the twenty-third invention, the same operations and advantages as those of the seventh invention, the ninth invention, the tenth invention, the eleventh invention, and the twelfth invention, respectively, can be obtained.

Further, in the aforesaid first invention, the actuator controlling means may include a reference state determining means for determining a future reference state, which is a reference state for a predetermined second state amount related to a vehicle motion in the future after the current time, on the basis of at least the time series of the future drive manipulated variable that has been determined, and a permissible range setting means for setting a permissible range of the second state amount related to the future vehicle motion according to the determined reference state, wherein the evaluation object in the processing by the evaluating means may include the second state amount, and the restrictive condition may include a condition in which the second state amount falls within the determined permissible range (a twenty-fourth invention).

The twenty-fourth invention makes it possible to determine an operation command of the actuator such that the second state amount related to a vehicle motion does not excessively deviate (the second state amount falls within the permissible range) from the future reference state (this means a future ideal state related to the second state amount).

The second state amount may be of course a different state amount from the first state amount, or it may be the same as the first state amount or a partial state amount of the first state amount.

Further, in the first invention or the second invention described above, the actuator controlling means may be equipped with a first reference state determining means for sequentially determining a reference state before the current time, which is a reference state up to the current time with respect to a predetermined second state amount related to the vehicle motion, on the basis of at least the drive manipulated variable detected by the drive manipulated variable detecting means before the current time, and a second reference state determining means for determining a future reference state, which is a reference state in the future after the current time with respect to the second reference state, on the basis of at least a time series of the future drive manipulated variable that has been determined and the determined reference state before the current time, wherein the first control law for the first future vehicle behavior determining means to determine the future vehicle behavior may be a control law for determining the future vehicle behavior such that, when each value of the time series of an operation command in the future vehicle behavior is input to the initialized vehicle model in a time series manner from the current time side to carry out arithmetic processing of the initialized vehicle model, the second state amount related to the vehicle motion determined by the arithmetic processing approaches to the determined future reference state (a twenty-fifth invention).

According to the twenty-fifth invention, the future reference state, which means a future ideal state related to the second state amount, is determined on the basis of the future drive manipulated variable and the reference state amount before the current time, so that a future reference state connecting to the reference state before the current time can be properly determined. Further, the future vehicle behavior is determined using the initialized vehicle model such that the second state amount therein approaches to the future reference state, thus making it possible to sequentially determine an operation command of the actuator such that the second state amount related to a motion of an actual vehicle approaches to an ideal state as long as at least the evaluation object of the future vehicle behavior satisfies the predetermined restrictive condition.

In the twenty-fifth invention, more specifically, for example, an operation command at arbitrary time k in the future vehicle behavior determined by the first future vehicle behavior determining means is a resultant value of a feedforward component and a feedback component, and the first control law for the first future vehicle behavior determining means to determine the future vehicle behavior is a control law which includes processing for determining the feedforward component of the operation command at time k in the future vehicle behavior according to a predetermined first feedforward control law on the basis of at least the value of a drive manipulated variable at time k or time k−1 in the time series of the determined future drive manipulated variable, processing for determining the feedback component of the operation command at time k in the future vehicle behavior according to a predetermined first feedback control law on the basis of the difference between a value at time k−1 in a second state amount related to a vehicle motion on the initialized vehicle model and a value at time k or time k−1 of the determined future reference state such that the difference is brought close to zero, and processing for combining the feedforward component and the feedback component at time k in the future vehicle behavior to determine an operation command at the time k (a twenty-sixth invention).

The twenty-sixth invention makes it possible to determine an operation command of the future vehicle behavior such that the second state amount of the future vehicle behavior approaches to the future reference state by using the feedback component while taking the feedforward component based on the future drive manipulated variable as a reference.

Further, in the third invention or the fourth invention described above, the actuator controlling means may be equipped with a first reference state determining means for sequentially determining a reference state before the current time, which is a reference state up to the current time with respect to a predetermined second state amount related to the vehicle motion, on the basis of at least the drive manipulated variable detected by the drive manipulated variable detecting means before the current time, and a second reference state determining means for determining a future reference state, which is a reference state in the future after the current time with respect to the second state amount, on the basis of at least a time series of the future drive manipulated variable that has been determined and the determined reference state before the current time, wherein the first control law for the first future vehicle behavior determining means to determine the first future vehicle behavior may be a control law for determining the first future vehicle behavior such that, when each value of the time series of an operation command in the first future vehicle behavior is input to the initialized vehicle model in a time series manner from the current time side to carry out arithmetic processing of the initialized vehicle model, the second state amount related to the vehicle motion determined by the arithmetic processing approaches to the determined future reference state, and the second control law for the second future vehicle behavior determining means to determine the second future vehicle behavior may be a control law for determining the second future vehicle behavior such that, when each value of the time series of an operation command in the second future vehicle behavior is input to the initialized vehicle model in a time series manner from the current time side to carry out arithmetic processing of the initialized vehicle model, the second state amount related to the vehicle motion determined by the arithmetic processing approaches to the determined future reference state (a twenty-seventh invention).

According to the twenty-seventh invention, as with the aforesaid twenty-fifth invention, the future reference state, which means a future ideal state related to the second state amount, is determined on the basis of the future drive manipulated variable and the reference state amount before the current time, so that a future reference state connecting to the reference state before the current time can be properly determined. Further, the first future vehicle behavior and the second future vehicle behavior are determined using the initialized vehicle model such that the second state amounts therein approach to the future reference state, thus making it possible to sequentially determine an operation command of the actuator such that the second state amount related to a motion of an actual vehicle approaches to an ideal state as long as at least the evaluation object of the first future vehicle behavior or the second future vehicle behavior satisfy the predetermined restrictive condition.

In the twenty-seventh invention, more specifically, for example, an operation command at arbitrary time k in the first future vehicle behavior determined by the first future vehicle behavior determining means is a resultant value of a first feedforward component and a first feedback component, and the first control law for the first future vehicle behavior determining means to determine the first future vehicle behavior is a control law which includes processing for determining the first feedforward component of the operation command at time k in the first future vehicle behavior according to a predetermined first feedforward control law on the basis of at least the value of a drive manipulated variable at time k or time k−1 in the time series of the determined future drive manipulated variable, processing for determining the first feedback component of the operation command at time k in the first future vehicle behavior according to a predetermined first feedback control law on the basis of the difference between a value at time k−1 in a second state amount related to a vehicle motion on the initialized vehicle model and a value at time k or time k−1 of the determined future reference state such that the difference is brought close to zero, and processing for combining the first feedforward component and the first feedback component at time k in the first future vehicle behavior to determine an operation command at the time k, and an operation command at arbitrary time k in the second future vehicle behavior determined by the second future vehicle behavior determining means is a resultant value of a second feedforward component and a second feedback component, and the second control law for the second future vehicle behavior determining means to determine the second future vehicle behavior is a control law which includes processing for determining the second feedforward component of the operation command at time k in the second future vehicle behavior according to a predetermined second feedforward control law, processing for determining the second feedback component of the operation command at time k in the second future vehicle behavior according to a predetermined second feedback control law on the basis of the difference between a value at time k−1 in a second state amount related to a vehicle motion on the initialized vehicle model and a value at time k or time k−1 of the determined future reference state such that the difference is brought close to zero, and processing for combining the second feedforward component and the second feedback component at time k in the second future vehicle behavior to determine an operation command at the time k (a twenty-eighth invention).

The twenty-eighth invention makes it possible to determine an operation command of the first future vehicle behavior such that the second state amount of the first future vehicle behavior approaches to the future reference state by using the first feedback component while taking the first feedforward component based on the future drive manipulated variable as a reference. Similarly, it is possible to determine an operation command of the second future vehicle behavior such that the second state amount of the second future vehicle behavior approaches to the future reference state by using the second feedback component while taking the second feedforward component as a reference.

In the twenty-eighth invention, the first feedback control law and the second feedback control law described above may be feedback control laws that are different from each other, or may be the same feedback control laws.

Further, in the fifth invention or the sixth invention, the actuator controlling means may be equipped with a first reference state determining means for sequentially determining a reference state before the current time, which is a reference state up to the current time with respect to a predetermined second state amount related to the vehicle motion, on the basis of at least the drive manipulated variable detected by the drive manipulated variable detecting means before the current time, and a second reference state determining means for determining a future reference state, which is a reference state in the future after the current time with respect to the second state amount, on the basis of at least a time series of the future drive manipulated variable that has been determined and the determined reference state before the current time, wherein the first control law for the first future vehicle behavior determining means to determine the first future vehicle behavior may be a control law for determining the first future vehicle behavior such that, when each value of the time series of an operation command in the first future vehicle behavior is input to the initialized vehicle model in a time series manner from the current time side to carry out arithmetic processing of the initialized vehicle model, the second state amount related to the vehicle motion determined by the arithmetic processing approaches to the determined future reference state, and the m-th control law for the m-th future vehicle behavior determining means to determine the m-th future vehicle behavior may be a control law for determining the m-th future vehicle behavior such that, when each value of the time series of an operation command in the m-th future vehicle behavior is input to the initialized vehicle model in a time series manner from the current time side to carry out arithmetic processing of the initialized vehicle model, the second state amount related to the vehicle motion determined by the arithmetic processing approaches to the determined future reference state (a twenty-ninth invention).

According to the twenty-ninth invention, as with the aforesaid twenty-fifth invention, the future reference state, which means a future ideal state related to the second state amount, is determined on the basis of the future drive manipulated variable and the reference state amount before the current time, so that a future reference state connecting to the reference state before the current time can be properly determined.

Further, the first future vehicle behavior and the m-th future vehicle behavior are determined using the initialized vehicle model such that the second state amounts therein approach to the future reference state, thus making it possible to sequentially determine an operation command of the actuator such that the second state amount related to a motion of an actual vehicle approaches to an ideal state as long as at least the evaluation object of the first future vehicle behavior or the m-th future vehicle behavior satisfy the predetermined restrictive condition.

In the twenty-ninth invention, more specifically, for example, an operation command at arbitrary time k in the first future vehicle behavior determined by the first future vehicle behavior determining means is a resultant value of a first feedforward component and a first feedback component, and the first control law for the first future vehicle behavior determining means to determine the first future vehicle behavior is a control law which includes processing for determining the first feedforward component of the operation command at time k in the first future vehicle behavior according to a predetermined first feedforward control law on the basis of at least the value of a drive manipulated variable at time k or time k−1 in the time series of the determined future drive manipulated variable, processing for determining the first feedback component of the operation command at time k in the first future vehicle behavior according to a predetermined first feedback control law on the basis of the difference between a value at time k−1 in a second state amount related to a vehicle motion on the initialized vehicle model and a value at time k or time k−1 of the determined future reference state such that the difference is brought close to zero, and processing for combining the first feedforward component and the first feedback component at time k in the first future vehicle behavior to determine an operation command at the time k, and an operation command at arbitrary time k in the m-th future vehicle behavior determined by the m-th future vehicle behavior determining means is a resultant value of an m-th feedforward component and an m-th feedback component, and the m-th control law for the m-th future vehicle behavior determining means to determine the m-th future vehicle behavior is a control law which includes processing for determining the m-th feedforward component of the operation command at time k in the m-th future vehicle behavior according to a predetermined m-th feedforward control law, processing for determining the m-th feedback component of the operation command at time k in the m-th future vehicle behavior according to a predetermined m-th feedback control law on the basis of the difference between a value at time k−1 in a second state amount related to a vehicle motion on the initialized vehicle model and a value at time k or time k−1 of the determined future reference state such that the difference is brought close to zero, and processing for combining the m-th feedforward component and the m-th feedback component at time k in the m-th future vehicle behavior to determine an operation command at the time k (a thirtieth invention).

The thirtieth invention makes it possible to determine an operation command of the first future vehicle behavior such that the second state amount of the first future vehicle behavior approaches to the future reference state by using the first feedback component while taking the first feedforward component based on the future drive manipulated variable as a reference. Similarly, it is possible to determine an operation command of the m-th future vehicle behavior such that the second state amount of the m-th future vehicle behavior approaches to the future reference state by using the m-th feedback component while taking the m-th feedforward component as a reference.

In the thirtieth invention, the first feedback control law and the m-th (m=2, 3, ..., M) feedback control law described above may be feedback control laws that are different from each other, or may be the same feedback control laws.

Further, in the twenty-sixth invention, more specifically, preferably, the feedforward component of the operation command at arbitrary time k in the future vehicle behavior determined by the first future vehicle behavior determining means is constituted of a basic feedforward component and a first auxiliary feedforward component, and the first feedforward control law of the first future vehicle behavior determining means is a control law which includes processing for determining the basic feedforward component of the operation command at arbitrary time k in the future vehicle behavior on the basis of at least a value of a drive manipulated variable at time k or time k−1 in the time series of the determined future drive manipulated variable and processing for determining the first auxiliary feedforward component of an operation command at each time of the future vehicle behavior in a predetermined pattern that causes at least the first auxiliary feedforward component at the current time in the future vehicle behavior to approach more to zero than a value of the first auxiliary feedforward component at time immediately preceding the current time at which the actuator controlling means attempts to determine a new operation command or to coincide with zero (a thirty-first invention).

According to the thirty-first invention, the basic feedforward component means an operation command of the actuator showing a vehicle behavior based on a request of a driver of a vehicle expressed by the drive manipulated variable. And, if an evaluation object of the future vehicle behavior determined by the first future vehicle behavior determining means satisfies the predetermined restrictive condition, then an operation command having a feedforward component that is close to or coincides with the basic feedforward component will be sequentially determined. Therefore, in a situation wherein an evaluation object of an actual vehicle is predicted to satisfy the predetermined restrictive condition in the future, the vehicle can be driven according to the driver's request as much as possible while bringing a second state amount related to a motion of the actual vehicle close to a reference state (ideal state).

The basic feedforward component in the thirty-first invention corresponds to the basic value in the aforesaid seventh invention.

In the aforesaid twenty-eighth invention, preferably, the first feedforward component of the operation command at arbitrary time k in the first future vehicle behavior determined by the first future vehicle behavior determining means is constituted of a basic feedforward component and a first auxiliary feedforward component, and the first feedforward control law of the first future vehicle behavior determining means is a control law which includes processing for determining the basic feedforward component of the operation command at arbitrary time k in the first future vehicle behavior on the basis of at least a value of a drive manipulated variable at time k or time k−1 in the time series of the determined future drive manipulated variable and processing for determining the first auxiliary feedforward component of an operation command at each time of the first future vehicle behavior in a predetermined pattern that causes at least the first auxiliary feedforward component at the current time in the first future vehicle behavior to approach more to zero than a value of the first auxiliary feedforward component at time immediately preceding the current time at which the actuator controlling means attempts to determine a new operation command or to coincide with zero, and the second feedforward component of an operation command at arbitrary time k in the second future vehicle behavior determined by the second future vehicle behavior determining means is constituted of the basic feedforward component and a second auxiliary feedforward component, and the second feedforward control law of the second future vehicle behavior determining means is a control law which includes processing which defines the second auxiliary feedforward components at the current time and the next time following the current time in the second future vehicle behavior as FF2_2(1) and FF2_2(2), respectively, and the first auxiliary feedforward components at the current time and the next time following the current time in the first future vehicle behavior as FF2_1(1) and FF2_1(2), respectively, and determines a second auxiliary feedforward component of an operation command at each time of the second future vehicle behavior in a predetermined pattern that causes at least FF2_2(1) to move farther away from zero than FF2_1(1) and FF2_2(2) to move farther away from zero than FF2_1(2) (a thirty-second invention).

The thirty-second invention can provide the same operations and advantages as those of the aforesaid thirty-first invention if an evaluation object of the first future vehicle behavior satisfies the predetermined restrictive condition. On the other hand, if the evaluation object of the first future vehicle behavior does not satisfy the predetermined restrictive condition, then the second auxiliary feedforward component of an operation command at each time of the second future vehicle behavior is determined in a predetermined pattern that causes at least the FF2_2(1) to move farther away from zero than FF2_1(1) and the FF2_2(2) to move farther away from zero than FF2_1(2). Hence, in a situation wherein an evaluation object of a vehicle is predicted not to satisfy the predetermined restrictive condition in the future if the actuator is operated according to a driver's request while bringing a second state amount related to a motion of an actual vehicle close to a reference state (ideal state), the second future vehicle behavior can be determined such that the occurrence of the situation can be prevented from the current time or from the next time following the current time. Therefore, an appropriate actuator operation command for preventing the occurrence of the aforesaid situation can be determined by determining the operation command at the current time of the actuator on the basis of the evaluation by the evaluating means on the evaluation object of the second future vehicle behavior.

The basic feedforward component in the thirty-second invention corresponds to the basic value in the aforesaid ninth invention.

Further, in the thirty-second invention, the aforesaid second feedforward control law of the second future vehicle behavior determining means is preferably a control law for determining the second auxiliary feedforward component of an operation command at arbitrary time k of the second future vehicle behavior such that it gradually moves away from zero as the time k proceeds (a thirty-third invention).

According to the thirty-third invention, in a situation wherein an evaluation object of a vehicle is predicted not to satisfy the predetermined restrictive condition in the future if the actuator is operated according to a driver's request while bringing a second state amount of an actual vehicle close to a reference state (ideal state), the feedforward component of an operation command of the actuator can be determined such that it gradually moves away from a basic feedforward component serving as a component of an operation command based on the driver's request.

As with the aforesaid thirty-second invention, in the aforesaid thirtieth invention, preferably, the first feedforward component of the operation command at arbitrary time k in the first future vehicle behavior determined by the first future vehicle behavior determining means is constituted of a basic feedforward component and a first auxiliary feedforward component, and the first feedforward control law of the first future vehicle behavior determining means is a control law which includes processing for determining the basic feedforward component of the operation command at arbitrary time k in the first future vehicle behavior on the basis of at least a value of a drive manipulated variable at time k or time k−1 in the time series of the determined future drive manipulated variable and processing for determining the first auxiliary feedforward component of an operation command at each time of the first future vehicle behavior in a predetermined pattern that causes at least the first auxiliary feedforward component at the current time in the first future vehicle behavior to approach more to zero than a value of the first auxiliary feedforward component at time immediately preceding the current time at which the actuator controlling means attempts to determine a new operation command or to coincide with zero, and the m-th feedforward component of an operation command at arbitrary time k in the m-th future vehicle behavior determined by the m-th future vehicle behavior determining means is constituted of the basic feedforward component and an m-th auxiliary feedforward component, and the m-th feedforward control law of the m-th future vehicle behavior determining means is a control law which includes processing which defines the m-th auxiliary feedforward components at the current time and the next time following the current time in the m-th future vehicle behavior as FF$2m(1)$ and FF$2m(2)$, respectively, and the (m−1)th auxiliary feedforward components at the current time and the next time following the current time in the (m−1)th future vehicle behavior as FF$2m-1(1)$ and FF$2m-1(2)$, respectively, and determines an m-th auxiliary feedforward component of an operation command at each time of the m-th future vehicle behavior in a predetermined pattern that causes at least FF$2m(1)$ to move farther away from zero than FF$2m-1(1)$ or FF$2m(2)$ to move farther away from zero than FF$2m-1(2)$ (a thirty-fourth invention).

The thirty-fourth invention can provide the same operations and advantages as those of the aforesaid thirty-first invention if an evaluation object of the first future vehicle behavior satisfies the predetermined restrictive condition. On the other hand, if the evaluation objects of the first to the (m−1)th future vehicle behavior does not satisfy the predetermined restrictive condition, then the m-th auxiliary feedforward component of an operation command at each time of the m-th future vehicle behavior is determined in a predetermined pattern that causes at least the FF$2m(1)$ to move farther away from zero than FF$2m-1(1)$ or the FF$2m(2)$ to move farther away from zero than FF$2m-1(2)$. Hence, in a situation wherein an evaluation object is predicted not to satisfy the predetermined restrictive condition in the future if the actuator is operated according to an operation command of the (m−1)th future vehicle behavior, the m-th future vehicle behavior can be determined such that the occurrence of the situation can be prevented from the current time or from the next time following the current time. Therefore, an appropriate actuator operation command for preventing the occurrence of the situation wherein an evaluation object of an actual vehicle comes not to satisfy the predetermined restrictive condition can be determined.

The basic feedforward component in the thirty-fourth invention corresponds to the basic value in the aforesaid eleventh invention.

Further, in the thirty-fourth invention, the aforesaid m-th feedforward control law of the m-th future vehicle behavior determining means is preferably a control law for determining the m-th auxiliary feedforward component of an operation command at arbitrary time k of the m-th future vehicle behavior such that it gradually moves away from zero as the time k proceeds (a thirty-fifth invention).

According to the thirty-fifth invention, in a situation wherein an evaluation object of a vehicle is predicted not to satisfy the predetermined restrictive condition in the future if the actuator is operated according to a driver's request while bringing a second state amount of an actual vehicle close to a reference state (ideal state), the feedforward component of an operation command of the actuator can be determined such that it gradually moves away from a basic feedforward component serving as a component of an operation command based on the driver's request.

In the aforesaid twenty-sixth invention, more specifically, the first future vehicle behavior determining means may be equipped with a means for setting a feedback gain of the first feedback control law at each time in the future vehicle behavior in a predetermined pattern that causes at least a feedback gain of the first feedback control law at the current time in the future vehicle behavior to approach more to a predetermined reference gain than a feedback gain value at time immediately preceding the current time at which the actuator controlling means attempts to determine a new operation command or to coincide with the reference gain (a thirty-sixth invention).

According to the thirty-sixth invention, if an evaluation object of a future vehicle behavior determined by the first future vehicle behavior determining means satisfies the predetermined restrictive condition, then a feedback gain of the first feedback control law is sequentially determined in a predetermined pattern that causes the feedback gain to be close to or coincide with a reference gain. Therefore, in a situation wherein an evaluation object of an actual vehicle is predicted to satisfy the predetermined restrictive condition in the future, a second state amount related to a motion related to an actual vehicle can be properly brought close to a reference state (ideal state).

Further, in the aforesaid twenty-eighth invention, the first future vehicle behavior determining means may be equipped with a means for setting a feedback gain of the first feedback control law at each time in the future vehicle behavior in a predetermined pattern that causes at least a feedback gain of the first feedback control law at the current time in the future vehicle behavior to approach more to a predetermined reference gain than a feedback gain value at time immediately preceding the current time at which the actuator controlling means attempts to determine a new operation command or to coincide with the reference gain, and the second future vehicle behavior determining means may be equipped with a means for setting a feedback gain of the second feedback control law at each time of the second future vehicle behavior in a predetermined pattern wherein, when the feedback gains of the second feedback control law at the current time and the next time following the current time in the second future vehicle behavior are defined as Kfb_2(1) and Kfb_2(2), respectively, and the feedback gains of the first feedback control law at the current time and the next time following the current time in the first future vehicle behavior are defined as Kfb_1(1) and Kfb_1(2), respectively, at least Kfb_2(1) is farther away from the reference gain than Kfb_1(1) or Kfb_2(2) is farther away from the reference gain than Kfb_1(2) (a thirty-seventh invention).

According to the thirty-seventh invention, if an evaluation object of the first future vehicle behavior satisfies the predetermined restrictive condition, then the same operations and advantages as those of the thirty-sixth invention can be obtained. On the other hand, if the evaluation object of the first future vehicle behavior does not satisfy the predetermined restrictive condition, then the feedback gain of the second feedback control law at each time of the second future vehicle behavior is set in a predetermined pattern that causes at least the Kfb_2(1) to move farther away from the reference gain than Kfb_1(1) or the Kfb_2(2) to move farther away from the reference gain than Kfb_1(2). Hence, in a situation wherein an evaluation object of a vehicle is predicted not to satisfy the predetermined restrictive condition in the future if the actuator is operated according to a driver's request while bringing a second state amount related to a motion of an actual vehicle close to a reference state (ideal state), the feedback component of the second future vehicle behavior can be determined such that the occurrence of the situation can be prevented from the current time or from the next time following the current time. Therefore, an appropriate actuator operation command for preventing the occurrence of the aforesaid situation can be determined by determining the operation command at the current time of the actuator on the basis of the evaluation by the evaluating means on the evaluation object of the second future vehicle behavior.

Further, in the thirty-seventh invention, the means for setting a feedback gain of the second feedback control law preferably sets the feedback gain of a second feedback control law at arbitrary time k of the second future vehicle behavior such that it gradually moves away from the reference gain as the time k proceeds (a thirty-eighth invention).

According to the thirty-eighth invention, in a situation wherein an evaluation object of a vehicle is predicted not to satisfy the predetermined restrictive condition in the future if the actuator is operated according to a driver's request while bringing a second state amount of an actual vehicle close to a reference state (ideal state), the feedback gain of the second feedback control law can be determined such that it gradually moves away from a reference gain.

As with the aforesaid thirty-seventh invention, in the aforesaid thirtieth invention, the first future vehicle behavior determining means may be equipped with a means for setting a feedback gain of the first feedback control law at each time in the future vehicle behavior in a predetermined pattern that causes at least a feedback gain of the first feedback control law at the current time in the future vehicle behavior to approach more to a predetermined reference gain than a feedback gain value at time immediately preceding the current time at which the actuator controlling means attempts to determine a new operation command or to coincide with the reference gain, and the m-th future vehicle behavior determining means may be equipped with a means for setting a feedback gain of the m-th feedback control law at each time of the m-th future vehicle behavior in a predetermined pattern wherein, when the feedback gains of the m-th feedback control law at the current time and the next time following the current time in the m-th future vehicle behavior are defined as Kfbm(1) and Kfbm(2), respectively, and the feedback gains of the (m−1)th feedback control law at the current time and the next time following the current time in the (m−1)th future vehicle behavior are defined as Kfbm−1(1) and Kfbm−1(2), respectively, at least Kfbm(1) is farther away from the reference gain than Kfbm−1(1) or Kfbm(2) is farther away from the reference gain than Kfbm−1(2) (a thirty-ninth invention).

According to the thirty-ninth invention, if an evaluation object of the first future vehicle behavior satisfies the predetermined restrictive condition, then the same operations and advantages as those of the thirty-sixth invention can be obtained. On the other hand, if the evaluation objects of the first to the (m−1)th future vehicle behaviors do not satisfy the predetermined restrictive condition, then the feedback gain of the m-th feedback control law at each time of the m-th future vehicle behavior is set in a predetermined pattern that causes at least the Kfbm(1) to move farther away from the reference gain than Kfbm−1(1) or the Kfbm(2) to move farther away from the reference gain than Kfbm−1(2). Hence, in a situation wherein an evaluation object is predicted not to satisfy the predetermined restrictive condition in the future if the actuator is operated according to an operation command of the (m−1)th future vehicle behavior, the feedback component of the m-th future vehicle behavior can be determined such that the occurrence of the situation can be prevented from the current time or from the next time following the current time. Therefore, an appropriate actuator operation command can be determined to prevent the occurrence of the aforesaid situation, in which an evaluation object of an actual vehicle comes not to satisfy the predetermined restrictive condition.

Further, in the thirty-ninth invention, the means for setting a feedback gain of the m-th feedback control law preferably sets a feedback gain of an m-th feedback control law at arbitrary time k of the m-th future vehicle behavior such that it gradually moves away from the reference gain as the time k proceeds (a fortieth invention).

According to the fortieth invention, in a situation wherein an evaluation object of a vehicle is predicted not to satisfy the predetermined restrictive condition in the future if the actuator is operated according to a driver's request while bringing a second state amount of an actual vehicle close to a reference state (ideal state), the feedback gain of the m-th feedback control law can be determined such that it gradually moves away from a reference gain.

Further, in the aforesaid twenty-sixth invention, the second reference state determining means may be constituted of a means for determining a future basic reference state after the current time with respect to the second state amount on the basis of at least the time series of the future drive manipulated variable that has been determined and the determined reference state before the current time, a means for determining a reference correction amount for correcting the basic reference state, and a means for determining the future reference state by correcting the determined basic reference state by the reference correction amount, and the means for determining the reference correction amount may, when determining the future vehicle behavior time series by the first future vehicle behavior determining means, determine the reference correction amount at each time of the future vehicle behavior according to a predetermined pattern that causes at least the reference correction amount at the current time in the future vehicle behavior to approach more to zero than the value of a reference correction amount at time immediately preceding the current time at which the actuator controlling means attempts to determine a new operation command or to coincide with zero (a forty-first invention).

According to the forty-first invention, if the evaluation object of a future vehicle behavior determined by the first future vehicle behavior determining means satisfies the predetermined restrictive condition, then the reference correction amount is sequentially determined according to a predetermined pattern that causes the reference correction amount to be close to or coincide with zero. Hence, in a situation wherein an evaluation object of an actual vehicle is predicted to satisfy the predetermined restrictive condition in the future, a second state amount related to a motion of the actual vehicle can be properly brought close to a reference state (ideal state).

Further, in the aforesaid twenty-eighth invention, the second reference state determining means may be constituted of a means for determining a future basic reference state after the current time with respect to the second state amount on the basis of at least the time series of the future drive manipulated variable that has been determined and the determined reference state before the current time, a means for determining a reference correction amount for correcting the basic reference state, and a means for determining the future reference state by correcting the determined basic reference state by the reference correction amount, and the means for determining the reference correction amount may, when determining the first future vehicle behavior by the first future vehicle behavior determining means, determine the reference correction amount at each time of the future vehicle behavior according to a predetermined pattern that causes at least the reference correction amount at the current time in the first future vehicle behavior to approach more to zero than the value of a reference correction amount at time immediately preceding the current time at which the actuator controlling means attempts to determine a new operation command or to coincide with zero, and when determining the second future vehicle behavior by the second future vehicle behavior determining means, the means for determining the reference correction may define the reference correction amounts at the current time and the next time following the current time in the second future vehicle behavior as C2(1) and C2(2), define the reference correction amounts at the current time and the next time following the current time in the first future vehicle behavior as C1(1) and C1(2), and determine the reference correction amount at each time of the second future vehicle behavior according to a predetermined pattern that causes at least C2(1) to move farther away from zero than C1(1) or C2(2) to move farther away from zero than C1(2) (a forty-second invention).

According to the forty-second invention, the same operations and advantages as those of the aforesaid forty-first invention can be obtained if an evaluation object of the first future vehicle behavior satisfies the predetermined restrictive condition. On the other hand, if the evaluation object of the first future vehicle behavior does not satisfy the predetermined restrictive condition, then the reference correction amount at each time of the second future vehicle behavior is set in a predetermined pattern that causes at least the C2(1) to move farther away from zero than C1(1) or the C2(2) to move farther away from zero than C1(2). Hence, in a situation wherein an evaluation object of a vehicle is predicted not to satisfy the predetermined restrictive condition in the future if the actuator is operated according to a driver's request while bringing a second state amount related to a motion of an actual vehicle close to a reference state (ideal state), the feedback component of the second future vehicle behavior can be determined such that the occurrence of the situation can be prevented from the current time or from the next time following the current time. Therefore, an appropriate actuator operation command for preventing the occurrence of the aforesaid situation can be determined by determining the operation command at the current time of the actuator on the basis of the evaluation by the evaluating means on the evaluation object of the second future vehicle behavior.

Further, in the forty-second invention, the means for determining the reference correction amount preferably determines the reference correction amount at arbitrary time k of the second future vehicle behavior such that it gradually moves away from zero as the time k proceeds (a forty-third invention).

According to the forty-third invention, in a situation wherein an evaluation object of a vehicle is predicted not to satisfy the predetermined restrictive condition in the future if the actuator is operated according to a driver's request while bringing a second state amount of an actual vehicle close to a reference state (ideal state), the future reference state can be determined such that it gradually moves away from a basic reference state.

As with the aforesaid forty-second invention, in the aforesaid thirtieth invention, the second reference state determining means may be constituted of a means for determining a future basic reference state after the current time with respect to the second state amount on the basis of at least the time series of the future drive manipulated variable that has been determined and the determined reference state before the current time, a means for determining a reference correction amount for correcting the basic reference state, and a means for determining the future reference state by correcting the determined basic reference state by the reference correction amount, and the means for determining the reference correction amount may, when determining the first future vehicle behavior by the first future vehicle behavior determining means, determine the reference correction amount at each time of the future vehicle behavior according to a predetermined pattern that causes at least the reference correction amount at the current time in the first future vehicle behavior to approach more to zero than the value of a reference correction amount at time immediately preceding the current time at which the actuator controlling means attempts to determine a new operation command or to coincide with zero, and when determining the m-th future vehicle behavior by the m-th future vehicle behavior determining means, the means for determining the reference correction may define the reference correction amounts at the current time and the next time following the current time in the m-th future vehicle behavior as Cm(1) and Cm(2), respectively, define the reference correction amounts at the current time and the next time following the current time in the (m−1)th future vehicle behavior as Cm−1(1) and Cm−1(2), respectively, and determine the reference correction amount at each time of the m-th future vehicle behavior according to a predetermined pattern that causes at least Cm(1) to move farther away from zero than Cm−1(1) or causes Cm(2) to move farther away from zero than Cm−1(2) (a forty-fourth invention).

According to the forty-fourth invention, the same operations and advantages as those of the aforesaid forty-first invention can be obtained if an evaluation object of the first future vehicle behavior satisfies the predetermined restrictive condition. On the other hand, if the evaluation objects of the first to the (m−1)th future vehicle behavior do not satisfy the predetermined restrictive condition, then the reference correction amount at each time of the m-th future vehicle behavior is determined according to a predetermined pattern that causes at least the Cm(1) to move farther away from zero than Cm−1(1) or the Cm(2) to move farther away from zero than Cm−1(2). Hence, in a situation wherein an evaluation object is predicted not to satisfy the predetermined restrictive condition in the future if the actuator is operated according to an operation command of the (m−1)th future vehicle behavior, the feedback component of the m-th future vehicle behavior can be determined such that the occurrence of the situation can be prevented from the current time or from the next time following the current time. Therefore, an appropriate actuator operation command for preventing the occurrence of the aforesaid situation, in which an evaluation object of an actual vehicle comes not to satisfy the predetermined restrictive condition, can be determined.

Further, in the forty-fourth invention, the means for determining the reference correction amount preferably determines the reference correction amount at arbitrary time k of the m-th future vehicle behavior such that it gradually moves away from zero as the time k proceeds (a forty-fifth invention).

According to the forty-fifth invention, in a situation wherein an evaluation object of a vehicle is predicted not to satisfy the predetermined restrictive condition in the future if the actuator is operated according to a driver's request while bringing a second state amount of an actual vehicle close to a reference state (ideal state), the future reference state related to the m-th future vehicle behavior can be determined such that it gradually moves away from a basic reference state.

Supplementally, two or more inventions of the thirty-first invention, the thirty-sixth invention, and the forty-first invention described above may be mutually combined. Further, two or more inventions of the thirty-second invention, the thirty-seventh invention, and the forty-second invention may be mutually combined. Further, two or more inventions of the thirty-fourth invention, the thirty-ninth invention, and the forty-fourth invention may be mutually combined.

Further, in the aforesaid thirty-first invention, preferably, the first control law of the first future vehicle behavior determining means further includes processing for taking, as a provisional value, each value of the time series of an operation command obtained by combining the feedforward component and the feedback component at time k in the future vehicle behavior and inputting the provisional value in the time series manner from the current time side into the initialized vehicle model and carrying out the arithmetic processing of the initialized vehicle model thereby to determine, as a restriction object, at least one of the road surface reaction force and the slippage of a wheel to be combined with each value of the time series of the operation command into a set, processing for determining whether the determined restriction object deviates from a predetermined permissible range, and processing for determining the provisional value as a value constituting the time series of an operation command in the future vehicle behavior if the restriction object to be combined with the provisional value into a set with respect to each of the provisional values does not deviate from the predetermined permissible range, or for determining each value of an operation command in the future vehicle behavior by correcting the first auxiliary feedforward component in the provisional value according to a predetermined rule such that the restriction object that has deviated falls within or approaches to a state to fall within the predetermined permissible range if the restriction object to be combined with the provisional value into a set deviates from the predetermined permissible range (a forty-sixth invention).

According to the forty-sixth invention, the future vehicle behavior can be determined by adjusting the first auxiliary feedforward component such that the restriction object (at least one of a road surface reaction force and the slippage of a wheel) does not become inappropriate, such as becoming excessive, in the future vehicle behavior. Consequently, an operation command that allows an evaluation object of an actual vehicle to satisfy the restrictive condition as much as possible can be properly determined. Further, a road surface reaction force or the slippage of a wheel (restriction object) is determined using the vehicle model on the basis of a provisional value of the operation command, thus making it possible to determine an operation command of a future vehicle behavior that permits the prevention of the restriction object from deviating from the permissible range as much as possible.

The predetermined rule in the forty-sixth invention corresponds to the predetermined 1b-th rule in the aforesaid fourteenth invention.

Further, according to the same concept of the aforesaid forty-sixth invention, in the thirty-second invention or the thirty-third invention described above, preferably, the first control law for the first future vehicle behavior determining means further includes processing for taking, as a provisional value, each value of the time series of an operation command obtained by combining the first feedforward component and the first feedback component at time k in the first future vehicle behavior and inputting the provisional value in the time series manner from the current time side into the initialized vehicle model and carrying out the arithmetic processing of the initialized vehicle model thereby to determine, as a restriction object, at least one of the road surface reaction force and the slippage of a wheel to be combined with each value of the time series of the operation command into a set, processing for determining whether the determined restriction object deviates from a predetermined permissible range, and processing for determining the provisional value as a value constituting the time series of an operation command in the future vehicle behavior if the restriction object to be combined with the provisional value into a set with respect to each of the provisional values of the time series of the operation command in the first future vehicle behavior does not deviate from the predetermined permissible range, or for determining each value of an operation command in the future vehicle behavior by correcting the first auxiliary feedforward component in the provisional value according to a predetermined rule such that the restriction object that has deviated falls within or approaches to a state to fall within the predetermined permissible range if the restriction object to be combined with the provisional value into a set deviates from the predetermined permissible range, and the second control law for the second future vehicle behavior determining means further includes processing for taking, as a provisional value, each value of the time series of an operation command obtained by combining the second feedforward component and the second feedback component at time k in the second future vehicle behavior and inputting the provisional value in the time series manner from the current time side into the initialized vehicle model and carrying out the arithmetic processing of the initialized vehicle model thereby to determine, as a restriction object, at least one of the road surface reaction force and the slippage of a wheel to be combined with each value of the time series of the operation command into a set, processing for determining whether the determined restriction object deviates from a predetermined permissible range, and processing for determining the provisional value as a value constituting the time series of an operation command in the future vehicle behavior if the restriction object to be combined with the provisional value into a set with respect to each of the provisional values of the time series of the operation command in the second future vehicle behavior does not deviate from the predetermined permissible range, or for determining each value of an operation command in the future vehicle behavior by correcting the second auxiliary feedforward component in the provisional value according to a predetermined rule such that the restriction object that has deviated falls within or approaches to a state to fall within the predetermined permissible range if the restriction object to be combined with the provisional value into a set deviates from the predetermined permissible range (a forty-seventh invention).

According to the forty-seventh invention, a second future vehicle behavior can be determined by adjusting a second auxiliary feedforward component such that the restriction object (at least one of a road surface reaction force and the slippage of a wheel) does not become inappropriate, such as becoming excessive, in not only the first future vehicle behavior but also the second future vehicle behavior. Consequently, an operation command that allows an evaluation object of an actual vehicle to satisfy the restrictive condition as much as possible can be properly determined. A road surface reaction force or the slippage of a wheel (restriction object) can be determined using the vehicle model on the basis of a provisional value of the operation command, thus making it possible to determine operation commands of the first and the second future vehicle behaviors that permit the prevention of restriction objects from deviating from the permissible ranges as much as possible.

Similarly, in the thirty-fourth invention or the thirty-fifth invention, the first control law for the first future vehicle behavior determining means further includes processing for taking, as a provisional value, each value of the time series of an operation command obtained by combining the first feedforward component and the first feedback component at time k in the first future vehicle behavior and inputting the provisional value in the time series manner from the current time side into the initialized vehicle model and carrying out the arithmetic processing of the initialized vehicle model thereby to determine, as a restriction object, at least one of the road surface reaction force and the slippage of a wheel to be combined with each value of the time series of the operation command into a set, processing for determining whether the determined restriction object deviates from a predetermined permissible range, and processing for determining the provisional value as a value constituting the time series of an operation command in the future vehicle behavior if the restriction object to be combined with the provisional value into a set with respect to each of the provisional values of the time series of the operation command in the first future vehicle behavior does not deviate from the predetermined permissible range, or for determining each value of an operation command in the future vehicle behavior by correcting the first auxiliary feedforward component in the provisional value according to a predetermined rule such that the restriction object that has deviated falls within or approaches to a state to fall within the predetermined permissible range if the restriction object to be combined with the provisional value into a set deviates from the predetermined permissible range, and the second control law for the m-th future vehicle behavior determining means further includes processing for taking, as a provisional value, each value of the time series of an operation command obtained by combining the m-th feedforward component and the m-th feedback component at time k in the m-th future vehicle behavior and inputting the provisional value in the time series manner from the current time side into the initialized vehicle model and carrying out the arithmetic processing of the initialized vehicle model thereby to determine, as a restriction object, at least one of the road surface reaction force and the slippage of a wheel to be combined with each value of the time series of the operation command into a set, processing for determining whether the determined restriction object deviates from a predetermined permissible range, and processing for determining the provisional value as a value constituting the time series of an operation command in the future vehicle behavior if the restriction object to be combined with the provisional value into a set with respect to each of the provisional values of the time series of the operation command in the m-th future vehicle behavior does not deviate from the predetermined permissible range, or for determining each value of an operation command in the future vehicle behavior by correcting the m-th auxiliary feedforward component in the provisional value according to a predetermined rule such that the restriction object that has deviated falls within or approaches to a state to fall within the predetermined permissible range if the restriction object to be combined with the provisional value into a set deviates from the predetermined permissible range (a forty-eighth invention).

According to the forty-eighth invention, an m-th future vehicle behavior can be determined by adjusting an m-th auxiliary feedforward component such that the restriction object (at least one of a road surface reaction force and the slippage of a wheel) does not become inappropriate, such as becoming excessive, in not only the first future vehicle behavior but also the m-th future vehicle behavior. Consequently, an operation command that allows an evaluation object of an actual vehicle to satisfy the restrictive condition as much as possible can be properly determined. A road surface reaction force or the slippage of a wheel (restriction object) is determined using the vehicle model on the basis of a provisional value of the operation command, thus making it possible to determine operation commands of the first and the m-th future vehicle behaviors that permit the prevention of restriction objects from deviating from the permissible ranges as much as possible.

In the twenty-fifth to the forty-eighth inventions provided with the aforesaid first reference state determining means, preferably, the actual state amount grasping means comprises a means for detecting or estimating the second state amount related to an actual motion of the vehicle, the first reference state determining means determines, when determining anew the reference state before the current time, a new reference state before the current time on the basis of at least the drive manipulated variable detected by the drive manipulated variable detecting means and a virtual external force determined on the basis of a difference between a past value of the reference state before the current time and the second state amount that has been detected or estimated such that the difference approaches to zero (a forty-ninth invention).

According to the forty-ninth invention, the reference state before the current time is determined by using the virtual external force that has been determined such that the difference between the past value and the second state amount that has been detected or estimated approaches to zero, thus making it possible to prevent the reference state before the current time from considerably deviating from the state of a second state amount of an actual vehicle. Consequently, the future reference state amount can be determined so as to have less deviation from the second state amount of the vehicle up to the current time. As a result, in each future vehicle behavior, it is possible to prevent an operation command that is determined such that a second state amount approaches to a future reference state amount from becoming excessive and to sequentially determine an operation command that allows an actual vehicle behavior to be properly controlled.

As another mode of the aforesaid forty-ninth invention, in, for example, the forty-sixth invention, if a difference between the provisional value at the current time of an operation command in a case where an operation command at the current time of the future vehicle behavior determined by the first future vehicle behavior determining means is determined as the new operation command and a new operation command is defined as an error for determining a virtual external force, then the first reference state determining means may, when determining anew a reference state before the current time, determine the new reference state before the current time on the basis of at least the drive manipulated variable detected by the drive manipulated variable detecting means and a virtual external force determined on the basis of the error for determining the virtual external force such that the error approaches to zero (a fifty-second invention).

Similarly, in the aforesaid forty-seventh invention, if a difference between one of the provisional value at the current time of the operation command of the first future vehicle behavior in a case where an operation command at the current time of the first future vehicle behavior determined by the first future vehicle behavior determining means is determined as the new operation command and the provisional value at the current time of the operation command of the second future vehicle behavior in a case where an operation command at the current time of the second future vehicle behavior determined by the second future vehicle behavior determining means is determined as the new operation command, and a new operation command is defined as an error for determining a virtual external force, then the first reference state determining means may, when determining anew a reference state before the current time, determine the new reference state before the current time on the basis of at least the drive manipulated variable detected by the drive manipulated variable detecting means and a virtual external force determined on the basis of the error for determining the virtual external force such that the difference approaches to zero (a fifty-third invention).

Similarly, in the aforesaid forty-eighth invention, if a difference between one of the provisional value at the current time of the operation command of the first future vehicle behavior in a case where an operation command at the current time of the first future vehicle behavior determined by the first future vehicle behavior determining means is determined as the new operation command and the provisional value at the current time of the operation command of the m-th future vehicle behavior in a case where an operation command at the current time of the m-th future vehicle behavior determined by the m-th future vehicle behavior determining means is determined as the new operation command, and a new operation command is defined as an error for determining a virtual external force, then the first reference state determining means may, when determining anew the reference state before the current time, determine a new reference state before the current time on the basis of at least the drive manipulated variable detected by the drive manipulated variable detecting means and a virtual external force determined on the basis of the error for determining the virtual external force such that the difference approaches to zero (a fifty-fourth invention).

According to the fifty-second to the fifty-fourth inventions, the reference state before the current time is determined on the basis of the error for determining the virtual external force such that the difference approaches to zero, thus making it possible to prevent the reference state before the current time from considerably deviating from the state of a second state amount of an actual vehicle, as with the aforesaid thirty-ninth invention. Consequently, in each future vehicle behavior, it is possible to prevent an operation command that is determined such that a second state amount approaches to a future reference state amount from becoming excessive and to sequentially determine an operation command that allows an actual vehicle behavior to be properly controlled.

BEST MODE FOR CARRYING OUT THE INVENTION

The following will explain embodiments of a vehicle control device in accordance with the present invention.

First, a schematic explanation of a vehicle in the embodiments in the present description will be given. A vehicle illustrated in the embodiments in the present description is a car provided with four wheels (two wheels each at the front and the rear of the vehicle). The construction itself of the car may be a publicly known one, so that detailed illustration and explanation will be omitted in the present description, the overview thereof being as follows. FIG. 1 is a block diagram showing the schematic construction of the vehicle.

As shown in FIG. 1, a vehicle 1 (car) is provided with a driving/braking device 3A (a driving/braking system) that imparts a rotational driving force (a rotational force that provides an impelling force of a vehicle) to driving wheels among four wheels W1, W2, W3, and W4, or imparting a braking force to each of the wheels W1 to W4, a steering device 3B (a steering system) for controlling steering wheels (usually the front wheels W1 and W2) among the four wheels W1 to S4, and a suspension device 3C (a suspension system) that resiliently supports a vehicle body 1B on the four wheels W1 to W4, as with a publicly known regular car.

These devices 3A, 3B and 3C have functions for manipulating motions of the vehicle 1. For example, the driving/braking device 3A has a function for manipulating primarily a position, a velocity, and acceleration in an advancing direction of the vehicle 1, the steering device 3B has a function for manipulating primarily a posture of the vehicle 1 in the yaw direction, and the suspension device 3C has a function for manipulating primarily postures in the pitch direction and the roll direction of the vehicle body 1B of the vehicle 1 or a height of the vehicle body 1B from a road surface (a vertical position of the vehicle body 1B relative to the wheels W1 to W4). Incidentally, "posture" means a spatial orientation in the present description.

Although not illustrated, more specifically, the driving/braking device 3A is equipped with an engine (an internal-combustion engine) serving as a motive power generating source of the vehicle 1 (an impellent generating source of the vehicle 1), a motive power transmitting system for transmitting an output (a rotational driving force) of the engine to the driving wheels among the wheels W1 to W4, and a braking device that imparts braking forces to the wheels W1 to W4. The motive power transmitting system includes a transmission, a differential gear, etc. The driving wheels may be the two front wheels W1 and W2 or the two rear wheels W3 and W4, or both the front wheels W1 and W2 and the rear wheels W3 and W4 (the four wheels W1 through W4).

The vehicle 1 explained in the embodiments is equipped with an engine as a motive power generating source; however, it may alternatively be a vehicle equipped with an engine and an electric motor as motive power generating sources (a so-called parallel type hybrid vehicle) or a vehicle equipped with an electric motor as a motive power generating source (a so-called electric car or series type hybrid vehicle).

Further, a steering wheel (driver's wheel), an accelerator (gas) pedal, a brake pedal, a shift lever, and the like functioning as manipulating devices 5 (man-caused manipulating devices) operated by a driver to steer the vehicle 1 (car) are provided in a vehicle compartment of the vehicle 1.

The steering wheel among the manipulating devices 5 is related to an operation of the steering device 3B. As the steering wheel is rotationally manipulated, the steering control wheels (normally the two front wheels W1 and W2) among the wheels W1 to W4 are steered accordingly by the steering device 3B.

The accelerator (gas) pedal, the brake pedal, and the shift lever among the manipulating devices 5 are related to operations of the driving/braking device 3A. More specifically, the opening of a throttle valve provided in an engine changes according to a manipulated variable (a depression amount) of the accelerator (gas) pedal and an intake air volume and a fuel injection amount (consequently an output of the engine) are adjusted. Further, the braking device is actuated according to a manipulated variable (a depression amount) of the brake pedal, and a braking force based on the manipulated variable of the brake pedal is imparted to the wheels W1 to W4. Further, manipulating the shift lever changes an operation state of the transmission, such as a change gear ratio of the transmission, thus making an adjustment or the like of torque transmitted from the engine to the driving wheels.

The drive manipulation states of the manipulating devices 5, such as the steering wheel, operated by the driver (the steerer of the vehicle 1) are detected by appropriate sensors, which are not shown. Hereinafter, detected values (detection outputs of the sensors) of the drive manipulation states will be referred to as drive manipulation inputs. The drive manipulation inputs specifically include a steering angle, which is a rotational angle of the steering wheel, an accelerator (gas) pedal manipulated variable, which is a manipulated variable of the accelerator (gas) pedal, a brake pedal manipulated variable, which is a manipulated variable of the brake pedal, and a shift lever position, which is a manipulation position of the shift lever. The drive manipulation inputs correspond to drive manipulated variables in the present invention, and sensors that detect the drive manipulation inputs correspond to the drive manipulated variable detecting means in the present invention.

In the embodiments in the present description, the driving/braking device 3A, the steering device 3B, and the suspension device 3C described above are adapted to permit active control of operations thereof (consequently motions of the vehicle 1) in response to state amounts (a vehicle speed, a yaw rate, etc.) of the vehicle 1 other than the aforesaid drive manipulation inputs.

More specifically, the driving/braking device 3A makes it possible to control, for example, the distribution of a rotational driving force transmitted from the engine to the driving wheels when the vehicle 1 travels or the distribution of a braking force to be imparted to the wheels W1 to W4 when the vehicle 1 decelerates to desired motive power distributions through the intermediary of actuators, such as a hydraulic actuator, an electric motor, and an electromagnetic control valve. Hereinafter, the driving/braking device 3A having such a function for controlling the distribution of motive power will be referred to as the driving/braking device 3A with motive power distribution controlling function. The driving/braking device 3A with motive power distribution controlling function includes an actuator for driving a throttle valve of the engine, an actuator for driving a fuel injection valve, an actuator for performing speed change drive of the transmission, and an actuator of the braking device in addition to the actuators for controlling motive power distribution.

Further, the steering device 3B is equipped with a steering mechanism for the rear wheels W3 and W4 in addition to the front wheels W1 and W2, and it is adapted to steer the front wheels W1 and W2 and also steer the rear wheels W3 and W4 (so-called 4WS) as necessary through the intermediary of actuators, including a hydraulic pump, an electric motor, and an electromagnetic control valve, as appropriate, in response to rotational manipulation of the steering wheel. In this case, the steering device 3B makes it possible to control the steering angles of the front wheels W1 and W2 to desired steering angles by actuators, including electric motors, as with the rear wheels W3 and W4.

However, the steering device 3B may be the one adapted to mechanically steer the front wheels W1 and W2 through the intermediary of a steering mechanism, such as a rack and pinion, in response to a rotational manipulation of the steering wheel (the one not provided with an actuator for steering the front wheels), or the one adapted to assist the steering of the front wheels W1 and W2 by an actuator, such as an electric motor, as necessary, in addition to the mechanical steering. Alternatively, the steering device 3B may be the one that is not equipped with a function for steering the rear wheels W3 and W4 but be capable of controlling only the steering angles of the front wheels W1 and W2 to desired steering angles by an actuator, such as an electric motor. Hereinafter, the steering device 3B capable of controlling the steering angles of the front wheels W1 and W2, or the steering angles of the rear wheels W1 and W2, or the steering angles of both the front wheels W1, W2 and the rear wheels W1, W2 by actuators will be referred to as the active steering device 3B.

In the active steering device adapted to subsidiarily steer steering wheels by actuators in addition to mechanically steering the steering wheels, such as the front wheels W1 and W2, in response to rotational manipulation of the steering wheel, a resultant angle of a steering angle of a steering wheel mechanically determined in response to a rotational manipulation of the steering wheel and a steering angle based on an operation of an actuator (a correction amount of a steering angle) will be a steering angle of a steering wheel. In an active steering device adapted to steer a steering wheel simply by a driving force of an actuator, a desired value of a steering angle of the steering wheel is determined on the basis of at least a detected value of a steering angle, and the actuator is controlled such that an actual steering angle of the steering wheel reaches the desired value.

Further, the suspension device 3C makes it possible to variably control, for example, a damping force, hardness or the like of a damper provided between the vehicle body 1B and the wheels W1 through W4 through the intermediary of actuators, such as electromagnetic control valves or electric motors. Alternatively, the suspension device 3C is adapted to be capable of directly controlling a stroke (an amount of vertical displacement between the vehicle body 1B and the wheels W1 to W4) of a suspension (a mechanical portion, such as a spring, of the suspension device 3C) or a vertical expanding/contracting force of the suspension generated between the vehicle body 1B and the wheels W1 to W4 by a hydraulic cylinder or a pneumatic cylinder (a so-called electronically controlled suspension). Hereinafter, the suspension device 3C having these controlling functions will be referred to as the active suspension device 3C. In the active suspension device 3C, the damping force or the like of the damper is controlled through the intermediary of an actuator so as to manipulate an acting force between the wheels W1 to W4 and the vehicle body 1B, thereby manipulating ground contact loads of the wheels W1 to W4 (a vertical component of a translational force of a road surface reaction force acting on the wheels W1 to W4 or a component thereof perpendicular to a road surface). Alternatively, a stroke of the suspension (that is, the vertical position of the vehicle body 1B relative to the wheels W1 to W4) is manipulated through the intermediary of an actuator.

Hereinafter, the driving/braking device 3A with motive power distribution controlling function, the active steering device 3B, and the active suspension device 3C will be frequently referred to generically as actuator devices 3 to mean devices that are capable of actively controlling their operations through the intermediary of appropriate actuators. The vehicle 1 in the embodiments in the present description is provided with the driving/braking device 3A with motive power distribution controlling function, the active steering device 3B, and the active suspension device 3C as the actuator devices 3.

Incidentally, it is not required that all these actuators 3 be provided; alternatively, only one or two of the actuator devices 3 may be provided. Further alternatively, an actuator device other than the above may be provided. The actuator devices 3 are required simply to be capable of actively controlling their operations in response to a drive manipulation input or a state amount (a vehicle speed, a yaw rate, etc.) or the like of the vehicle 1, and capable of actively manipulating a certain motion of the vehicle 1 by the control.

Furthermore, the vehicle 1 is provided with a control device 10 that determines a manipulated variable of an actuator (a control input to the actuator; hereinafter referred to as an actuator manipulated variable) provided in each of the actuator devices 3 on the basis of the aforesaid drive manipulation inputs or the like and controls the operation of each actuator device 3 on the basis of the actuator manipulated variable. This control device 10 is constituted of an electronic circuit unit that includes a microcomputer, and implements each means in the present invention by the arithmetic processing function thereof. Incidentally, the control device 10 receives the aforesaid drive manipulation inputs from sensors of the manipulating devices 5 and also detected values of state amounts of the vehicle 1, such as a vehicle speed and a yaw rate, from various sensors, which are not shown.

The above has presented an overview of the vehicle 1 (the car) in the embodiments in the present description. Based on the overview of the vehicle 1 explained above, the control device 10 of the vehicle 1 in the embodiments will be explained in detail below. Hereinafter, the real vehicle 1 will be frequently referred to as the actual vehicle 1.

FIG. 2 is a block diagram schematically showing an overall control processing function of the control device 10. The portion excluding the actual vehicle 1 in FIG. 2 (more precisely, the portion excluding the actual vehicle 1 and the sensors included in a sensor observer 20, which will be described later) accommodates the main control processing function of the control device 10. The actual vehicle 1 in FIG. 2 is provided with the aforesaid actuator devices (the driving/braking device 3A with motive power distribution controlling function, the active steering device 3B, and the active suspension device 3C).

The control device 10 is provided with a reference dynamic characteristics model 12, a scenario preparer 14, an actuator drive controller 16, a R estimator 18, the sensor observer 20, and a sensory feedback law 22. The following will explain an outline of the processing by the control device 10 in combination of the processing function of each section shown in FIG. 2. The processing by the control device 10 is sequentially carried out at a predetermined control processing cycle (a value thereof will be denoted as ΔT). Hereinafter, regarding the values of variables determined at each control processing cycle of the control device 10, a value finally obtained by the processing of a present (latest) control processing cycle will be referred to as a current time value, a value finally obtained by the processing of a last control processing cycle will be referred to as a last time value, and a value finally obtained by the processing of a past control processing cycle will be referred to as a past value (including a last time value).

At each control processing cycle of the control device 10, first, the sensor observer 20 detects or estimates the current time value of an actual state amount, which is a real state amount of the actual vehicle 1. The sensor observer 20 is equipped with various sensors, including an acceleration sensor for detecting an acceleration of the actual vehicle 1, a rate sensor for detecting an angular velocity (yaw rate) of the actual vehicle 1, a vehicle speed sensor for detecting a vehicle speed (absolute speed) of the actual vehicle 1, rotation velocity sensors for detecting the rotation velocities of the wheels W1 to W4, a suspension stroke sensor for detecting a stroke (an amount of vertical displacement) of the suspension, a vehicle height sensor for detecting a height of the vehicle body 1B (a vertical position relative to a road surface), force sensors for detecting the ground contact loads (road surface reaction forces) of the wheels W1 to W4 or frictional forces between the wheels and a road surface, torque sensors for detecting the drive torques of the wheels W1 to W4, a visual sensor or a radar for detecting an object existing around (in front or the like) of the actual vehicle 1, and a GPS or an inertial navigation system for detecting a position of the actual vehicle 1. Based on outputs of these sensors, an actual state amount of the actual vehicle 1 and an ambient condition, including an obstacle, of the actual vehicle 1 are detected.

Further, regarding an actual state amount (e.g., a slide slip angle) of the actual vehicle 1 that cannot be directly detected by a sensor, the sensor observer 20 estimates an actual state amount of the actual vehicle 1 by an observer on the basis of, for example, the aforesaid drive manipulation inputs, actuator manipulated variables of the actuator devices 3, and detected values of sensors. The real state amount of the actual vehicle 1 directly detected by the sensors or estimated by the observer as described above is an actual state amount. In the embodiments in the present description, detected or estimated actual state amounts (first state amounts related to an actual motion of the vehicle 1) include a position (spatial position) of the actual vehicle 1, a changing velocity of the position, a posture of the vehicle body 1B of the actual vehicle 1 (azimuthal angles in the yaw direction, the pitch direction, and the roll direction), a changing velocity of the posture (angular velocities in the yaw direction, the pitch direction, and the roll direction), a vehicle speed, rotational speeds of the wheels W1 to W4, a side slip angle, a rotation speed of the engine, and the like. The sensor observer 20 shown in FIG. 2 does not include the sensors of the manipulating devices 5. Hereinafter, "actual" will be frequently attached to a detected value or an estimated value of an individual actual state amount. For instance, a detected value or an estimated value of an actual vehicle speed will be referred to as an actual vehicle speed and a detected value or an estimated value of an actual yaw rate (an angular velocity in the yaw direction) will be referred to as an actual yaw rate.

Supplementally, the sensor observer 20 corresponds to the actual state amount grasping means in the present invention.

Subsequently, estimated friction coefficients μestm (current time values), which are the estimated values of the friction coefficients between the wheels W1 to W4 and a road surface, are calculated by the μ estimator 18. This μ estimator 18 receives, for example, actual state amounts of the actual vehicle 1 (e.g., the accelerations of the actual vehicle 1 in the longitudinal and lateral directions, the rotational speeds of the wheels W1 to W4, and the yaw rate of the actual vehicle 1)

detected or estimated by the sensor observer 20 and the actuator manipulated variables that define the steering angles (past values, such as last time values) of the steering wheels W1 to W4 and the actuator manipulated variables (past values, such as last time values) that define driving/braking forces out of the actuator manipulated variables determined by the actuator drive controller 16, which will be discussed later in detail, and the estimated friction coefficients µestm are calculated from these inputs. In this case, a variety of techniques have been publicly known as the techniques for estimating the friction coefficients, so that such publicly known techniques may be used to determine µestm. For example, a friction coefficient can be estimated on the basis of a peak value of an acceleration of the vehicle body 1B.

The estimated friction coefficient µestm is desirably determined separately for each wheel of W1 through W4; alternatively, however, it may be, for example, a representative estimated value on the set of all wheels W1 to W4, or a representative estimated value on each set of the set of the front wheels W1, W2 and the set of the rear wheels W3, W4, or a representative estimated value on each set of the set of the left wheels W1, W3 and the set of the right wheels W2, W4. Further, the estimated friction coefficient µestm may be updated at a fixed time interval that is longer than the control processing cycle of the control device 10 in order to prevent the value thereof from frequently fluctuating, or the estimated friction coefficient µestm may be obtained through the intermediary of a filter, such as a low-pass filter, from an instantaneous estimated value of a friction coefficient at each control processing cycle.

Subsequently, a steering angle (a current time value) among drive manipulation inputs, including a steering angle, an accelerator (gas) pedal manipulated variable, a brake pedal manipulated variable, and a shift lever position, of the manipulating devices 5, a vehicle speed (current time value) of an actual state amount detected or estimated by the sensor observer 20, and a current state acceptance manipulated variable are input to the reference dynamic characteristics model 12. The reference dynamic characteristics model 12 is a means which sequentially prepares a reference state amount serving as a reference value of a state amount (a second state amount) related to a motion of the vehicle 1 for each control processing cycle from the drive of the actual vehicle 1 begins (more precisely, at a start-up of the control device 10). The time series of the reference state amount means the time series of an ideal state amount of the vehicle 1 (e.g., a state amount related to a motion of the actual vehicle 1 desired by a driver by operating the manipulating devices 5 on an ideal dry road surface) on the basis of the drive manipulation inputs up to the present control processing cycle (up to the current time). In the embodiments in the present description, the time series of a reference state amount is composed of, for example, a time series of a yaw rate of the vehicle 1 and a traveling route of the vehicle 1 serving as a spatial track of the time series of a position of the vehicle 1. Hereinafter, a yaw rate prepared by the reference dynamic characteristics model 12 will be referred to as a reference yaw rate and a traveling route of the vehicle 1 will be referred to as a reference course. A reference state amount may be a state amount of a single type, such as only one of a reference yaw rate and a reference course, or it may include a state amount of another type. In other words, types of state amounts that can be manipulated by the actuator 3 and that are desired to be controlled may be selected, as appropriate, from among a variety of state amounts related to a motion of the actual vehicle 1, and reference values of the selected types of state amounts may be determined as reference state amounts. In the embodiments in the present description, reference yaw rates and reference courses are determined as reference state amounts in order to properly control a motion about a yaw axis of the vehicle 1 and a traveling route.

The current state acceptance manipulated variable input to the reference dynamic characteristics model 12 corresponds to a virtual external force input to the reference dynamic characteristics model 12 to bring a reference state amount prepared by the reference dynamic characteristics model 12 close to an actual state amount of the actual vehicle 1 (in order to restrain a reference state amount from deviating far from an actual state amount of the actual vehicle 1). The current state acceptance manipulated variable is sequentially determined for each control processing cycle in the scenario preparer 14, the details of which will be discussed later. When the reference dynamic characteristics model 12 calculates a current time value of a reference state amount at each control processing cycle, a last value of the current state acceptance manipulated variable is supplied.

Specific processing by the reference dynamic characteristics model 12 will be explained. In the present embodiment, a reference yaw rate and a reference course as reference state amounts will be determined on the basis of a two-degree-of-freedom model (two-wheel vehicle model) shown in, for example, FIG. 6-63 of the aforesaid non-patent document 1 or FIG. 3.5 of "Motion and control of car (second edition)" (written by Masato Abe; published by Sankaido Co., Ltd. on Jul. 23, 2004). As shown in FIG. 3, the two-degree-of-freedom model is a model which approximately represents a behavior of the actual vehicle 1 in terms of a behavior of a vehicle having a single front wheel Wf and a single rear wheel Wr (that is, a two-wheel vehicle).

In this case, the reference dynamic characteristics model 12 in the present embodiment is described by the dynamic equations of the following expressions 01a and 01b.

[Mathematical Expression 1]

$$m \cdot V \cdot \frac{d\beta}{dt} + 2 \cdot (Kf + Kr) \cdot \beta + \left\{ m \cdot V + \frac{2}{V} \cdot (Lf \cdot Kf - Lr \cdot Kr) \right\} \cdot \gamma = 2 \cdot Kf \cdot \delta f + Fvirt \quad \text{Expression 01a}$$

$$2 \cdot (Lf \cdot Kf - Lr \cdot Kr) \cdot \beta + I \cdot \frac{d\gamma}{dt} + \frac{2 \cdot (Lf^2 \cdot Kf + Lr^2 \cdot Kr)}{V} \cdot \gamma = 2 \cdot Lf \cdot Kf \cdot \delta f + Mvirt \quad \text{Expression 01b}$$

where m, I, V, $\beta$, $\gamma$, and $\delta f$ denote a mass of the vehicle 1, an inertial moment about a yaw axis of the vehicle 1, a traveling speed (vehicle speed), a side slip angle of the center of gravity point of the vehicle 1, a yaw rate of the vehicle 1, and the steering angles of the front wheels W1 and W2 (the front wheel Wf in FIG. 3), respectively. Further, Lf denotes a distance between the center of gravity point of the vehicle 1 and a front axle, Lr denotes a distance between the center of gravity point of the vehicle 1 and a rear axle, Kf denotes cornering power per wheel of the front wheels W1 and W2 of the vehicle 1 (cornering power of the front wheel Wf in FIG. 3), and Kr denotes cornering power per wheel of the rear wheels W3 and W4 of the vehicle 1 (cornering power of the rear wheel Wr in FIG. 3). Further, Fvirt and Mvirt denote a translational force component and a moment component, respectively, of the current state acceptance manipulated variable. In the present embodiment, Fvirt=0.

The reference dynamic characteristics model 12 receives the vehicle speed V (a current time value) of an actual state amount of the vehicle 1, a steering angle (a current time value) of drive manipulation inputs, and the current state acceptance manipulated variable (Mvirt in the present embodiment) at each control processing cycle. Then, based on the input steering angle, a steering control angle δf (a current time value) is determined, and the steering angle δf and the input vehicle speed V are used to calculate the current time values of the side slip angle β and the yaw rate γ that satisfy the above expressions 01a and 01b. In this case, preset values are used for m, Lf, Lr, Kf, and Kr in expressions 01a and 01b. The yaw rate γ out of the side slip angle β and the yaw rate γ thus calculated is obtained as a reference yaw rate.

Subsequently, the yaw rate γ (reference yaw rate) calculated as described above is integrated at each control processing cycle to determine an azimuthal angle (an angle about the yaw axis) of the vehicle 1. Furthermore, based on the azimuthal angle, the side slip angle β of the center of gravity point of the vehicle 1 calculated as described above, and the actual vehicle speed V, the position of the vehicle 1 (more specifically, the position in a plane of the center of gravity point of the vehicle 1) is calculated in a time series manner. The spatial track (track on the plane) of the time series of the position of the center of gravity point of the vehicle 1 thus obtained is obtained as a reference course.

As described above, in the reference dynamic characteristics model 12, at each control processing cycle, a reference state amount up to that time (up to the current time) is sequentially determined. The current time value of the reference state amount thus determined is used as an initial value of the time series of a scenario reference state amount, which will be discussed later. In other words, the reference dynamic characteristics model 12 is adapted to sequentially determine an initial value of a scenario reference state amount, which will be discussed later.

In the present embodiment, a reference yaw rate and a reference course have been used as reference state amounts; however, if only a reference yaw rate is determined as a reference state amount, then the reference yaw rate may be determined, for example, as follows. This example will be explained below with reference to FIG. 4. FIG. 4 is a block diagram showing a processing function for calculating a reference yaw rate. As illustrated, the reference dynamic characteristics model 12 is equipped with a stabilizing desired value determiner 12a, a flywheel follow-up control law 12b, an adding processor 12c, and a flywheel model 12d as the processing function for preparing a time series of a reference yaw rate.

At each control processing cycle, a steering angle in drive manipulation inputs and a vehicle speed in an actual state amount of the actual vehicle 1 are input to the stabilizing desired value determiner 12a. The steering angle and the vehicle speed to be input are current time values. From the input steering angle and the vehicle speed, the stabilizing desired value determiner 12a determines a stabilizing desired yaw rate (a current time value), which is a desired value of the yaw rate of the vehicle 1 in a steady state (a state in which the steering angle and the vehicle speed are respectively maintained constantly at current time values), according to a map created beforehand on the basis of driving experiments or an arithmetic expression or the like.

Then, the stabilizing desired yaw rate (the current time value) determined by the stabilizing desired value determiner 12a and the reference yaw rate (a last value of the reference yaw rate) calculated at a last control processing cycle by the reference dynamic characteristics model 12 are input to the flywheel follow-up law 12b. According to a feedback control law, such as a PD control law, the flywheel follow-up control law 12b calculates a flywheel FB moment as a manipulated variable (a manipulated variable of the dimension of a moment in this example) for bringing a difference between the stabilizing desired yaw rate and the reference yaw rate that have been input to zero (for convergence) on the basis of the difference. The flywheel FB moment corresponds to a required value of a moment about the center-of-gravity (a moment about the yaw axis) of the vehicle 1 for generating an angular acceleration (an angular acceleration about the yaw axis) for bringing the reference yaw rate close to a stabilizing desired yaw rate.

Next, the last time value of the current state acceptance manipulated variable is added to the flywheel FB moment (the current time value) by the adding processor 12c, and the result of the addition is input to the flywheel model 12d. The flywheel model 12c is a model which approximately represents a motion about the yaw axis of the vehicle 1 in terms of a motion of the flywheel whose inertial moment is substantially equal to an actual inertial moment about the yaw axis of the vehicle 1. The current state acceptance manipulated variable added to the flywheel FB moment may be the same as Mvirt shown in the aforesaid expression 01b, which corresponds to a virtual external force moment (an external force moment about the yaw axis) to be applied to the vehicle 1.

The flywheel model 12d divides the result, which has been obtained by adding the current state acceptance manipulated variable (the last time value) to the flywheel FB moment (the current time value), by a preset flywheel inertial moment I (the inertial moment about the yaw axis of the vehicle 1), and integrates the value obtained as the result of the division for each control processing cycle, thereby calculating a reference yaw rate. Specifically, the value obtained by dividing the result, which has been obtained by adding the last time value of the current state acceptance manipulated variable to the current time value of the flywheel FB moment, by the inertial moment I of the flywheel (this means an angular acceleration of the flywheel) is multiplied by a control processing cycle ΔT, then the value of the multiplication result is added to the last time value of the reference yaw rate so as to calculate the current time value of the reference yaw rate.

Supplementally, the processing by the reference dynamic characteristics model 12 explained above is based on an assumption that the friction coefficient of a road surface is maintained at a friction coefficient (a fixed value) of an ideal dry road surface. Alternatively, however, the friction coefficient of a road surface does not have to be a fixed value, and a reference state amount may be determined by considering an actual change in friction coefficient. In this case, if the reference state amount is determined using the aforesaid expressions 01a and 01b, then Kf and Kr in the expressions are variably set according to the estimated friction coefficient μestm (a current time value) determined by the μ estimator 18. To determine a reference state amount (reference yaw rate) by the processing in FIG. 4, the estimated friction coefficient μestm (a current time value) determined by the μ estimator 18 is supplied to the stabilizing desired value determiner 12a and the flywheel follow-up control law 12b as indicated by, for example, the dashed line in FIG. 4. Then, the stabilizing desired value determiner 12a determines a stabilizing desired yaw rate from the input estimated friction coefficient μestm, drive manipulation inputs, and a vehicle speed (an actual vehicle speed) according to a map or the like. The flywheel follow-up control law 12b variably adjusts a gain (e.g., a proportional gain) of a feedback control law on the basis of the input estimated friction coefficient μestm. Preferably, a value of a friction coefficient used with the reference dynamic characteristics model 12 does not frequently fluctuate. In a case where a friction coefficient of a road surface is estimated or set for each wheel of W1 to W4, the values of the friction coefficient of a road surface are desirably the same or substantially the same with each other for the left wheels W1 and W3 and for the right wheels W2 and W4, respectively. Further, it is desirable that a difference between the friction coefficient of a road surface of the front wheels W1 and W2 and the friction coefficient of a road surface of the rear wheels W3 and W4 does not suddenly change.

Further, a reference yaw rate of a reference state amount may be determined by, for example, passing the stabilizing desired yaw rate determined by the stabilizing desired value determiner 12a through a first-order lag filter. The time series of a reference yaw rate in this case will be a time series of a yaw rate that follows a stabilizing desired yaw rate with a first-order lag.

Further, in place of a reference course of a reference state amount, a reference value of a turning curvature or a curvature radius (a curvature or a curvature radius of each section of a reference course) of the vehicle 1 may be determined.

Supplementally, the processing by the reference dynamic characteristics model 12 corresponds to the first reference state determining means in the present invention. A reference yaw rate or the reference yaw rate and a reference course determined by the processing correspond to a reference state before the current time.

Referring back to FIG. 2, after the reference state amount (the current time value) is determined by the reference dynamic characteristics model 12 as described above, the drive manipulation inputs (the current time values), including the steering angle, the accelerator (gas) pedal manipulated variable, the brake pedal manipulated variable, and the shift lever position, the actual state amount (the current time values of the position of the actual vehicle 1, the changing velocity of the position, the posture (the azimuth), a changing velocity (angular velocity) of the posture, a vehicle speed, the rotational speed of the engine, etc.) of the actual vehicle 1 detected or estimated by the sensor observer 20, the reference state amount (the current time values of the reference yaw rate and the reference course) determined by the reference dynamic characteristics model 12, and the estimated friction coefficient μestm (the last time value) determined by the μ estimator 18 are input to the scenario preparer 14. Based on these inputs, the scenario preparer 14 determines the current time value of an actuator operation desired value (an input value to the actuator drive controller 16) as an operation command specifying the operation of each actuator 3, as will be discussed in detail later.

Here, the actuator operation desired value determined by the scenario preparer 14 corresponds to an operation command in the present invention. In the embodiments in the present description, the actuator operation desired value is a vector amount composed of, for example, a desired driving/braking force as a desired value of the motive power distribution to each of the wheels W1 to W4 with respect to the driving/braking device 3A with motive power distribution controlling function (more specifically, a set of a desired value of a driving torque of each of the wheels W1 to W4 and a desired value of a braking torque), a desired steering angle as a desired value of a steering angle of each steering control wheel relative to the active steering device 3B, a desired ground contact load as a desired value of a ground contact load of each of the wheels W1 to W4 relative to the active suspension device 3C (a translational force component of a road surface reaction force acting on each of the wheels W1 to W4, the translational force component being in the vertical direction or the direction perpendicular to a road surface), and a desired suspension stroke as a desired value of a stroke of the suspension relative to the active suspension device 3C.

Subsequently, the actuator operation desired value (the current time value) and the actual state amount (the current time values of the vehicle speed, the rotational speed of the engine, etc.) of the actual vehicle 1 are supplied to the actuator drive controller 16. Based on the supplied actuator operation desired value and the actual state amount, the actuator drive controller 16 determines actuator manipulated variables of the actuator devices 3 (the driving/braking device 3A with motive power distribution controlling function, the active steering device 3B, and the active suspension device 3C) of the actual vehicle 1, and controls the actuator devices 3 on the basis of the actuator manipulated variables.

More specifically, the actuator drive controller 16 outputs the actuator manipulated variable to the actual driving/braking device 3A with motive power distribution controlling function such that the driving/braking force of each of the wheels W1 to W4 produced by the actual driving/braking device 3A with motive power distribution controlling function (the engine, the gear shifter, the braking device, etc.) coincides with or converges to a desired driving/braking force of each of the wheels. The actuator drive controller 16 also outputs the actuator manipulated variable to the actual active steering device 3B such that the steering angle of each steering control wheel by the actual active steering device 3B coincides with or converges to or follows a desired steering angle of each steering control wheel. Moreover, the actuator drive controller 16 also outputs the actuator manipulated variable such that a ground contact load generated in each of the wheels W1 to W4 by the actual active suspension device 3C and a suspension stroke of the active suspension device 3C coincide with or converge to a desired ground contact load and a desired suspension stroke, respectively.

It is impossible to make a desired ground contact load and a desired suspension stroke of each of the wheels W1 to W4 precisely hold at the same time, so that a compliance characteristic is imparted to the control of the active suspension device 3C to as to comprominsingly satisfy the desired ground contact load and the desired suspension stroke.

Regarding an actuator operation desired value, desired values for the elements constituting the driving/braking device 3A with motive power distribution controlling function, namely, a desired opening degree of a throttle valve and a desired fuel injection rate of the engine, a desired change gear ratio of the gear shifter, and a desired braking pressure of the braking device may be used in place of a desired driving/braking force of each of the wheels W1 to W4. Alternatively, a desired driving force and a desired braking pressure of each of the wheels W1 to W4 may be used in place of a desired driving/braking force. Further, a desired slip ratio as a desired value of the slip ratio of each of the wheels W1 to W4 and a desired side slip angle as a desired value of a side slip angle may be used in place of a desired ground contact load.

Supplementally, the processing by the scenario preparer 14 and the actuator drive controller 16 corresponds to the actuator controlling means in the present invention.

Further, the sensory feedback control law 22 receives a result of determination processing carried out by the scenario preparer 14, as will be discussed later. Then, the sensory feedback control law 22 gives the driver of the vehicle 1 required information, as necessary, according to a received determination result, as will be discussed in detail hereinafter.

This completes the overview of the general processing by the control device 10. This overview will apply to any one of the embodiments in the present description.

The processing of the scenario preparer 14 in a first embodiment of the present invention will now be specifically explained.

To schematically explain the scenario preparer 14, at each control processing cycle of the control device 10, the scenario preparer 14 prepares the time series of a future reference state amount (hereinafter referred to as "the time series of a scenario reference state amount") of the vehicle 1 up to time in predetermined time Te from the current time (time of the current time+Te) on the basis of the aforesaid drive manipulation inputs or the like, and also prepares the time series of a set of an actuator operation desired value, a state amount related to a motion of the vehicle 1, a road surface reaction force acting on each of the wheels W1 to W4, and a slip (a side slip angle and a slip ratio) of each of the wheels W1 to W4 (hereinafter, the set will be referred to as "a scenario vehicle behavior") up to time in the predetermined time Te from the current time. At this time, basically, the time series of a scenario vehicle behavior is prepared such that the slip (the side slip angle and a slip ratio) of each of the wheels W1 to W4 or a road surface reaction force of each of the wheels W1 to W4 in a scenario vehicle behavior falls within a predetermined permissible range and a difference between a state amount related to a motion of a scenario vehicle behavior and a scenario reference state amount falls within a predetermined permissible range. Then, an actuator operation desired value at the current time in the time series of the scenario vehicle behavior prepared as described above (at the initial time of the time series) is output as the actuator operation desired value to be output to the actual actuator drive controller 16, that is, as the current time value of the actuator operation desired value, at the present (the current time) control processing cycle.

The time series of a scenario vehicle behavior is a time series of a time interval of a predetermined time step Δt. The time step Δt is set to be the same as, for example, the control processing cycle ΔT of the control device 10. However, it does not have to be necessarily Δt=ΔT; it may alternatively be set to Δt>ΔT in order to shorten the time for preparing the time series of a scenario vehicle behavior. Alternatively, it may be set to Δt<ΔT in order to enhance the accuracy of the time series of a scenario vehicle behavior.

Hereinafter, a designation "scenario" will be frequently attached at the beginning of a variable name, such as a state amount, prepared by the scenario preparer 14. For instance, of a scenario vehicle behavior, a state amount related to a motion of the vehicle 1 will be referred to as a scenario motion state amount, and a read surface reaction force will be referred to as a scenario road surface reaction force. Further, an actuator operation desired value of the scenario vehicle behavior will be referred to as a scenario actuator operation desired value.

Further, arbitrary time in a time series of a scenario vehicle behavior will be denoted by an integer value "k" and the following time will be denoted by "k+1", and the preceding time will be denoted by "k−1". The time difference between time k and time k+1 or k−1 will be the aforesaid time step Δt. Time k=1 will mean the initial time of a scenario vehicle behavior, and the initial time will coincide with the time of a control processing cycle at which a new time series of a scenario vehicle behavior is to be created (that is, the current time).

Supplementally, the scenario vehicle behavior corresponds to a future vehicle behavior (a first future vehicle behavior, a second future vehicle behavior, or an m-th future vehicle behavior) in the present invention. The scenario reference state amount corresponds to a future reference state in the present invention.

Here, a scenario vehicle model 41 (refer to FIG. 7) used in the processing by the scenario preparer 14 will be explained.

The scenario vehicle model 41 is a model which represents behaviors of the vehicle 1 and includes a friction model representing a relationship between slips of the wheels W1 to W4 and road surface reaction forces acting on the wheels W1 to W4, a kinetic model representing a relationship between motions of the vehicle 1 and slips of the wheels W1 to W4, a dynamic model representing a relationship between motions of the vehicle 1 and road surface reaction forces (more generally, external forces (including road surface reaction forces) acting on the vehicle 1), and a model representing the operation characteristics of the actuator devices 3 (the operation characteristics of the actuator devices 3 relative to drive manipulation inputs and actuator manipulated variables or external forces). The scenario vehicle model 41 corresponds to a vehicle model in the present invention.

FIG. 5 is a block diagram showing a functional construction of the scenario vehicle model 41. In the following explanation, if variables corresponding to the wheels W1 to W4, respectively, need to be explicitly distinguished, then subscripts i (i=1, 2, 3, 4) of the same numbers of the wheels W1 to W4 will be attached to the variables. As shown in FIG. 1 mentioned above, the wheels W1 to W4 denote the front left wheel, the front right wheel, the rear left wheel, and the rear right wheel, respectively, of the vehicle 1. In the following explanation of the scenario vehicle model 41, the tire provided on the outer periphery (a portion to be in direct contact with a road surface and subjected to a frictional force) of each of the wheels W1 to W4 will be regarded as identical to the wheel, and the wheels W1 to W4 will be frequently referred to as tires wheels W1 to W4. The longitudinal direction or an advancing direction of the vehicle body 1B will be denoted by X axis, the vertical direction thereof will be denoted by Z axis, and the axis orthogonal to the X axis and the Z axis will be denoted by Y axis, and subscripts x, y, and z, respectively, will be attached to the coordinate axis components of vector amounts.

The scenario vehicle model 41 shown in FIG. 5 includes a tire friction model 50, a driving/braking system model 52, a suspension dynamic characteristics model 54, a vehicle body motion model 56, a tire rotational motion model 58, a steering system model 60, a side slip angle calculator 62, a slip ratio calculator 64, and a tire advancing speed vector calculator 66. In the explanation of the scenario vehicle model 41, "a current time value" is used to mean a value at time k in a time series of a scenario vehicle behavior, and "a last time value" is used to mean a value at time k−1.

The tire friction model 50 corresponds to the friction model showing the relationship between the slips of the wheels W1 to W4 and the road surface reaction forces acting on the wheels W1 to W4, and calculates and outputs a driving/braking force Fmdl_x_i, a lateral force Fmdl_y_i, and a self-aligning torque Mmdl_z_i of a road surface reaction force that are produced in each tire Wi (acting on each tire Wi from a road surface) in response to a relative motion between each tire Wi (i=1, 2, 3, 4) and the road surface on the scenario vehicle model 41. These Fmdl_x_i, Fmdl_y_i, and Mmdl_z_i are calculated by publicly known arithmetic processing mentioned in, for example, the aforesaid non-patent document 1.

Specifically, the driving/braking force Fmdl_x_i, of each tire Wi is determined by the following expressions 02a and 02b on the basis of a slip ratio Smdl_i of the tires W1 to W4, as shown in, for example, expressions (26) and (27) on page 183 of the non-patent document 1. Incidentally, expressions 02a and 02b take the same forms of expressions for all tires W1 to W4, so that the subscript i (i=1, 2, 3, 4) will be omitted.

If $Smdl \leq 3 \cdot \mu s \cdot Fmdl\_z/Kx$, then $$Fmdl\_x = Kx \cdot (Lh/L)^2 \cdot Smdl + \mu d \cdot (1 + 2 \cdot Lh/L) \cdot (1 - Lh/L)^2 \cdot Fmdl\_z + 6 \cdot Fmdl\_z \cdot (\mu s - \mu d) \cdot [\{(L \cdot \epsilon \cdot Smdl)^{-2} + 2 \cdot (L \cdot \epsilon \cdot Smdl)^{-3}\} \exp\{-\epsilon \cdot (L - Lh) \cdot Smdl\} + (L \cdot \epsilon \cdot Smdl)^{-1} \cdot (1 - Lh/L) \cdot (Lh/L) - (L \cdot \epsilon \cdot Smdl)^{-2} \cdot (1 - 2 \cdot Lh/L) - 2 \cdot (L \cdot \epsilon \cdot Smdl)^{-3}]$$  Expression 02a If $1 \geq |Smdl| \geq 3 \cdot \mu s \cdot Fmdl\_z/Kx$, then $$Fmdl\_x = \mu d \cdot Fmdl\_z + 6 \cdot Fmdl\_z \cdot (\mu s - \mu d) \cdot [\{(L \cdot \epsilon \cdot Smdl)^{-2} + 2 \cdot (L \cdot \epsilon \cdot Smdl)^{-3}\} \cdot \exp(-L \cdot \epsilon \cdot Smdl) + (L \cdot \epsilon \cdot Smdl)^{-2} - 2 \cdot (L \cdot \epsilon \cdot Smdl)^{-3}]$$  Expression 02b In these expressions 02a and 02b, Kx denotes a proportionality constant called driving stiffness (when the tires Wi are driven) or braking stiffness (when the tires Wi are braked), L denotes the ground contact length of each tire Wi, $\mu s$ denotes a maximum friction coefficient, $\mu d$ denotes a slip friction coefficient, Lh denotes a ground contact length of each tire Wi at the beginning of a slip thereof, $\epsilon$ denotes a changing degree when the friction coefficient changes from $\mu s$ to $\mu d$, exp( ) denotes an exponential function of a base e of a natural logarithm, Smdl denotes a slip ratio of each tire Wi on the scenario vehicle model 41, and Fmdl_z denotes a ground contact load (a road surface reaction force in the vertical direction) of each tire Wi on the scenario vehicle model 41. The slip ratio Smdl of each tire Wi is determined by the slip ratio calculator 64, which will be discussed later, and the ground contact load Fmdl_z is determined by the suspension dynamic characteristics model 54, which will be discussed later, and $\mu s$ and $\mu d$ are determined on the basis of an estimated road surface friction coefficient $\mu estm$ determined by the $\mu$ estimator 18 described above. Kx, L, Lh, and $\epsilon$ are set to, for example, predetermined values decided in advance. Alternatively, $\epsilon$ and the like may be estimated by a publicly known method, as with a friction coefficient. Incidentally, as shown in FIG. 6-17 on page 183 of the aforesaid non-patent document 1, the relationship between the slip ratios of the tires Wi and Fmdl_x may be set in the form of a map or a data table, and this may be used to determine Fmdl_x.

The self-aligning torque Mmdl_z_i of each tire Wi is determined according to expressions 03a and 03b given below on the basis of a side slip angle $\alpha mdl\_i$, as shown in, for example, expressions (4) and (5) on page 180 of the aforesaid non-patent document 1. Incidentally, expressions 03a and 03b take the same forms of expressions for all tires W1 through W4, so that the subscript i (i=1, 2, 3 4) will be omitted.

$$M\_z^* = Mmdl\_z/(L \cdot \mu \cdot Fmdl\_z) = (1/6) \cdot \phi - (1/6)\phi^2 + (1/18) \cdot \phi^3 - (1/162) \cdot \phi^4$$  Expression 03a $$\phi = (Ky/(\mu \cdot Fmdl\_z)) \cdot \tan \alpha mdl$$  Expression 03b In these expressions 03a and 03b, Ky denotes a proportionality constant called cornering stiffness, L denotes a ground contact length of the tires W1 to W4, and $\mu$ denotes a friction coefficient. The ground contact load Fmdl_z of each tire is determined by the suspension dynamic characteristics model 54, which will be discussed later, and $\mu$ is determined on the basis of an estimated road surface friction coefficient $\mu estm$ determined by the aforesaid $\mu$ estimator 18. Ky and L are set to, for example, predetermined values decided in advance or estimated by a publicly known method. The side slip angle $\alpha mdl$ is determined by the side slip angle calculator 62, which will be discussed later.

Incidentally, as shown in FIG. 6-10 on page 180 of the aforesaid non-patent document 1, the relationship between $\phi$ and M_z* of each tire Wi may be set in the form of a map or a data table beforehand, and this may be used to determine Mmdl_z_i.

The lateral force Fmdl_y_i of each tire Wi is determined according to expression 04 given below on the basis of a side slip angle $\alpha mdl\_i$, as shown in expression (3) on page 180 of the aforesaid non-patent document 1. Incidentally, expression 04 takes the same form of expression for all tires W1 through W4, so that the subscript i (i=1, 2, 3 4) will be omitted.

$$F\_y^* = Fmdl\_y/(\mu \cdot Fmdl\_z) = \phi - (1/3)\phi^2 + (1/27) \cdot \phi^3$$  Expression 04

$\phi$ in this expression is a value defined according to the aforesaid expression 03b on the basis of the side slip angle $\alpha mdl\_i$. The ground contact load Fmdl_z of each tire Wi is determined by the suspension dynamic characteristics model 54, which will be discussed later, and $\mu$ is decided on the basis of the estimated friction coefficient $\mu estm$ determined by the $\mu$ estimator 18.

As shown in FIG. 6-10 on page 180 of the aforesaid non-patent document 1, the relationship between $\phi$ and F_y* may be set beforehand in the form of a map or a data table, and this may be used to determine Fmdl_y_i. Further, the lateral force Fmdl_y_i of each tire Wi may be corrected according to the slip ratio Smdl_i. More specifically, a relationship between lateral forces and slip ratios, as shown in FIG. 6-20 on page 184 of the aforesaid non-patent document 1, may be set in the form of a map or a data table beforehand, and this may be used to correct the lateral force Fmdl_y_i determined according to expression 04. Alternatively, the lateral force Fmdl_y_i may be directly determined by using a map from the side slip angle $\alpha mdl\_i$ and the slip ratio Smdl_i. Furthermore, if an inertia (an inertial moment) of the tires Wi can be ignored, then the relationship shown in FIG. 6-21 on page 184 of the aforesaid non-patent document 1 may be used to correct the lateral force Fmdl_y_i on the basis of the driving/braking force Fmdl_x_i acting on each tire Wi, instead of correcting the lateral force Fmdl_y_i on the basis of the slip ratio Smdl_i.

As described above, in order to calculate the driving/braking force Fmdl_x_i, the lateral force Fmdl_y_i, and the self-aligning torque Mmdl_z_i, in the vehicle model 41 shown in FIG. 5, the slip ratio Smdl_i, the side slip angle $\alpha mdl\_i$, the ground contact load Fmdl_z_i, and the estimated friction coefficient $\mu estm$ of each tire are input to the tire friction model 50, then on the basis of the input values, Fmdl_x_i, Fmdl_y_i, and Mmdl_z_i are determined and output.

Supplementally, the driving/braking force Fmdl_x_i determined according to expression 02a or expression 02b given above is a force in the direction of a line of intersection between a central plane of a wheel Wi (a plane orthogonal to the axis of rotation of a wheel Wi) and a road surface, and the lateral force Fmdl_y_i determined according to expression 04 is a force in the direction of a line of intersection between a plane, which includes the axis of rotation of the wheel Wi and which is perpendicular to a road surface, and the road surface. Hence, if the directions of the lines of intersection do not agree with the directions of the X axis (the longitudinal direction of the vehicle body) and the Y axis (the direction of the vehicle width of the vehicle body) (when the vehicle is turning or the like), then Fmdl_x_i and Fmdl_y_i are determined by carrying out coordinate conversion on the basis of a steering angle $\delta mdl\_i$ or the like of each wheel Wi, which will be discussed hereinafter. If the directions of the lines of intersection do not agree with the X axis and the Y axis, then a force Fmdl_x_i in the X-axis direction is referred to as a cornering drag and a force Fmdl_y_i in the Y-axis direction is referred to as a cornering force.

As described above, the driving/braking system model 52 is a model of the driving/braking device 3A with motive power distribution controlling function composed of the engine, the motive power transmission system, and the braking device, as described above (a model showing the dynamic characteristics of the driving/braking device 3A), and it calculates a driving/braking torque Tqmdl_i to be imparted to each tire Wi (a set of a driving torque and a braking torque to be imparted to each tire Wi) on the basis of at least the manipulated variables of the driving/braking system actuators (the manipulated variables of actuators for driving a throttle valve of the engine, driving a fuel injection device, a gear shifting operation of the gear shifter, and driving the braking device), which are the manipulated variables of the actuators provided in the driving/braking device 3A. The driving/braking system actuator manipulated variables are input from a scenario actuator drive controller model 39, which is a model of the actuator drive controller 16 and which will be discussed later. Hereinafter, the driving/braking system actuator manipulated variables will be referred to as the driving/braking system model actuator manipulated variables in some cases. In this case, the driving/braking torque Tqmdl_i to be imparted to each tire Wi from the driving/braking device 3A with motive power distribution controlling function varies with a rotational speed ωwmdl_i of each tire Wi, so that the rotational speed ωwmdl_i of each tire Wi is also input to the driving/braking system model 52. Further, the aforesaid actuator operation desired value to be input to the actual actuator drive controller 16 in the embodiments in the present description include, as described above, a desired driving/braking force of each wheel Wi (a set of a desired value of driving torque and a desired value of a braking torque of each wheel Wi) for the driving/braking device 3A with motive power distribution control function. Further, actuator manipulated variables output to the driving/braking device 3A with motive power distribution control function from the actual actuator drive controller 16 are generated such that driving forces or braking forces of the wheels W1 to W4 produced by the actual driving/braking device 3A with motive power distribution control function coincide with or converge to or follow respective desired values. For this reason, the inputs to the scenario actuator drive controller model 39, which is the model of the actuator drive controller 16 and which will be discussed later, also include the desired values of the driving/braking forces acting on the tires Wi. Further, the driving/braking system model 52 calculates the driving/braking torques Tqmdl_i to be imparted to the tires Wi such that they follows the desired values.

The suspension dynamic characteristics model 54 is a model showing the dynamic characteristics of the active suspension device 3C. The suspension dynamic characteristics model 54 receives last time values of state amounts related to a motion the vehicle body 1B (an azimuth and its angular velocity of a posture of the vehicle body 1B and a position and a speed of the vehicle body 1B) on the vehicle model from the vehicle body motion model 56, which will be described in detail later, and suspension system actuator manipulated variables, which are the manipulated variables of the actuators provided in the active suspension device 3C, (hereinafter, referred to as the suspension system model actuator manipulated variables in some cases) from the scenario actuator drive controller model 39, which will be discussed later.

Then, the suspension dynamic characteristics model 54 calculates the ground contact loads Fmdl_Z_i acting on the tires Wi on the scenario vehicle model 41 on the basis of the input suspension system model actuator manipulated variables, the last time values of the state amounts related to the motion of the vehicle body 1B on the scenario vehicle model 41, and an assumed or estimated road surface configuration.

If the suspension device 3C is a passive suspension device not provided with an active actuator, then the suspension dynamic characteristics model 54 may be the one that expresses the spring-mass-damper characteristics of the suspension or the tires Wi. In this case, the suspension dynamic characteristics model 54 may calculate the ground contact loads Fmdl_z_i acting on the tires W1 to W4 on the basis of the last time values of the state amounts related to the motion of the vehicle body 1B (the azimuth and its angular velocity of a posture of the vehicle body 1B and a position and a speed of the vehicle body 1B) on the scenario vehicle model 41 and the assumed or estimated road surface configuration.

The vehicle body motion model 56 is a dynamic model showing a relationship between forces (e.g., a road surface reaction force) acting on the vehicle 1 and motions of the vehicle body 1B, and receives the road surface reaction forces (the lateral force Fmdl_y_i, the driving/braking force Fmdl_x_i, the ground contact load Fmdl_z_i, the self-aligning torque Mmdl_z_i and the like) of the tires Wi determined by the tire friction model 50 and the suspension dynamic characteristics model 54. Then, based on these inputs and the last time values of the state amounts related to the motion of the vehicle body 1B (the azimuth and its angular velocity of a posture of the vehicle body 1B and a position and a speed of the vehicle body 1B), the vehicle body motion model 56 calculates the current time values of the state amounts related to the motion of the vehicle body 1B. Incidentally, a state amount of a motion of the vehicle body 1B on the vehicle body motion model 56 will be hereinafter referred to as a scenario motion state amount.

The vehicle body motion model 56 is specifically described in terms of, for example, expressions (122) to (127) on page 211 of the aforesaid non-patent document 1. More specifically, the dynamics related to the translational motions of the vehicle body 1B (the translational motions in the directions of coordinate axes of X, Y and Z axes) is described by expressions 05a to 05c given below, while the dynamics related to rotational motions of the vehicle body 1B (in the roll direction (about the X axis), the pitch direction (about the Y axis), and the yaw direction (about the Z axis)) is described by expressions 06a to 06c given below. Here, the influences of aerodynamic forces acting on the vehicle 1 are ignored.

[Mathematical Expression 2]

$$m \cdot \left(\frac{du}{dt} - v \cdot r\right) = \sum_{i=1}^{4} \text{Fmdl\_x\_i} \quad \text{Expression 05a}$$

$$m \cdot \left(\frac{dv}{dt} + u \cdot r\right) = \sum_{i=1}^{4} \text{Fmdl\_y\_i} \quad \text{Expression 05b}$$

$$ms \cdot \frac{dw}{dt} + ms \cdot g = \sum_{i=1}^{4} \text{Fmdl\_z\_i} \quad \text{Expression 05c}$$

[Mathematical Expression 3]

$$Ix \cdot \frac{dp}{dt} - Ixz \cdot \frac{dr}{dt} - ms \cdot \left(\frac{dv}{dt} + r \cdot u\right) \cdot hs = \quad \text{Expression 06a}$$
$$(\text{Fmdl\_y\_1} + \text{Fmdl\_y\_2}) \cdot hf +$$
$$(\text{Fmdl\_y\_3} + \text{Fmdl\_y\_4}) \cdot hr +$$
$$(\text{Fmdl\_z\_1} - \text{Fmdl\_z\_2}) \cdot \frac{bf}{2} +$$
$$(\text{Fmdl\_z\_3} - \text{Fmdl\_z\_4}) \cdot \frac{br}{2}$$

-continued $$Iy \cdot \frac{dq}{dt} + ms \cdot \left(\frac{du}{dt} - v \cdot r\right) \cdot hs =$$ Expression 06b
$$-(Fmdl\_z\_1 + Fmdl\_z\_2) \cdot Lf +$$
$$(Fmdl\_z\_3 + Fmdl\_z\_4) \cdot Lr - \sum_{i=1}^{4} Fmdl\_x\_i \cdot h_{RC}$$

$$-Ixz \cdot \frac{dp}{dt} + Iz \cdot \frac{dr}{dt} = (Fmdl\_y\_1 + Fmdl\_y\_2) \cdot Lf -$$ Expression 06c
$$(Fmdl\_y\_3 + Fmdl\_y\_4) \cdot Lr +$$
$$(Fmdl\_x\_2 - Fmdl\_x\_1) \cdot \frac{bf}{2} +$$
$$(Fmdl\_x\_4 - Fmdl\_x\_3) \cdot \frac{br}{2} + \sum_{i=1}^{4} Mmdl\_z\_i$$

Here, the meanings of the variables of these expressions are as defined by table 6-7 on page 210 of non-patent document 1. More specifically, u, v, and w denote velocity components in the longitudinal, lateral, and vertical directions, respectively, of a portion above the spring (the vehicle body 1B) of the vehicle 1, p, q, and r denote angular velocities in the roll direction, the pitch direction, and the yaw direction, respectively, of the portion above the spring, Ix and Iy denote inertial moments about the X axis and the Y axis, respectively, of the portion above the spring, Iz denotes an inertial moment about the Z axis of the vehicle 1, Ixz denotes an inertial synergistic moment related to the X axis and the Z axis of the portion above the spring, hf and hr denote the roll center heights of the front axis and the rear axis, respectively, of the vehicle 1, hs denotes the length of the normal drawn onto a roll axis from the center of gravity of the portion above the spring (roll arm), hRC denotes the height of the roll axis at the position of the center of gravity of the portion above the spring, Lf and Lr denote the distances between the front axis and the rear axis, respectively, and the center of gravity of the portion above the spring, bf and br denote a front wheel tread and a rear wheel tread, respectively, m and ms denote the mass of the vehicle and the portion above the spring, respectively, g denotes a gravitational acceleration, and ax and ay denote accelerations in the longitudinal direction and the lateral direction (the direction of the vehicle width) of the vehicle 1, respectively.

According to a specific arithmetic procedure of the vehicle body motion model 56, the velocities of the vehicle body 1B in the X-, Y-, and Z-axis directions (u, v, and w in expressions 05a to 05c) and the angular velocities in the roll direction, the pitch direction, and the yaw direction (p, q, and r in expressions 06a to 06c) are determined according to the model expressions of expressions 05a to 05c and 06a to 06c given above. Then, the determined velocities and angular velocities of the vehicle body 1B are integrated thereby to determine the position and posture angles (the angles in the roll direction, the pitch direction, and the yaw direction) of the vehicle body 1B.

Incidentally, in the expressions for the vehicle body motion model 56 described above, it is assumed that the vertical displacements of the tires Wi are constant (or the height from a road surface is constant); however, they do not have to be constant.

Further, in the aforesaid models, moments Mmdl_x_i and Mmdl_y_i about a horizontal axis that act on the tires Wi are ignored; however, they may be considered. Further, the models may be described by expressions that do not use the roll center.

The tire rotational motion model 58 is a model that receives the driving/braking force Fmdl_x_i of the tires Wi and the driving/braking torque Tqmdl_i of the tires Wi and outputs the rotational speed ωwmdl_i of the tires Wi. The Fmdl_x_i and the Tqmdl_i are input from the tire friction model 50 and the driving/braking system model 52, respectively.

Specifically, in the tire rotational motion model 58, first, a value obtained by multiplying the driving/braking force Fmd_x_i of each tire Wi by an effective radius rw of the tire is subtracted from the driving/braking torque Tqmdl_i of each tire Wi so as to determine rotational acceleration torque of each tire Wi. And, a value obtained by dividing the rotational acceleration torque by a rotational inertia (inertial moment) Iw of each tire Wi is integrated, thereby determining the rotational speed ωwmdl_i of each tire Wi.

Incidentally, in a discrete system whose time step is Δt, in order to determine the rotational speed ωwmdl_i of each tire Wi by integration, the rotational acceleration torque of each tire Wi is divided by the rotational inertia Iw of the tire Wi, then the obtained value is multiplied by Δt. The result is added to a last time value of the rotational speed of the tire Wi, thereby determining a current time value of the rotational speed ωwmdl_i of the tire Wi.

The steering system model 60 is a model that receives a steering angle θs and the like, which are elements of the drive manipulation inputs, and calculates the steering angle δmdl_i of each tire Wi (a model showing operation characteristics of the steering device 3B). The active steering device 3B, which is a steering device 3B in the present embodiment, the steering system model 60 receives, in addition to the steering angle θs, a steering actuator manipulated variable δa_i (hereinafter referred to a steering system model actuator manipulated variable), which is a manipulated variable of an actuator provided in the active steering device 3B. If the active steering device 3B is a device capable of controlling only the steering angles of the rear wheels W3 and W4 by actuators, then the steering system model actuator manipulated variable δa_i is a manipulated variable that specifies the steering angle of each steering control wheel by an actuator. Then, the steering system model 60 calculates the steering angles δmdl_i of the tires W1 to W4 on the basis of these inputs.

If the active steering device 3B is a device adapted to perform steering of all wheels W1 to W4 by actuators, then the steering angles of the wheels Wi are defined by the steering system model actuator manipulated variables δa_i of the wheels Wi, so that the input of the steering angles θs to the steering system model 60 may be omitted.

If the active steering device 3B is not adapted to steer the rear wheels W3 and W4, then the steering angles of the rear wheels W3 and W4 are always set to zero (the angle relative to the longitudinal direction of the vehicle body 1B is zero) regardless of the steering angle θs. Further, if the steering device 3B is not equipped with an active actuator, then the steering system model 60 may calculate the steering angle δmdl_i of each steering control wheel (each of the front wheels W1 and W2) from the steering angles θs on the basis of mechanical characteristics of the steering device 3B. In addition, a stroke change of the suspension or a geometry change due to a load change may be taken into account.

The aforesaid slip ratio calculator 64 receives the advancing speed vector Vmdl_i of each tire Wi, the steering angle δmdl_i of each tire Wi, and the rotational speed ωwmdl_i of each tire Wi, and calculates, from these inputs, the slip ratio Smdl_i of each tire Wi according to, for example, expressions (17) and (18) on page 182 of the aforesaid non-patent document 1. The advancing speed vector Vmdl_i is supplied from the tire advancing speed vector calculator 66, which will be discussed in detail later, the steering angle δmdl_i is supplied from the steering system model 60, and the rotational speed ωwmdl_i is supplied from the tire rotational motion model 58.

Specifically, the slip ratio Smdl_i of each tire Wi is calculated according to expression 07a given below when the tire Wi is driven, whereas it is calculated according to expression 07b given below when the tire Wi is braked, where V in these expressions 07a and 07b denotes a component in the direction of the line of intersection between the central plane of the tire Wi and a road surface in the advancing speed vector Vmdl_i based on the direction of the vehicle body 1B. This component is determined by using the steering angle δmdl_i. Further, in expressions 07a and 07b, rw denotes an effective radius of each tire Wi. Incidentally, expressions 07a and 07b take the same forms of expressions for all tires W1 through W4, so that the subscript i (i=1, 2, 3, 4) will be omitted.

When driven:

$$Smdl=(V-rw\cdot\omega wmdl)/(rw\cdot\omega wmdl) \quad \text{Expression 07a}$$

When braked:

$$Smdl=(V-rw\cdot\omega wmdl)/V \quad \text{Expression 07b}$$

The side slip angle calculator 62 receives the advancing speed vector Vmdl_i of each tire Wi and the steering angle δmdl_i of each tire Wi, and based on these inputs, the side slip angle calculator 62 determines a difference between a steering angle (an angle relative to the X-axis direction) of each tire Wi and a direction (an angle relative to the X-axis direction) of the advancing speed vector Vmdl_i of each tire Wi, as shown in, for example, FIG. 6-13 on page 181 of the aforesaid non-patent document 1, thereby determining the side slip angle αmdl_i. The advancing speed vector Vmdl_i and the steering angle δmdl_i are input from the tire advancing speed vector calculator 66, which will be discussed in detail later, and the steering system model 60, respectively.

Based on the state amounts related to a motion of the vehicle body 1B input from the vehicle body motion model 56, the tire advancing speed vector calculator 66 calculates the advancing speed vector of each tire Wi (the advancing direction and speed of each tire Wi) Vmdl_i by kinematics computation.

The following will explain the aforesaid arithmetic processing of the scenario vehicle model 41 by referring to the flowchart of FIG. 6. This arithmetic processing is processing carried out at each time k of the aforesaid time series of the scenario vehicle behavior. In the following explanation, a suffix [k] will mean a value at time k, and a suffix [k−1] will mean a value at time k−1.

First, in S010, a driving/braking system model actuator manipulated variable [k] is input to the driving/braking system model 52 so as to calculate a driving/braking torque Tqmdl_i[k] of each tire Wi (a set of a driving torque and a braking torque of each tire Wi).

Subsequently, the procedure proceeds to S012 wherein the driving/braking torque Tqmdl_i[k] of each tire Wi and a driving/braking force Fmdl_x_i[k−1] of each tire Wi at time k−1 are input to the tire rotational motion model 58 so as to calculate the rotational speed ωwmdl_i[k] of each tire Wi, as described above.

Subsequently, the procedure proceeds to S014 wherein the steering angle θs[k] and the steering system model actuator manipulated variable δa_i[k] are input to the steering system model 60 so as to determine the steering angle δmdl_i[k] of each tire Wi.

Subsequently, the procedure proceeds to S016 wherein a suspension system model actuator manipulated variable [k] and a scenario motion state amount [k−1] at time k−1 (a posture angle [k−1] and an angular velocity thereof [k−1] of the vehicle body 1B and a position [k−1] and a speed [k−1] of the vehicle body 1B) are input to the suspension dynamic characteristics model 54 to calculate the ground contact load Fmdl_z_i[k] acting on each tire Wi. In this case, an assumed or estimated road surface configuration may be input to the suspension dynamic characteristics model 54. In the present embodiment, the road surface configuration is supposed to be flat.

Subsequently, the procedure proceeds to S018 wherein the scenario motion state amounts at time k−1 (the speed [k−1] and the posture angle [k−1] and the angular velocity [k−1] of the vehicle body 1B) are input to the tire advancing speed vector calculator 66 to calculate the advancing speed vector Vmdl_i[k] (the advancing direction and speed) of each tire Wi.

Subsequently, the procedure proceeds to S020 wherein the steering angle δmdl_i[k] of each tire Wi, the rotational speed ωwmdl_i[k] of each tire Wi, and the advancing speed vector Vmdl_i[k] of each tire Wi are input to the slip ratio calculator 64 to calculate the slip ratio Smdl_i[k] of each tire Wi.

Subsequently, the procedure proceeds to S022 wherein the steering angle δmdl_i[k] of each tire Wi and the advancing speed vector Vmdl_i[k] of each tire Wi are input to the side slip angle calculator 62 to determine the side slip angle αmdl_i[k].

Subsequently, the procedure proceeds to S024 wherein the side slip angle αmdl_i[k], the slip ratio Smdl_i[k], and the ground contact load Fmdl_z_i[k] of each tire Wi are input to the tire friction model 50 to determine the driving/braking force Fmdl_x_i[k], the lateral force Fmdl_y_i[k], and the self-aligning torque Mmdl_z_i[k] of each tire Wi.

Lastly, the procedure proceeds to S126 wherein the road surface reaction forces (the lateral force Fmdl_y_i[k], the driving/braking force Fmdl_x_i[k], the ground contact load Fmdl_z_i[k], and the self-aligning torque Mmdl_z_i[k]) determined as described above are input to the aforesaid vehicle body motion model 56 to calculate the scenario motion state amounts [k]. At this time, the vehicle body motion model 56 calculates the scenario motion state amounts [k] on the basis of the aforesaid inputs and the scenario motion state amounts at time k−1 (the posture angle [k−1] and its angular velocity [k−1] of the vehicle body 1B and the position [k−1] and the speed [k−1] of the vehicle body 1B).

The above has described in detail the arithmetic processing by the scenario vehicle model 41. Hereinafter, the scenario motion state amounts and the road surface reaction force (the scenario road surface reaction force), the side slip angle (the scenario side slip angle), and the slip ratio (the scenario slip ratio) of each wheel Wi that are calculated by the arithmetic processing carried out by the scenario vehicle model 41, as described above, may be generically referred to as scenario vehicle state amounts. Incidentally, the order of the arithmetic processing by the scenario vehicle model 41 may be changed, as appropriate. For example, the order of the arithmetic processing of S012 and S014 may be reversed. Supplementally, the scenario vehicle model 41 and its arithmetic processing are the same in the embodiments in the present description.

FIRST EMBODIMENT

The processing by a scenario preparer 14 in a first embodiment will now be explained in detail.

FIG. 7 is a block diagram showing the outline of the processing features of the scenario preparer 14 in the first embodiment. As shown in the figure, the scenario preparer 14 is equipped with, as main processing features, a future drive manipulation input time series determiner 31, a scenario reference dynamic characteristics model 33, a scenario actuator operation desired provisional value determiner 35, a side slip angle/slip ratio limiter 37, a scenario actuator drive controller model 39, the scenario vehicle model 41, and the current state acceptance manipulated variable determiner 43.

A drive manipulation input supplied from a sensor of the manipulating devices 5 to a scenario preparer 14 is given to the future drive manipulation input time series determiner 31. Based on the input drive manipulation input time series (a current time value and a past value), the future drive manipulation input time series determiner 31 prepares a time series op[k] (k=1, 2, . . . , Ke) of a future drive manipulation input op, which is a drive manipulation input in the future up to time k=Te/Δt (hereinafter, Te/Δt=Ke) in predetermined time Te from time k=1 (the current time).

The processing by the future drive manipulation input time series determiner 31 corresponds to the future drive manipulated variable determining means in the present invention.

The future drive manipulation input op[k] at each time k is input to the scenario reference dynamic characteristics model 33 and the scenario actuator operation desired provisional value determiner 35. Based on the future drive manipulation input op[k], the scenario current state acceptance manipulated variable [k−1], and the scenario motion state amount [k−1], the scenario reference dynamic characteristics model 33 prepares the scenario reference state amount [k], which is a reference state amount related to a motion of the vehicle 1 at each time k of a scenario vehicle behavior. The scenario reference state amount [k] is composed of a reference yaw rate and a reference course, as with a reference state amount prepared by the aforesaid reference dynamic characteristics model 12. Hereinafter, a reference yaw rate of a scenario reference state amount will be referred to as a scenario reference yaw rate, and a reference course thereof will be referred to as a scenario reference course. The prepared scenario reference state amount [k] is input to the scenario actuator operation desired provisional value determiner 35. Incidentally, the scenario current state acceptance manipulated variable [k−1] and the scenario motion state amount [k−1] input to the scenario reference dynamic characteristics model 33 to prepare the scenario reference state amount are determined at time k−1 by the current state acceptance manipulated variable determiner 43 and the scenario vehicle model 41, respectively.

Supplementally, the scenario reference state amount corresponds to the future reference state in the present invention; therefore, the processing by the scenario reference dynamic characteristics model 33 corresponds to the reference state determining means in the present invention (more specifically, the reference state determining means in the aforesaid twenty-fourth invention or the second reference state determining means in the twenty-fifth invention, the twenty-seventh invention, or the twenty-ninth invention).

The scenario actuator operation desired provisional value determiner 35 determines a scenario actuator operation desired provisional value [k] as the provisional value of an actuator operation desired value at each time k. Here, the scenario actuator operation desired provisional value [k] is composed of a first feedforward amount FF1[k], a second feedforward amount FF2[k], and a feedback amount FB[k], which are determined by a normal feedforward law 35a, a reserved feedforward amount determiner 35c, and a feedback law 35b, respectively. Then, these FF1[k], FF2[k], and FB[k] are added by an adding processor 35d to determine the scenario actuator operation desired provisional value [k] (=FF1[k]+FF2[k]+FB[k]). The determined scenario actuator operation desired provisional value [k] is input to the side slip angle/slip ratio limiter 37.

Here, the first feedforward amount FF1 is a feedforward manipulated variable (a basic value of an actuator operation desired value) determined by a normal feedforward law (a map, an arithmetic expression or the like that is set beforehand) from drive manipulation inputs and the state amounts of a motion of the vehicle 1. For example, as with the conventionally known engine drive control, a fuel injection amount (a basic fuel injection amount) determined according to a map or the like from an opening of a throttle valve or a manipulated variable of an accelerator (gas) pedal or a pressure in an intake pipe and a rotational speed of an engine corresponds to the first feedforward amount FF1. In the embodiments in the present description, an actuator operation desired value is a vector amount composed of a desired driving/braking force, a desired steering angle, a desired ground contact load, and a desired suspension stroke of each wheel Wi, as described above; hence, a vector amount composed of the basic values (reference values) of these desired values is determined as the first feedforward amount FF1. In this case, FF1 is determined by the normal feedforward law 35a on the basis of the drive manipulation inputs op[k] and the scenario motion state amount [k−1]. In other words, FF1 is determined without using future information. Specifically, when determining FF1[k], op[k'](k'>k) and a scenario motion state amount [k''](k''>k−1) are not used.

Further, the second feedforward amount FF2 is a reservation type feedforward manipulated variable for preventing the vehicle 1 in a scenario vehicle behavior from spinning or deviating from a course. The FF2 has a function as a correction amount for correcting the components of the first feedforward amount FF1 (the basic values of a desired driving/braking force, a desired steering angle, a desired ground contact load, and a desired suspension stroke of each wheel Wi) to prevent the vehicle 1 from spinning or deviating from a course, and it is a vector amount composed of the correction amounts of the components of FF1. The FF2 is determined by the reservation type feedforward amount determiner 35c according to a scenario type SC, which will be described later, and basically, the magnitude of FF2 (more precisely, the magnitude of FF2 (the absolute value) of a particular component of FF2) is gradually increased if there is a danger that the vehicle 1 in a scenario vehicle behavior will spin or deviate from a course. Further, in a situation wherein the vehicle 1 in a scenario vehicle behavior will not spin or deviate from the track, the components of FF2 are maintained at zero or gradually returned to zero.

Further, the feedback amount FB is a feedback manipulated variable determined such that a state amount of a motion of the vehicle 1 in a scenario vehicle behavior (a scenario motion state amount) is brought close to (converged to or caused to follow) a scenario reference state amount. The FB has a function as a correction amount for correcting the components of the first feedforward amount FF1 (the basic values of a desired driving/braking force, a desired steering angle, a desired ground contact load, and a desired suspension stroke of each wheel Wi) to bring a scenario motion state amount close to a scenario reference state amount, and it is a vector amount composed of the correction amounts of the components of FF1, and it is determined by the feedback control law 35b on the basis of a difference between a scenario reference state amount k and a scenario motion state amount [k−1].

The side slip angle/slip ratio limiter 37 corrects, as necessary, the aforesaid scenario actuator operation desired provisional value [k] such that a side slip angle [k] (a scenario side slip angle [k]) and a slip ratio [k] (a scenario slip ratio [k]) on the scenario vehicle model 41 fall within predetermined permissible ranges, and determines the time series of the scenario actuator operation desired value [k] up to time Ke.

The scenario actuator drive controller model 39 determines the time series of a scenario actuator manipulated variable [k], which is an actuator manipulated variable related to a scenario vehicle behavior, by the same processing as that by an actuator drive controller 16 of an actual vehicle 1 on the basis of the scenario actuator operation desired value [k] and the scenario vehicle state amount [k−1].

The scenario vehicle model 41 calculates the scenario vehicle state amounts [k] (the scenario road surface reaction force [k], the scenario slip ratio [k], the scenario side slip angle [k], and the scenario motion state amount [k]) of the scenario vehicle behavior on the basis of the scenario actuator manipulated variable [k] and the like, as described above.

The current state acceptance manipulated variable determiner 43 determines a scenario current state acceptance manipulated variable on the basis of the scenario actuator operation desired provisional value and the scenario actuator operation desired value. The scenario current state acceptance manipulated variable is a manipulated variable for bringing a scenario reference state amount close to the scenario motion state amount created by the scenario vehicle model 41. In the present embodiment, the scenario current state acceptance manipulated variable is a manipulated variable of the dimension of a moment, as with the current state acceptance manipulated variable input to the reference dynamic characteristics model 12.

Incidentally, at each control processing cycle in a controller 10, a value at time k=1 in the time series of the scenario actuator operation desired value [k] finally determined by the side slip angle/slip ratio limiter 37 is output as the actuator operation desired value in the present (the current time) control processing cycle to the actuator drive controller 16 from the scenario preparer 14. Further, the value at time k=1 in the time series of the scenario current state acceptance manipulated variable [k] determined by the current state acceptance manipulated variable determiner 43 is output from the scenario preparer 14 as the current state acceptance manipulated variable to be used with the computation in the reference dynamic characteristics model 12 at the control processing cycle following the present control processing cycle.

Referring primarily to the flowcharts of FIG. 8 to FIG. 11, the processing by the scenario preparer 14 will be explained below in detail.

FIG. 8 is a flowchart showing main routine processing carried out by the scenario preparer 14. For the convenience of explanation, the flowchart includes also the processing carried out by the reference dynamic characteristics model 12.

First, the processing of S110 is carried out. This processing of S110 is the processing by the future drive manipulation input time series determiner 31. In this S110, the time series of future drive manipulation inputs op[k] (k=1, 2, . . . , Ke), which is composed of a drive manipulation input at each time k from the current time k=1 up to the future time k=Ke, is determined on the basis of the time series of the drive manipulation inputs up to the current time (the time series composed of a current time value and past values of the drive manipulation inputs). The determined time series of the future drive manipulation inputs op[k] is stored and retained in a memory, which is not shown.

To be specific, the time series of the future drive manipulation inputs op[k] is prepared as follows. A steering angle θs among drive manipulation inputs will be taken as an example in the following explanation. If it is assumed that the time series of steering angle θs up to the current time is as shown by, for example, the dashed line in the graph of FIG. 12, then the time series of the steering angle θs[k] in the time series of the future drive manipulation inputs op[k] is determined as shown by the solid line in the graph of the figure. In this case, if an environment (a traveling environment of the actual vehicle 1) cannot be recognized, then the time series of the steering angle θs[k] may be determined such that the steering angle θs[k] becomes constant from the time at which some time has elapsed from the current time k=1. To be more specific, the θs[k] is determined from a value (a current time value) of the steering angle θs at the current time and a value (a current time value) of an angular velocity of the steering angle θs such that a behavior of, for example, a first-order lag system is shown. More specifically, if a value of a steering angle θs[1] at the current time k=1 is denoted by θs1 and a value of an angular velocity is denoted by dθs1/dt, then the θs[k] is determined such that it provides a first-order lag waveform that is stabilized to θs1+Ts·dθs1/dt at a predetermined time constant Ts. In this case, θs1 is set to coincide with a detected value of the steering angle θs at the current time, i.e., a current time value of θs. The angular velocity dθs1/dt may be determined by dividing a difference between the current time value and the last time value of a detected value of the steering angle θs by a control processing cycle Δt; alternatively, however, it may be determined by an FIR filter or an IIR filter on the basis of the current time value and a time series of a plurality of past values of detected values of the steering angle θs so as to remove noises.

The time series of other drive manipulation inputs in addition to the steering angle θs (an accelerator (gas) pedal manipulated variable and a brake pedal manipulated variable) among the future motion manipulation inputs op[k] is also determined in the same manner as that for the time series θs[k] of the steering angle θs. Incidentally, among the future motion manipulation inputs op[k], a time series of a shift lever position is determined such that, for example, it is maintained at a shift lever position (a current time value) at the current time.

Supplementally, if a traveling environment of the actual vehicle 1 can be recognized by a visual sensor, a radar, a GPS, an inertial navigation device, map data, or the like, then it is desirable to prepare a time series of future drive manipulation inputs op[k] on the basis of environmental information. For instance, if a driver suddenly steers the steering wheel when the actual vehicle 1 is traveling on an expressway, the time series of future drive manipulation inputs op[k] may be prepared, interpreting that the driver is trying to change a lane to avoid an obstacle or the like. Desirably, the time series of the future drive manipulation inputs op[k] basically provides drive manipulation inputs that make it possible to obtain a behavior of the vehicle 1 that approximates a future behavior of the actual vehicle 1 intended by the driver.

The processing of S110 (the processing by the future drive manipulation input time series determiner 31) explained above corresponds to the future drive manipulated variable determining means in the present invention.

Subsequently, the procedure proceeds to S112 wherein the last time value (the latest value) of a current state acceptance manipulated variable, the current time values of drive manipulation inputs (=op[1]: latest values of drive manipulation inputs), and the current time value (the latest value) of an actual state amount (specifically, the vehicle speed) of the actual vehicle 1 are input to the reference dynamic characteristics model 12 to determine the current time values of the reference state amounts (the reference yaw rate and the reference course), as described above. In this case, the last time value of the current state acceptance manipulated variable is used as Mvirt of the aforesaid expression 01b. The processing of this S112 (the processing by the reference dynamic characteristics model 12) constitutes the first reference state determining means in the present invention.

Subsequently, the procedure proceeds to S114 wherein a resetting scenario is set as the scenario type SC. Here, the scenario type SC defines the type of a changing pattern of the second feedforward amount FF2[$k$] ($k$=1, 2, . . . , Ke) in a scenario vehicle behavior. In the present embodiment, when the time series of a scenario vehicle behavior is created, FF2[$k$], FF1[$k$], and FB[$k$] are provisionally determined at each time k, and the total thereof is determined as an actuator operation desired provisional value [k]. The scenario type SC defines the changing pattern of the second feedforward amount FF2[$k$] (the rule for setting the time series of FF2[$k$]) of the actuator operation desired provisional value [k]. In the present embodiment, the scenario type SC is available in roughly four different scenario types, including the resetting scenario.

Subsequently, the procedure proceeds to S116 wherein a scenario vehicle behavior is created according to the currently set scenario type SC (=resetting scenario). This processing of S116 corresponds to the first future vehicle behavior determining means in the present invention. Hence, the scenario vehicle behavior created by this processing corresponds to a future vehicle behavior in the aforesaid first invention or a first future vehicle behavior in the third invention and the fifth invention. This processing of S116 is executed by the subroutine processing shown in the flowchart of FIG. 9. In the following explanation, in order to distinguish between a value determined at the current time (the present) control processing cycle and a value determined at the last time control processing cycle, the values may be accompanied by suffixes n and n−1, as appropriate.

The explanation will now be given. First, in S210, a value FF2[1]$n$−1 at time k=1 in the time series of the second feedforward amount FF2[$k$]$n$−1 (k=1, 2, . . . , Ke) finally determined in the last time control processing cycle is substituted into a value FF[0]n at time 0 (time of the current time−Δt) of the second feedforward amount FF2. In other words, FF2[0]$n$=FF2[1]$n$−1.

Subsequently, the procedure proceeds to S212 wherein the initial states of the scenario vehicle model 41 (the scenario motion states at time k=0) are set to agree with the current time values of an actual state of the actual vehicle 1 (the latest state of the actual vehicle 1). More specifically, the values of state amounts (state amounts to be initialized), such as the position of the vehicle on the scenario vehicle model 41, the changing velocity of the position, a posture angle (an azimuth) and a changing velocity of the posture angle at time=0 are set to agree with the current time values of the actual state amounts of the actual vehicle 1. This processing of S212 constitutes the vehicle model initializing means in the present invention. Incidentally, for example, the values obtained by filtering the actual state amounts may be used to initialize the state amounts to be initialized of the scenario vehicle model 41. Further, for example, the last time values of the actual state amounts of the actual vehicle 1 (the values at time that is one control processing cycle before (this means time in the vicinity of the current time)) may be used to initialize the state amounts of the scenario vehicle model 41.

Subsequently, the procedure proceeds to S214 wherein the value of time k is set to the initial time "1" of a scenario vehicle behavior, then the loop processing of S216 to S242 is carried out at each time k (k=1, 2, . . . , Ke). The processing of S216 is the processing carried out in the aforesaid scenario reference dynamic characteristics model 33. In this S216, the scenario current state acceptance manipulated variable [k−1], the future drive manipulation inputs op[k], and the scenario motion state amounts [k−1] (specifically, the vehicle speed in the scenario motion state amount [k−1]) are input to the scenario reference dynamic characteristics model 33 to determine the scenario reference state amounts [k] (the scenario reference yaw rate [k] and the scenario reference course [k]). However, if k=1, then the current time values of the reference state amounts determined by the reference dynamic characteristics model 12 (the latest values of the reference state amounts determined in S112 in FIG. 8) are directly substituted into the scenario reference state amounts [1]. The scenario reference state amounts [k] when k≠1 are determined by the same processing as that carried out by the reference dynamic characteristics model 12. In this case, to calculate a scenario reference state amount at time k (≧2), the steering angle θs[k] in the future drive manipulation inputs op[k], the vehicle speed [k−1] in the scenario motion state amounts [k−1], and the scenario current state acceptance manipulated variable [k−1] previously determined in association with time k−1 by the processing of S238, which will be discussed later, are input to the scenario reference dynamic characteristics model 33. Then, from these input values, the scenario reference state amount is calculated by the same processing (the arithmetic processing based on the aforesaid expressions 01a and 01b) as that in the aforesaid reference dynamic characteristics model 12.

If only a scenario reference yaw rate is determined as the scenario reference state amount, then the scenario reference yaw rate may be determined by the same processing as that shown in FIG. 4 described above.

Subsequently, the procedure proceeds to S218 wherein the second feedforward amount FF2[$k$] is determined on the basis of the currently set scenario type SC. This processing is the processing executed by the reservation type feedforward amount determiner 35c of the actuator operation desired provisional value determiner 35.

Here, the scenario type SC that defines a changing pattern of FF2[$k$] (k=1, 2, . . . , Ke) is available in roughly four different scenario types, including the resetting scenario, in the present embodiment. However, the three different scenario types SC other than the resetting scenario are further divided according to a type of a behavior of the vehicle 1 expected to take place as a result of a deviation if a scenario side slip angle and a scenario slip ratio (or a scenario road surface reaction force), respectively, of a scenario vehicle behavior deviate from predetermined permissible ranges or if a difference between a scenario motion state amount and a scenario reference state amount deviates from a predetermined permissible range. The three different scenario types SC other than the resetting scenario are further divided according to, for example, a situation wherein the vehicle 1 is likely to deviate from a course to the left toward the front of the vehicle 1, a situation wherein the vehicle 1 is likely to spin to the left (counterclockwise), a situation wherein the vehicle 1 is likely to deviate from the track to the right, or a situation wherein the vehicle 1 is likely to spin to the right (clockwise). Hereinafter, these situations will be generically referred to as the situations to be prevented. Thus, the three different scenario types other than the resetting scenario are determined for each type of the situations to be prevented.

Hereinafter, each type of the situations to be prevented is distinguished by a lower-case alphabet (a, b, . . . ), and the three different scenario types SC are expressed by being distinguished by integer values 1 to 3 for each type of situations to be prevented. For instance, three different scenario types SC of situations to be prevented in a case where the vehicle 1 deviates from a course to the left are denoted by a1, a2, and a3, or if the type of a situation to be prevented is a spin of the vehicle 1 to the left (counterclockwise), then the scenario types SC are denoted by b1, b2, and b3. In these scenario types SC, the scenario types carrying the same value for the integer value portion of the denotation of the scenario types SC mean that they are scenario types having the same type of changing pattern of the second feedforward amount FF2 defined thereby (the same type of rule for determining the time series of FF2). For example, a1, b1, . . . denote the scenario types sharing the same type of changing pattern of FF2. Any two scenario types having the same value for the integer value portion of the denotation of the scenario type SC but different lower-case alphabets (different types of situations to be prevented) generally differ in a component in the second feedforward amount FF2 to be changed, but share the same type of changing pattern for a time-dependent changing pattern of the component to be changed. In other words, a component of the second feedforward amount FF2 to be changed is specified for each type of situations to be prevented, and there are three different changing patterns of the component. Further, the resetting scenario is a scenario type for gradually returning, to zero, a component of FF2 that has been changed according to each type of situations to be prevented. Incidentally, according to the resetting scenario, in a situation wherein all components of FF2 are zero, then the situation is maintained.

The processing of S218 is carried out by the subroutine processing shown by the flowchart of FIG. 10. In FIG. 10, one component among the components (particular components of each scenario type) of FF2 (vector amount) to be changed according to the situations to be prevented is representatively denoted by FF2$x$. In practice, the processing shown in FIG. 10 is carried out on each of the components of FF2 (vector amount) to be changed on the basis of the type of situations to be prevented (on the basis of a scenario type). In FIG. 11, FIG. 13, and FIG. 27, which will be discussed later, "FF2$x$" in these figures means a representative one component, as described above.

Referring to FIG. 10, first, in S310, a scenario type SC that is currently set is discriminated. If SC is the resetting scenario, then each component of the second feedforward amount FF2 is gradually returned to zero or the resetting processing, which is the processing for maintaining each component at zero, is carried out in S312. This resetting processing is executed by the subroutine processing shown by the flowchart of FIG. 11.

First, in S410, the value of FF2$x$[$k$−1] is discriminated. If FF2$x$[$k$−1] is zero, then the procedure proceeds to S412 wherein FF2$x$[$k$] is set to zero, and the subroutine processing of FIG. 11 is terminated. In other words, the subroutine processing of FIG. 11 is terminated, maintaining the value of FF2$x$ at zero.

In the discrimination in S410, if FF2$x$[$k$−1] is found to be larger than zero, then the procedure proceeds to S414 wherein a result obtained by subtracting a predetermined amount ΔFF2$x$_$rec$(>0) from FF2$x$[$k$−1] is defined as FF2$x$[$k$]. Here, ΔFF2$x$_$rec$ specifies the amount of change (the amount of temporal change) of FF2$x$ per time step Δt in gradually bringing FF2$x$ close to zero. Incidentally, ΔFF2$x$_$rec$ is set beforehand for each component of the second feedforward amount FF2.

Subsequently, the procedure proceeds to S416 wherein the value of FF2$x$[$k$] is discriminated. At this time, if FF2$x$[$k$] is smaller than zero, then the procedure proceeds to S418 wherein FF2$x$[$k$] is set to zero, as in the aforesaid S412, and the subroutine processing of FIG. 11 is terminated. If it is determined in S416 that FF2$x$[$k$] is not smaller than zero, then the subroutine processing of FIG. 11 is immediately terminated.

Further, if it is determined in S410 that FF2$x$[$k$−1]<0, then the procedure proceeds to S420 wherein a result obtained by adding a predetermined amount ΔFF2$x$_$rec$ to FF2$x$[$k$−1] is defined as FF2$x$[$k$]. Next, the procedure proceeds to S422 wherein the value of FF2$x$[$k$] is discriminated. At this time, if FF2$x$[$k$] is larger than zero, then the procedure proceeds to S424 wherein FF2$x$[$k$] is set to zero, and the subroutine processing of FIG. 11 is terminated. If it is determined in S422 that FF2$x$[$k$] is not larger than zero, then the subroutine processing of FIG. 11 is immediately terminated.

Supplementally, the components of the second feedforward amount FF2 come in the component FF2$x$[$k$] which changes in a value of zero or more and the component FF2$x$[$k$] which changes in a value of zero or less according to a scenario type. In practice, the processing of S420 to S424 is not carried out on FF2$x$[$k$] which changes in a value of zero or more. The processing of S420 to S424 is the processing carried out on FF2$x$[$k$] which changes in a value of zero or less. And, the processing of S414 to S418 is not carried out on FF2$x$[$k$] which changes in a value of zero or less.

The above has explained the processing of S312 of FIG. 10.

In the explanation of FIG. 10 hereinafter, the component FF2$x$[$k$] which changes in a value of zero or more will be representatively explained.

Returning to the explanation of FIG. 10, if it is determined in S310 that the scenario SC is a1, then the procedure proceeds to S314 wherein it is determined whether k=1 or not. If k=1, then the procedure proceeds to S316 wherein the same processing as that in the aforesaid S312 (the processing for resetting FF2$x$) is carried out. Further, if k≠1 in S314, then the procedure proceeds to S318 wherein a result obtained by adding a predetermined amount ΔFF2$x$_$emg$_$a$(>0) to FF2$x$[$k$−1] is defined as FF2$x$[$k$]. The ΔFF2$x$_$emg$_$a$ specifies an amount of change (an amount of temporal change) of FF2$x$ per time step Δt (here, FF2$x$≧0, so that ΔFF2$x$_$emg$_$a$ specifies an amount of increase in FF2 (a temporal increasing rate) per time step Δt) according to the type a of situations to be prevented.

Subsequently, the procedure proceeds to S320 wherein it is determined whether FF2$x$[$k$] is larger than a preset upper limit value FF2$x$max(>0). If the determination result in S320 is YES, then the procedure proceeds to S322 wherein the value of FF2$x$[$k$] is forcibly limited to FF2$x$max, and the subroutine processing in FIG. 10 is terminated. If the determination result in S320 is NO, then the subroutine processing in FIG. 10 is immediately terminated.

If it is determined in S310 that the scenario type SC is a2, then the procedure proceeds to S324 wherein it is determined whether k=1. If k=1, then the procedure proceeds to S326 wherein FF2$x$[$k$−1] is substituted into FF2$x$[$k$], and the subroutine processing in FIG. 10 is terminated. If k≠1 in S324, then the procedure proceeds to S328 wherein the same processing as that in S318 is carried out. Subsequently, the same processing as that in S320 and S322 described above is carried out in S330 and S332, respectively.

If it is determined in S310 that the scenario type SC is a3, then the procedure proceeds to S334 wherein the same processing as that in S318 described above is carried out. Subsequently, the same processing as that in S320 and S322 described above is carried out in S336 and S338, respectively.

Furthermore, if the scenario type SC is b1, b2, b3 or the like, the same processing as that for the case where the scenario type SC is a1, a2, or a3 is carried out to determine FF2x[k]. For instance, if SC=b1, then FF2x[k] is set by the same processing as that in S314 to S322, or if SC=b2, then FF2x[k] is set by the same processing as that in S324 to S332, or if SC=b3, then FF2x[k] is set by the same processing as that in S334 to S338. However, ΔFF2x_emg is set for each type of situations to be prevented or for each particular component of FF2 associated with the type.

Regarding FF2x that changes in a value of zero or less, a result obtained by subtracting ΔFF2x_emg from FF2x[k−1] is substituted into FF2x[k] in place of the processing of S318, S328, and S334. Further, in place of the determination processing of S320, S330, and S336, FF2x[k] is compared with a predetermined lower limit value FF2xmin(<0), and if FF2x[k]<FF2xmin, then a value of FF2x[k] is forcibly set to FF2xmin in place of S322, S332, and S338. Except for this, the same processing as that in FIG. 10 related to FF2x that changes in a value of zero or more applies.

Supplementally, a component of FF2 to be changed by ΔFF2_emg_a when the type of a situation to be prevented is "a" is, for example, a correction amount of a desired braking force of each wheel Wi or a correction amount of a desired steering angle or both thereof.

The above is the processing of S218 of FIG. 9. The processing changes predetermined components (components set for each type of situations to be prevented) of FF2 at each time k, as shown in FIGS. 13(a) to (d), according to the scenario types SC, which have been set. Here, a case where the type of situations to be prevented is "a" will be representatively explained.

FIGS. 13(a) to (d), respectively, show the examples of the changing patterns of particular components FF2x[k] in FF2[k] in a case where the resetting scenario, the a1 scenario, the a2 scenario, and the a3 scenario have been set as the scenario types SC. In this case, in FIGS. 13(a) to (d), for the FF2x that changes in a value of zero or more, the upward direction of the axis of ordinates indicates a positive direction, and for the FF2x that changes in a value of zero or less, the upward direction of the axis of ordinates indicates the negative direction. In the explanation of FIG. 13, if it is necessary to distinguish between the explanation about FF2x that changes in a value of zero or more and the explanation about FF2x that changes in a value of zero or less, then the explanation about the latter will be given in braces { }.

In any one of the scenario types, FF2[k] (=FF2[0]) at time k=0 is set to be the same as a value of FF2[1]n−1, which is a value of FF2x at time k=1 in the last time control processing cycle.

Further, according to the resetting scenario, as shown in FIG. 13(a), FF2x[k] is changed from time k=1 toward zero by a predetermined amount ΔFF2x_rec for each time step Δt until it is finally maintained at zero.

According to the a1 scenario, as shown in FIG. 13(b), FF2x[k] is changed at time k=1 from FF2x[0] toward zero by a predetermined amount ΔFF2x_rec (however, if FF2x[0]=0, then FF2x[k]=0), and after time k=2, it is changed by a predetermined amount ΔFF2x_emg_a for each time step Δt until the upper limit value FF2xmax {the lower limit value FF2xmin} is reached. Then, after the upper limit value FF2xmax {the lower limit value FF2xmin} is reached, FF2x[k] is maintained at the upper limit value {the lower limit value}. Thus, the a1 scenario (more generally, a scenario type whose integer value indicating the type of scenario type SC is "1") is a scenario type which brings a predetermined component FF2x[k] of FF2[k] close to zero from FF2x[0] (in a case where FF2x[0]≠0) or maintains FF2x[k] at FF2x[0] (in a case where FF2x[0]=0) only when time k=1, and thereafter, changes FF2x[k] such that FF2x[k] changes (monotonously changes) to the upper limit value FF2xmax {the lower limit value FF2xmin}.

According to the a2 scenario, as shown in FIG. 13(c), FF2x[k] is maintained at the same value as FF2x[0] at time k=1, and after time k=2, it is changed by a predetermined amount ΔFF2x_emg_a for each time step Δt until the upper limit value FF2xmax {the lower limit value FF2xmin} is reached. Then, after the upper limit value FF2xmax {the lower limit value FF2xmin} is reached, FF2[k] is maintained at the upper limit value {the lower limit value}. Thus, the a2 scenario (more generally, a scenario type whose integer value indicating the type of scenario type SC is "2") is a scenario type which maintains FF2x[k] to be the same as FF2x[0] only when time k=1, and thereafter, changes FF2x[k] such that FF2x[k] changes (monotonously changes) to the upper limit value FF2xmax {the lower limit value FF2xmin}.

According to the a3 scenario, as shown in FIG. 13(d), FF2x[k] is changed from time k=1 by a predetermined amount ΔFF2x_emg_a for each time step Δt until the upper limit value FF2xmax {the lower limit value FF2xmin} is reached. Then, after the upper limit value FF2xmax {the lower limit value FF2xmin} is reached, FF2x[k] is maintained at the upper limit value {the lower limit value}. Thus, the a3 scenario (more generally, a scenario type whose integer value indicating the type of scenario type SC is "3") is a scenario type which changes FF2x[k] from time k=1 such that FF2x[k] changes (monotonously changes) to the upper limit value FF2xmax {the lower limit value FF2xmin}.

Returning to the explanation of FIG. 9, after the processing of S218, the procedure proceeds to S220 wherein a first feedforward amount FF1[k] is determined by the normal feedforward law 35a on the basis of a future drive manipulation input op[k] and a scenario motion state amount [k−1] of the vehicle model 41, and the feedback amount FB[k] is determined by the feedback law 35b on the basis of a difference between the scenario motion state amount [k−1] and a scenario reference state amount [k].

In this case, each component (a reference value of a desired driving/braking force, etc.) of the first feedforward amount FF1[k] is determined according to a predetermined map or an arithmetic expression from a drive manipulation input (an accelerator (gas) pedal manipulated variable, etc.) associated with the component in the future drive manipulation input op[k] and a state amount (a vehicle speed, etc.) associated with the component in the scenario motion state amount [k−1]. When determining FF1[k], scenario types SC may be taken into account. For example, maps or arithmetic expressions prepared for scenario types SC in advance may be used to determine FF1[k], as appropriate.

Further, the feedback amount FB[k] is determined by the feedback law from a difference between a position of the vehicle 1 in the scenario motion state amount [k−1] (hereinafter referred to as "a scenario vehicle position" in some cases) and a scenario reference course in the scenario reference state amount [k] (a distance between the scenario vehicle position [k−1] and a reference course: hereinafter referred to as "a course deviation" in some cases) and a difference between a yaw rate in the scenario motion state amount [k−1] and a scenario reference yaw rate in the scenario reference state amount [k] (hereinafter referred to as "a yaw rate error" in some cases).

For example, FB[k] is calculated according to expression 08 given below.

$$FB[k] = Kfby \cdot \text{Yaw rate error} + Kfbc \cdot \text{Course deviation} \quad \text{Expression 08}$$

Kfby and Kfbc in this expression 08 denote predetermined feedback gains. Incidentally, FB[k] may be determined by using a difference between a curvature [k−1] of a traveling route of the vehicle 1 on the scenario vehicle model 41, which is defined by a track of a scenario vehicle position up to time k−1, and a curvature [k] of a scenario reference course at time k, in place of the course deviation.

Further, expression 08' given below may be used in place of expression 08.

$FB[k]=Kfby$·Yaw rate error+$Kfbc$·Course deviation+
$Kfbc'$·Course deviation change rate     Expression 08'

Using this expression 08' makes it possible to further improve the performance for following a reference course.

Subsequently, the procedure proceeds to S222 wherein FF1[$k$], FF2[$k$], and FB[k] determined as described above are added by the aforesaid adding processor 35*d* to determine a scenario actuator operation desired provisional value [k].

Subsequently, the procedure proceeds to S224 wherein a scenario side slip angle [k] and a slip ratio [k] are calculated using the scenario vehicle model 41 on the basis of the future drive manipulation input op[k], the scenario actuator operation desired provisional value [k], a scenario vehicle state amount [k−1] (the scenario motion state amount [k−1], the scenario road surface reaction force [k−1], the scenario side slip angle [k−1], and the scenario slip ratio [k−1]), and the estimated friction coefficient μestm. The processing of S224 is the processing carried out by the side slip angle/slip ratio limiter 37, the scenario actuator drive controller model 39, and the scenario vehicle model 41.

Specifically, the side slip angle/slip ratio limiter 37 directly outputs the scenario actuator operation desired provisional value [k] to the scenario actuator drive controller model 39. At this time, the scenario actuator drive controller model 39 determines a scenario actuator manipulated variable [k] for each actuator device 3 such that each desired value of the scenario actuator operation desired provisional value [k] is satisfied, and inputs the determined scenario actuator manipulated variable [k] to the scenario vehicle model 41. Then, the scenario vehicle model 41 calculates the scenario side slip angle [k] and the scenario slip ratio [k] by carrying out arithmetic processing as described above on the basis of the input scenario actuator manipulated variable [k], the future drive manipulation input op[k], and the estimated friction coefficient μestm (the current time value) obtained by the μ estimator 18. These scenario side slip angle [k] and the scenario slip ratio [k], respectively, are obtained from a side slip angle calculator 62 and a slip calculator 64 in FIG. 5.

Subsequently, the procedure proceeds to S226 wherein it is determined whether the scenario side slip angle [k] and the scenario slip ratio [k], respectively, satisfy predetermined permissible ranges (whether they fall within permissible ranges). This determination processing of S226 and the processing of S228, S230, and S232, which will be discussed later, are processing performed by the side slip angle/slip ratio limiter 37.

Here, if both the scenario side slip angle [k] and the scenario slip ratio [k] satisfy the predetermined permissible ranges associated therewith, then it means that the aforesaid situation to be prevented, such as spinning or deviating from a course or the like of the vehicle 1, will not occur on the scenario vehicle model 41. Hence, in this case, the procedure proceeds to S232 wherein the scenario actuator operation desired provisional value [k] (determined in S222) is determined as the scenario actuator operation desired value [k].

On the other hand, if either one of the scenario side slip angle [k] and the scenario slip ratio [k] does not satisfy the permissible range thereof (if it deviates from the permissible range thereof), then there is a danger that the aforesaid situation to be prevented, such as spinning or deviating from a course or the like of the vehicle 1, will occur on the scenario vehicle model 41. In this case, therefore, the procedure proceeds to S228 to correct the second feedforward amount FF2[$k$] in a direction that cause both the scenario side slip angle [k] and the scenario slip ratio [k] to satisfy the permissible ranges associated therewith. For instance, in a situation wherein there is a danger that the vehicle 1 spins or deviates from a course on the scenario vehicle model 41, a component related to a desired braking force among the components of FF2[$k$] or a component related to a desired steering angle is corrected. More specifically, for instance, if the scenario slip ratio [k] deviates from the permissible range thereof, then the desired braking force among the components of FF2[$k$] is weakened from a provisional value by a predetermined amount or a predetermined percentage. Further, if, for example, the scenario side slip angle [k] deviates from the permissible range thereof, then the desired steering angle among the components of FF2[$k$] is changed from a provisional value in a direction for reducing the side slip angle by a predetermined amount or a predetermined percentage.

Subsequently, the procedure proceeds to S230 wherein FF2[$k$], which has been corrected, and FF1[$k$] and FB[k] determined in S220 are added so as to determine the scenario actuator operation desired value [k].

After the processing of S230 or S232, the procedure proceeds to S234 wherein the scenario vehicle state amounts [k] (the scenario side slip angle [k], the scenario slip ratio [k], the scenario road surface reaction force [k], and the scenario motion state amount [k]) are calculated using the scenario vehicle model 41 on the basis of the future drive manipulation input op[k], the scenario actuator operation desired value [k] determined in S230 or S232, the scenario vehicle state amounts [k−1] (the scenario motion state amount [k−1], the scenario road surface reaction force [k−1], the scenario side slip angle [k−1], and the scenario slip ratio [k31 1]), and the estimated friction coefficient μestm (current time value). The processing of S234 is the processing carried out by the scenario actuator drive controller model 39 and the scenario vehicle model 41.

Specifically, the scenario actuator drive controller model 39 determines a scenario actuator manipulated variable [k] for each actuator device 3 such that each desired value of the scenario actuator operation desired value [k] determined in S230 or S232 is satisfied, and supplies it to the scenario vehicle model 41. Then, the scenario vehicle model 41 carries out the arithmetic processing, as described above, on the basis of the scenario actuator manipulated variable [k], the future drive manipulation inputs op[k], and the estimated friction coefficient μestm (current time value) obtained by the estimator 18, which have been received, so as to calculate the scenario vehicle state amounts [k] (the scenario road surface reaction force [k], the scenario side slip angle [k], the scenario slip ratio [k], and the scenario motion state amount [k]).

Subsequently, the procedure proceeds to S236 wherein a road surface reaction force associated with a difference between the scenario actuator operation desired value [k] and the scenario actuator operation desired provisional value [k] (specifically, a component about the yaw axis in a moment about the center-of-gravity of the vehicle 1 attributable to a road surface reaction force associated with the difference) is multiplied by a predetermined coefficient Kmdl[k] to determine a scenario current state acceptance manipulated variable [k]. This processing is the processing carried out by the aforesaid current state acceptance manipulated variable determiner 43. This processing of S236 will be explained with reference to FIG. 14. FIG. 14 is a dataflow diagram showing the flow of the processing of S236.

In S236a, a scenario provisional road surface reaction force as a provisional value of a scenario road surface reaction force is calculated on the basis of the scenario actuator operation desired provisional value [k] (the one determined in S222 of FIG. 9), the future drive manipulation inputs op[k], the scenario vehicle state amount [k−1], and a preset ideal friction coefficient μideal. To be more specific, the same processing as that by the aforesaid scenario actuator drive controller model 39 is executed on the basis of the scenario actuator operation desired provisional value [k] and the scenario vehicle state amount [k−1] so as to determine an actuator manipulated variable for each actuator device 3. Then, computation by the scenario vehicle model 41 (specifically, computation by a tire friction model 50 and a suspension dynamic characteristics model 54 in FIG. 5) is performed on the basis of the actuator manipulated variable, the scenario vehicle state amount [k−1], and the ideal friction coefficient μideal, thereby determining the scenario provisional road surface reaction force [k]. In this case, the tire friction model 50 in FIG. 5 uses the ideal friction coefficient μideal in place of the estimated friction coefficient μestm. The ideal friction coefficient μideal is a set value of a friction coefficient of an ideal dry road surface. A variable value required to determine the scenario provisional road surface reaction force [k] may require some components of the future drive manipulation inputs op[k] in addition to the actuator manipulated variable, the scenario vehicle state amount [k−1], and the ideal friction coefficient μideal, depending on the constructions of the actuator devices 3. For example, if the steering device 3B is adapted to mechanically steer steering control wheels in response to an operation of the steering wheel (if not steering-by-wire), then a steering angle θs among the drive manipulation inputs op will be also necessary.

The scenario provisional road surface reaction force [k] thus determined means a road surface reaction force that occurs in a case where it is assumed that a motion of the vehicle 1 is performed without slippages of the wheels Wi when the actuator devices 3 are controlled on the basis of the scenario actuator operation desired provisional value [k].

Subsequently, in S236b, the resultant force of the scenario provisional road surface reaction forces [k] of the wheels Wi (more specifically, a component about the yaw axis of the moments generated about the center-of-gravity of the vehicle 1 by the scenario provisional road surface reaction forces of the wheels Wi. This will be hereinafter referred to as a scenario provisional resultant force) is calculated.

Further, in S236c, the scenario road surface reaction force [k] is determined by the same arithmetic processing as that in S236a on the basis of the scenario actuator operation desired value [k] (the one determined in S230 or S232 in FIG. 9), the future drive manipulation inputs op[k], the scenario vehicle state amounts [k−1], and the estimated friction coefficient μestm (current time value). Incidentally, the scenario road surface reaction force [k] determined in this S236c will be the same as the scenario road surface reaction force [k] in the scenario vehicle state amount [k] determined in the aforesaid S234, so that the processing of S236b may be omitted.

Then, in S236d, as in S236b, the resultant force of the scenario road surface reaction forces [k] of the wheels Wi (more specifically, the components about the yaw axis of the moments generated about the center-of-gravity of the vehicle 1 by the scenario road surface reaction forces [k] of the wheels Wi. This will be hereinafter referred to as a scenario resultant force) determined in S236c (or S234) is calculated.

Subsequently, in S236e, the aforesaid scenario provisional resultant force (the moment about the yaw axis) is subtracted from the aforesaid scenario resultant force (the moment about the yaw axis) (a difference between the two resultant forces is calculated). Then, the calculation result in this S236e (the scenario resultant force−the scenario provisional resultant force) is multiplied by a predetermined coefficient Kmdl[k] in S236f to calculate the scenario current state acceptance manipulated variable [k].

The above is the processing of S236 of FIG. 9. In this case, in the present embodiment, the scenario current state acceptance manipulated variable [1] at time k=1 is used as the current state acceptance manipulated variable in the computation by the reference dynamic characteristics model 12; therefore, the coefficient Kmdl[k] is desirably Kmdl[1]>0 (e.g., Kmdl[1]=1) at least when k=1. Further, if k≧2, then Kmdl[k]=Kmdl[1], for example; however, it does not have to be always Kmdl[k]>0, and Kmdl[k]=0 may alternatively be applied. In the present embodiment, Kmdl[1]=1, Kmdl[k]=0 (k=2, 3, . . . , Ke).

Returning to the explanation of FIG. 9, after the processing of S236 is carried out as described above, the procedure proceeds to S238 wherein the scenario reference state amount [k], the scenario vehicle behavior [k] (the scenario actuator operation desired value [k], the scenario side slip angle [k], the scenario slip ratio [k], the scenario road surface reaction force [k], and the scenario motion state amount [k]), and the scenario current state acceptance manipulated variable [k] are stored and retained in a memory, which is not shown.

Subsequently, the procedure proceeds to S240 wherein the value of time k is incremented by 1, then in S242, it is determined whether k>Ke. And, if the determination result is NO, then the processing from S216 is repeated, or if it is YES, then the processing of FIG. 9 is terminated.

Thus, the time series of the scenario vehicle behavior [k], the scenario reference state amount [k], and the scenario current state acceptance manipulated variable [k] from time k=1 to k=Ke is prepared. In this case, at each control processing cycle, the initial state (the scenario motion state amount at time k=0) of the scenario vehicle model 41 is set to agree with an actual state of the actual vehicle 1; therefore, the scenario vehicle behavior [k] (specifically, the scenario motion state amount [k]) that is prepared anew at each control processing cycle does not depend on a scenario vehicle behavior prepared at a past control processing cycle and it is prepared using the actual state of the actual vehicle 1 at time k=0 as the initial value, as shown in FIG. 15. This makes it possible to prepare a time series of a scenario vehicle behavior [k] based on the actual state of the actual vehicle 1, i.e., a time series of a highly accurate scenario vehicle behavior [k] that indicates a future behavior of the actual vehicle 1.

Further, in S216, when time k=1, the scenario reference state amount [1] is set to agree with a reference state amount calculated by the reference dynamic characteristics model 12, considering a current state acceptance manipulated variable (a last time value), thus making it possible to prevent the scenario reference state amount from significantly deviating from a state amount of the actual vehicle 1. As a result, it is possible to prevent the feedback amount FB in a scenario actuator operation desired value from becoming excessive, which eventually causes the scenario actuator operation desired value (or a scenario actuator operation desired provisional value) from taking an excessive value that leaves no allowance for adjustment.

In S226, it has been determined whether the scenario side slip angle [k] and the scenario slip ratio [k], respectively, satisfy predetermined permissible ranges; alternatively, however, a scenario road surface reaction force [k] may be determined in S224 and then whether the scenario road surface reaction force [k] satisfies the predetermined permissible range may be determined in S226.

Further, in S216, the scenario reference state amount [k] may be calculated with the scenario current state acceptance manipulated variable being always set at zero.

The above has described the processing of S116 of FIG. 8 in detail.

Supplementally, the processing of S116 explained above corresponds to the first future vehicle behavior determining means in the present invention, as described above. In this case, a rule that depends on SC=Resetting scenario (a rule for determining a scenario vehicle behavior) corresponds to the first control law in the present invention. The aforesaid repetitive processing of S218 to S222 carried out in the processing of S116 corresponds to the processing for determining each provisional value of the time series of an operation command in a future vehicle behavior (a first future vehicle behavior) according to the 1a-th rule in the present invention. The aforesaid repetitive processing of S228 carried out in the processing of S116 corresponds to the processing for correcting a provisional value of an operation command according to the 1b-th rule in the present invention. A first feedforward amount FF1[k] determined by the repetitive processing of S220 carried out in the processing of S116 (the repetition of the processing according to the normal feedforward law 35a) corresponds to a basic value of an operation command or a basic feedforward component in the present invention. A second feedforward amount FF2[k] determined by the repetitive processing of S220 in the processing of S116 (the repetition of the processing by the reservation type feedforward amount determiner 35c) corresponds to a first auxiliary feedforward component in the present invention. The processing of S220 in the processing of S116 determines both FF1 and FF2, so that it may be said to be the processing for determining a first feedforward component formed of FF1 and FF2 according to a first feedforward control law (a control law constituted of the control law of the normal feedforward law 35a and the control law of the reservation type feedforward amount determiner 35c) in the present invention.

The scenario side slip angle and the scenario slip ratio (or the scenario road surface reaction force) determined by the processing of S224 correspond to the objects to be restricted in the present invention. The difference between a scenario resultant force and a scenario provisional resultant force determined in S236e of FIG. 14 in the aforesaid processing of S236 corresponds to the error for determining a virtual external force in the present invention. These objects to be restricted and the error for determining a virtual external force will apply to the processing of S126, S132, and S138, which will be discussed later.

To determine the first feedforward amount FF1[k] in S220, a future drive manipulation input op[k−1] at time k−1 may be used in place of a future drive manipulation input op[k] at time k. The same will apply to the processing of S126, S132, and S138, which will be discussed later.

Returning to the explanation of FIG. 8, after the processing of S116 is executed, the procedure proceeds to S118 wherein it is determined whether the time series of the predetermined components of the scenario vehicle behavior created by the processing of S116 satisfies a predetermined permissible range. To be specific, it is determined whether the scenario side slip angle and the scenario slip ratio, respectively, in the scenario vehicle behavior satisfy their permissible ranges at each time k (k=1, 2, . . . , Ke). Alternatively, it is determined whether the scenario motion state amounts (the scenario yaw rate and the scenario vehicle position) of the scenario vehicle behavior satisfy predetermined permissible ranges set on the basis of scenario reference state amounts at each time k (or whether the differences (the aforesaid yaw rate error and the deviation from a course) between the scenario motion state amounts and the scenario reference state amounts satisfy predetermined permissible ranges). The permissible range for the scenario vehicle position (deviation from a course) is set as a spatial range centering around the scenario reference course on the basis of a scenario reference course, as illustrated in, for example, FIG. 16. The permissible range for the scenario yaw rate is set on the basis of the scenario reference yaw rate as a predetermined width range centering around the scenario reference yaw rate at, for example, each time k.

Here, a situation wherein the scenario side slip angle or the scenario slip ratio deviate from the predetermined permissible ranges or the differences between the scenario motion state amounts and the scenario reference state amounts deviate from the predetermined permissible ranges means a situation wherein there is a danger that the aforesaid situations to be prevented (e.g., deviation from a course and spin) occur. Incidentally, it may alternatively be determined whether the scenario road surface reaction force satisfies a predetermined permissible range in place of determining whether the scenario side slip angle and the scenario slip ratio, respectively, satisfy their predetermined permissible ranges.

Supplementally, the determination processing of S118 and the determination processing of S128, S134, and S140, which will be described later, correspond to the evaluating means in the present invention. As described above, the present embodiment uses a scenario side slip angle and a scenario slip ratio (or the scenario road surface reaction force), or a scenario vehicle position or the scenario yaw rate as the objects to be evaluated. In S118, the processing for setting the permissible range of the scenario motion state amount on the basis of the scenario reference state amount, as described above, corresponds to the permissible range setting means in the present invention. The permissible range may be set during the processing of S116.

If a determination result in S118 is affirmative (if the time series of the predetermined components of the scenario vehicle behavior satisfies the predetermined permissible range), then the procedure proceeds to S120 wherein the scenario actuator operation desired value [1] at time k=1 is output as the current time value of the actuator operation desired value to the actual actuator drive controller 16.

Supplementally, the affirmative determination result of S118 means that an object to be evaluated of a first future vehicle behavior (a future vehicle behavior determined by the first future vehicle behavior determining means) in the present invention satisfies a predetermined restrictive condition (a condition that the object to be evaluated satisfies a permissible range).

Subsequently, the procedure proceeds to S122 wherein the scenario current state acceptance manipulated variable [1] at time k=1 is output as the current time value of the current state acceptance manipulated variable to the reference dynamic characteristics model 12. The current time value of the current state acceptance manipulated variable is used for the processing in the reference dynamic characteristics model 12 at the next time control processing cycle.

On the other hand, if the determination result of S118 is negative, then the processing for each type of situations to be prevented that may occur is carried out. In other words, a set of scenario type (e.g., the set of (a1, a2, and a3), the set of (b1, b2, and b3)) is selected on the basis of the situation of deviation of an object to be evaluated, which is determined in S118 whether it satisfies a permissible range, from the permissible range, then the processing associated with the selected set is carried out. The processing of selection here corresponds to the control law selecting means in the present invention.

Here, a case where, for instance, a situation to be prevented which may occur is deviation of the vehicle 1 from a course to the left (a case where the set of (a1, a2, and a3) is selected), will be taken as an example and representatively explained.

In this case, first, in S124, the scenario type SC is set to the a1 scenario. This means to determine the time series of a scenario vehicle behavior according to the control law of the a1 scenario.

Subsequently, the procedure proceeds to S126 wherein the time series of a scenario vehicle behavior is created by the same processing as that of S116 described above. In this case, SC=a1, so that the second feedforward amount FF2[$k$] will be determined by the processing of S314 to S322 of FIG. 10 in the subroutine processing of S218 of FIG. 9. Hence, the correction amount of, for example, a desired braking force (or braking pressure) among the components of FF2[$k$], is set according to the changing pattern shown in FIG. 13($b$). However, the temporal change rate of FF2[$k$] differs between the braking force of the left wheels W1 and W3 of the vehicle 1 and the braking force of the right wheels W2 and W4, and the correction amounts of the desired braking forces of the wheels Wi of FF2[$k$] are determined so as to prevent the vehicle 1 from deviating from a course to the left.

At this time, FF2[$k$] is determined in a pattern that is different from the one in S116; therefore, a scenario vehicle behavior having the time series of an actuator operation desired value of a pattern that is different from the time series of an actuator operation desired value of the scenario vehicle behavior determined in S116 will be determined in S126.

Supplementally, the processing of S126 corresponds to the second future vehicle behavior determining means in the present invention. Hence, the scenario vehicle behavior determined by the processing of S126 corresponds to the second future vehicle behavior in the present invention. In this case, a rule (a rule for determining a scenario vehicle behavior) that depends on SC=a1 (or b1, c1 or the like) corresponds to the second control law in the present invention. The aforesaid repetitive processing of S218 to S222 carried out in the processing of S126 corresponds to the processing for determining each provisional value of the time series of an operation command in a second future vehicle behavior according to the 2a-th rule in the present invention. The aforesaid repetitive processing of S228 carried out in the processing of S126 corresponds to the processing for correcting a provisional value of an operation command according to the 2b-th rule in the present invention. A first feedforward amount FF1[$k$] determined by the repetitive processing of S220 carried out in the processing of S126 corresponds to a basic value of an operation command or a basic feedforward component in the present invention. A second feedforward amount FF2[$k$] determined by the repetitive processing of S218 in the processing of S126 corresponds to a second auxiliary feedforward component in the present invention. The processing of S218 in combination with S220 in the processing of S126 determines both FF1 and FF2, so that it may be said to be the processing for determining a second feedforward component formed of FF1 and FF2 according to a second feedforward control law in the present invention.

Subsequently, the procedure proceeds to S128 wherein the same determination processing as that in S118 described above is carried out. At this time, if a determination result in S128 is affirmative (if the time series of the predetermined components of the scenario vehicle behavior created in S126 satisfies the predetermined permissible range), then the processing of S120 and S122 described above is carried out to determine and output the current time value of an actuator operation desired value and the current time value of a current state acceptance manipulated variable. The permissible range in the determination processing of S128 may be different from the permissible range in the determination processing of S118.

If the determination result of S128 is negative, then the procedure proceeds to S130 wherein the scenario type SC is set to the a2 scenario. This means to determine the time series of a scenario vehicle behavior according to the control law of the a2 scenario. Subsequently, the procedure proceeds to S132 wherein the time series of a scenario vehicle behavior is created by the same processing as that of S116 described above. In this case, SC=a2, so that the second feedforward amount FF2[$k$] will be determined by the processing of S324 to S332 of FIG. 10 in the subroutine processing of S218 of FIG. 9. Hence, the correction amount of, for example, a desired braking force among the components of FF2[$k$], is set according to the changing pattern shown in FIG. 13($c$). However, the temporal change rate of FF2[$k$] differs between the braking force of the left wheels W1 and W3 of the vehicle 1 and the braking force of the right wheels W2 and W4, and the correction amounts of the desired braking forces of the wheels Wi of FF2[$k$] are determined so as to prevent the vehicle 1 from deviating from a course to the left.

At this time, FF2[$k$] is determined in a pattern that is different from the ones in S116 and S126; therefore, a scenario vehicle behavior having the time series of an actuator operation desired value of a pattern that is different from the time series of the actuator operation desired values of the scenario vehicle behaviors determined in S116 and S126, respectively, will be determined in S132.

Supplementally, the processing of S132 corresponds to the third future vehicle behavior determining means in the present invention. Hence, the scenario vehicle behavior determined by the processing of S132 corresponds to the third future vehicle behavior (the m-th future vehicle behavior when m=3) in the present invention. In this case, a rule (a rule for determining a scenario vehicle behavior) that depends on SC=a2 (or b2, c2 or the like) corresponds to the third control law in the present invention. The aforesaid repetitive processing of S218 to S222 carried out in the processing of S132 corresponds to the processing for determining each provisional value of the time series of an operation command in a third future vehicle behavior according to the 3a-th rule in the present invention. The aforesaid repetitive processing of S228 carried out in the processing of S132 corresponds to the processing for correcting a provisional value of an operation command according to the 3b-th rule in the present invention. A first feedforward amount FF1[$k$] determined by the repetitive processing of S220 carried out in the processing of S132 corresponds to a basic value of an operation command or a basic feedforward component in the present invention. A second feedforward amount FF2[$k$] determined by the repetitive processing of S218 in the processing of S132 corresponds to a third auxiliary feedforward component in the present invention. The processing of S218 in combination with S220 in the processing of S132 determines both FF1 and FF2, so that it may be said to be the processing for determining a third feedforward component formed of FF1 and FF2 according to a third feedforward control law in the present invention.

Subsequently, the procedure proceeds to S134 wherein the same determination processing as that in S118 described above is carried out. At this time, if a determination result in S134 is affirmative (if the time series of the predetermined components of the scenario vehicle behavior created in S132 satisfies the predetermined permissible range), then the processing of S120 and S122 described above is carried out to determine and output the current time value of an actuator operation desired value and the current time value of a current state acceptance manipulated variable. The permissible range in the determination processing of S134 may be different from the permissible range in the determination processing of S118 or the determination processing of S128.

If the determination result of S134 is negative (if there is a danger that the vehicle 1 may deviate from the track to the left), then the procedure proceeds to S136 wherein the scenario type SC is set to the a3 scenario. This means to determine the time series of a scenario vehicle behavior according to the control law of the a3 scenario. Subsequently, the procedure proceeds to S138 wherein the time series of a scenario vehicle behavior is created by the same processing as that of S116 described above. In this case, SC=a3, so that the second feedforward amount FF2[k] will be determined by the processing of S334 to S338 of FIG. 10 in the subroutine processing of S218 of FIG. 9. Hence, the correction amount of, for example, a desired braking force among the components of FF2[k], is set according to the changing pattern shown in FIG. 13(d). However, the temporal change rate of FF2[k] differs between the braking force of the left wheels W1 and W3 of the vehicle 1 and the braking force of the right wheels W2 and W4, and the correction amounts of the desired braking forces of the wheels Wi of FF2[k] are determined so as to prevent the vehicle 1 from deviating from the track to the left.

At this time, FF2[k] is determined in a pattern that is different from the ones in S116, S126, and S132; therefore, a scenario vehicle behavior having the time series of an actuator operation desired value of a pattern that is different from the time series of the actuator operation desired values of the scenario vehicle behaviors determined in S116, S126, and S132, respectively, will be determined in S138.

Supplementally, the processing of S138 corresponds to the fourth future vehicle behavior determining means in the present invention. Hence, the scenario vehicle behavior determined by the processing of S138 corresponds to the fourth future vehicle behavior (the m-th future vehicle behavior when m=4) in the present invention. In this case, a rule (a rule for determining a scenario vehicle behavior) that depends on SC=a3 (or b3, c3 or the like) corresponds to the fourth control law in the present invention. The aforesaid repetitive processing of S218 to S222 carried out in the processing of S138 corresponds to the processing for determining each provisional value of the time series of an operation command in a fourth future vehicle behavior according to the 4a-th rule in the present invention. The aforesaid repetitive processing of S228 carried out in the processing of S138 corresponds to the processing for correcting a provisional value of an operation command according to the 4b-th rule in the present invention. A first feedforward amount FF1[k] determined by the repetitive processing of S220 carried out in the processing of S138 corresponds to a basic value of an operation command or a basic feedforward component in the present invention. A second feedforward amount FF2[k] determined by the repetitive processing of S218 in the processing of S138 corresponds to a fourth auxiliary feedforward component in the present invention. The processing of S218 in combination with S220 in the processing of S138 determines both FF1 and FF2, so that it may be said to be the processing for determining a fourth feedforward component formed of FF1 and FF2 according to a fourth feedforward control law in the present invention.

Subsequently, the procedure proceeds to S140 wherein the same determination processing as that in S118 described above is carried out. At this time, if a determination result in S140 is affirmative (if the time series of the predetermined components of the scenario vehicle behavior created in S138 satisfies the predetermined permissible range), then the processing of S120 and S122 described above is carried out to determine and output the current time value of an actuator operation desired value and the current time value of a current state acceptance manipulated variable. The permissible range in the determination processing of S140 may be different from the permissible range in the determination processing of S118, the determination processing of S128, or the determination processing of S134.

If the determination result in S140 is negative, that is, if there is a danger that the vehicle 1 will deviate from a course to the left in any one of the scenarios a1 to a3, then the procedure proceeds to S142 wherein an actuator operation desired value (current time value) is determined by an emergency stop control law. To be specific, the time series of a scenario vehicle behavior is prepared by the same processing as that shown in FIG. 9, and the scenario actuator operation desired value [1] is determined as the actuator operation desired value at time k=1 of the prepared time series of the scenario vehicle behavior. In this case, however, in S218 of FIG. 9, the second feedforward amount FF2[k] is determined such that the desired braking forces of all wheels W1 to W4 are increased to upper limit values (maximum braking forces on an ideal dry road surface) at a predetermined change rate. In the determination processing of S226, the permissible range of the scenario side slip angle is set to a wider range than in a case where the scenario type SC is the resetting scenario, the a1 scenario, the a2 scenario, or the a3 scenario, and the permissible range of the scenario slip ratio is set to a wider range than in a case where the scenario type SC is the resetting scenario, the a1 scenario, the a2 scenario, or the a3 scenario. The permissible ranges of the scenario side slip angle and the scenario slip ratio are set as described above in order to preferentially secure a braking force of the vehicle 1 than to prevent side slips of the wheels Wi.

In S142, only the actuator operation desired value at the current time may be determined to take an actuator operation desired value that is different from the actuator operation desired value at the current time of a scenario vehicle behavior in each scenario type of the resetting scenario, the a1 scenario, the a2 scenario, and the a3 scenario.

Subsequently, the procedure proceeds to S144 wherein the current state acceptance manipulated variable (current time value) is set to zero. Thus, in the situation wherein the current time value of the actuator operation desired value is determined by the emergency stop control law, the current time value of the current state acceptance manipulated variable is set to zero so as to abort bringing a reference state amount close to a state amount of the actual vehicle 1.

When the determination result of S118 indicates the danger that a situation to be prevented (e.g., spinning of the vehicle 1) other than the vehicle 1 deviating from a course to the left will take place, the actuator operation desired value (current time value) and the current state acceptance manipulated variable (current time value) are also determined in the same manner as described above for each type of situations to be prevented.

The above has described in detail the processing by the scenario preparer 14 in the first embodiment.

The scenario preparer 14 outputs the determination results of S118, S128, S134, and S140 in FIG. 8 to the aforesaid sensory feedback law 22. Then, based on the determination results, the sensory feedback law 22 notifies the driver of the situation of the vehicle 1 by means of a visual or an auditory indicating means or the like, as appropriate. For example, in a situation wherein a situation to be prevented may take place, the driver is notified of the type of situation to be prevented, which may take place, by an appropriate indicating means.

Supplementally, in the present embodiment, if the determination result (evaluation result) of S118 is negative, it may be said in other words that a scenario actuator operation desired value [1] obtained by correcting the scenario actuator operation desired value [1] at the current time (k=1) of the scenario vehicle behavior in the resetting scenario according to the a1 scenario, the a2 scenario, the a3 scenario, and a correction rule, including the emergency stop control law, is determined as the current time value of an actual actuator operation desired value.

In the present embodiment, three different scenario types SC have been set for each situation to be prevented; however, for example, the a2 scenario (more generally, the scenario type whose numeric value portion is "2") may be omitted. In this case, the processing of S130 to S134 in FIG. 8 may be omitted.

Further, the resetting scenario may be omitted, and only the a1 scenario (or a scenario type of the same type as this (whose numeric portion is "1")) and the a3 scenario (or a scenario type of the same type as this (whose numeric portion is "3")) may be used. More specifically, the a1 scenario is a pattern that brings the second feedforward amount FF2[$k$] close to zero or maintains it at zero at time k=1, so that setting the a1 scenario in a situation wherein there is no danger of the occurrence of a situation to be prevented makes it possible to bring FF2[1] of an actuator operation desired value [1] to be output to the actuator drive controller 16 at each control processing cycle close to zero or to maintain the FF2[1] at zero. If only the a1 scenario (or a scenario type of the same type as this) and the a3 scenario (or a scenario type of the same type as this) are used, then, for example, SC=a1 is set in S114 of FIG. 8, and the time series of a scenario vehicle behavior is prepared in S116. And, the processing of S124 to S134 for each situation to be prevented in a case where the determination result of S118 is negative may be omitted. In such a case, the scenario vehicle behavior first created using the a1 scenario corresponds to a first future vehicle behavior in the present invention. Further, if the time series of the scenario vehicle behavior prepared using the a1 scenario does not satisfy a permissible range in the aforesaid determination processing of S118, then a scenario vehicle behavior prepared using the a3 scenario (or a scenario type of the same type as this) corresponds to a second future vehicle behavior in the present invention.

Further alternatively, in a case where the emergency stop control law is omitted and the determination processing of S134 is negative, a scenario actuator operation desired value at the current time (k=1) of the scenario vehicle behavior prepared using the a3 scenario (the scenario vehicle behavior prepared in S138) may be determined as the current time value of an actual actuator operation desired value. And, in this case also, the resetting scenario may be omitted, as described above, and the time series of a scenario vehicle behavior corresponding to the first future vehicle behavior (a future vehicle behavior determined by the first future vehicle behavior determining means) may be determined using the a1 scenario. Further, if the time series of a scenario vehicle behavior by the a1 scenario does not satisfy the permissible range in the same determination processing as that in S118 described above, then the scenario actuator operation desired value at the current time of the scenario vehicle behavior by the a3 scenario (or a scenario type of the same type as this) is determined as the current time value of an actual actuator operation desired value. In such a case, the scenario actuator operation desired value (the actual actuator operation desired value) at the current time of the scenario vehicle behavior by the a3 scenario may be said to be the one obtained by correcting the scenario actuator operation desired value at the current time of the scenario vehicle behavior by the a1 scenario such that the difference from the first feedforward amount FF1[1] as the basic value of the actuator operation desired value is farther away from zero than the difference between the scenario actuator operation desired value at the current time of the scenario vehicle behavior by the a1 scenario and FF[1].

SECOND EMBODIMENT

A second embodiment of the present invention will now be explained with reference to FIG. 17 to FIG. 23. The present embodiment differs from the first embodiment only partly in the processing by a scenario preparer; therefore, the same components or the same functions as those of the first embodiment will be assigned the same reference numerals and drawings as those of the first embodiment, and the explanation thereof will be omitted.

In the first embodiment, if there is a danger that a situation to be prevented will take place in a scenario vehicle behavior, then a second feedforward amount FF2 is manipulated according to the type of the situation to be prevented (according to the scenario type SC) to adjust an actuator operation desired value so as to prevent the occurrence of the situation to be prevented. In contrast thereto, according to the second embodiment, to schematically explain, a scenario reference state amount to be input to the feedback law 35$b$ and the aforesaid feedback gains Kfby and Kfbc (refer to the aforesaid expression 08) of the feedback law 35$b$ in addition to the second feedforward amount FF2 are manipulated to adjust a feedback amount FB thereby to adjust the actuator operation desired value so as to prevent the occurrence of a situation to be prevented.

FIG. 17 is a block diagram showing the processing function of a scenario preparer 14 of the present embodiment. As shown in the figure, a scenario actuator operation desired provisional value determiner 35 is equipped with, in addition to the functional components of the scenario preparer of the aforesaid first embodiment, a reference correction amount determiner 35$e$ which determines a reference correction amount for correcting a scenario reference state amount, an FB gain determiner 35$f$ which determines feedback gains Kfby and Kfbc of a feedback law 35$b$, and an adding processor 35$g$ which adds a reference correction amount to a scenario reference state amount to correct the scenario reference state amount. Further, an output (a corrected scenario reference state amount) of the adding processor 35$g$ is input to the feedback control law 35$b$, and a scenario type SC is input to the reference correction amount determiner 35$e$ and the FB gain determiner 35$f$. The processing function of the scenario preparer 14 other than this is the same as that of the first embodiment.

The FB gain determiner 35$e$ changes the feedback gains Kfby[$k$] and Kfbc[$k$] at each time k in a predetermined pattern based on a scenario type SC. To be more specific, first, Kfby[1]$n$−1 and Kfbc[1]$n$−1 used when determining a feedback amount FB[1]$n$−1 of an actuator operation desired value[1] $n$−1 at time k=1 finally determined at the last time control processing cycle are respectively set to an initial value Kfby [0]$n$ of Kfby and an initial value Kfbc[0]$n$ of Kfbc at time k=0 in the current time control processing cycle. Then, if the scenario type SC is a resetting scenario, Kfby[$k$] (k=1, 2, . . . , Ke) at the current time control processing cycle is gradually (at a predetermined temporal change rate) brought close to a predetermined reference value (standard value) from Kfby[0] and finally maintained at the reference value. In this case, if Kfby[0] is already the reference value, then Kfby[k] (k=1, 2, . . . , Ke) is maintained at the reference value. Similarly, the feedback gain Kfbc[k] is gradually brought close to a predetermined reference value (standard value) or maintained at the reference value. Incidentally, the reference value generally differs between Kfby and Kfbc.

If the scenario type SC is a scenario other than the resetting scenario, then the feedback gains Kfby[k] and Kfbc[k] are changed from Kfby[0] and Kfbc[0], respectively, in a pattern based on a situation to be prevented, which may take place. Examples of the changing patterns are shown in FIG. 18 to FIG. 21.

FIGS. 18(*a*) to (*c*) respectively illustrate the changing patterns of the feedback gain Kfby when the scenario types SC are an a1 scenario, an a2 scenario, and an a3 scenario in a case where a situation to be prevented is a deviation from a course. FIGS. 19(*a*) to (*c*) respectively illustrate the changing patterns of the feedback gain Kfbc when the scenario types SC are the a1 scenario, the a2 scenario, and the a3 scenario in a case where a situation to be prevented is the deviation from a course. FIGS. 20(*a*) to (*c*) respectively illustrate the changing patterns of the feedback gain Kfby when the scenario types SC are a b1 scenario, a b2 scenario, and a b3 scenario in a case where a situation to be prevented is spinning of a vehicle 1. FIGS. 21(*a*) to (*c*) respectively illustrate the changing patterns of the feedback gain Kfbc when the scenario types SC are the b1 scenario, the b2 scenario, and the b3 scenario in a case where a situation to be prevented is spinning of the vehicle 1.

In a case where a situation to be prevented is the deviation from a course, if the scenario SC is the a1 scenario, then the feedback gain Kfby[k] (k=1, 2, . . . , Ke) related to a yaw rate is determined in a pattern in which the feedback gain Kfby[k] is brought close to a predetermined standard value Kfby_s from Kfby[0] (=Kfby[1]$n$−1) at time k=1, and after time k=2, it is gradually (at a predetermined temporal change rate) moved away from the standard value to a predetermined lower limit value Kfby_a from Kfby[1], as shown in FIG. 18(*a*). After reaching the lower limit value Kfby_a, Kfby[k] is maintained at the lower limit value Kfby_a. If Kfby[0]=Kfby_s, then Kfby[1] is maintained at Kfby_s.

At the same time, as shown in FIG. 19(*a*), the feedback gain Kfbc[k] (k=1, 2, . . . , Ke) related to a traveling course is determined in a pattern in which the feedback gain Kfbc[k] is brought close to a predetermined standard value Kfbc_s by a predetermined amount from Kfbc[0] (=Kfbc[1]$n$−1) at time k=1, and after time k=2, it is gradually (at a predetermined temporal change rate) moved away from the standard value to a predetermined upper limit value Kfbc_a from Kfbc[1]. After reaching the upper limit value Kfbc_a, Kfbc[k] is maintained at the upper limit value Kfbc_a. If Kfbc[0]=Kfbc_s, then Kfcy[1] is maintained at Kfbc_s.

In a case where a situation to be prevented is the deviation from a course, if the scenario type SC is an a2 scenario, then the feedback gain Kfby[k] (k=1, 2, . . . , Ke) related to a yaw rate is determined in a pattern in which the feedback gain Kfby[k] is maintained at the same value as Kfby[0] (=Kfby[1]$n$−1) at time k=1, and after time k=2, it is gradually (at a predetermined temporal change rate) moved away from the aforesaid standard value Kfby_s to the aforesaid lower limit value Kfby_a (a lower limit value in this case) from Kfby[1] (=Kfby[0]), as shown in FIG. 18(*b*). After reaching the lower limit value Kfby_a, Kfby[k] is maintained at the lower limit value Kfby_a. If Kfby[0]=Kfby_a, then Kfby[k] is maintained at Kfby_a from time k=1.

At the same time, as shown in FIG. 19(*b*), the feedback gain Kfbc[k] (k=1, 2, . . . , Ke) related to a traveling course is determined in a pattern in which the feedback gain Kfbc[k] is maintained at the same value as Kfbc[0] (=Kfbc[1]$n$−1) at time k=1, and after time k=2, it is gradually (at a predetermined temporal change rate) moved away from the standard value Kfbc_s to the aforesaid upper limit value Kfbc_a from Kfbc[1] (=Kfbc[0]). After reaching the upper limit value Kfbc_a, Kfbc[k] is maintained at the upper limit value Kfbc_a. If Kfbc[0]=Kfbc_a, then Kfbc[k] is maintained at Kfbc_a from time k=1.

In a case where a situation to be prevented is the deviation from a course, if the scenario type SC is an a3 scenario, then the feedback gain Kfby[k] (k=1, 2, . . . , Ke) related to a yaw rate is determined in a pattern in which the feedback gain Kfby[k] is gradually (at a predetermined temporal change rate) moved away from the aforesaid standard value Kfby_s to the aforesaid lower limit value Kfby_a from Kfby[0] (=Kfby[1]$n$−1), as shown in FIG. 18(*c*). After reaching the lower limit value Kfby_a, Kfby[k] is maintained at the lower limit value Kfby_a. If Kfby[0]=Kfby_a, then Kfby[k] is maintained at Kfby_a from time k=1.

At the same time, as shown in FIG. 19(*c*), the feedback gain Kfbc[k] (k=1, 2, . . . , Ke) related to a traveling course is determined in a pattern in which the feedback gain Kfbc[k] is gradually (at a predetermined temporal change rate) moved away from the aforesaid standard value Kfbc_s to the aforesaid upper limit value Kfbc_a from Kfbc[0] (=Kfbc[1]$n$−1). After reaching the upper limit value Kfbc_a, Kfbc[k] is maintained at the upper limit value Kfbc_a. If Kfbc[0]=Kfbc_a, then Kfbc[k] is maintained at Kfbc_a from time k=1.

In a case where a situation to be prevented is spinning, if the scenario type SC is the b1 scenario, then the feedback gain Kfby[k] (k=1, 2, . . . , Ke) related to a yaw rate is determined in a pattern in which the feedback gain Kfby[k] is brought close to the aforesaid standard value Kfby_s by a predetermined amount from Kfby[0] (=Kfby[1]$n$−1) at time k=1, and after time k=2, it is gradually (at a predetermined temporal change rate) moved away from the standard value Kfby_s to a predetermined upper limit value Kfby_b from Kfby[1], as shown in FIG. 20(*a*). After reaching the upper limit value Kfby_b, Kfby[k] is maintained at the upper limit value Kfby_b. If Kfby[0]=Kfby_s, then Kfby[1] is maintained at Kfby_s.

At the same time, as shown in FIG. 21(*a*), the feedback gain Kfbc[k] (k=1, 2, . . . , Ke) related to a traveling course is determined in a pattern in which the feedback gain Kfbc[k] is brought close to the aforesaid standard value Kfbc_s by a predetermined amount from Kfbc[0] (=Kfbc[1]$n$−1) at time k=1, and after time k=2, it is gradually (at a predetermined temporal change rate) moved away from the standard value Kfbc_s to a predetermined lower limit value Kfbc_b from Kfbc[1]. After reaching the lower limit value Kfbc_b, Kfbc[k] is maintained at the lower limit value Kfbc_b. If Kfbc[0]=Kfbc_s, then Kfbc[1] is maintained at Kfbc_s.

In a case where a situation to be prevented is spinning, if the scenario type SC is a b2 scenario, then the feedback gain Kfby[k] (k=1, 2, . . . , Ke) related to a yaw rate is determined in a pattern in which the feedback gain Kfby[k] is maintained at the same value as Kfby[0] (=Kfby[1]$n$−1) at time k=1, and after time k=2, it is gradually (at a predetermined temporal change rate) moved away from the standard value Kfby_s to the upper limit value Kfby_b from Kfby[1] (=Kfby[0]), as shown in FIG. 20(*b*). After reaching the upper limit value Kfby_b, Kfby[k] is maintained at the upper limit value Kfby_b. If Kfby[0]=Kfby_b, then Kfby[k] is maintained at Kfby_b from time k=1.

At the same time, as shown in FIG. 21(b), the feedback gain Kfbc[k] (k=1, 2, . . . , Ke) related to a traveling course is determined in a pattern in which the feedback gain Kfbc[k] is maintained at the same value as Kfbc[0] (=Kfbc[1]n−1) at time k=1, and after time k=2, it is gradually (at a predetermined temporal change rate) moved away from the standard value Kfbc_s to the predetermined lower limit value Kfbc_b from Kfbc[1] (=Kfbc[0]). After reaching the lower limit value Kfbc_b, Kfbc[k] is maintained at the lower limit value Kfbc_b. If Kfbc[0]=Kfbc_b, then Kfbc[k] is maintained at Kfbc_b from time k=1.

In a case where a situation to be prevented is spinning, if the scenario type SC is a b3 scenario, then the feedback gain Kfby[k] (k=1, 2, . . . , Ke) related to a yaw rate is determined in a pattern in which the feedback gain Kfby[k] is gradually (at a predetermined temporal change rate) moved away from the standard value Kfby_s to the upper limit value Kfby_b from Kfby[0] (=Kfby[1]n−1). After reaching the upper limit value Kfby_b, Kfby[k] is maintained at the upper limit value Kfby_b, as shown in FIG. 20(c). If Kfby[0]=Kfby_b, then Kfby[k] is maintained at Kfby_b from time k=1.

At the same time, as shown in FIG. 21(c), the feedback gain Kfbc[k] (k=1, 2, . . . , Ke) related to a traveling course is determined in a pattern in which the feedback gain Kfbc[k] is gradually (at a predetermined temporal change rate) moved away from the aforesaid standard value Kfby_s to the aforesaid lower limit value Kfbc_b from Kfbc[0] (=Kfbc[1]n−1). After reaching the lower limit value Kfbc_b, Kfbc[k] is maintained at the lower limit value Kfbc_b. If Kfbc[0]=Kfbc_b, then Kfbc[k] is maintained at Kfbc_b from time k=1.

Thus, the feedback gains Kfby[k] and Kfbc[k] are determined on the basis of the scenario type SC. Whether Kfby[k] and Kfbc[k] (k>1) are to be moved toward an upper limit or a lower limit away from the standard values Kfby_s and Kfbc_s, respectively, is determined according to the type of a situation to be prevented (the type corresponding to an alphabetical portion of a scenario type SC).

The feedback gains Kfby and Kfbc set as described above are used for calculating FB[k] in the aforesaid S220 of FIG. 9 according to the aforesaid expression 08.

Supplementally, it is desirable to correct the feedback gains Ffby and Kfbc set as described above on the basis of a vehicle speed (scenario vehicle speed) V among scenario motion state amounts, as indicated by the following expressions 09a and 09b, and to use the corrected feedback gains Kfby' and Kfbc' to determine the feedback amount FB by the computation of expression 08.

$$Kfby'=f(V)\cdot Kfby \quad \text{Expression 09a}$$

$$Kfbc'=f(V)\cdot Kfbc \quad \text{Expression 09b}$$

where f(V) denotes a function of the scenario vehicle speed V.

The reference correction amount determiner 35e changes a reference correction amount at each time k in a predetermined pattern based on the scenario type SC. Specifically, for example, if a situation to be prevented is the deviation from a course, then a reference course correction amount (more specifically, a correction amount of a curvature of a reference course) is determined according to a changing pattern based on the scenario type SC.

FIG. 22(a) shows an example of a curvature of a reference course prepared by a scenario reference dynamic characteristics model 33, and FIG. 22(b) illustrates a changing pattern for a reference course correction amount (a correction amount of a curvature of a reference course) in a case where the situation to be prevented is the deviation from a course (the deviation of the vehicle 1 from a course to the left) and the scenario type SC is the a1 scenario. Further, FIG. 22(c) illustrates the curvature of the reference course that has been corrected on the basis of the reference course correction amount shown in FIG. 22(b). In the example shown in FIG. 22(b), it is assumed that the reference course correction amount [k]n−1 (curvature correction amount [k]n−1) at time k=1, which has been determined by the reference correction amount determiner 35e when finally determining an actuator operation desired value at the last time control processing cycle, is zero.

In this case, as shown in FIG. 22(b), a reference course correction amount [1] at time k=1 is maintained at zero in the current time control processing cycle. If the reference course correction amount [0]n at time k=0 (=Reference course correction amount [1]n−1) is not zero, then the reference course correction amount [1] is brought close to zero by a predetermined amount from a reference course correction amount [0]. Then, after time k=2, the reference course correction amount [k] is gradually changed (monotonously changed) to a predetermined value (<0) to gradually (at a predetermined temporal change rate) reduce the curvature of a reference course, and maintained at the predetermined value after reaching the predetermined value.

Supplementally, if the scenario type SC is the resetting scenario, then the reference course correction amount [k] is returned from a value at time k=0 (=Reference course correction amount [1]n−1) to zero at a predetermined temporal change rate (if the reference course correction amount [0]≠0) or it is maintained at zero (if the reference course correction amount [0]=0). If the scenario type SC is the a2 scenario, then the reference course correction amount [k] is maintained at the reference course correction amount [0] at time k=1, and changed (monotonously changed) at a predetermined temporal change rate up to the aforesaid predetermined value after time k=2. If the scenario type SC is the a3 scenario, then the reference course correction amount [k] is changed (monotonously changed) at a predetermined temporal change rate up to the aforesaid predetermined value from the reference course correction amount [0]. Whether the reference course correction amount [k] (k>1) is changed toward an increasing side or a decreasing side is determined according to the type of a situation to be prevented.

The reference course correction amount [k] (k=1, 2, . . . , Ke) determined by the reference correction amount determiner 35e as described above is added to a curvature [k] of a reference course of a scenario reference state amount by the aforesaid adding processor 35g so as to correct the scenario reference state amount, and the corrected scenario reference state amount is input to the feedback law 35b.

In the example of FIG. 22, the curvature [k] of the reference course of the corrected scenario reference state amount is as indicated by the solid line in FIG. 22(c). The dashed line in FIG. 22(c) indicates the curvature [k] of the reference course before correction. A relationship between the reference course of the scenario reference state amount after the correction and the reference course before the correction in this case is as shown in FIG. 23.

Then, the feedback control law 35b calculates the feedback amount FB[k] according to the following expression 10.

$$FB[k]=Kfby[k]\cdot \Delta \text{Yaw rate}'+Kfbc[k]\cdot \Delta \text{Course curvature} \quad \text{Expression 10}$$

where ΔYaw rate' denotes a difference between a scenario yaw rate [k−1] of a scenario motion state amount [k−1] and a reference yaw rate [k] of a scenario reference state amount [k] after correction (this being equivalent to a reference yaw rate [k] of a scenario reference state amount [k] in the present embodiment), and ΔCourse curvature denotes a difference between a curvature [k−1] of a traveling route of the vehicle 1 defined by the time series of a scenario vehicle position until time k−1 and a curvature [k] of a reference course of a scenario reference state amount after correction. The feedback gains Kfby[k] and Kfbc[k] may be corrected on the basis of the vehicle speed V among scenario motion state amounts, as indicated by the aforesaid expressions 09a and 09b.

The processing of a controller 10 other than that explained above is the same as that of the aforesaid first embodiment.

In the second embodiment explained above, not only the second feedforward amount FF2 but also the feedback gains Kfby and Kfbc of the feedback law 35b and a scenario reference state amount are adjusted in the same temporal changing pattern as that of the FF2 on the basis of the scenario type SC, thus permitting further appropriate generation of a scenario actuator operation desired value that makes it possible to prevent a situation to be prevented from taking place.

Supplementally, in the present embodiment, the processing by the scenario reference dynamic characteristics model 33, the reference correction amount determiner 35e, and the adding processor 35g corresponds to the second reference state amount determining means in the present invention. In this case, the scenario reference state amount determined by the reference dynamic characteristics model 33 corresponds to a basic reference state in the present invention. The aforesaid standard value related to a feedback gain corresponds to a reference gain in the present invention.

In the second embodiment, the second feedforward amount FF2, the feedback gains Kfby and Kfbc of the feedback law 35b, and the scenario reference state amount have been adjusted on the basis of the scenario type SC; alternatively, however, either one or two thereof may be adjusted.

THIRD EMBODIMENT

A third embodiment of the present invention will now be explained with reference to FIG. 24. The present embodiment differs from the first embodiment only partly in the processing by a scenario preparer, so that the same components or the same functions as those of the first embodiment will be assigned the same reference numerals and drawings as those of the first embodiment and the explanations thereof will be omitted.

In the third embodiment, instead of the processing of S122 in FIG. 8 described above, the subroutine processing shown by the flowchart of FIG. 24 is carried out to determine a current state acceptance manipulated variable (a current state acceptance manipulated variable used in the aforesaid reference dynamic characteristics model 12). Except for this, the present embodiment is the same as the first embodiment.

The following will explain the processing in FIG. 24. First, in S430, based on the difference between a state of a reference dynamic characteristics model 12 and an actual state of an actual vehicle 1 detected or estimated by the aforesaid sensor observer 20, a desired value Mdmd of a virtual external force to be applied to a vehicle 1 (a vehicle 1 on a scenario vehicle model 41) in order to reduce the difference is calculated. Specifically, the difference between the state of the reference dynamic characteristics model 12 and the actual state of the actual vehicle 1 is constituted of the difference between a current time value of a reference yaw rate and a current time value of an actual yaw rate of the actual vehicle 1 and the distance between a current time value of a reference course and a current time value of a position (actual position) of the actual vehicle 1 (a course deviation of the actual vehicle 1 from a reference course). Then, the difference and the distance (the course deviation), respectively, are multiplied by predetermined gains and added up thereby to calculate the desired value Mdmd. In other words, the desired value Mdmd is calculated so as to bring the yaw rate difference and the course deviation close to zero. Incidentally, the desired value Mdmd is a virtual external force of the dimension of a moment (specifically, a moment about a yaw axis).

Subsequently, the procedure proceeds to S432 wherein it is determined whether Mdmd is larger than an upper limit value Mdmd_max of a predetermined dead zone, and if Mdmd>Mdmd_max, then the procedure proceeds to S440 wherein the current state acceptance manipulated variable (the current time value) is set to Mdmd_max−Mdmd. If the determination in S432 indicates Mdmd≦Mdmd_max, then the procedure proceeds to S434 wherein it is determined whether Mdmd is smaller than a lower limit value Mdmd_min of the aforesaid dead zone. At this time, if Mdmd<Mdmd_min, then the procedure proceeds to S436 wherein the current state acceptance manipulated variable (the current time value) is set to Mdmd_min−Mdmd. If Mdmd≧Mdmd_min, then the current state acceptance manipulated variable (the current time value) is set to zero.

The current time value of the current state acceptance manipulated variable is determined as described above. Thus, according to the third embodiment, a reference state amount is determined by the reference dynamic characteristics model 12 to bring a reference state amount close to an actual state of the actual vehicle 1 only if the difference between the reference state amount and the actual state of the actual vehicle 1 becomes relatively large (if Mdmd deviates from the aforesaid dead zone). In this case, the reference dynamic characteristics model 12 uses the current state acceptance manipulated variable, which has been determined as described above, as Mvirt of the aforesaid expression 01b. Incidentally, in the present embodiment, Fvirt of expression 01a will be set to zero, as with the aforesaid first embodiment.

In the third embodiment explained above, as with the aforesaid second embodiment, the feedback gain of the feedback law 35b may be varied according to a scenario type SC or a scenario reference state amount may be corrected.

FOURTH EMBODIMENT

A fourth embodiment of the present invention will now be explained with reference to FIG. 25 to FIG. 28. The present embodiment differs from the first embodiment only in the processing by a scenario preparer, so that the same components or the same functions as those of the first embodiment will be assigned the same reference numerals and drawings as those of the first embodiment and the explanations thereof will be omitted.

According to the fourth embodiment, if there is a danger that a situation to be prevented occurs in a scenario vehicle behavior, a scenario preparer 14 exploratorily determines a scenario vehicle behavior that makes it possible to prevent the situation to be prevented as much as possible.

FIG. 25 is a flowchart showing main routine processing by the scenario preparer 14. The following will explain. First, from S510 to S518, the same processing as that from S110 to S118 of FIG. 8 described above is carried out. More specifically, a time series of a future drive manipulation inputs op[k] is prepared in S510 and a current time value of a reference state amount (=Scenario reference state amount [1]) is determined by a reference dynamic characteristics model 12 in S512, then a scenario type is set to a resetting scenario in S514 and a time series of a scenario vehicle behavior is prepared in S516. Then, in S518, it is determined in S518 whether a time series of a predetermined component of the scenario vehicle behavior satisfies a predetermined permissible range (it is determined whether there is a danger of occurrence of a situation to be prevented) at each time k (k=1, 2, ..., Ke).

Supplementally, the processing of S510 corresponds to the future drive manipulated variable determining means in the present invention, and the processing of S512 corresponds to the first reference state determining means in the present invention. Further, the processing of S516 corresponds to the first future vehicle behavior determining means in the present invention. In addition, the determination processing of S518 and the determination processing of S526, which will be discussed later, constitute an evaluating means in the present invention. These are the same as the aforesaid first embodiment.

If the determination result in S518 is affirmative (if there is no danger of the occurrence of a situation to be prevented), then the procedure proceeds to S520 wherein the same processing as that of S120 in FIG. 8 described above is carried out, and the current time value of an actuator operation desired value is determined and output.

Further, in S522, the same processing as that of S122 in FIG. 8 described above is carried out, and the current time value of a current state acceptance manipulated variable is determined and output.

On the other hand, if the determination result in S518 is negative (if there is a danger of the occurrence of a situation to be prevented), then based on the situation to be prevented, which may occur, a scenario vehicle behavior that makes it possible to prevent the situation to be prevented is exploratorily determined (S524, S532, ... ). In the illustrated example, if a situation to be prevented that may take place is the deviation of the vehicle 1 from a course to the left, then the procedure proceeds to S524, or if it is spinning of the vehicle 1 to the left (counterclockwise spinning), then the procedure proceeds to S532. This processing of branching corresponds to a control law selecting means in the present invention.

The following will explain, as a representative example, a case where a situation to be prevented which may take place is the deviation from a course to the left.

FIG. 26 is a flowchart showing the subroutine processing of S524. The following will be explained. First, in S610, "a" is set at the scenario type SC. "a" means that the scenario type SC is a scenario type for preventing the deviation from a course to the left. In the present embodiment, the scenario type SC defines the components and their temporal changing patterns of a second feedforward amount FF2[$k$] to be adjusted to prevent the situation to be prevented and the algorithm of the processing for exploring a scenario vehicle behavior.

Subsequently, the procedure proceeds to S612 wherein preset predetermined values SLmin and SLmax are substituted into a small-side candidate value SL0 and a large-side candidate value SL2 (<SL0), respectively, of an upper limit value of a permissible range of a scenario slip ratio.

Subsequently, the procedure proceeds to S614 wherein the small-side candidate value SL0 is substituted into a slip ratio upper limit set value SL, which is the set value of the upper limit value of the permissible range of the scenario slip ratio. The lower limit value of the permissible range of the scenario slip ratio is zero. Further, in this S614, SL0=SLmin; therefore, SL will be set to SLmin.

Subsequently, the procedure proceeds to S616 wherein a time series (a time series from time k=1 to time k=Ke) of a scenario vehicle behavior is prepared on the basis of a currently set scenario type SC (the "a" scenario in this case) and the slip ratio upper limit set value SL (SLmin in this case). This processing is carried out in the same manner as the processing in FIG. 9 explained in the first embodiment. However, in the processing of S218 in FIG. 9, a predetermined component FF2$x$[$k$] (a particular component for each scenario type, such as a desired braking force) of a second feedforward amount FF2[$k$] is determined in the same changing pattern as that of the aforesaid a3 scenario in FIG. 13($d$), as shown in, for example, FIG. 27. More specifically, FF2$x$[$k$] is determined such that the predetermined component gradually monotonously changes from a value at time k=0 (=FF2$x$[1]$n$−1) at a predetermined temporal change rate to a predetermined upper limit value FF2$x$max (if FF2$x$ is changed at zero or more) or to a predetermined lower limit value FF2$x$min (if FF2$x$ is changed at zero or less). And, the determination processing of S226 is executed with the upper limit value of the permissible range of the slip ratio [$k$] set as the slip ratio upper limit set value SL (the lower limit value being set to zero). At this time, if the determination result in S226 is NO, then FF2[$k$] is corrected as indicated by the dashed line FF2$x$' in FIG. 27. Except for this, the processing is the same as that in FIG. 9.

Subsequently, the procedure proceeds to S618 wherein a maximum deviation from a course is determined from the time series of a scenario vehicle behavior prepared in S616, and the determined maximum deviation from a course is substituted into E0. E0 denotes a maximum deviation from a course obtained in association with the small-side candidate value SL0 of the slip ratio upper limit set value SL. Here, the maximum deviation from a course is a maximum value of a distance between a scenario vehicle position [$k$] at each time k in a scenario vehicle behavior and a scenario reference course (the amount of a deviation of the scenario vehicle position [$k$] from the scenario reference course). In other words, in the time series of a scenario vehicle behavior, the amount of a deviation at the time when the deviation of a scenario vehicle position from a scenario reference course is the largest is the maximum deviation from a course.

Subsequently, the procedure proceeds to S620 wherein the large-side candidate value SL2 (SLmax in this case) is substituted into the slip ratio upper limit set value SL, then proceeds to S622 wherein the same processing as that of S616 described above is carried out to prepare the time series of a scenario vehicle behavior. However, the slip ratio upper limit set value SL in this case is SL=SL2, which differs from the case of the processing of S616.

Subsequently, the procedure proceeds to S624 wherein a maximum deviation from a course in the scenario vehicle behavior prepared in S622 is determined in the same manner as that in S618 described above, and the determined maximum deviation from a course is substituted into E2. E2 denotes a maximum deviation from a course obtained in association with the large-side candidate value SL2 of the slip ratio upper limit set value SL.

Subsequently, the procedure proceeds to S626 wherein an intermediate candidate value SL2 of the slip ratio upper limit set value SL is determined as the mean value of the current small-side candidate value SL0 (SLmin in this case) and large-side candidate value SL2 (SLmax in this case), and the determined mean value is substituted into the slip ratio upper limit set value SL.

Subsequently, the procedure proceeds to S628 wherein the same processing as that in S616 described above is carried out to prepare the time series of a scenario vehicle behavior. In this case, however, the slip ratio upper limit set value SL is SL=SL1, which differs from the case of the processing of S616.

Subsequently, the procedure proceeds to S630 wherein the maximum deviation from a course in the scenario vehicle behavior prepared in S628 is determined in the same manner as that in the aforesaid S618 and the determined value is substituted into E1. E1 is a maximum deviation from a course which has been obtained in association with the intermediate candidate value SL1 of the slip ratio upper limit set value SL.

The processing of S610 to S630 described above determines the values E0, E1, and E2 of the maximum deviation from a course associated with the three types of values SL0, SL1, and SL2, respectively, (SL0<SL1<SL2) of the slip ratio upper limit set value SL.

Here, the aforesaid S616, S622, and S628 prepare the time series of a scenario vehicle behavior by the same processing as the processing in FIG. 9, as described above, so that the time series will be based on a value of the slip ratio upper limit set value SL. Therefore, the maximum deviation from a course in a scenario vehicle behavior to be prepared will provide a function of the slip ratio upper limit set value SL. Examples of patterns of the function are shown in FIGS. 28(a) to (e). As indicated by the solid line curves in these FIGS. 28(a) to (e), the function of a maximum deviation from a course relative to the slip ratio upper limit set value SL draws a pattern that bulges downward, in which the maximum deviation from a course takes a minimum value when the slip ratio upper limit set value SL takes a certain value. In FIGS. 28(a) to (e), the values of E0, E1, E2, SL0, SL1, and SL2 at the point of the determination processing of S632 or S636 explained below are denoted with a suffix "m," as E0_$m$, E1_$m$, E2_$m$, SL0_$m$, SL1_$m$, and SL2_$m$.

Considering the above relationship between the slip ratio upper limit set value SL and the maximum deviation from a course, the processing in FIG. 26 (the subroutine processing of S524 in FIG. 25) performs the processing explained below to exploratorily prepare the time series of a scenario vehicle behavior such that the maximum deviation from a course takes a minimum value or a value close thereto so as to prepare the time series of a scenario vehicle behavior that allows the deviation from a course to be prevented as much as possible. The values of the aforesaid SLmin and SLmax are set such that a minimum value of the maximum deviation from a course always exists between SLmin and SLmax.

More specifically, after the processing of S630, the procedure proceeds to S632 wherein it is determined whether the value of the current maximum deviation from a course E0 is smaller than the value of the current maximum deviation from a course E1 (whether E0<E1). If the determination result is YES (if E0<E1), then the relationship among the maximum deviation from a course E0 when SL=SL0, the maximum deviation from a course E1 when SL=SL1, and the maximum deviation from a course E2 when SL=SL2 is a relationship as shown in FIG. 28(a) (Among E0_$m$, E1_$m$, and E2_$m$, E0_$m$ is the closest to a minimum value). In this situation, the value of the slip ratio upper limit set value SL that provides a minimum value for the maximum deviation from a course should lie in a range (the solution existing zone in the figure) between SL0 (SL0_$m$) and SL1 (SL1_$m$). Hence, in this case, the procedure proceeds to S634 wherein the current intermediate candidate value SL1 is substituted anew into the large-side candidate value SL2 of the slip ratio upper limit set value SL (to update SL2), and the value of the current E1 is substituted anew into E2 (to update E2). In this case, the small-side candidate value SL0 is maintained at a current value. More specifically, if the determination result of S632 is YES, then the value SL0_$m$ of SL0 and the value SL1_$m$ of SL1 at that time are respectively set anew as the small-side candidate value SL0 and the large-side candidate value SL2.

If the determination result in S632 is NO (if E0≧E1), then the procedure proceeds to S636 wherein it is determined whether the value of the current maximum deviation from a course E2 is smaller than the value of the current maximum deviation from a course E1 (whether E1>E2). If the determination result is YES (if E1>E2), then the relationship among the maximum deviation from a course E0 when SL=SL0, the maximum deviation from a course E1 when SL=SL1, and the maximum deviation from a course E2 when SL=SL2 is a relationship as shown in FIG. 28(b) (Among E0_$m$, E1_$m$, and E2_$m$, E2_$m$ is the closest to a minimum value). In this situation, the value of the slip ratio upper limit set value SL that provides a minimum value for the maximum deviation from a course should lie in a range (the solution existing zone shown in the figure) between SL1 (SL1_$m$) and SL2 (SL2_$m$). Hence, in this case, the procedure proceeds to S638 wherein the current intermediate candidate value SL1 is substituted anew into the small-side candidate value SL0 of the slip ratio upper limit set value SL (to update SL0), and the value of the current E1 is substituted anew into E0 (to update E0). In this case, the large-side candidate value SL2 is maintained at a current value. More specifically, if the determination result of S636 is YES, then the value SL1_$m$ of SL1 and the value SL2_$m$ of SL2 at that time are respectively set anew as the small-side candidate value SL0 and the large-side candidate value SL2.

After the processing of S634 or S638 is carried out as described above, the procedure proceeds to S640 wherein a mean value of the current small-side candidate value SL0 (SL0_$m$ or SL1_$m$) and the current large-side candidate value SL2 (SL1_$m$ or SL2_$m$) is set anew as the intermediate candidate value SL1, which is substituted anew into the slip ratio upper limit set value SL. In the case of, for example, FIG. 28(a), the mean value of SL0_$m$ and SL1_$m$ is set as a new intermediate candidate value SL1_$m$+1, which is substituted into the slip ratio upper limit set value SL. In the case of FIG. 28(b), the mean value of SL1_$m$ and SL2_$m$ is set as a new intermediate candidate value SL1_$m$+1, which is substituted into the slip ratio upper limit set value SL.

Subsequently, the procedure proceeds to S642 wherein the same processing as that in S616 described above is carried out to prepare the time series of a scenario vehicle behavior. In this case, however, the slip ratio upper limit set value SL is the intermediate candidate value SL1, which has been determined in S640.

Subsequently, the procedure proceeds to S644 wherein the maximum deviation from a course in the scenario vehicle behavior prepared in S642 is determined in the same manner as that in the aforesaid S618 and the determined value is substituted into E1. E1 is a maximum deviation from a course which has been obtained in association with the slip ratio upper limit set value SL, which has been set in S640 (=the intermediate candidate value SL1 determined in S640). Examples of the maximum deviation from a course E1 determined in S644 as described above are respectively indicated by E1_$m$+1 in FIGS. 28(a) and (b).

Subsequently, the procedure proceeds to S646 wherein the value of a number of times counter cnt is incremented by 1. The number of times counter cnt is a counter for counting the number of times a scenario vehicle behavior that causes a maximum deviation from a course to take a minimum value or a value close thereto has been prepared (the number of times the search for a scenario vehicle behavior has been executed)

after the processing of S630, and the counter is initialized to zero at the beginning of the processing shown in FIG. 26.

Subsequently, the procedure proceeds to S648 wherein it is determined whether the value of the number of times counter cnt has reached a predetermined upper limit value cnt_max. This determination processing is the processing for determining whether a determined maximum deviation from a course E1 has sufficiently converged to a minimum value. At this time, if the determination result of S648 is NO (if cnt<cnt_max), then the procedure returns to the determination processing of S632. If the determination result of S648 is YES, then it is determined that the current maximum deviation from a course E1 has reached a value that is sufficiently close to a minimum value and the procedure proceeds to S678 wherein the current maximum deviation from a course E1 is determined as the amount of deviation of the scenario vehicle position in the scenario vehicle behavior, which has been finally prepared, from a reference course (course deviation).

On the other hand, if the determination result in the aforesaid S636 is NO (if E0≧E1 and E2≧E1), then the relationship among the maximum deviation from a course E0 when SL=SL0, the maximum deviation from a course E1 when SL=SL1, and the maximum deviation from a course E2 when SL=SL2 will be a relationship as shown in FIG. 28(c) or FIG. 28(d) or FIG. 28(e) (Among E0_m, E1_m, and E2_m, E1_m is the closest to a minimum value). In such a case, the value of the slip ratio upper limit set value SL that provides a minimum value for the maximum deviation from a course should lie in a range between SL0(SL0_m) and SL1(SL1_m) or in a range between SL1(SL1_m) and SL2(SL2_m), and it is unknown at this point in which range the value lies.

Hence, in the present embodiment, if the determination result in S636 is NO, the procedure proceeds to S650 wherein the value SL2_m of the current large-side candidate value SL2 and the value E2_m of the maximum deviation from a course E2 associated therewith are stored and retained as the values of backup parameters SL2bk and E2bk, respectively, and the value SL1_m of the current intermediate candidate value SL1 and the value E1_m of the maximum deviation from a course E1 associated therewith are stored and retained as the values of backup parameters SL1bk and E1bk, respectively.

Subsequently, the procedure proceeds to S652 wherein the value SL1_m of the current intermediate candidate value SL1 is substituted anew into the large-side candidate value SL2 (to update SL2) and the value E1_m of the current E1 is substituted anew into E2 (to update E2). In this case, the small-side candidate value SL0 is maintained at the current value SL0_m. More specifically, if the determination result of S636 is NO, then the value SL0_m of SL0 and the value SL1_m of SL1 at that time are respectively set anew as the small-side candidate value SL0 and the large-side candidate value SL2.

Subsequently, the procedure proceeds to S654 wherein the mean value of the current small-side candidate value SL0 (=SL0_m) and the current large-side candidate value SL2 (=SL1_m) is set anew as the intermediate candidate value SL1, which is substituted anew into the slip ratio upper limit set value SL. In the examples shown in FIGS. 28(c) to (e), SL1_m+1 in the figures is set as a new intermediate candidate value SL1, which is substituted anew into the slip ratio upper limit set value SL.

Subsequently, the procedure proceeds to S656 wherein the same processing as that in the aforesaid S616 is carried out to prepare the time series of a scenario vehicle behavior. In this case, however, the slip ratio upper limit set value SL takes the intermediate candidate value SL1 determined in S654.

Subsequently, the procedure proceeds to S658 wherein the maximum deviation from a course in the scenario vehicle behavior prepared in S656 is determined in the same manner as that in the aforesaid S618, and the determined maximum deviation from a course is substituted into E1. E1 denotes the maximum deviation from a course obtained in association with the slip ratio upper limit set value SL (=SL1_m+1 in FIG. 28(c) to FIG. 28(e)) set in S654. Examples of E1 determined in S658 as described above are shown by E1_m+1 in FIG. 28(c) to FIG. 28(e).

Subsequently, the procedure proceeds to S660 wherein it is determined whether the value of the current E1 (=E1_m+1) is smaller than the value of the current E2 (=E1_m) (whether E1<E2). If the determination result is YES, then it means that the situation is as illustrated in FIG. 28(c), and the slip ratio upper limit set value SL that provides a minimum value of a maximum deviation from a course lies in a range between the current small-side candidate value SL0 (=SL0_m) and the current large-side candidate value SL2 (=SL1_m) (a solution existing zone in FIG. 28(c)). In this case, therefore, the small-side candidate value SL0 and the large-side candidate value SL2 are respectively maintained at the current values, and the procedure proceeds to S646.

If the determination result of S660 is NO, it means that the situation is as illustrated in FIG. 28(d) or FIG. 28(e). In this case, the procedure proceeds to S662 wherein the value of SL1bk (=SL1_m), the value of E1bk (=E1_m), the value of SL2bk (=SL2_m), and the value of E2bk (=E2_m), which have been stored and retained in S650, are substituted into SL0, E0, SL2, and E2, respectively, and further, the value of the current SL1 (=SL1_m+1) and the value of the current E1 (=E1_m+1) are stored and retained as the values of the backup parameters SL1bk and E1bk.

Subsequently, the procedure proceeds to S664 wherein the mean value of the current small-side candidate value SL0 (=SL1_m) and the current large-side candidate value SL2 (=SL2_m) is set anew as the intermediate candidate value SL1, which is substituted anew into the slip ratio upper limit set value SL. In the examples shown in FIGS. 28(d) and (e), SL1_m+2 in the figures is set as a new intermediate candidate value SL1, which is substituted anew into the slip ratio upper limit set value SL.

Subsequently, the procedure proceeds to S666 wherein the same processing as that in the aforesaid S616 is carried out to prepare the time series of a scenario vehicle behavior. In this case, however, the slip ratio upper limit set value SL takes the intermediate candidate value SL1 determined in S664.

Subsequently, the procedure proceeds to S668 wherein the maximum deviation from a course in the scenario vehicle behavior prepared in S666 is determined in the same manner as that in the aforesaid S618, and the determined maximum deviation from a course is substituted into E1. E1 denotes the maximum deviation from a course obtained in association with the slip ratio upper limit set value SL (=SL1_m+2 in FIGS. 28(d) and (e)) set in S664. Examples of E1 determined in S668 as described above are shown by E1_m+2 in FIGS. 28(d) and (e).

Subsequently, the procedure proceeds to S670 wherein it is determined whether the current E1 (=E1_m+2) is smaller than the current E0 (=E1_m) (whether E1<E0). If the determination result is YES, then it means that the situation is as illustrated in FIG. 28(d), and the slip ratio upper limit set value SL that provides a minimum value of a maximum deviation from a course lies in a range between the current small-side candidate value SL0 (=SL1_m) and the current large-side candidate value SL2 (=SL2_m) (a solution existing zone in FIG. 28(d)). In this case, therefore, the procedure proceeds to S646, respectively maintaining the small-side candidate value SL0 and the large-side candidate value SL2 at the current values.

If the determination result of S670 is NO, it means that the situation is as illustrated in FIG. 28(e) and the slip ratio upper limit set value SL that provides a minimum value of a maximum deviation from a course lies in a range between the intermediate candidate value SL1 (=SL1_m+1) at the point of the determination processing of S660 and the current intermediate candidate value SL1 (=SL1_m+2) (a solution existing zone in FIG. 28(e)). In this case, therefore, the procedure proceeds to S672 wherein the value of SL0 (=SL1_m), the value of E0 (=E1_m), the value of SL1 (=SL1_m+2), and the value of E2 (=E1_m+2) at present are substituted anew into SL1, E1, SL2, and E2, respectively, and further, the value of the backup parameter SL1bk (=SL1_m+1) and the value of E1bk (=E1_m+1), which have been stored and retained in S662, are substituted anew into SL0 and E0, respectively. In other words, SL1_m+1, SL1_m, and SL1_m+2 are substituted into the small-side candidate value SL0, the intermediate candidate value SL1, and the large-side candidate value SL2, respectively.

Subsequently, the procedure proceeds to S674 wherein the same processing as that in the aforesaid S646 is carried out and the value on the number of times counter cnt is incremented by 1, then the procedure proceeds to S676 wherein the same determination processing as that in the aforesaid S648 is carried out. Further, if the determination result in S676 is NO, then the procedure returns to the processing from the aforesaid S650, or if the determination result is YES, then the processing of the aforesaid S678 is carried out and the processing shown in FIG. 26 is terminated.

By the processing described above, a scenario vehicle behavior finally prepared is obtained as an optimal scenario vehicle behavior that makes it possible to prevent the deviation from a course as much as possible. And, the maximum deviation from a course in the scenario vehicle behavior is determined as the amount of the deviation of the scenario vehicle position from a reference course (the deviation from a course).

The above has described in detail the subroutine processing of S524 of FIG. 25. If a situation to be prevented is the deviation from a course to the right, the same processing as that of S524 may be carried out to search for the time series of a scenario vehicle behavior such that a maximum deviation from a course takes a minimum value or a value close thereto. Although a detailed explanation will be omitted, if a behavior to be prevented is spinning, then the time series of a scenario vehicle behavior may be searched for such that, for example, the maximum value of the absolute value of a side slip angle in the time series of the scenario vehicle behavior is a minimum value or a value close thereto. The processing for preparing the time series of a scenario vehicle behavior (the processing of S616, S622, S628, S642, S656, and S666) in the processing shown in FIG. 26 is the same as the processing in FIG. 9 described above, so that the time series of a scenario reference state amount and a scenario current state acceptance manipulated variable are also prepared in addition to the time series of a scenario vehicle behavior.

Supplementally, the processing of S524 corresponds to the second future vehicle behavior determining means in the present invention. In this case, the processing of S212 in FIG. 9 in the processing of S616, S622, S628, S642, S656, and S666 carried out in the processing of S524 corresponds to the vehicle model initializing means in the present invention.

Further, the repetitive processing of S216 in FIG. 9 corresponds to the second reference state determining means in the present invention.

Returning to the explanation of FIG. 25, after the processing of S524, the procedure proceeds to S526 wherein it is determined whether the time series of a predetermined component of the scenario vehicle behavior prepared by the processing of S524 satisfies a predetermined permissible range in the same manner as that in S118 of FIG. 8 described above. In this case, whether the difference (distance) between a scenario vehicle position and a scenario reference course satisfies a predetermined range is determined by determining whether the maximum deviation from a course E1 finally determined by the processing of S524 satisfies a predetermined permissible range. At this time, it may be determined whether a side slip angle (a scenario side slip angle) satisfies a predetermined permissible range, in addition to the determination of the maximum deviation from a course E1.

If this determination result of S526 is YES, then the same processing as that of S120 and S122 of FIG. 8 described above is carried out in S520 and S522, respectively, thereby determining and outputting a current time value of an actuator operation desired value and a current time value of a current state acceptance manipulated variable.

If the determination result of S526 is NO, then the same processing as that in S142 and S144 of FIG. 8 described above is carried out in S528 and S530, respectively, to determine a current time value of the actuator operation desired value by an emergency stop control law and to set a current time value of the current state acceptance manipulated variable to zero.

If a situation to be prevented is other than the deviation from a course to the left (spinning to the left, the deviation from a course to the right, spinning to the right, etc.), the same determination processing as that of S526 is also carried out, and a current time value of the actuator operation desired value and a current time value of the current state acceptance manipulated variable are determined on the basis of the determination result.

The above has described the fourth embodiment. In the fourth embodiment, as with the second embodiment, a feedback gain of the feedback law 35b may be changed according to the scenario type SC or a scenario reference state amount may be corrected according to the scenario type SC. The current state acceptance manipulated variable may be determined in the same manner as that in the aforesaid third embodiment.

In the first through the fourth embodiments explained above, the current state acceptance manipulated variables have been represented in terms of external force moments; alternatively, however, an external force moment and a translational external force may be used in combination or a translational external force may be used in place of an external force moment in order to bring a reference state amount close to a state amount of the actual vehicle 1.

Desirably, a tire friction model is set to equivalent characteristics, including influences caused by geometric changes due to the characteristics of a suspension system and a steering system.

In the arithmetic processing by the scenario vehicle model 41 or the like, the order of the processing may be changed, as appropriate.

Further, in the aforesaid embodiments, to prepare the time series of scenario vehicle behaviors, a scenario motion state amount has been brought close by the feedback control law to the scenario reference state amount determined by the scenario reference dynamic characteristics model 33; however, this may be omitted. In this case, the time series of a scenario vehicle behavior may be prepared by setting FB[k]=0 (k=1, 2, ..., Ke) in the first embodiment or the second embodiment or the fourth embodiment described above. Further, in this case, the processing by the reference dynamic characteristics model 12, the scenario reference dynamic characteristics model 33, the feedback law, and the current state acceptance manipulated variable determiner 43 is unnecessary.

INDUSTRIAL APPLICABILITY

As described above, the present invention is usefully applied to permit proper control of behaviors of vehicles, such as automobiles, hybrid cars, and electric vehicles, while securing high robustness.

BRIEF DESCRIPTION OF THE DRAWINGS

FIG. 17 It is a block diagram showing the functional construction of a scenario preparer in a second embodiment in the present invention.

Figure 1:
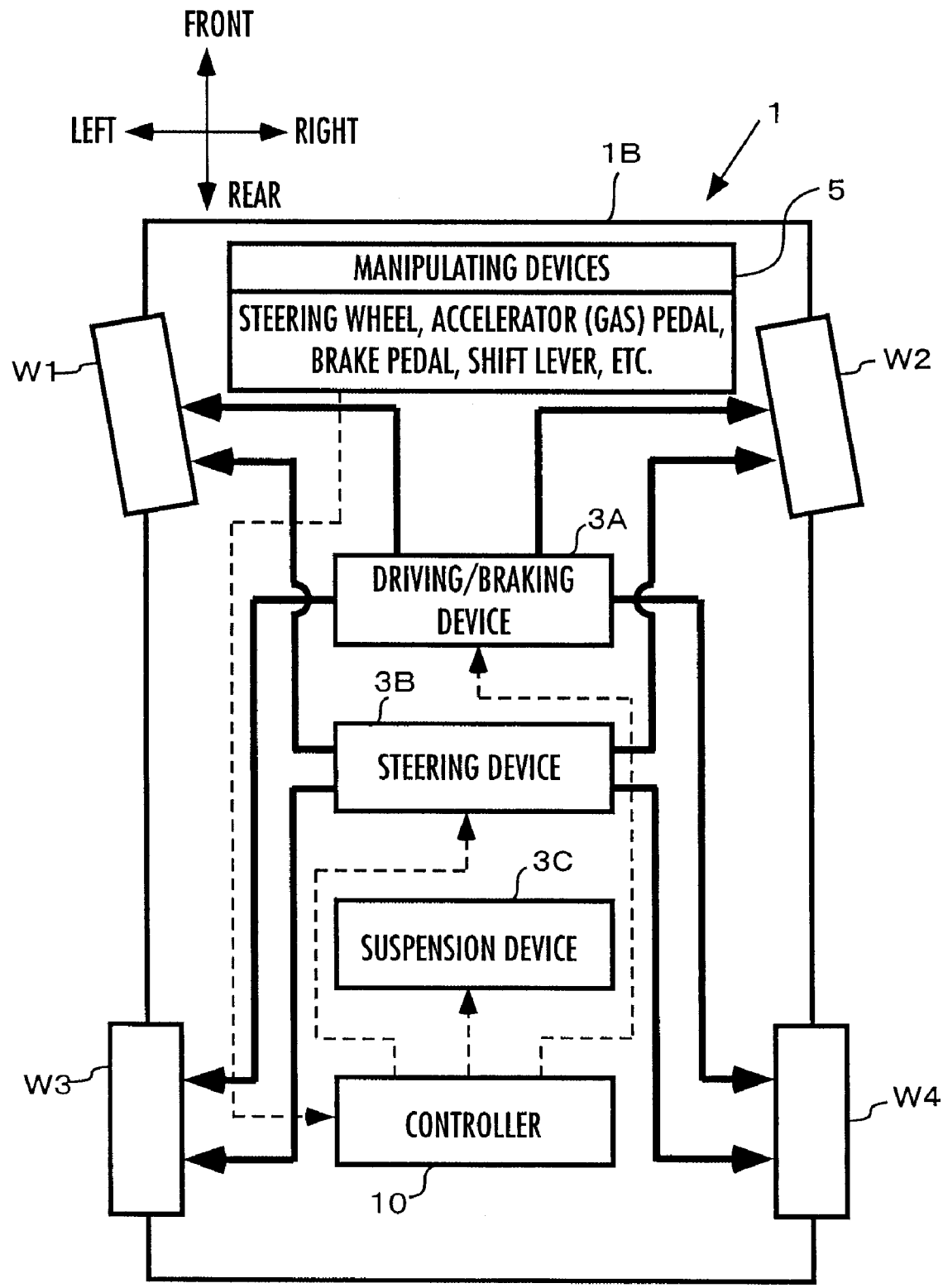
FIG. 1 It is a block diagram showing a schematic construction of a vehicle in an embodiment of the present invention.
Figure 2:
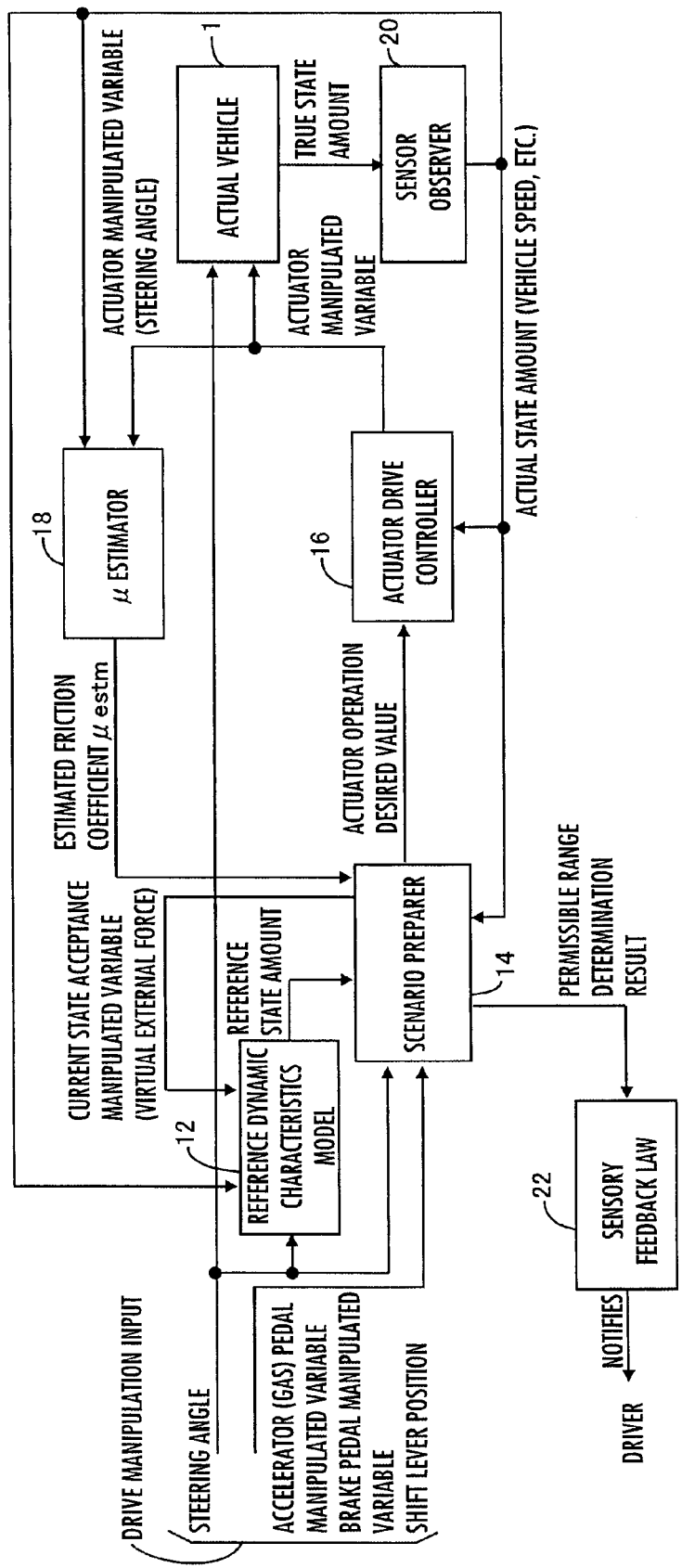
FIG. 2 It is a block diagram showing the functional construction of an entire control device in a first embodiment of the present invention.
Figure 3:
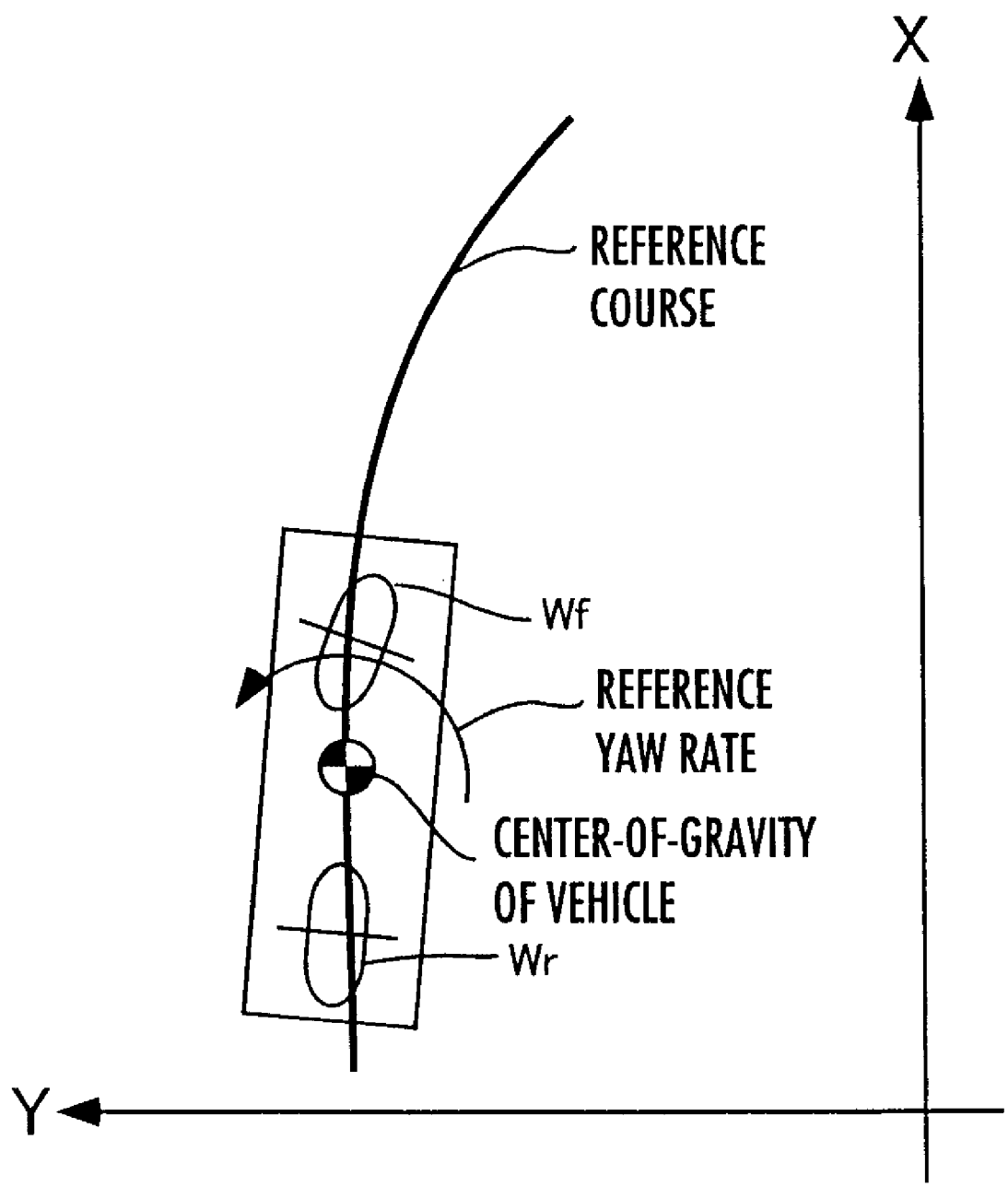
FIG. 3 It is a diagram for explaining a reference dynamic characteristics model in the first embodiment.
Figure 4:
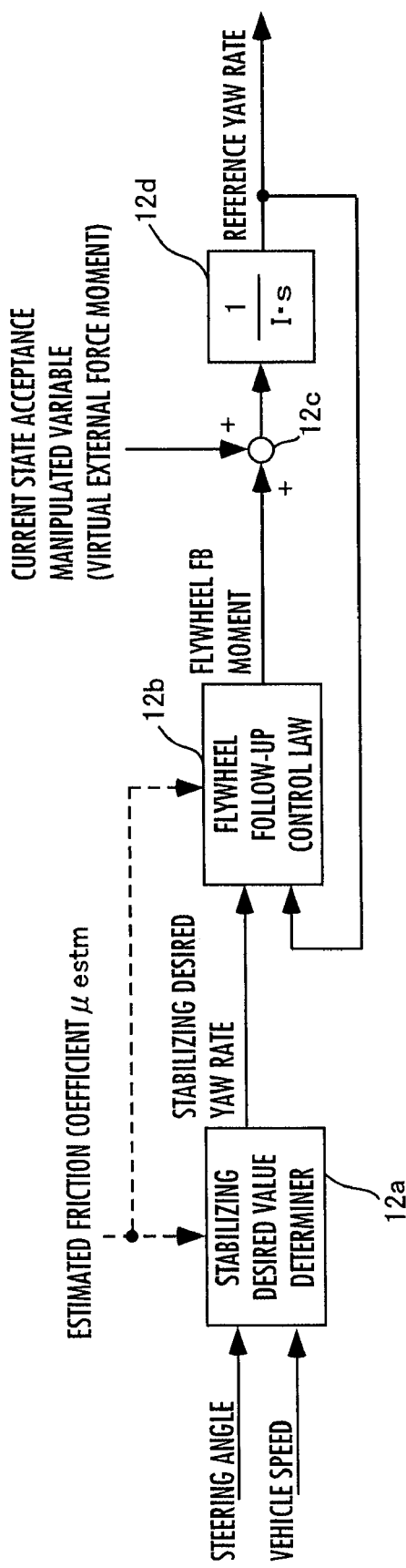
FIG. 4 It is a diagram for explaining another example of the reference dynamic characteristics model in the first embodiment.
Figure 5:
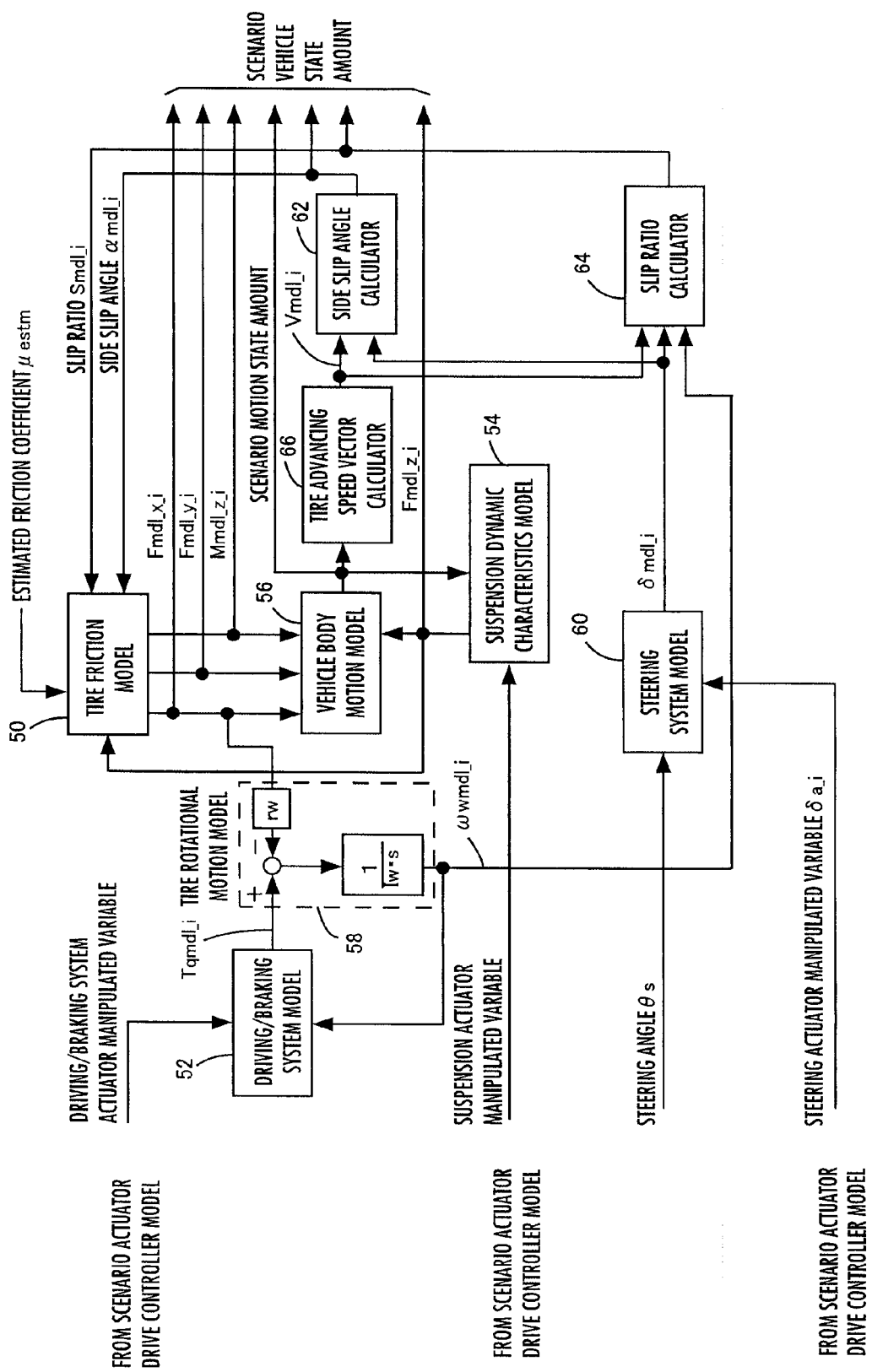
FIG. 5 It is a block diagram showing the functional construction of a scenario vehicle model in the first embodiment.
Figure 6:
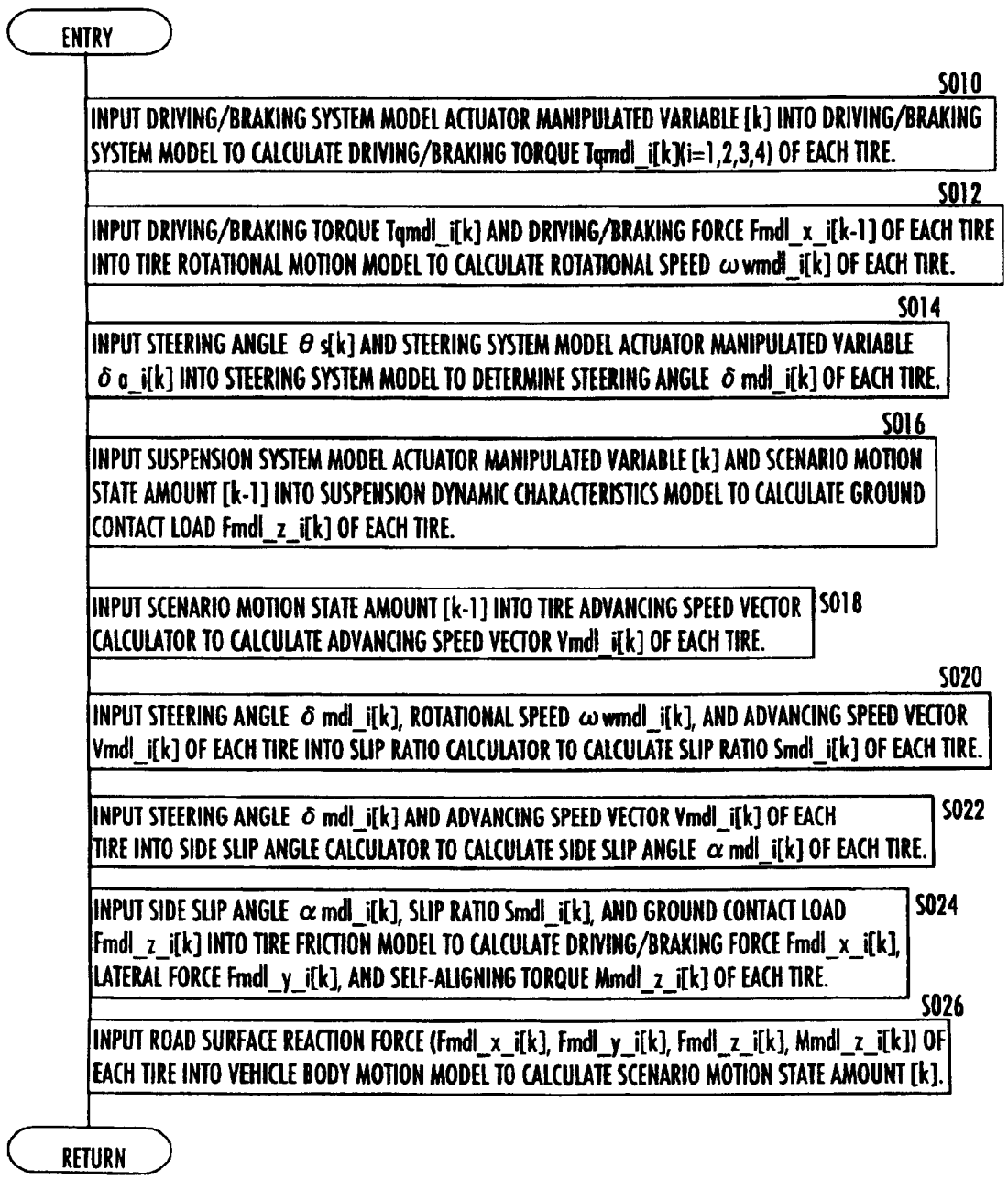
FIG. 6 It is a flowchart showing the processing of the scenario vehicle model of FIG. 5.
Figure 7:
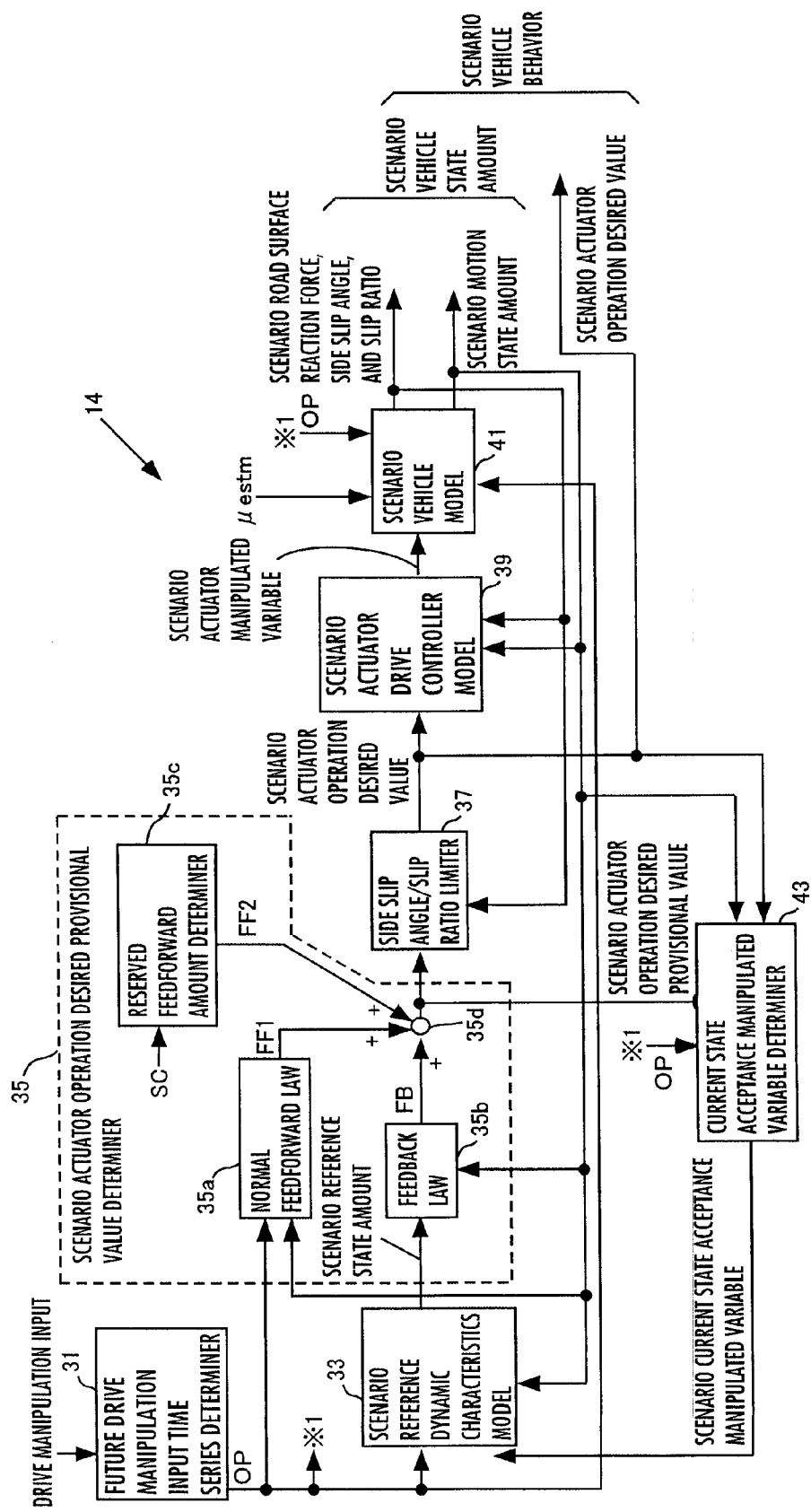
FIG. 7 It is a block diagram showing the function construction of a scenario preparer in the first embodiment.
Figure 8:
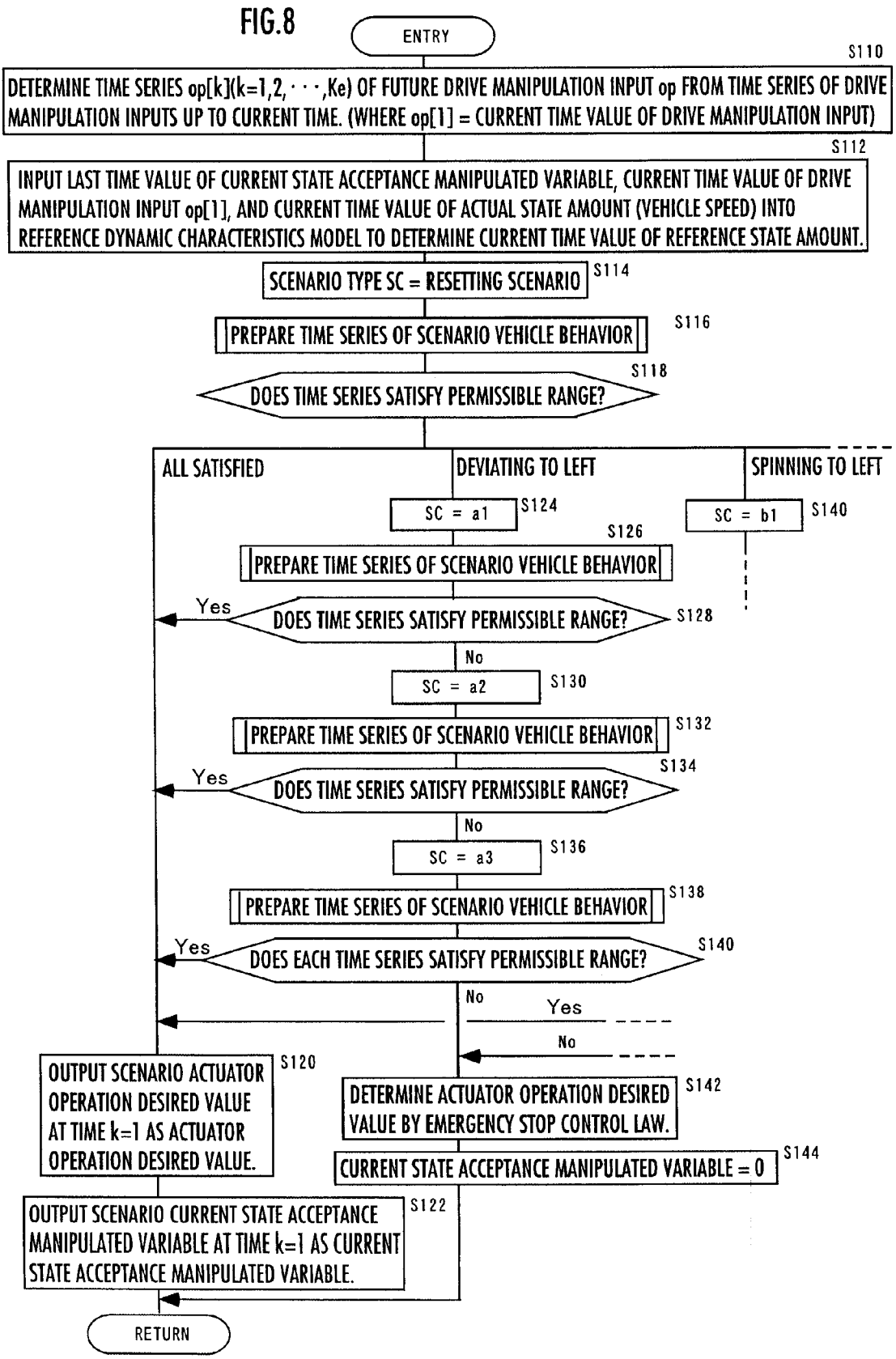
FIG. 8 It is a flowchart showing the processing of the scenario preparer and the reference dynamic characteristics model in the first embodiment.
Figure 9:
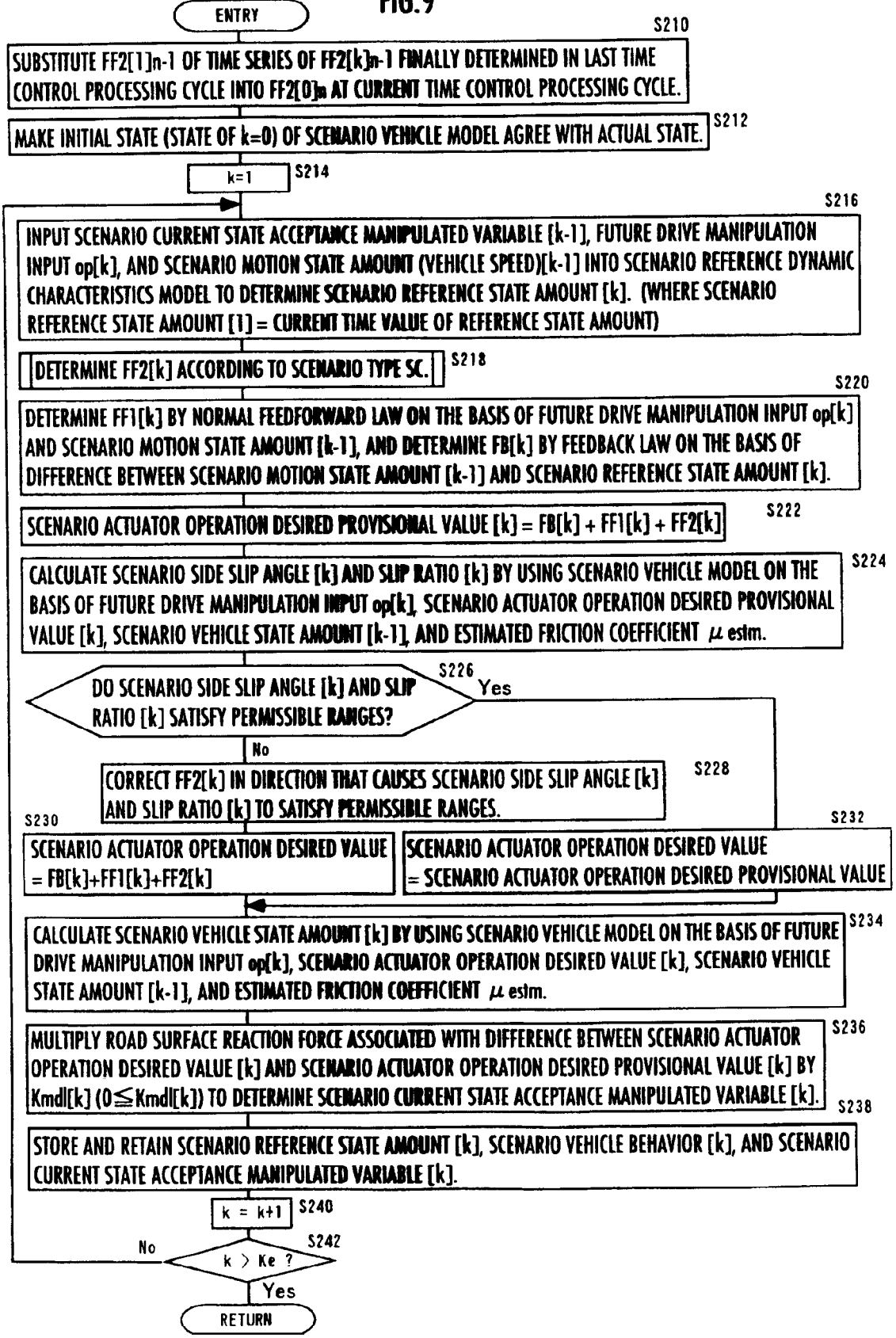
FIG. 9 It is a flowchart showing the subroutine processing of S116, S126, and S138 in FIG. 8.
Figure 10:
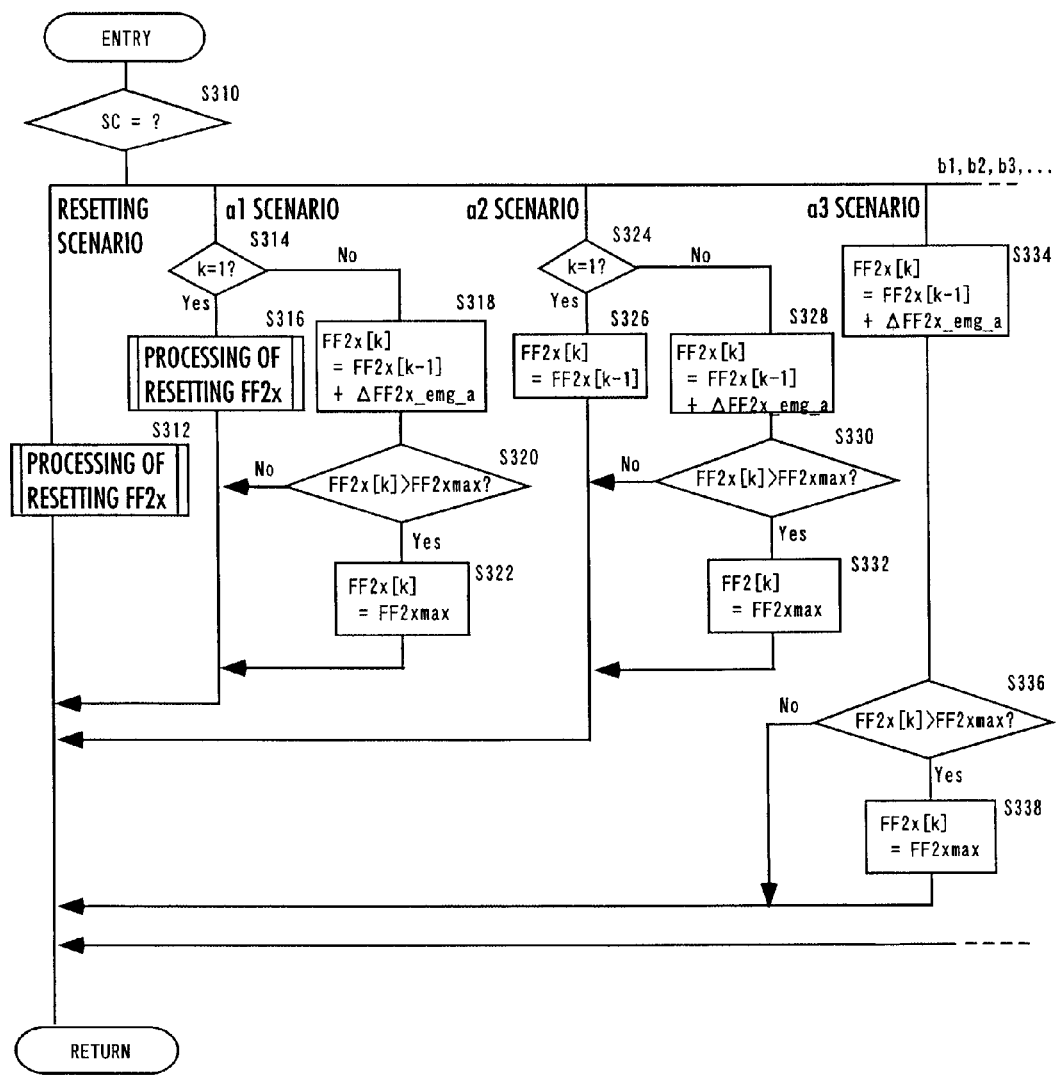
FIG. 10 It is a flowchart showing the subroutine processing of S218 in FIG. 9.
Figure 11:
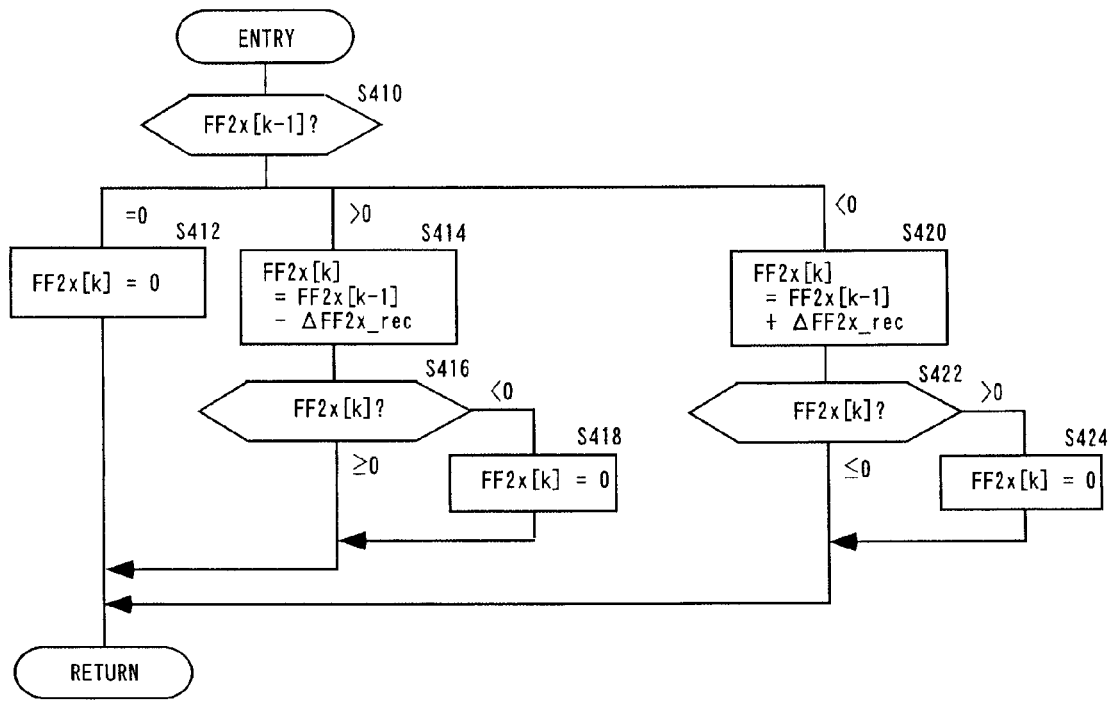
FIG. 11 It is a flowchart showing the subroutine processing of S312 and S316 in FIG. 10.
Figure 12:
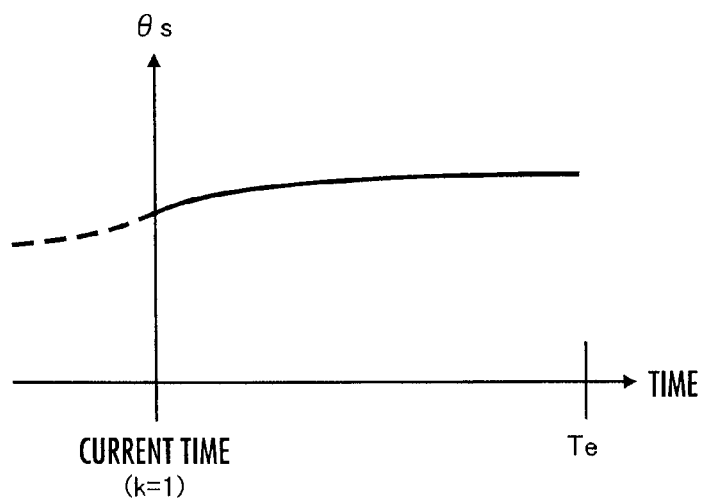
FIG. 12 It is a graph showing an example of preparing a future drive manipulation input (steering angle θs) in the first embodiment.
Figure 13A:
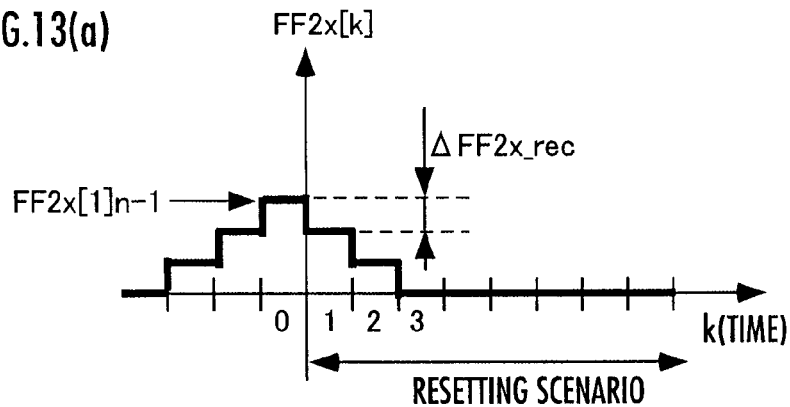
FIGS. 13(a) to (d) are graphs for explaining how to determine a second feedforward amount FF2 in the first embodiment.
Figure 13B:
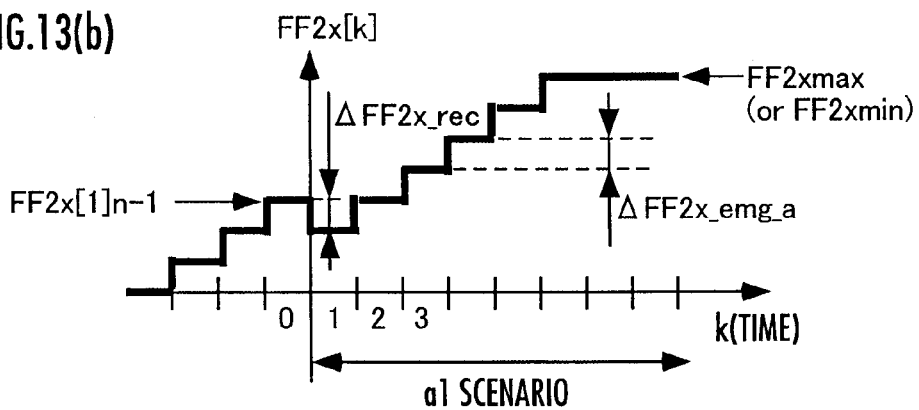
Figure 13C:
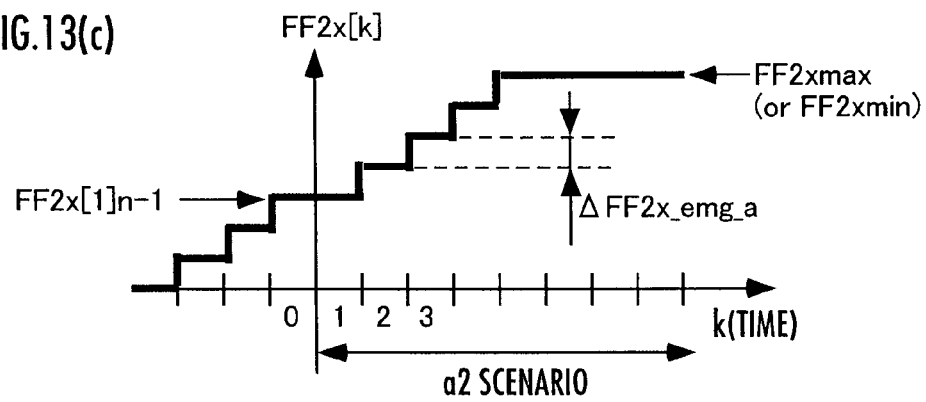
Figure 13D:
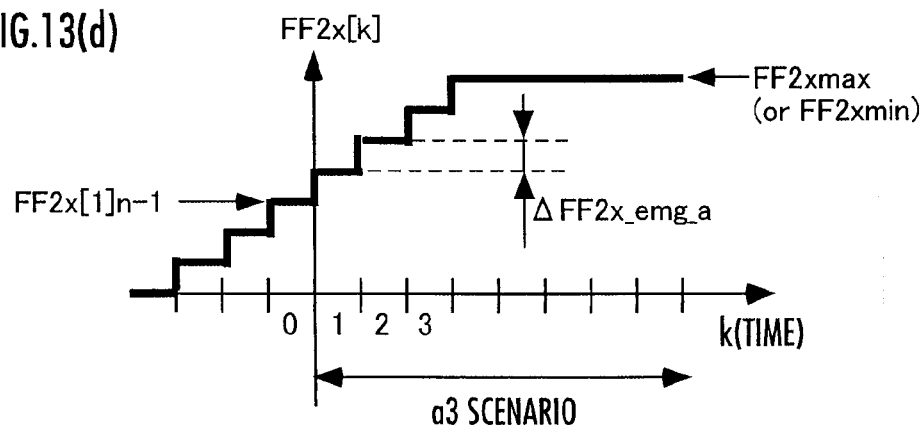
Figure 14:
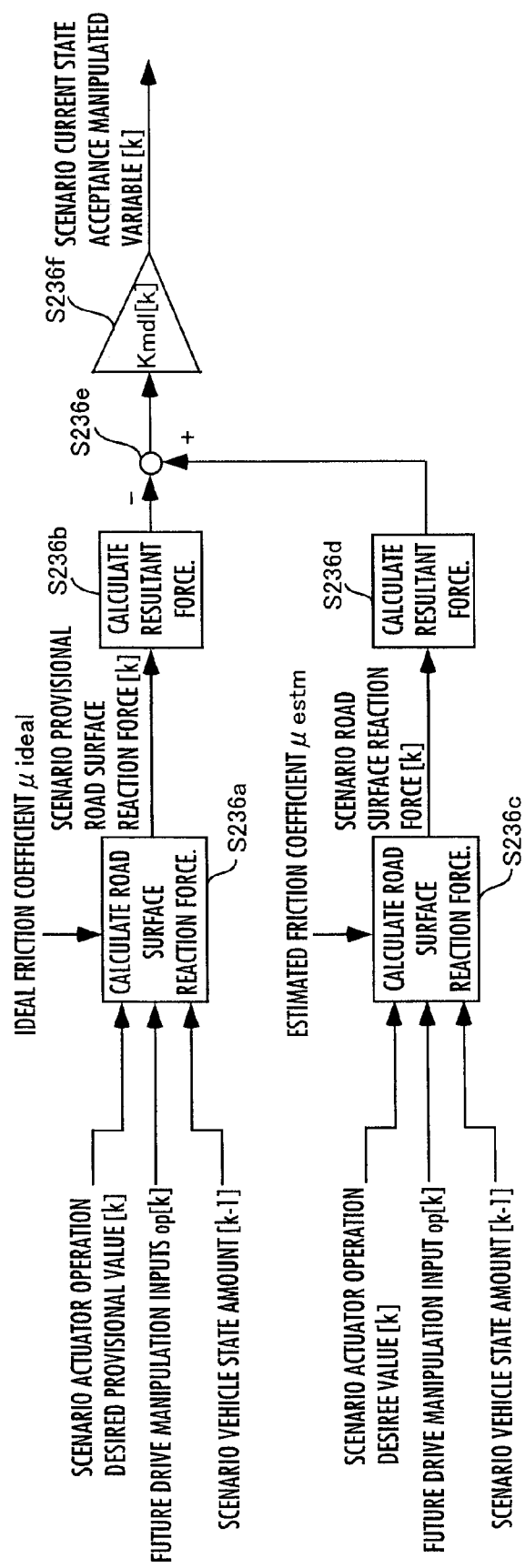
FIG. 14 It is a block diagram showing the processing for determining a scenario current state acceptance manipulated variable in the first embodiment.
Figure 15:
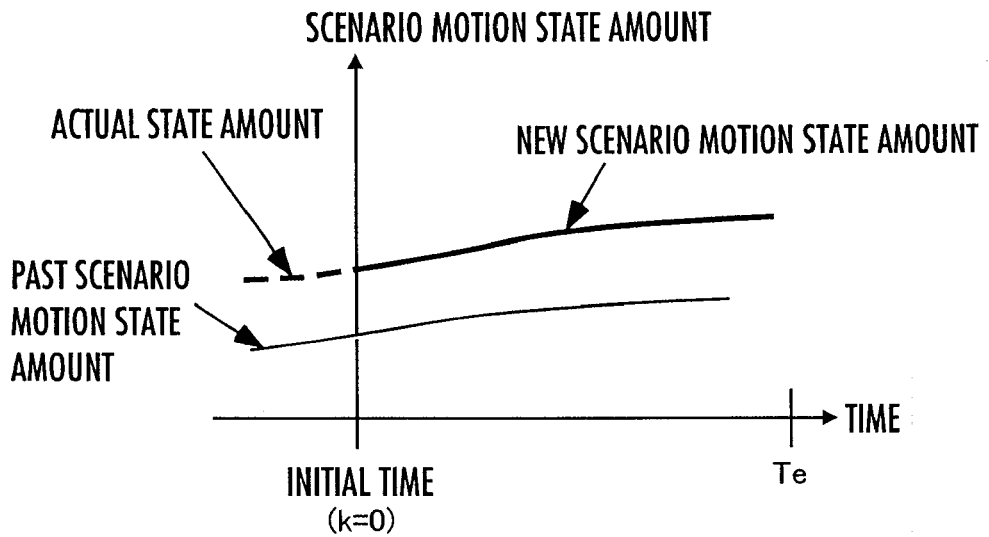
FIG. 15 It is a graph showing an example of preparing a scenario motion state amount in the first embodiment.
Figure 16:
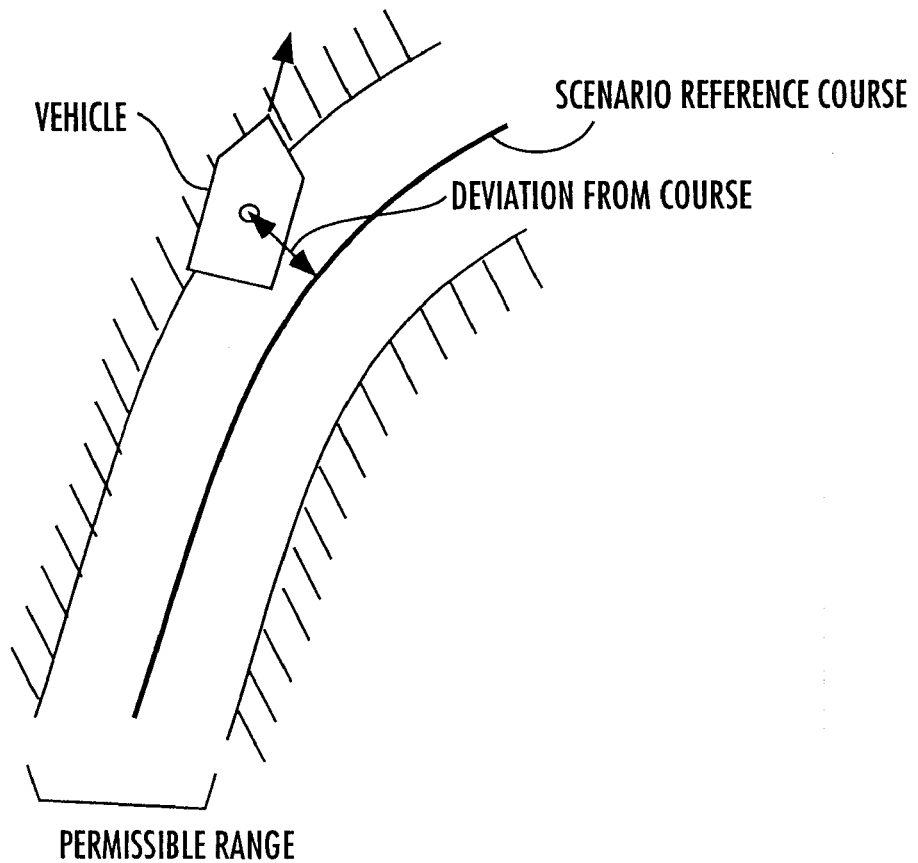
FIG. 16 It is a diagram for explaining the deviation from a course in the first embodiment.
Figure 18A:
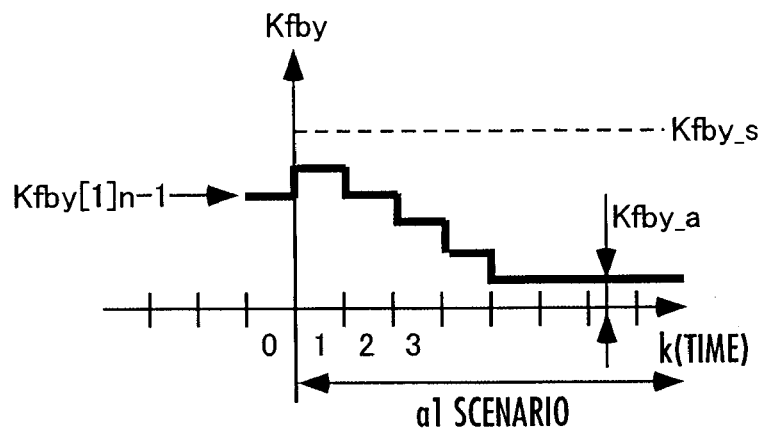
FIGS. 18(a) to (c) are graphs for explaining how to set a gain Kfby of a feedback law in the second embodiment if the deviation of a vehicle from a course occurs.
Figure 18B:
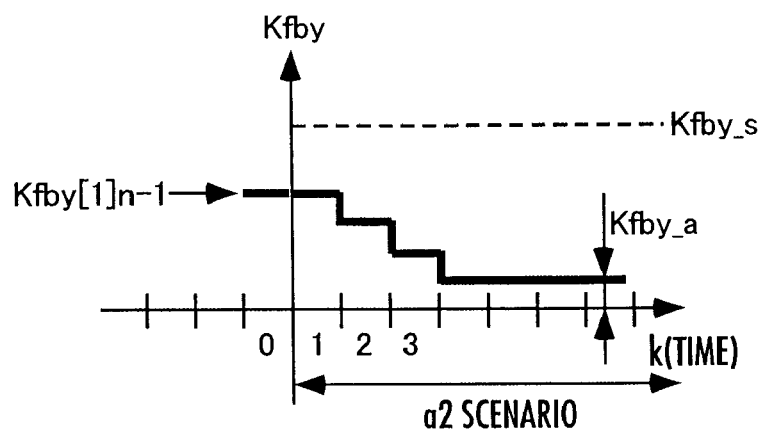
Figure 18C:
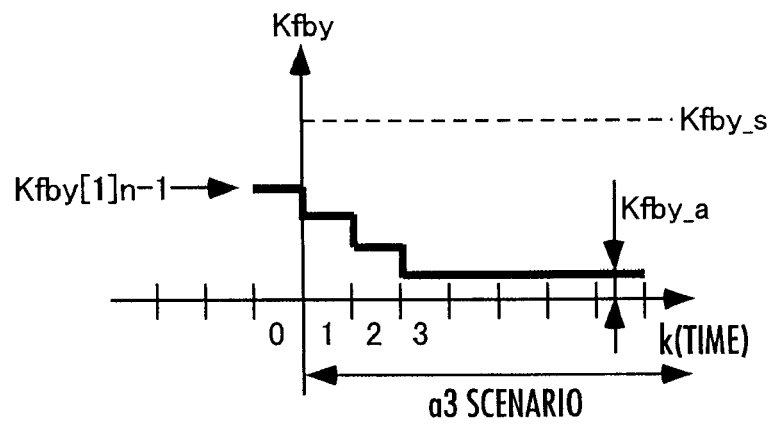
Figure 19A:
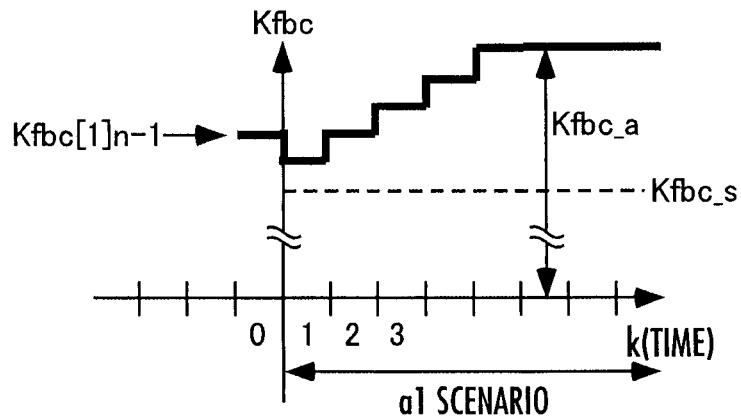
FIGS. 19(a) to (c) are graphs for explaining how to set a gain Kfbc of the feedback law in the second embodiment if the deviation of a vehicle from a course occurs.
Figure 19B:
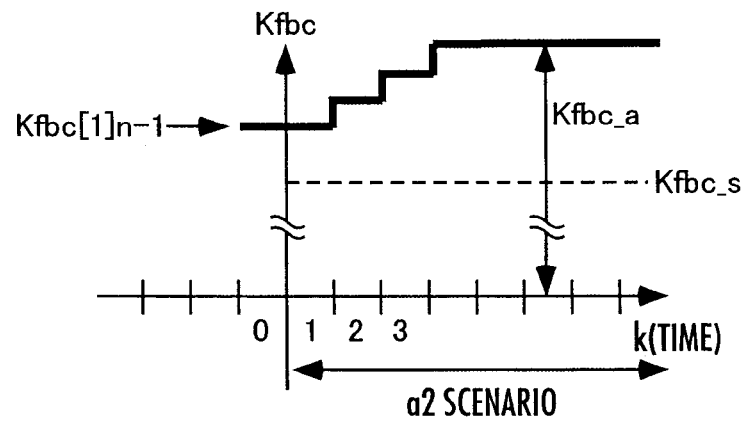
Figure 19C:
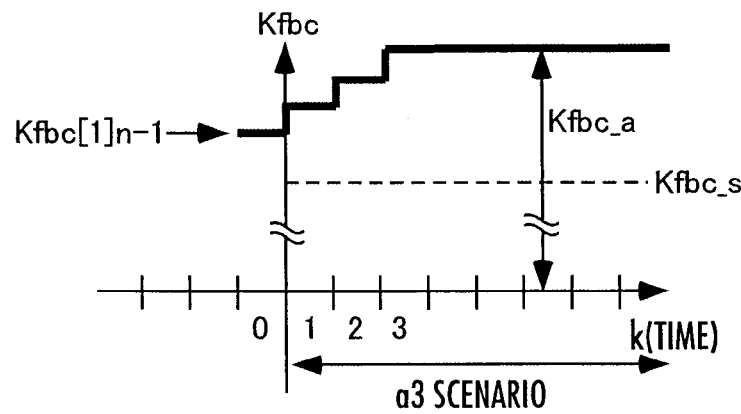
Figure 20A:
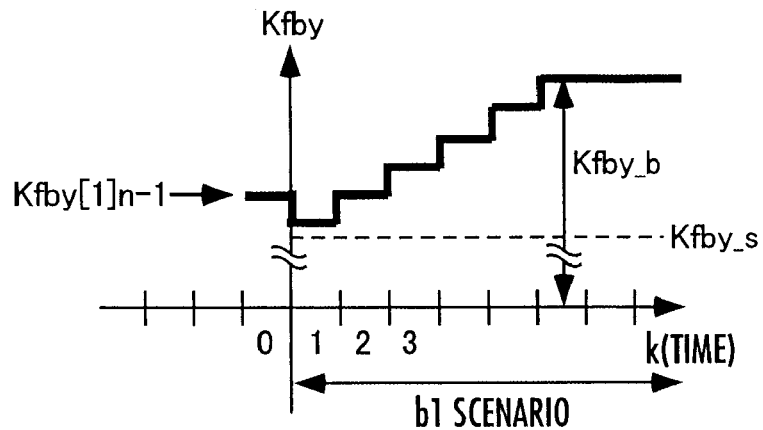
FIGS. 20(a) to (c) are graphs for explaining how to set the gain Kfby of the feedback law in the second embodiment if spinning of a vehicle occurs.
Figure 20B:
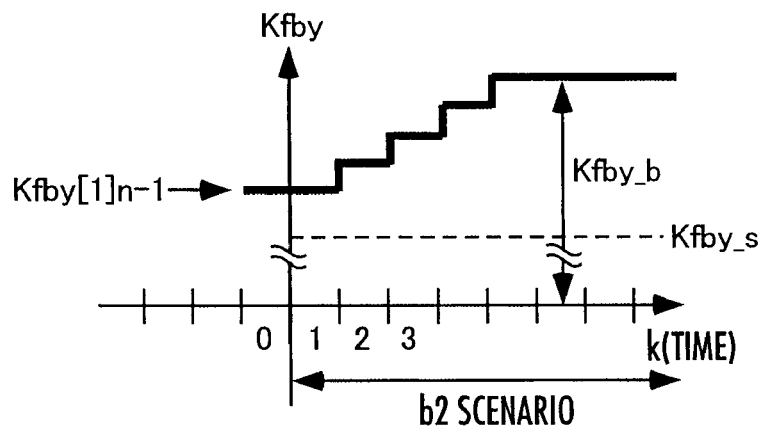
Figure 20C:
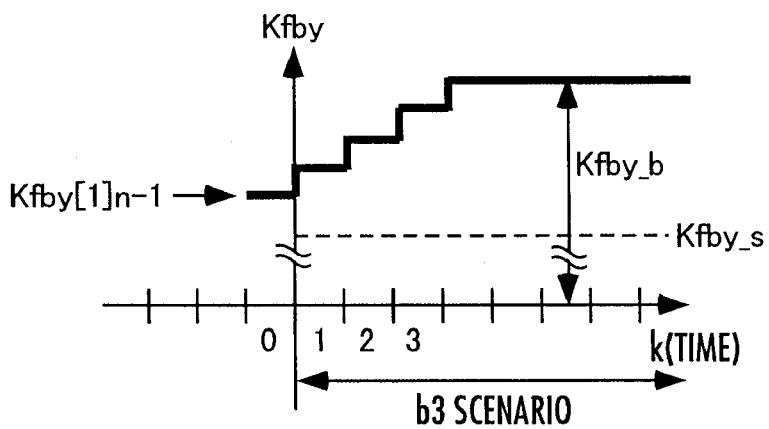
Figure 21A:
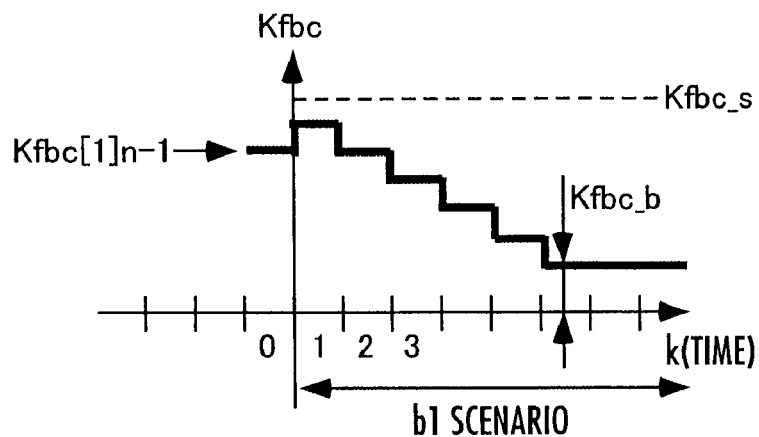
FIGS. 21(a) to (c) are graphs for explaining how to set the gain Kfbc of the feedback law in the second embodiment if spinning of a vehicle occurs.
Figure 21B:
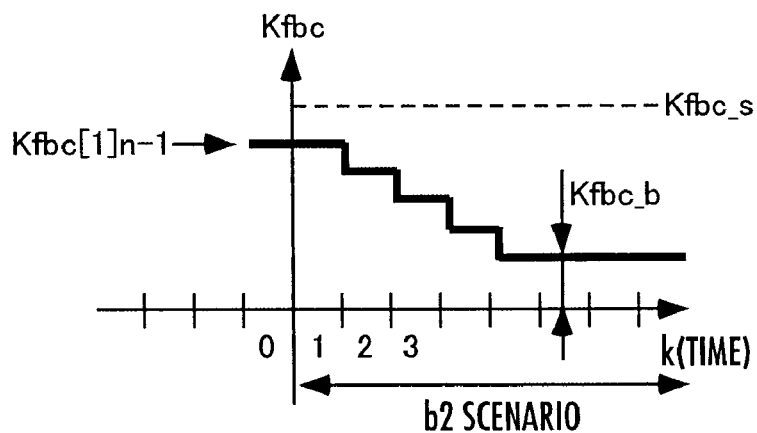
Figure 21C:
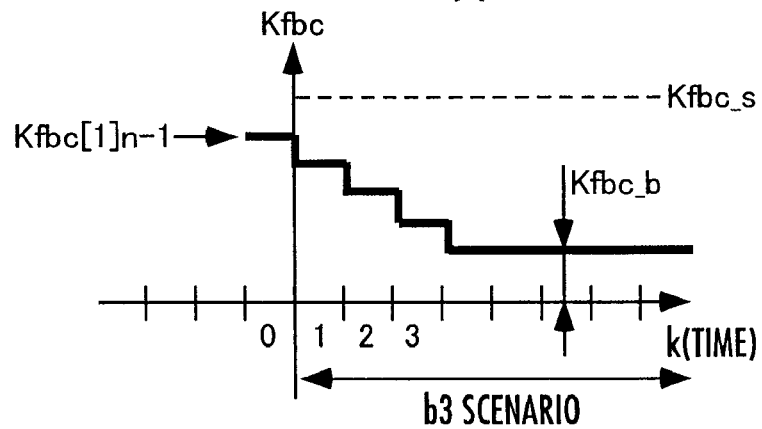
Figure 22A:
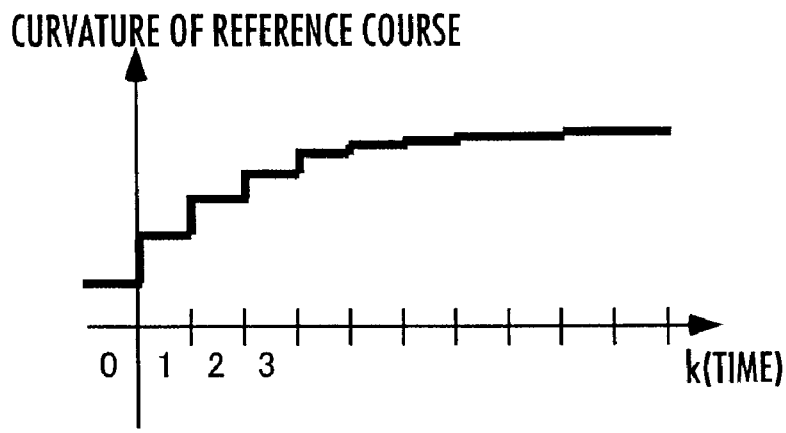
FIGS. 22(a) to (c) are graphs for explaining how to correct a reference course in the second embodiment.
Figure 22B:
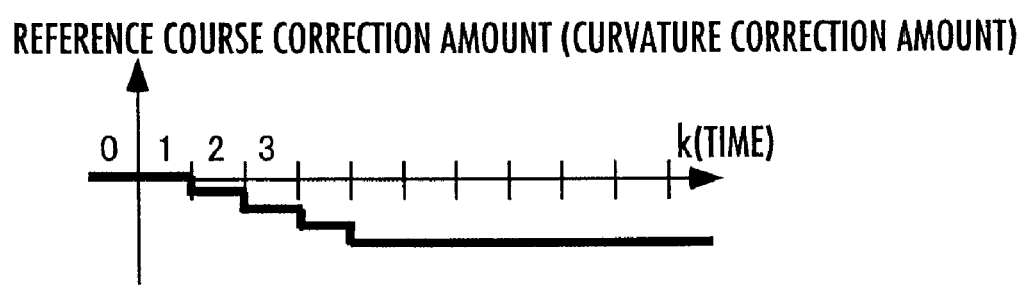
Figure 22C:
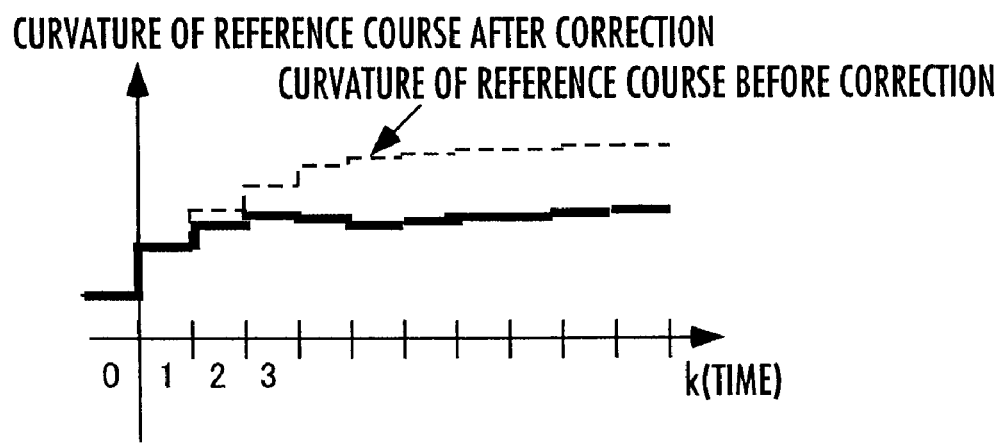
Figure 23:
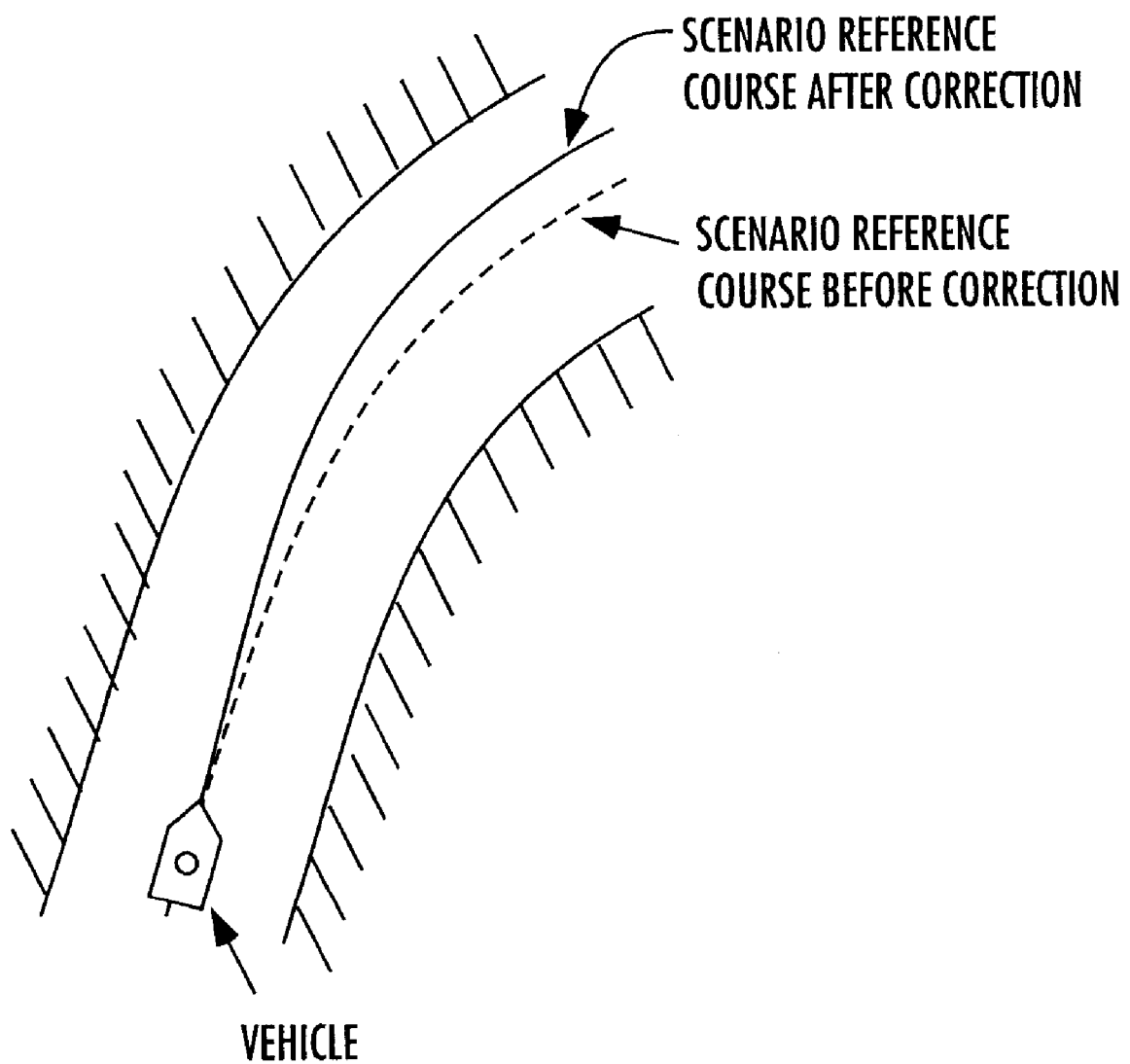
FIG. 23 It is a diagram showing an example of correcting the reference course in the second embodiment.
Figure 24:
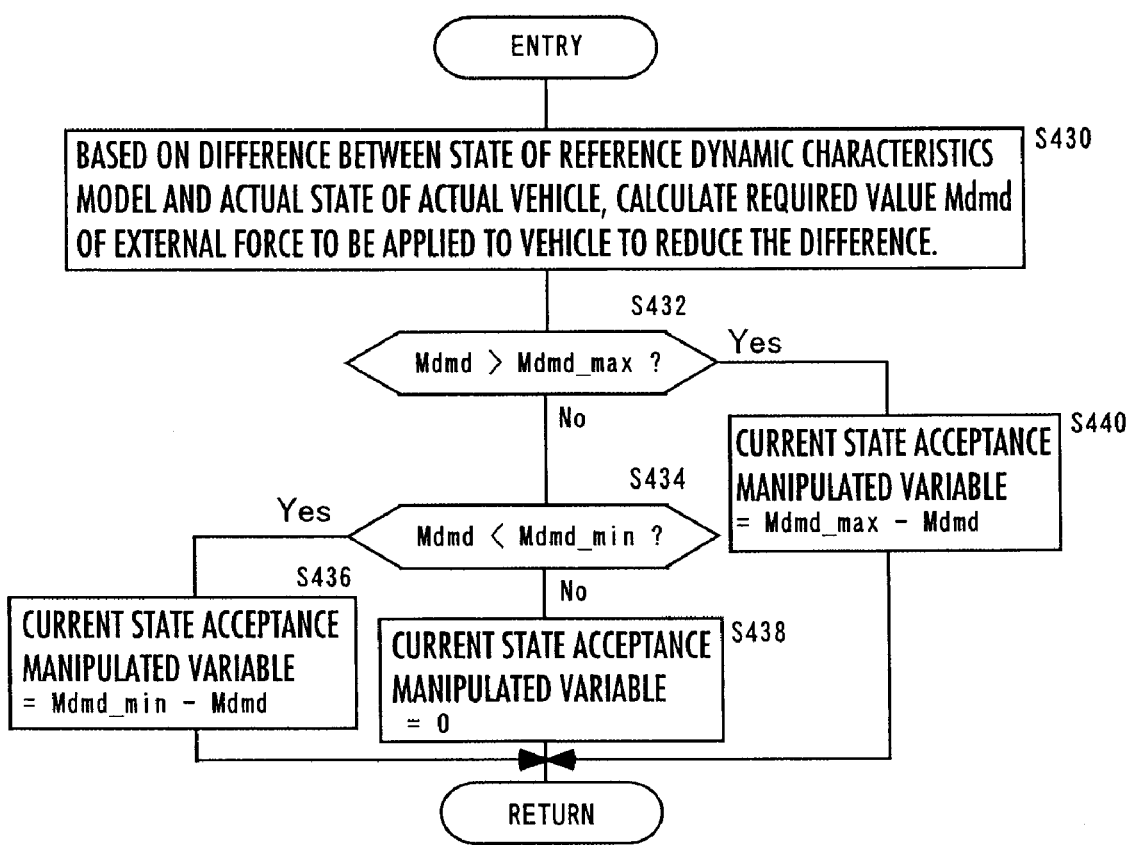
FIG. 24 It is a flowchart showing the processing for determining a current state acceptance manipulated variable in a third embodiment of the present invention.
Figure 25:
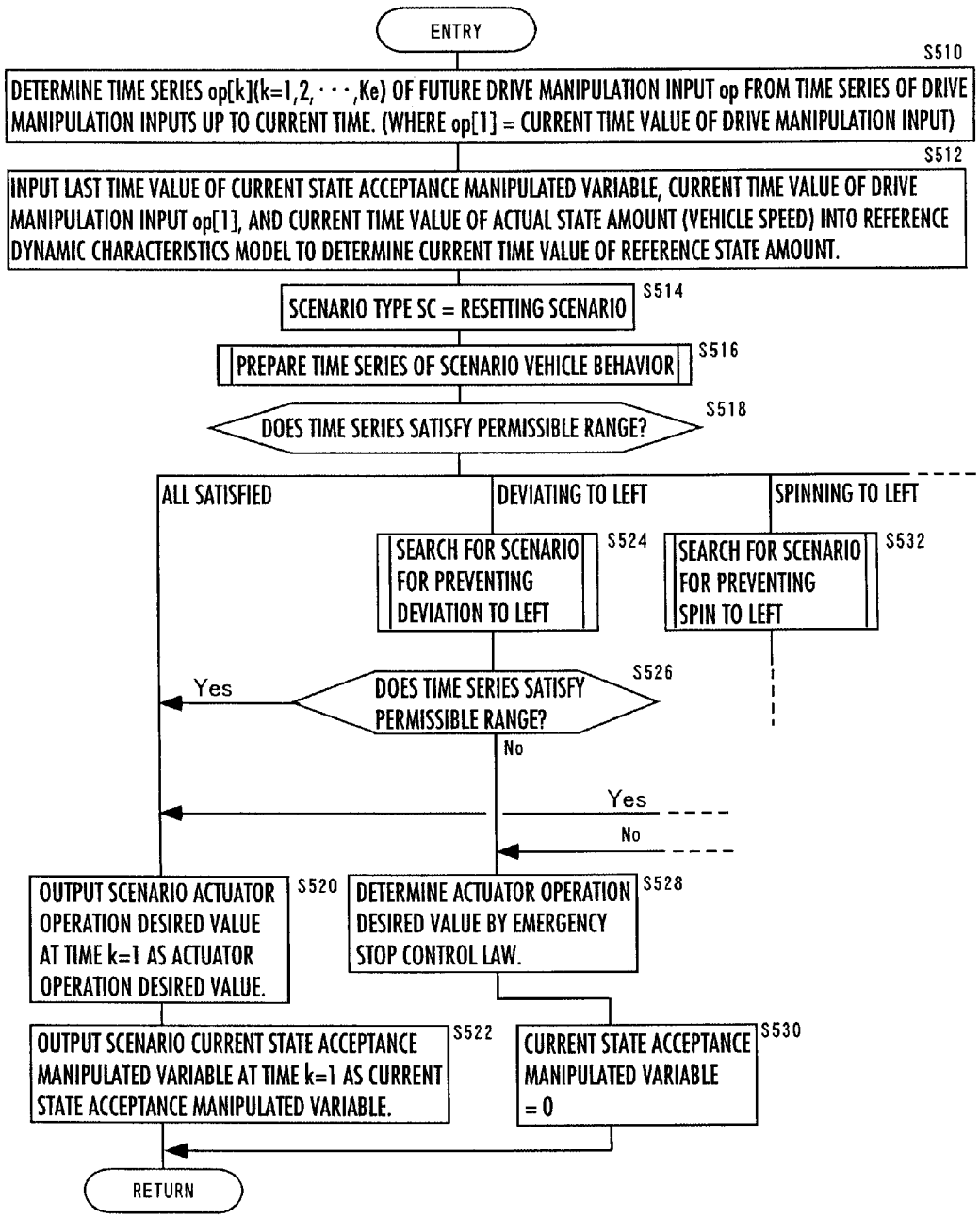
FIG. 25 It is a flowchart showing the processing by a scenario preparer and a reference dynamic characteristics model in a fourth embodiment of the present invention.
Figure 26:
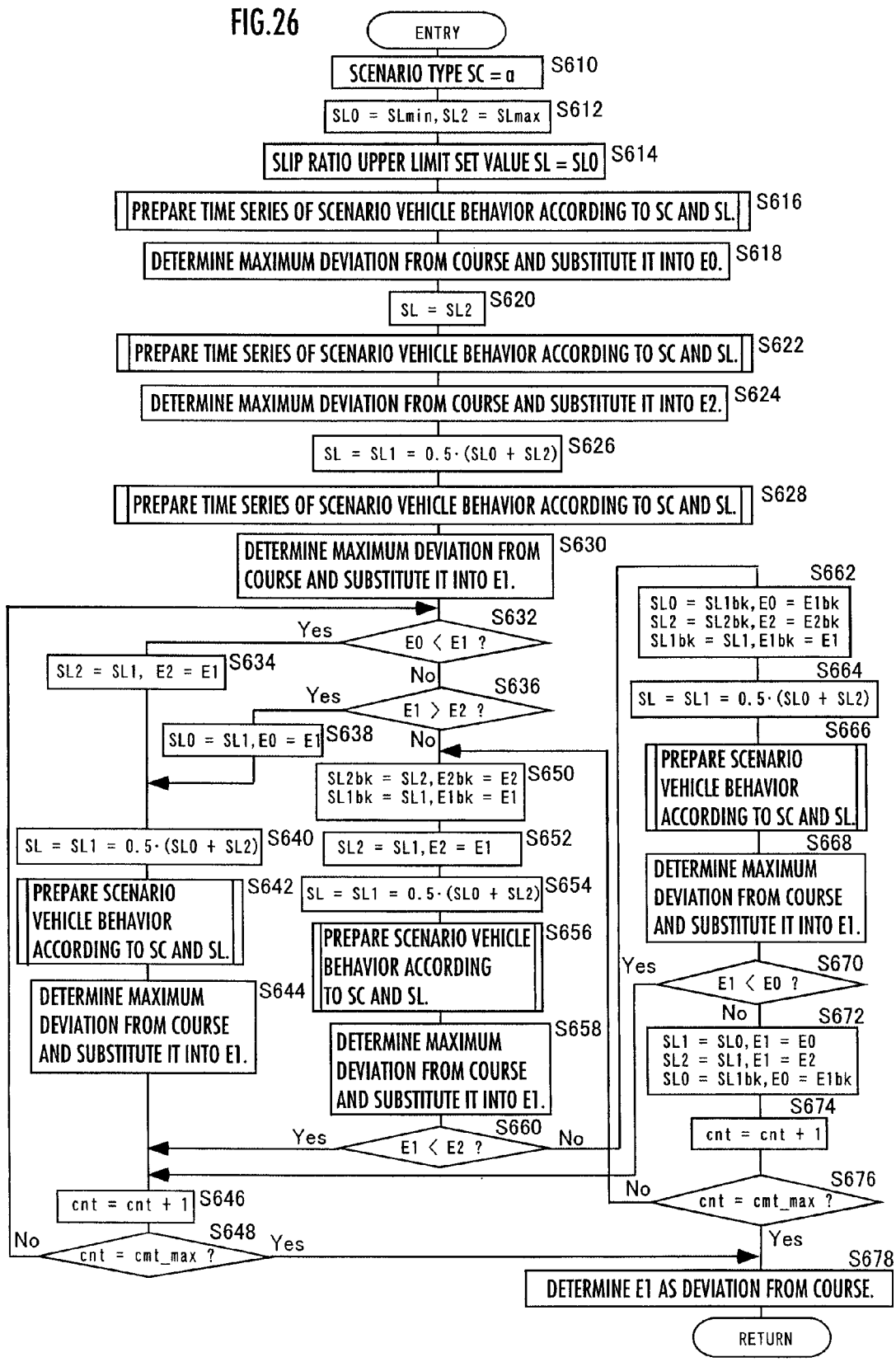
FIG. 26 It is a flowchart showing the subroutine processing of S524 in FIG. 25.
Figure 27:
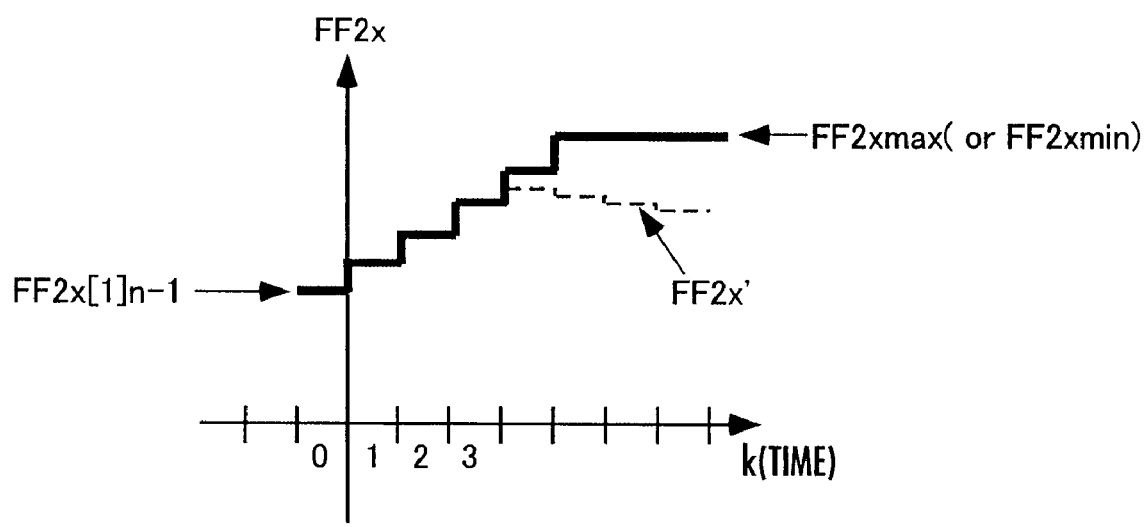
FIG. 27 It is a graph for explaining the processing of S616 in FIG. 26.
Figure 28A:
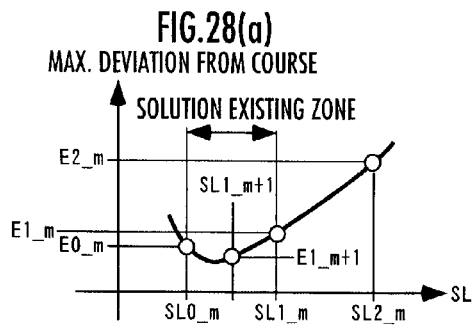
FIGS. 28(a) to (e) are graphs for explaining the processing of S632 to S678 in FIG. 26.
Figure 28B:
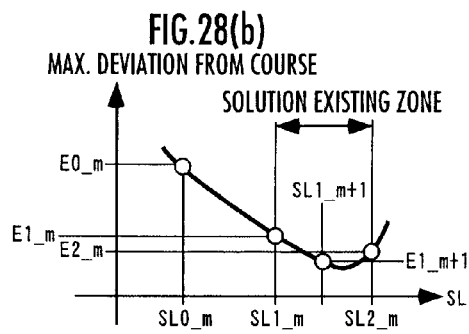
Figure 28C:
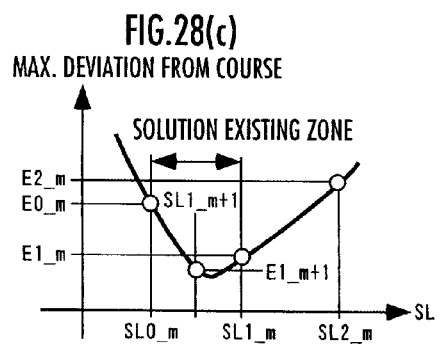
Figure 28D:
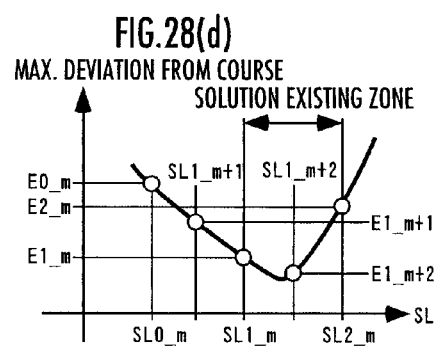
Figure 28E:
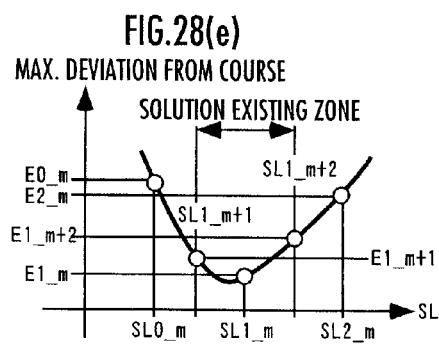

The invention claimed is:

1. A vehicle control device comprising:
an operating device with which a driver of a vehicle having a plurality of wheels drives the vehicle;
a drive manipulated variable detecting means which detects a drive manipulated variable expressing an operation state of the operating device by the driver;
an actuator provided in the vehicle so as to permit a motion of the vehicle to be made in response to an operation command;
an actuator controlling means which sequentially determines the operation command to the actuator on the basis of at least the drive manipulated variable and controls the operation of the actuator according to the determined operation command; and
an actual state amount grasping means which detects or estimates an actual state amount, which is a first state amount related to an actual motion of the vehicle,
wherein the actuator controlling means comprises:
a vehicle model which includes at least a friction model showing a relationship between slippage of the wheels and road surface reaction forces acting on the wheels, a dynamic model showing a relationship between motions of the vehicle and the road surface reaction forces, and a model showing the operating characteristics of the actuator;
a vehicle model initializing means which defines at least a first model state amount related to a motion of the vehicle on the vehicle model as a state amount to be initialized, and initializes a value of the state amount to be initialized at a current time or at a predetermined time in the vicinity thereof to a value determined on the basis of at least the actual state amount before the current time;
a future drive manipulated variable determining means which determines a time series of a future drive manipulated variable after the current time on the basis of at least the drive manipulated variable before the current time;
a first future vehicle behavior determining means which determines a future vehicle behavior, which is a future time series after the current time of a set of the operation command to the actuator of the vehicle model, the motion of the vehicle on the vehicle model to which the operation command has been given, a road surface reaction force, and the slippage of wheels, according to a predetermined first control law by using an initialized vehicle model, which is the vehicle model wherein at least the values of the determined time series of the future drive manipulated variable and the state amount to be initialized have been initialized; and an evaluating means which selects, as an evaluation object, at least one of the motion of the vehicle, a road surface reaction force, and the slippage of wheels in the future vehicle behavior, and evaluates whether the evaluation object satisfies a predetermined restrictive condition, wherein, when determining the operation command anew, the processing by the vehicle model initializing means, the future drive manipulated variable determining means, and the first future vehicle behavior determining means is carried out to determine the future vehicle behavior, and the processing by the evaluating means is also carried out on the evaluation object of the determined future vehicle behavior so as to determine a new operation command for the actuator on the basis of at least an evaluation result given by the evaluating means, and wherein the actuator controlling means comprises a second future vehicle behavior determining means which defines a first future vehicle behavior as the future vehicle behavior determined by the first future vehicle behavior determining means, the second future vehicle behavior determining means determining a second future vehicle behavior when the first future vehicle behavior evaluation object does not satisfy the predetermined restrictive condition, the second future vehicle behavior determined according to a predetermined second control law by using at least the initialized vehicle model, the second future vehicle behavior having a time series of the operation command with a pattern different from that of the time series of the operation command in the first future vehicle behavior, and when determining the operation command anew the new operation command is determined as the operation command at the current time in the first future vehicle behavior when the first future vehicle behavior evaluation object satisfies the predetermined restrictive condition, and the new operation command is determined on the basis of at least the evaluation result of the evaluation object of the second future vehicle behavior by processing carried out by the evaluating means on the second future vehicle behavior evaluation object when the first future vehicle behavior evaluation object does not satisfy the predetermined restrictive condition.

2. The vehicle control device according to claim 1, wherein the first future vehicle behavior determining means comprises a means for determining a future basic operation command, which is a time series of a basic value of the operation command in the future after the current time, on the basis of at least the time series of the future drive manipulated variable that has been determined, and the first control law for the first future vehicle behavior determining means to determine the first future vehicle behavior is a control law for determining the first future vehicle behavior such that at least the difference between an operation command at the current time in the first future vehicle behavior and the basic value at the current time in the determined future basic operation command approximates zero or coincides with zero, and the second control law for the second future vehicle behavior determining means to determine the second future vehicle behavior is a control law which defines the difference between an operation command at the current time in the second future vehicle behavior and the basic value at the current time in the determined future basic operation command as $\Delta 2(1)$, defines the difference between an operation command at the next time following the current time in the second future vehicle behavior and the basic value at the next time following the current time in the determined future basic operation command as $\Delta 2(2)$, defines the difference between an operation command at the current time in the first future vehicle behavior and the basic value at the current time in the determined future basic operation command as $\Delta 1(1)$, defines the difference between an operation command at the next time following the current time in the first future vehicle behavior and the basic value at the next time following the current time in the determined future basic operation command as $\Delta 1(2)$, and determines the second future vehicle behavior such that at least $\Delta 2(1)$ is farther away from zero than $\Delta 1(1)$ or $\Delta 2(2)$ is farther away from zero than $\Delta 1(2)$.

3. The vehicle control device according to claim 2, wherein the second control law for the second future vehicle behavior determining means to determine the second future vehicle behavior is a control law for determining the second future vehicle behavior such that the difference between an operation command at arbitrary time k of the second future vehicle behavior and the basic value at the time k in the determined future basic operation command gradually moves away from zero as the time k proceeds.

4. The vehicle control device according to claim 1, wherein the first control law for the first future vehicle behavior determining means to determine the first future vehicle behavior includes processing for restricting each value of the time series of an operation command in the first future vehicle behavior such that, when each value of the time series of an operation command in the first future vehicle behavior is input to the initialized vehicle model in a time series manner from the current time side to carry out arithmetic processing of the initialized vehicle model, at least one of the road surface reaction force and the slippage of a wheel determined by the arithmetic processing falls within a predetermined permissible range, and the second control law for the second future vehicle behavior determining means to determine the second future vehicle behavior includes processing for restricting each value of the time series of an operation command in the second future vehicle behavior such that, when each value of the time series of an operation command in the second future vehicle behavior is input to the initialized vehicle model in a time series manner from the current time side to carry out arithmetic processing of the initialized vehicle model, at least one of the road surface reaction force and the slippage of a wheel determined by the arithmetic processing falls within the predetermined permissible range.

5. The vehicle control device according to claim 1, wherein the first control law for the first future vehicle behavior determining means to determine the first future vehicle behavior includes processing for determining each provisional value of the time series of an operation command in the first future vehicle behavior according to a predetermined 1a-th rule on the basis of at least the time series of the future drive manipulated variable that has been determined, processing for inputting each provisional value of the determined operation command of the first future vehicle behavior in the time series manner from the current time side into the initialized vehicle model and carrying out the arithmetic processing of the initialized vehicle model thereby to determine, as a restriction object, at least one of the road surface reaction force and the slippage of a wheel to be combined with each provisional value of the time series of the operation command into a set, processing for determining whether the determined restriction object deviates from a predetermined permissible range, and processing for determining the provisional value as a value constituting the time series of an operation command in the first future vehicle behavior if the restriction object to be combined with the provisional value into a set with respect to each provisional value of the time series of the operation command in the first future vehicle behavior does not deviate from the predetermined permissible range, or for determining a value obtained by correcting the provisional value according to a predetermined 1b-th rule such that the restriction object that has deviated falls within or approaches to a state to fall within the predetermined permissible range as a value constituting the time series of the operation command in the first future vehicle behavior if the restriction object to be combined with the provisional value into a set deviates from the predetermined permissible range, and the second control law for the second future vehicle behavior determining means to determine the second future vehicle behavior includes processing for determining each provisional value of the time series of the operation command in the second future vehicle behavior according to a predetermined 2a-th rule, processing for inputting each provisional value of the determined operation command of at least the second future vehicle behavior in the time series manner from the current time side into the initialized vehicle model and carrying out the arithmetic processing of the initialized vehicle model thereby to determine, as a restriction object, at least one of the road surface reaction force and the slippage of a wheel to be combined with each provisional value of the time series of the operation command of the second future vehicle behavior into a set, processing for determining whether the determined restriction object deviates from a predetermined permissible range, and processing for determining the provisional value as a value constituting the time series of an operation command in the second future vehicle behavior if the restriction object to be combined with the provisional value into a set with respect to each provisional value of the time series of the operation command in the second future vehicle behavior does not deviate from the predetermined permissible range, or for determining a value obtained by correcting the provisional value according to a predetermined 2b-th rule such that the restriction object that has deviated falls within or approaches to a state to fall within the predetermined permissible range as a value constituting the time series of the operation command in the second future vehicle behavior if the restriction object to be combined with the provisional value into a set deviates from the predetermined permissible range.

6. The vehicle control device according to claim 5, wherein the first future vehicle behavior determining means comprises a means for determining a future basic operation command, which is the time series of a basic value of the operation command in the future after the current time, on the basis of at least the time series of the determined future drive manipulated variable, the 1a-th rule for the first future vehicle behavior determining means to determine each provisional value of a time series of an operation command in the first future vehicle behavior is a rule for determining each provisional value of the time series of the operation command in the first future vehicle behavior such that at least the difference between an operation command at the current time in the first future vehicle behavior and the basic value at the current time in the determined future basic operation command approaches to zero or coincides with zero, and the 2a-th rule for the second future vehicle behavior determining means to determine each provisional value of a time series of an operation command of the second future vehicle behavior is a rule which defines the difference between an operation command at the current time in the second future vehicle behavior and the basic value at the current time in the determined future basic operation command as $\Delta 2(1)$, defines the difference between an operation command at the next time following the current time in the second future vehicle behavior and the basic value at the next time following the current time in the determined future basic operation command as $\Delta 2(2)$, defines the difference between an operation command at the current time in the first future vehicle behavior and the basic value at the current time in the determined future basic operation command as $\Delta 1(1)$, defines the difference between an operation command at the next time following the current time in the first future vehicle behavior and the basic value at the next time following the current time in the determined future basic operation command as $\Delta 1(2)$, and determines each provisional value of the time series of the operation command of the second future vehicle behavior such that at least $\Delta 2(1)$ is farther away from zero than $\Delta 1(1)$ or $\Delta 2(2)$ is farther away from zero than $\Delta 1(2)$.

7. The vehicle control device according to claim 6, wherein the 2a-th rule for the second future vehicle behavior determining means to determine each provisional value of the time series of the operation command of the second future vehicle behavior is a rule for determining each provisional value of the time series of the operation command of the second future vehicle behavior such that the difference between an operation command at arbitrary time k of the second future vehicle behavior and the basic value at the time k in the determined future basic operation command gradually moves away from zero as the time k proceeds.

8. The vehicle control device according to claim 1, wherein the actuator controlling means comprises a first reference state determining means for sequentially determining a reference state before the current time, which is a reference state up to the current time with respect to a predetermined second state amount related to the vehicle motion, on the basis of at least the drive manipulated variable detected by the drive manipulated variable detecting means before the current time, and a second reference state determining means for determining a future reference state, which is a reference state in the future after the current time with respect to the second state amount, on the basis of at least a time series of the future drive manipulated variable that has been determined and the determined reference state before the current time, the first control law for the first future vehicle behavior determining means to determine the first future vehicle behavior is a control law for determining the first future vehicle behavior such that, when each value of the time series of an operation command in the first future vehicle behavior is input to the initialized vehicle model in a time series manner from the current time side to carry out arithmetic processing of the initialized vehicle model, the second state amount related to the vehicle motion determined by the arithmetic processing approaches to the determined future reference state, and the second control law for the second future vehicle behavior determining means to determine the second future vehicle behavior is a control law for determining the second future vehicle behavior such that, when each value of the time series of an operation command in the second future vehicle behavior is input to the initialized vehicle model in a time series manner from the current time side to carry out arithmetic processing of the initialized vehicle model, the second state amount related to the vehicle motion determined by the arithmetic processing approaches to the determined future reference state.

9. The vehicle control device according to claim 8, wherein an operation command at arbitrary time k in the first future vehicle behavior determined by the first future vehicle behavior determining means is a resultant value of a first feedforward component and a first feedback component, the first control law for the first future vehicle behavior determining means to determine the first future vehicle behavior is a control law which includes processing for determining the first feedforward component of the operation command at time k in the first future vehicle behavior according to a predetermined first feedforward control law on the basis of at least the value of a drive manipulated variable at time k or time k−1 in the time series of the determined future drive manipulated variable, processing for determining the first feedback component of the operation command at time k in the first future vehicle behavior according to a predetermined first feedback control law on the basis of the difference between a value at time k−1 in a second model state amount related to a vehicle motion on the initialized vehicle model and a value at time k or time k−1 of the determined future reference state such that the difference is brought close to zero, and processing for combining the first feedforward component and the first feedback component at time k in the first future vehicle behavior to determine an operation command at the time k, and an operation command at arbitrary time k in the second future vehicle behavior determined by the second future vehicle behavior determining means is a resultant value of a second feedforward component and a second feedback component, the second control law for the second future vehicle behavior determining means to determine the second future vehicle behavior is a control law which includes processing for determining the second feedforward component of the operation command at time k in the second future vehicle behavior according to a predetermined second feedforward control law, processing for determining the second feedback component of the operation command at time k in the second future vehicle behavior according to a predetermined second feedback control law on the basis of the difference between a value at time k−1 in the second model state amount related to the vehicle motion on the initialized vehicle model and a value at time k or time k−1 of the determined future reference state such that the difference is brought close to zero, and processing for combining the second feedforward component and the second feedback component at time k in the second future vehicle behavior to determine an operation command at the time k.

10. The vehicle control device according to claim 9, wherein the first feedforward component of the operation command at arbitrary time k in the first future vehicle behavior determined by the first future vehicle behavior determining means is constituted of a basic feedforward component and a first auxiliary feedforward component, and the first feedforward control law of the first future vehicle behavior determining means is a control law which includes processing for determining the basic feedforward component of the operation command at arbitrary time k in the first future vehicle behavior on the basis of at least a value of a drive manipulated variable at time k or time k−1 in the time series of the determined future drive manipulated variable and processing for determining the first auxiliary feedforward component of an operation command at each time of the first future vehicle behavior in a predetermined pattern that causes at least the first auxiliary feedforward component at the current time in the first future vehicle behavior to approach more to zero than a value of the first auxiliary feedforward component at time immediately preceding the current time at which the actuator controlling means attempts to determine a new operation command or to coincide with zero, and the second feedforward component of an operation command at arbitrary time k in the second future vehicle behavior determined by the second future vehicle behavior determining means is constituted of the basic feedforward component and a second auxiliary feedforward component, and the second feedforward control law of the second future vehicle behavior determining means is a control law which includes processing which defines the second auxiliary feedforward components at the current time and the next time following the current time in the second future vehicle behavior as $FF2\_2(1)$ and $FF2\_2(2)$, respectively, and the first auxiliary feedforward components at the current time and the next time following the current time in the first future vehicle behavior as $FF2\_1(1)$ and $FF2\_1(2)$, respectively, and determines a second auxiliary feedforward component of an operation command at each time of the second future vehicle behavior in a predetermined pattern that causes at least $FF2\_2(1)$ to be farther away from zero than $FF2\_1(1)$ and $FF2\_2(2)$ to be farther away from zero than $FF2\_1(2)$.

11. The vehicle control device according to claim 10, wherein the second feedforward control law of the second future vehicle behavior determining means is a control law for determining the second auxiliary feedforward component of an operation command at arbitrary time k of the second future vehicle behavior such that it gradually moves away from zero as the time k proceeds.

12. The vehicle control device according to claim 10, wherein the first control law for the first future vehicle behavior determining means further includes processing for taking, as a provisional value, each value of the time series of an operation command obtained by combining the first feedforward component and the first feedback component at time k in the first future vehicle behavior and inputting the provisional value in the time series manner from the current time side into the initialized vehicle model and carrying out the arithmetic processing of the initialized vehicle model thereby to determine, as a restriction object, at least one of the road surface reaction force and the slippage of a wheel to be combined with each value of the time series of the operation command into a set, processing for determining whether the determined restriction object deviates from a predetermined permissible range, and processing for determining the provisional value as a value constituting the time series of an operation command in the future vehicle behavior if the restriction object to be combined with the provisional value into a set with respect to each of the provisional values of the time series of the operation command in the first future vehicle behavior does not deviate from the predetermined permissible range, or for determining each value of an operation command in the future vehicle behavior by correcting the first auxiliary feedforward component in the provisional value according to a predetermined rule such that the restriction object that has deviated falls within or approaches to a state to fall within the predetermined permissible range if the restriction object to be combined with the provisional value into a set deviates from the predetermined permissible range, and the second control law for the second future vehicle behavior determining means further includes processing for taking, as a provisional value, each value of the time series of an operation command obtained by combining the second feedforward component and the second feedback component at time k in the second future vehicle behavior and inputting the provisional value in the time series manner from the current time side into the initialized vehicle model and carrying out the arithmetic processing of the initialized vehicle model thereby to determine, as a restriction object, at least one of the road surface reaction force and the slippage of a wheel to be combined with each value of the time series of the operation command into a set, processing for determining whether the determined restriction object deviates from a predetermined permissible range, and processing for determining the provisional value as a value constituting the time series of an operation command in the future vehicle behavior if the restriction object to be combined with the provisional value into a set with respect to each of the provisional values of the time series of the operation command in the second future vehicle behavior does not deviate from the predetermined permissible range, or for determining each value of an operation command in the future vehicle behavior by correcting the second auxiliary feedforward component in the provisional value according to a predetermined rule such that the restriction object that has deviated falls within or approaches to a state to fall within the predetermined permissible range if the restriction object to be combined with the provisional value into a set deviates from the predetermined permissible range.

13. The vehicle control device according to claim 12, wherein if a difference between one of the provisional value at the current time of the operation command of the first future vehicle behavior in a case where an operation command at the current time of the first future vehicle behavior determined by the first future vehicle behavior determining means is determined as the new operation command and the provisional value at the current time of the operation command of the second future vehicle behavior in a case where an operation command at the current time of the second future vehicle behavior determined by the second future vehicle behavior determining means is determined as the new operation command, and a new operation command is defined as an error for determining a virtual external force, then the first reference state determining means determines, when determining anew a reference state before the current time, the new reference state before the current time on the basis of at least the drive manipulated variable detected by the drive manipulated variable detecting means and a virtual external force determined on the basis of the error for determining the virtual external force such that the difference approaches to zero.

14. The vehicle control device according to claim 9, wherein the first future vehicle behavior determining means comprises a means for setting a feedback gain of the first feedback control law at each time in the future vehicle behavior in a predetermined pattern that causes at least a feedback gain of the first feedback control law at the current time in the future vehicle behavior to approach more to a predetermined reference gain than a feedback gain value at time immediately preceding the current time at which the actuator controlling means attempts to determine a new operation command or to coincide with the reference gain, and the second future vehicle behavior determining means comprises a means for setting a feedback gain of the second feedback control law at each time of the second future vehicle behavior in a predetermined pattern wherein, when the feedback gains of the second feedback control law at the current time and the next time following the current time in the second future vehicle behavior are defined as $Kfb\_2(1)$ and $Kfb\_2(2)$, respectively, and the feedback gains of the first feedback control law at the current time and the next time following the current time in the first future vehicle behavior are defined as $Kfb\_1(1)$ and $Kfb\_1(2)$, respectively, at least $Kfb\_2(1)$ is farther away from the reference gain than $Kfb\_1(1)$ or $Kfb\_2(2)$ is farther away from the reference gain than $Kfb\_1(2)$.

15. The vehicle control device according to claim 14, wherein the means for setting a feedback gain of the second feedback control law sets the feedback gain of a second feedback control law at arbitrary time k of the second future vehicle behavior such that it gradually moves away from the reference gain as the time k proceeds.

16. The vehicle control device according to claim 9, wherein the second reference state determining means comprises a means for determining a future basic reference state after the current time with respect to the second state amount on the basis of at least the time series of the future drive manipulated variable that has been determined and the determined reference state before the current time, a means for determining a reference correction amount for correcting the basic reference state, and a means for determining the future reference state by correcting the determined basic reference state by the reference correction amount, and the means for determining the reference correction determines, when determining the first future vehicle behavior by the first future vehicle behavior determining means, the reference correction amount at each time of the future vehicle behavior according to a predetermined pattern that causes at least the reference correction amount at the current time in the first future vehicle behavior to approach more to zero than the value of a reference correction amount at time immediately preceding the current time at which the actuator controlling means attempts to determine a new operation command or to coincide with zero, and when determining the second future vehicle behavior by the second future vehicle behavior determining means, the means for determining the reference correction defines the reference correction amounts at the current time and the next time following the current time in the second future vehicle behavior as $C2(1)$ and $C2(2)$, defines the reference correction amounts at the current time and the next time following the current time in the first future vehicle behavior as $C1(1)$ and $C1(2)$, and determines the reference correction amount at each time of the second future vehicle behavior according to a predetermined pattern that causes at least $C2(1)$ to move farther away from zero than $C1(1)$ or $C2(2)$ to move farther away from zero than $C1(2)$.

17. The vehicle control device according to claim 16, wherein the means for determining the reference correction amount determines the reference correction amount at arbitrary time k of the second future vehicle behavior such that it gradually moves away from zero as the time k proceeds.

18. The vehicle control device according to claim 8, wherein the actual state amount grasping means comprises a means for detecting or estimating the second state amount related to an actual motion of the vehicle, and the first reference state determining means determines, when determining anew the reference state before the current time, a new reference state before the current time on the basis of at least the drive manipulated variable detected by the drive manipulated variable detecting means and a virtual external force determined on the basis of a difference between a past value of the reference state before the current time and the second state amount that has been detected or estimated such that the difference approaches to zero.

19. A vehicle control device comprising:

an operating device with which a driver of a vehicle having a plurality of wheels drives the vehicle;

a drive manipulated variable detecting means which detects a drive manipulated variable expressing an operation state of the operating device by the driver;

an actuator provided in the vehicle so as to permit a motion of the vehicle to be made in response to an operation command;

an actuator controlling means which sequentially determines the operation command to the actuator on the basis of at least the drive manipulated variable and controls the operation of the actuator according to the determined operation command; and an actual state amount grasping means which detects or estimates an actual state amount, which is a first state amount related to an actual motion of the vehicle, wherein the actuator controlling means comprises:

a vehicle model which includes at least a friction model showing a relationship between slippage of the wheels and road surface reaction forces acting on the wheels, a dynamic model showing a relationship between motions of the vehicle and the road surface reaction forces, and a model showing the operating characteristics of the actuator;

a vehicle model initializing means which defines at least a first model state amount related to a motion of the vehicle on the vehicle model as a state amount to be initialized, and initializes a value of the state amount to be initialized at a current time or at a predetermined time in the vicinity thereof to a value determined on the basis of at least the actual state amount before the current time;

a future drive manipulated variable determining means which determines a time series of a future drive manipulated variable after the current time on the basis of at least the drive manipulated variable before the current time;

a first future vehicle behavior determining means which determines a future vehicle behavior, which is a future time series after the current time of a set of the operation command to the actuator of the vehicle model, the motion of the vehicle on the vehicle model to which the operation command has been given, a road surface reaction force, and the slippage of wheels, according to a predetermined first control law by using an initialized vehicle model, which is the vehicle model wherein at least the values of the determined time series of the future drive manipulated variable and the state amount to be initialized have been initialized; and an evaluating means which selects, as an evaluation object, at least one of the motion of the vehicle, a road surface reaction force, and the slippage of wheels in the future vehicle behavior, and evaluates whether the evaluation object satisfies a predetermined restrictive condition, wherein, when determining the operation command anew, the processing by the vehicle model initializing means, the future drive manipulated variable determining means, and the first future vehicle behavior determining means is carried out to determine the future vehicle behavior, and the processing by the evaluating means is also carried out on the evaluation object of the determined future vehicle behavior so as to determine a new operation command for the actuator on the basis of at least an evaluation result given by the evaluating means, and wherein the actuator controlling means comprises:

a control law selecting means which defines, as a first future vehicle behavior, the future vehicle behavior determined by the first future vehicle behavior determining means, and selects a second control law for determining a second future vehicle behavior having a time series of the operation command with a pattern different from that of the time series of the operation command of the first future vehicle behavior, the second control law selected from among a predetermined plurality of types of control laws on the basis of a state of deviation of an evaluation object of the first future vehicle behavior from the restrictive condition when the evaluation object of the first future vehicle behavior does not satisfy the predetermined restrictive condition; and a second future vehicle behavior determining means which determines the second future vehicle behavior by using at least the initialized vehicle model according to the selected second control law, wherein, when determining the operation command anew, the new operation command is determined as the operation command at the current time in the first future vehicle behavior when the first future vehicle behavior evaluation object satisfies the predetermined restrictive condition, and the new operation command is determined on the basis of at least an evaluation result of the evaluation object of the second future vehicle behavior by processing carried out by the evaluating means on the second future vehicle behavior evaluation object when the first future vehicle behavior evaluation object does not satisfy the predetermined restrictive condition.

20. A vehicle control device comprising:

an operating device with which a driver of a vehicle having a plurality of wheels drives the vehicle;

a drive manipulated variable detecting means which detects a drive manipulated variable expressing an operation state of the operating device by the driver;

an actuator provided in the vehicle so as to permit a motion of the vehicle to be made in response to an operation command;

an actuator controlling means which sequentially determines the operation command to the actuator on the basis of at least the drive manipulated variable and controls the operation of the actuator according to the determined operation command; and an actual state amount grasping means which detects or estimates an actual state amount, which is a first state amount related to an actual motion of the vehicle, wherein the actuator controlling means comprises:

a vehicle model which includes at least a friction model showing a relationship between slippage of the wheels and road surface reaction forces acting on the wheels, a dynamic model showing a relationship between motions of the vehicle and the road surface reaction forces, and a model showing the operating characteristics of the actuator;

a vehicle model initializing means which defines at least a first model state amount related to a motion of the vehicle on the vehicle model as a state amount to be initialized, and initializes a value of the state amount to be initialized at a current time or at a predetermined time in the vicinity thereof to a value determined on the basis of at least the actual state amount before the current time;

a future drive manipulated variable determining means which determines a time series of a future drive manipulated variable after the current time on the basis of at least the drive manipulated variable before the current time;

a first future vehicle behavior determining means which determines a future vehicle behavior, which is a future time series after the current time of a set of the operation command to the actuator of the vehicle model, the motion of the vehicle on the vehicle model to which the operation command has been given, a road surface reaction force, and the slippage of wheels, according to a predetermined first control law by using an initialized vehicle model, which is the vehicle model wherein at least the values of the determined time series of the future drive manipulated variable and the state amount to be initialized have been initialized; and an evaluating means which selects, as an evaluation object, at least one of the motion of the vehicle, a road surface reaction force, and the slippage of wheels in the future vehicle behavior, and evaluates whether the evaluation object satisfies a predetermined restrictive condition, wherein, when determining the operation command anew, the processing by the vehicle model initializing means, the future drive manipulated variable determining means, and the first future vehicle behavior determining means is carried out to determine the future vehicle behavior, and the processing by the evaluating means is also carried out on the evaluation object of the determined future vehicle behavior so as to determine a new operation command for the actuator on the basis of at least an evaluation result given by the evaluating means, and wherein the actuator controlling means comprises an m-th future vehicle behavior determining means which defines, as a first future vehicle behavior, the future vehicle behavior determined by the first future vehicle behavior determining means, defines M as a predetermined integer value of 2 or more, and when the evaluation object of an (m−1)th (m: any integer that is 2≦m≦M) future vehicle behavior does not satisfy the predetermined restrictive condition, the m-th future vehicle behavior determining means determines the m-th future vehicle behavior having a time series of the operation command with a pattern different from that of the time series of the operation command of each of the first to the (m−1)th future vehicle behaviors according to a predetermined m-th control law by using at least the initialized vehicle model, and when determining the operation command anew, if the evaluation object of the (m−1)th future vehicle behavior satisfies the predetermined restrictive condition, then the operation command at the current time in the (m−1)th future vehicle behavior is determined as the new operation command, if the evaluation object of the (m−1)th future vehicle behavior does not satisfy the predetermined restrictive condition, then the processing for determining the m-th future vehicle behavior is carried out in order from m=2 by the m-th future vehicle behavior determining means, and if an M-th future vehicle behavior has been determined, then the new operation command is determined on the basis of at least an evaluation result given by the evaluating means on the evaluation object of the M-th future vehicle behavior.

21. The vehicle control device according to claim 20, wherein a plurality of sets of the second to the M-th control laws is prepared beforehand, the second to the M-th future vehicle behavior determining means select, from among the plurality of sets, a set of the second to the M-th control laws on the basis of the state of deviation of the determined first future vehicle behavior evaluation object from the predetermined restrictive condition, and any m-th future vehicle behavior determining means among the second to the M-th future vehicle behavior determining means determines the m-th future vehicle behavior according to the m-th control law out of the second to the M-th control laws of the selected set.

22. The vehicle control device according to claim 20, wherein the first future vehicle behavior determining means comprises a means for determining a future basic operation command, which is a time series of a basic value of the operation command in the future after the current time, on the basis of at least the time series of the future drive manipulated variable that has been determined, and the first control law according to which the first future vehicle behavior determining means determines the first future vehicle behavior is a control law for determining the first future vehicle behavior such that at least the difference between an operation command at the current time in the first future vehicle behavior and the basic value at the current time in the determined future basic operation command approximates zero or coincides with zero, and the m-th control law for the m-th future vehicle behavior determining means to determine the m-th future vehicle behavior is a control law which defines the difference between an operation command at the current time in the m-th future vehicle behavior and the basic value at the current time in the determined future basic operation command as $\Delta m(1)$, defines the difference between an operation command at the next time following the current time in the m-th future vehicle behavior and the basic value at the next time following the current time in the determined future basic operation command as $\Delta m(2)$, defines the difference between an operation command at the current time in the (m−1)th future vehicle behavior and the basic value at the current time in the determined future basic operation command as $\Delta m-1(1)$, defines the difference between an operation command at the next time following the current time in the (m−1)th future vehicle behavior and the basic value at the next time following the current time in the determined future basic operation command as $\Delta m-1(2)$, and determines the m-th future vehicle behavior such that at least $\Delta m(1)$ is farther away from zero than $\Delta m-1(1)$ or $\Delta m(2)$ is farther away from zero than $\Delta m-1(2)$.

23. The vehicle control device according to claim 22, wherein the m-th control law for the m-th future vehicle behavior determining means to determine the m-th future vehicle behavior is a control law for determining the m-th future vehicle behavior such that the difference between an operation command at arbitrary time k of the m-th future vehicle behavior and the basic value at the time k in the determined future basic operation command gradually moves away from zero as the time k proceeds.

24. The vehicle control device according to claim 20, wherein the first control law for the first future vehicle behavior determining means to determine the first future vehicle behavior includes processing for restricting each value of the time series of an operation command in the first future vehicle behavior such that, when each value of the time series of an operation command in the first future vehicle behavior is input to the initialized vehicle model in a time series manner from the current time side to carry out arithmetic processing of the initialized vehicle model, at least one of the road surface reaction force and the slippage of a wheel determined by the arithmetic processing falls within a predetermined permissible range, and the m-th control law for the m-th future vehicle behavior determining means to determine the m-th future vehicle behavior includes processing for restricting each value of the time series of an operation command in the m-th future vehicle behavior such that, when each value of the time series of an operation command in the m-th future vehicle behavior is input to the initialized vehicle model in a time series manner from the current time side to carry out arithmetic processing of the initialized vehicle model, at least one of the road surface reaction force and the slippage of a wheel determined by the arithmetic processing falls within a predetermined permissible range.

25. The vehicle control device according to claim 20, where the first control law for the first future vehicle behavior determining means to determine the first future vehicle behavior includes processing for determining each provisional value of the time series of the operation command in the first future vehicle behavior according to a predetermined 1a-th rule on the basis of at least the time series of the future drive manipulated variable that has been determined, processing for inputting each provisional value of the determined operation command of the first future vehicle behavior in the time series manner from the current time side into the initialized vehicle model and carrying out the arithmetic processing of the initialized vehicle model thereby to determine, as a restriction object, at least one of the road surface reaction force and the slippage of a wheel to be combined with each provisional value of the time series of the operation command into a set, processing for determining whether the determined restriction object deviates from a predetermined permissible range, and processing for determining the provisional value as a value constituting the time series of an operation command in the first future vehicle behavior if the restriction object to be combined with the provisional value into a set with respect to each provisional value of the time series of an operation command in the first future vehicle behavior does not deviate from the predetermined permissible range, or for determining a value obtained by correcting the provisional value according to a predetermined 1b-th rule such that the restriction object that has deviated falls within or approaches to a state to fall within the predetermined permissible range as a value constituting the time series of the operation command in the first future vehicle behavior if the restriction object to be combined with the provisional value into a set deviates from the predetermined permissible range, and the m-th control law for the m-th future vehicle behavior determining means to determine the m-th future vehicle behavior includes processing for determining each provisional value of the time series of the operation command in the m-th future vehicle behavior according to a predetermined ma-th rule, processing for inputting at least each provisional value of the determined operation command of the m-th future vehicle behavior in the time series manner from the current time side into the initialized vehicle model and carrying out arithmetic processing of the initialized vehicle model thereby to determine, as a restriction object, at least one of the road surface reaction force and the slippage of a wheel to be combined with each provisional value of the time series of the operation command of the m-th future vehicle behavior into a set, processing for determining whether the determined restriction object deviates from a predetermined permissible range, and processing for determining the provisional value as a value constituting the time series of an operation command in the m-th future vehicle behavior if the restriction object to be combined with the provisional value into a set with respect to each provisional value of the time series of an operation command in the m-th future vehicle behavior does not deviate from the predetermined permissible range, or for determining a value obtained by correcting the provisional value according to a predetermined mb-th rule such that the restriction object that has deviated falls within or approaches to a state to fall within the predetermined permissible range as a value constituting the time series of the operation command in the second future vehicle behavior if the restriction object to be combined with the provisional value into a set deviates from the predetermined permissible range.

26. The vehicle control device according to claim 25, wherein the first future vehicle behavior determining means comprises a means for determining a future basic operation command, which is the time series of a basic value of the operation command in the future after the current time, on the basis of at least the time series of the determined future drive manipulated variable, the 1a-th rule for the first future vehicle behavior determining means to determine each provisional value of a time series of an operation command in the first future vehicle behavior is a rule for determining each provisional value of the time series of the operation command in the first future vehicle behavior such that at least the difference between an operation command at the current time in the first future vehicle behavior and the basic value at the current time in the determined future basic operation command approaches to zero or coincides with zero, and the ma-th rule for the m-th future vehicle behavior determining means to determine each provisional value of a time series of an operation command of the m-th future vehicle behavior is a rule which defines the difference between an operation command at the current time in the m-th future vehicle behavior and the basic value at the current time in the determined future basic operation command as $\Delta m(1)$, defines the difference between an operation command at the next time following the current time in the m-th future vehicle behavior and the basic value at the next time following the current time in the determined future basic operation command as $\Delta m(2)$, defines the difference between an operation command at the current time in the (m−1)th future vehicle behavior and the basic value at the current time in the determined future basic operation command as $\Delta m-1(1)$, defines the difference between an operation command at the next time following the current time in the (m−1)th future vehicle behavior and the basic value at the next time following the current time in the determined future basic operation command as $\Delta m-1(2)$, and determines each provisional value of the time series of the operation command of the m-th future vehicle behavior such that at least $\Delta m(1)$ is farther away from zero than $\Delta m-1(1)$ or $\Delta m(2)$ is farther away from zero than $\Delta m-1(2)$.

27. The vehicle control device according to claim 26, wherein the ma-th rule for the m-th future vehicle behavior determining means to determine each provisional value of the time series of the operation command of the m-th future vehicle behavior is a rule for determining each provisional value of the time series of the operation command in the m-th future vehicle behavior such that the difference between an operation command at arbitrary time k of the m-th future vehicle behavior and the basic value at the time k in the determined future basic operation command gradually moves away from zero as the time k proceeds.

28. The vehicle control device according to claim 20, wherein the actuator controlling means comprises a first reference state determining means for sequentially determining a reference state before the current time, which is a reference state up to the current time with respect to a predetermined second state amount related to the vehicle motion, on the basis of at least the drive manipulated variable detected by the drive manipulated variable detecting means before the current time, and a second reference state determining means for determining a future reference state, which is a reference state in the future after the current time with respect to the second state amount, on the basis of at least a time series of the future drive manipulated variable that has been determined and the determined reference state before the current time, the first control law for the first future vehicle behavior determining means to determine the first future vehicle behavior is a control law for determining the first future vehicle behavior such that, when each value of the time series of an operation command in the first future vehicle behavior is input to the initialized vehicle model in a time series manner from the current time side to carry out arithmetic processing of the initialized vehicle model, the second state amount related to the vehicle motion determined by the arithmetic processing approaches to the determined future reference state, and the m-th control law for the m-th future vehicle behavior determining means to determine the m-th future vehicle behavior is a control law for determining the m-th future vehicle behavior such that, when each value of the time series of an operation command in the m-th future vehicle behavior is input to the initialized vehicle model in a time series manner from the current time side to carry out arithmetic processing of the initialized vehicle model, the second state amount related to the vehicle motion determined by the arithmetic processing approaches to the determined future reference state.

29. The vehicle control device according to claim 28, wherein an operation command at arbitrary time k in the first future vehicle behavior determined by the first future vehicle behavior determining means is a resultant value of a first feedforward component and a first feedback component, the first control law for the first future vehicle behavior determining means to determine the first future vehicle behavior is a control law which includes processing for determining the first feedforward component of the operation command at time k in the first future vehicle behavior according to a predetermined first feedforward control law on the basis of at least the value of a drive manipulated variable at time k or time k−1 in the time series of the determined future drive manipulated variable, processing for determining the first feedback component of the operation command at time k in the first future vehicle behavior according to a predetermined first feedback control law on the basis of the difference between a value at time k−1 in a second model state amount related to a vehicle motion on the initialized vehicle model and a value at time k or time k−1 of the determined future reference state such that the difference is brought close to zero, and processing for combining the first feedforward component and the first feedback component at time k in the first future vehicle behavior to determine an operation command at the time k, and an operation command at arbitrary time k in the m-th future vehicle behavior determined by the m-th future vehicle behavior determining means is a resultant value of an m-th feedforward component and an m-th feedback component, the m-th control law for the m-th future vehicle behavior determining means to determine the m-th future vehicle behavior is a control law which includes processing for determining the m-th feedforward component of the operation command at time k in the m-th future vehicle behavior according to a predetermined m-th feedforward control law, processing for determining the m-th feedback component of the operation command at time k in the m-th future vehicle behavior according to a predetermined m-th feedback control law on the basis of the difference between a value at time k−1 in the second model state amount related to the vehicle motion on the initialized vehicle model and a value at time k or time k−1 of the determined future reference state such that the difference is brought close to zero, and processing for combining the m-th feedforward component and the m-th feedback component at time k in the m-th future vehicle behavior to determine an operation command at the time k.

30. The vehicle control device according to claim 29, wherein the first feedforward component of the operation command at arbitrary time k in the first future vehicle behavior determined by the first future vehicle behavior determining means is constituted of a basic feedforward component and a first auxiliary feedforward component, and the first feedforward control law of the first future vehicle behavior determining means is a control law which includes processing for determining the basic feedforward component of the operation command at arbitrary time k in the first future vehicle behavior on the basis of at least a value of a drive manipulated variable at time k or time k−1 in the time series of the determined future drive manipulated variable and processing for determining the first auxiliary feedforward component of an operation command at each time of the first future vehicle behavior in a predetermined pattern that causes at least the first auxiliary feedforward component at the current time in the first future vehicle behavior to approach more to zero than a value of the first auxiliary feedforward component at time immediately preceding the current time at which the actuator controlling means attempts to determine a new operation command or to coincide with zero, and the m-th feedforward component of an operation command at arbitrary time k in the m-th future vehicle behavior determined by the m-th future vehicle behavior determining means is constituted of the basic feedforward component and an m-th auxiliary feedforward component, and the m-th feedforward control law of the m-th future vehicle behavior determining means is a control law which includes processing which defines the m-th auxiliary feedforward components at the current time and the next time following the current time in the m-th future vehicle behavior as FF2$m$(1) and FF2$m$(2), respectively, and the (m−1)th auxiliary feedforward components at the current time and the next time following the current time in the (m−1)th future vehicle behavior as FF2$m$−1(1) and FF2$m$−1(2), respectively, and determines an m-th auxiliary feedforward component of an operation command at each time of the m-th future vehicle behavior in a predetermined pattern that causes at least FF2m(1) to move farther away from zero than FF2m−1(1) or FF2m(2) to move farther away from zero than FF2m−1(2).

31. The vehicle control device according to claim 30, wherein the m-th feedforward control law of the m-th future vehicle behavior determining means is a control law for determining the m-th auxiliary feedforward component of an operation command at arbitrary time k of the m-th future vehicle behavior such that it gradually moves away from zero as the time k proceeds.

32. The vehicle control device according to claim 30, wherein the first control law for the first future vehicle behavior determining means further includes processing for taking, as a provisional value, each value of the time series of an operation command obtained by combining the first feedforward component and the first feedback component at time k in the first future vehicle behavior and inputting the provisional value in the time series manner from the current time side into the initialized vehicle model and carrying out the arithmetic processing of the initialized vehicle model thereby to determine, as a restriction object, at least one of the road surface reaction force and the slippage of a wheel to be combined with each value of the time series of the operation command into a set, processing for determining whether the determined restriction object deviates from a predetermined permissible range, and processing for determining the provisional value as a value constituting the time series of an operation command in the future vehicle behavior if the restriction object to be combined with the provisional value into a set with respect to each of the provisional values of the time series of the operation command in the first future vehicle behavior does not deviate from the predetermined permissible range, or for determining each value of an operation command in the future vehicle behavior by correcting the first auxiliary feedforward component in the provisional value according to a predetermined rule such that the restriction object that has deviated falls within or approaches to a state to fall within the predetermined permissible range if the restriction object to be combined with the provisional value into a set deviates from the predetermined permissible range, and the m-th control law for the m-th future vehicle behavior determining means further includes processing for taking, as a provisional value, each value of the time series of an operation command obtained by combining the m-th feedforward component and the m-th feedback component at time k in the m-th future vehicle behavior and inputting the provisional value in the time series manner from the current time side into the initialized vehicle model and carrying out the arithmetic processing of the initialized vehicle model thereby to determine, as a restriction object, at least one of the road surface reaction force and the slippage of a wheel to be combined with each value of the time series of the operation command into a set, processing for determining whether the determined restriction object deviates from a predetermined permissible range, and processing for determining the provisional value as a value constituting the time series of an operation command in the future vehicle behavior if the restriction object to be combined with the provisional value into a set with respect to each of the provisional values of the time series of the operation command in the m-th future vehicle behavior does not deviate from the predetermined permissible range, or for determining each value of an operation command in the future vehicle behavior by correcting the m-th auxiliary feedforward component in the provisional value according to a predetermined rule such that the restriction object that has deviated falls within or approaches to a state to fall within the predetermined permissible range if the restriction object to be combined with the provisional value into a set deviates from the predetermined permissible range.

33. The vehicle control device according to claim 32, wherein if a difference between one of the provisional value at the current time of the operation command of the first future vehicle behavior in a case where an operation command at the current time of the first future vehicle behavior determined by the first future vehicle behavior determining means is determined as the new operation command and the provisional value at the current time of the operation command of the m-th future vehicle behavior in a case where an operation command at the current time of the m-th future vehicle behavior determined by the m-th future vehicle behavior determining means is determined as a new operation command, and a new operation command is defined as an error for determining a virtual external force, then the first reference state determining means determines, when determining anew the reference state before the current time, a new reference state before the current time on the basis of at least the drive manipulated variable detected by the drive manipulated variable detecting means and a virtual external force determined on the basis of the error for determining the virtual external force such that the difference approaches to zero.

34. The vehicle control device according to claim 29, wherein the first future vehicle behavior determining means comprises a means for setting a feedback gain of the first feedback control law at each time in the future vehicle behavior in a predetermined pattern that causes at least a feedback gain of the first feedback control law at the current time in the future vehicle behavior to approach more to a predetermined reference gain than a feedback gain value at time immediately preceding the current time at which the actuator controlling means attempts to determine a new operation command or to coincide with the reference gain, and the m-th future vehicle behavior determining means comprises a means for setting a feedback gain of the m-th feedback control law at each time of the m-th future vehicle behavior in a predetermined pattern wherein, when the feedback gains of the m-th feedback control law at the current time and the next time following the current time in the m-th future vehicle behavior are defined as Kfbm(1) and Kfbm(2), respectively, and the feedback gains of the (m−1)th feedback control law at the current time and the next time following the current time in the (m−1)th future vehicle behavior are defined as Kfbm−1(1) and Kfbm−1(2), respectively, at least Kfbm(1) is farther away from the reference gain than Kfbm−1(1) or Kfbm(2) is farther away from the reference gain than Kfbm−1(2).

35. The vehicle control device according to claim 34, wherein the means for setting a feedback gain of the m-th feedback control law sets a feedback gain of an m-th feedback control law at arbitrary time k of the m-th future vehicle behavior such that it gradually moves away from the reference gain as the time k proceeds.

36. The vehicle control device according to claim 29, wherein the second reference state determining means comprises a means for determining a future basic reference state after the current time with respect to the second state amount on the basis of at least the time series of the future drive manipulated variable that has been determined and the determined reference state before the current time, a means for determining a reference correction amount for correcting the basic reference state, and a means for determining the future reference state by correcting the determined basic reference state by the reference correction amount, and the means for determining the reference correction amount determines, when determining the first future vehicle behavior by the first future vehicle behavior determining means, the reference correction amount at each time of the future vehicle behavior according to a predetermined pattern that causes at least the reference correction amount at the current time in the first future vehicle behavior to approach more to zero than the value of a reference correction amount at time immediately preceding the current time at which the actuator controlling means attempts to determine a new operation command or to coincide with zero, and when determining the m-th future vehicle behavior by the m-th future vehicle behavior determining means, the means for determining the reference correction defines the reference correction amounts at the current time and the next time following the current time in the m-th future vehicle behavior as Cm(1) and Cm(2), respectively, defines the reference correction amounts at the current time and the next time following the current time in the (m−1)th future vehicle behavior as Cm−1(1) and Cm−1(2), respectively, and determines the reference correction amount at each time of the m-th future vehicle behavior according to a predetermined pattern that causes at least Cm(1) to be farther away from zero than Cm−1(1) or causes Cm(2) to be farther away from zero than Cm−1(2).

37. The vehicle control device according to claim 36, wherein the means for determining the reference correction amount determines the reference correction amount at arbitrary time k of the m-th future vehicle behavior such that it gradually moves away from zero as the time k proceeds.

38. The vehicle control device according to claim 28, wherein the actual state amount grasping means comprises a means for detecting or estimating the second state amount related to an actual motion of the vehicle, and the first reference state determining means determines, when determining anew the reference state before the current time, a new reference state before the current time on the basis of at least the drive manipulated variable detected by the drive manipulated variable detecting means and a virtual external force determined on the basis of a difference between a past value of the reference state before the current time and the second state amount that has been detected or estimated such that the difference approaches to zero.

39. A vehicle control device comprising:
an operating device with which a driver of a vehicle having a plurality of wheels drives the vehicle;
a drive manipulated variable detecting means which detects a drive manipulated variable expressing an operation state of the operating device by the driver;
an actuator provided in the vehicle so as to permit a motion of the vehicle to be made in response to an operation command;
an actuator controlling means which sequentially determines the operation command to the actuator on the basis of at least the drive manipulated variable and controls the operation of the actuator according to the determined operation command; and
an actual state amount grasping means which detects or estimates an actual state amount, which is a first state amount related to an actual motion of the vehicle,
wherein the actuator controlling means comprises:
a vehicle model which includes at least a friction model showing a relationship between slippage of the wheels and road surface reaction forces acting on the wheels, a dynamic model showing a relationship between motions of the vehicle and the road surface reaction forces, and a model showing the operating characteristics of the actuator;
a vehicle model initializing means which defines at least a first model state amount related to a motion of the vehicle on the vehicle model as a state amount to be initialized, and initializes a value of the state amount to be initialized at a current time or at a predetermined time in the vicinity thereof to a value determined on the basis of at least the actual state amount before the current time;
a future drive manipulated variable determining means which determines a time series of a future drive manipulated variable after the current time on the basis of at least the drive manipulated variable before the current time;
a first future vehicle behavior determining means which determines a future vehicle behavior, which is a future time series after the current time of a set of the operation command to the actuator of the vehicle model, the motion of the vehicle on the vehicle model to which the operation command has been given, a road surface reaction force, and the slippage of wheels, according to a predetermined first control law by using an initialized vehicle model, which is the vehicle model wherein at least the values of the determined time series of the future drive manipulated variable and the state amount to be initialized have been initialized; and
an evaluating means which selects, as an evaluation object, at least one of the motion of the vehicle, a road surface reaction force, and the slippage of wheels in the future vehicle behavior, and evaluates whether the evaluation object satisfies a predetermined restrictive condition,
wherein, when determining the operation command anew, the processing by the vehicle model initializing means, the future drive manipulated variable determining means, and the first future vehicle behavior determining means is carried out to determine the future vehicle behavior, and the processing by the evaluating means is also carried out on the evaluation object of the determined future vehicle behavior so as to determine a new operation command for the actuator on the basis of at least an evaluation result given by the evaluating means,
wherein the first future vehicle behavior determining means comprises a means for determining a future basic operation command, the future basic operation command being a time series of a basic value of the operation command in the future after the current time, the future basic operation command determined on the basis of at least the time series of the future drive manipulated variable that has been determined, and
the first control law according to which the first future vehicle behavior determining means determines the future vehicle behavior is a control law for determining the future vehicle behavior such that at least the difference between an operation command at the current time in the future vehicle behavior and the basic value at the current time in the determined future basic operation command approximates zero or coincides with zero.

40. A vehicle control device comprising:
an operating device with which a driver of a vehicle having a plurality of wheels drives the vehicle;
a drive manipulated variable detecting means which detects a drive manipulated variable expressing an operation state of the operating device by the driver;

an actuator provided in the vehicle so as to permit a motion of the vehicle to be made in response to an operation command;

an actuator controlling means which sequentially determines the operation command to the actuator on the basis of at least the drive manipulated variable and controls the operation of the actuator according to the determined operation command; and an actual state amount grasping means which detects or estimates an actual state amount, which is a first state amount related to an actual motion of the vehicle, wherein the actuator controlling means comprises:

a vehicle model which includes at least a friction model showing a relationship between slippage of the wheels and road surface reaction forces acting on the wheels, a dynamic model showing a relationship between motions of the vehicle and the road surface reaction forces, and a model showing the operating characteristics of the actuator;

a vehicle model initializing means which defines at least a first model state amount related to a motion of the vehicle on the vehicle model as a state amount to be initialized, and initializes a value of the state amount to be initialized at a current time or at a predetermined time in the vicinity thereof to a value determined on the basis of at least the actual state amount before the current time;

a future drive manipulated variable determining means which determines a time series of a future drive manipulated variable after the current time on the basis of at least the drive manipulated variable before the current time;

a first future vehicle behavior determining means which determines a future vehicle behavior, which is a future time series after the current time of a set of the operation command to the actuator of the vehicle model, the motion of the vehicle on the vehicle model to which the operation command has been given, a road surface reaction force, and the slippage of wheels, according to a predetermined first control law by using an initialized vehicle model, which is the vehicle model wherein at least the values of the determined time series of the future drive manipulated variable and the state amount to be initialized have been initialized; and an evaluating means which selects, as an evaluation object, at least one of the motion of the vehicle, a road surface reaction force, and the slippage of wheels in the future vehicle behavior, and evaluates whether the evaluation object satisfies a predetermined restrictive condition, wherein, when determining the operation command anew, the processing by the vehicle model initializing means, the future drive manipulated variable determining means, and the first future vehicle behavior determining means is carried out to determine the future vehicle behavior, and the processing by the evaluating means is also carried out on the evaluation object of the determined future vehicle behavior so as to determine a new operation command for the actuator on the basis of at least an evaluation result given by the evaluating means, wherein, when determining the operation command anew, the actuator controlling means determines, as the new operation command, an operation command at the current time in a future vehicle behavior if an evaluation object of the future vehicle behavior determined by the first future vehicle behavior determining means satisfies the predetermined restrictive condition, or determines, as the new operation command, an operation command obtained by correcting the operation command at the current time in the future vehicle behavior according to a predetermined correction rule if the evaluation object of the future vehicle behavior does not satisfy the predetermined restrictive condition, and wherein the first future vehicle behavior determining means comprises a means for determining a future basic operation command, which is a time series of a basic value of the operation command in the future after the current time, on the basis of at least the time series of the future drive manipulated variable that has been determined, and the first control law according to which the first future vehicle behavior determining means determines the future vehicle behavior is a control law for determining the future vehicle behavior such that at least the difference between an operation command at the current time in the future vehicle behavior and the basic value at the current time in the determined future basic operation command approximates zero or coincides with zero, and the correction rule for correcting the operation command at the current time in the future vehicle behavior if the evaluation object of the determined future vehicle behavior does not satisfy the predetermined restrictive condition is a rule for correcting the value of the operation command at the current time in the future vehicle behavior such that the difference between an operation command obtained by correcting the operation command at the current time in the future vehicle behavior and the basic value at the current time in the determined future basic operation command is farther away from zero than the difference between a before-correction operation command at the current time in the future vehicle behavior and the basic value at the current time in the determined future basic operation command.

41. A vehicle control device comprising:

an operating device with which a driver of a vehicle having a plurality of wheels drives the vehicle;

a drive manipulated variable detecting means which detects a drive manipulated variable expressing an operation state of the operating device by the driver;

an actuator provided in the vehicle so as to permit a motion of the vehicle to be made in response to an operation command;

an actuator controlling means which sequentially determines the operation command to the actuator on the basis of at least the drive manipulated variable and controls the operation of the actuator according to the determined operation command; and an actual state amount grasping means which detects or estimates an actual state amount, which is a first state amount related to an actual motion of the vehicle, wherein the actuator controlling means comprises:

a vehicle model which includes at least a friction model showing a relationship between slippage of the wheels and road surface reaction forces acting on the wheels, a dynamic model showing a relationship between motions of the vehicle and the road surface reaction forces, and a model showing the operating characteristics of the actuator;

a vehicle model initializing means which defines at least a first model state amount related to a motion of the vehicle on the vehicle model as a state amount to be initialized, and initializes a value of the state amount to be initialized at a current time or at a predetermined time in the vicinity thereof to a value determined on the basis of at least the actual state amount before the current time;

a future drive manipulated variable determining means which determines a time series of a future drive manipulated variable after the current time on the basis of at least the drive manipulated variable before the current time;

a first future vehicle behavior determining means which determines a future vehicle behavior, which is a future time series after the current time of a set of the operation command to the actuator of the vehicle model, the motion of the vehicle on the vehicle model to which the operation command has been given, a road surface reaction force, and the slippage of wheels, according to a predetermined first control law by using an initialized vehicle model, which is the vehicle model wherein at least the values of the determined time series of the future drive manipulated variable and the state amount to be initialized have been initialized; and an evaluating means which selects, as an evaluation object, at least one of the motion of the vehicle, a road surface reaction force, and the slippage of wheels in the future vehicle behavior, and evaluates whether the evaluation object satisfies a predetermined restrictive condition, wherein, when determining the operation command anew, the processing by the vehicle model initializing means, the future drive manipulated variable determining means, and the first future vehicle behavior determining means is carried out to determine the future vehicle behavior, and the processing by the evaluating means is also carried out on the evaluation object of the determined future vehicle behavior so as to determine a new operation command for the actuator on the basis of at least an evaluation result given by the evaluating means, and wherein the first control law for the first future vehicle behavior determining means to determine the future vehicle behavior includes:

processing for determining each provisional value of the time series of the operation command in the future vehicle behavior according to a predetermined 1a-th rule on the basis of at least the time series of the future drive manipulated variable that has been determined;

processing for inputting at least each provisional value of the determined operation command in the time series manner from the current time side into the initialized vehicle model and carrying out the arithmetic processing of the initialized vehicle model to determine, as a restriction object, at least one of the road surface reaction force and the slippage of a wheel to be combined with each provisional value of the time series of the operation command into a set;

processing for determining whether the determined restriction object deviates from a predetermined permissible range; and processing for determining one of: the provisional value as a value constituting the time series of an operation command in the future vehicle behavior if the restriction object to be combined with the provisional value into a set with respect to each of the provisional values does not deviate from the predetermined permissible range; and a value obtained by correcting the provisional value according to a predetermined 1b-th rule such that the restriction object that has deviated falls within or approaches the predetermined permissible range as a value constituting the time series of the operation command in the future vehicle behavior when the restriction object to be combined with the provisional value into a set deviates from the predetermined permissible range.

42. The vehicle control device according to claim 41, wherein the first future vehicle behavior determining means comprises a means for determining a future basic operation command, which is the time series of a basic value of the operation command in the future after the current time, on the basis of at least the time series of the determined future drive manipulated variable, wherein the 1a-th rule for the first future vehicle behavior determining means to determine each provisional value of an operation command in the future vehicle behavior is a rule for determining the future vehicle behavior such that at least the difference between an operation command at the current time in the future vehicle behavior and the basic value at the current time in the determined future basic operation command approaches to zero or coincides with zero.

43. A vehicle control device comprising:

an operating device with which a driver of a vehicle having a plurality of wheels drives the vehicle;

a drive manipulated variable detecting means which detects a drive manipulated variable expressing an operation state of the operating device by the driver;

an actuator provided in the vehicle so as to permit a motion of the vehicle to be made in response to an operation command;

an actuator controlling means which sequentially determines the operation command to the actuator on the basis of at least the drive manipulated variable and controls the operation of the actuator according to the determined operation command; and an actual state amount grasping means which detects or estimates an actual state amount, which is a first state amount related to an actual motion of the vehicle, wherein the actuator controlling means comprises:

a vehicle model which includes at least a friction model showing a relationship between slippage of the wheels and road surface reaction forces acting on the wheels, a dynamic model showing a relationship between motions of the vehicle and the road surface reaction forces, and a model showing the operating characteristics of the actuator;

a vehicle model initializing means which defines at least a first model state amount related to a motion of the vehicle on the vehicle model as a state amount to be initialized, and initializes a value of the state amount to be initialized at a current time or at a predetermined time in the vicinity thereof to a value determined on the basis of at least the actual state amount before the current time;

a future drive manipulated variable determining means which determines a time series of a future drive manipulated variable after the current time on the basis of at least the drive manipulated variable before the current time;

a first future vehicle behavior determining means which determines a future vehicle behavior, which is a future time series after the current time of a set of the operation command to the actuator of the vehicle model, the motion of the vehicle on the vehicle model to which the operation command has been given, a road surface reaction force, and the slippage of wheels, according to a predetermined first control law by using an initialized vehicle model, which is the vehicle model wherein at least the values of the determined time series of the future drive manipulated variable and the state amount to be initialized have been initialized; and an evaluating means which selects, as an evaluation object, at least one of the motion of the vehicle, a road surface reaction force, and the slippage of wheels in the future vehicle behavior, and evaluates whether the evaluation object satisfies a predetermined restrictive condition, wherein, when determining the operation command anew, the processing by the vehicle model initializing means, the future drive manipulated variable determining means, and the first future vehicle behavior determining means is carried out to determine the future vehicle behavior, and the processing by the evaluating means is also carried out on the evaluation object of the determined future vehicle behavior so as to determine a new operation command for the actuator on the basis of at least an evaluation result given by the evaluating means, and wherein the actuator controlling means comprises:

a reference state determining means for determining a future reference state, the future reference state being a reference state for a predetermined second state amount related to a vehicle motion in the future after the current time, the future reference state determined on the basis of at least the time series of the future drive manipulated variable that has been determined; and a permissible range setting means for setting a permissible range of the second state amount related to the future vehicle motion on the basis of the determined reference state, wherein the evaluation object in the processing by the evaluating means includes the second state amount, and the restrictive condition includes a condition in which the second state amount falls within the determined permissible range.

44. A vehicle control device comprising:

an operating device with which a driver of a vehicle having a plurality of wheels drives the vehicle;

a drive manipulated variable detecting means which detects a drive manipulated variable expressing an operation state of the operating device by the driver;

an actuator provided in the vehicle so as to permit a motion of the vehicle to be made in response to an operation command;

an actuator controlling means which sequentially determines the operation command to the actuator on the basis of at least the drive manipulated variable and controls the operation of the actuator according to the determined operation command; and an actual state amount grasping means which detects or estimates an actual state amount, which is a first state amount related to an actual motion of the vehicle, wherein the actuator controlling means comprises:

a vehicle model which includes at least a friction model showing a relationship between slippage of the wheels and road surface reaction forces acting on the wheels, a dynamic model showing a relationship between motions of the vehicle and the road surface reaction forces, and a model showing the operating characteristics of the actuator;

a vehicle model initializing means which defines at least a first model state amount related to a motion of the vehicle on the vehicle model as a state amount to be initialized, and initializes a value of the state amount to be initialized at a current time or at a predetermined time in the vicinity thereof to a value determined on the basis of at least the actual state amount before the current time;

a future drive manipulated variable determining means which determines a time series of a future drive manipulated variable after the current time on the basis of at least the drive manipulated variable before the current time;

a first future vehicle behavior determining means which determines a future vehicle behavior, which is a future time series after the current time of a set of the operation command to the actuator of the vehicle model, the motion of the vehicle on the vehicle model to which the operation command has been given, a road surface reaction force, and the slippage of wheels, according to a predetermined first control law by using an initialized vehicle model, which is the vehicle model wherein at least the values of the determined time series of the future drive manipulated variable and the state amount to be initialized have been initialized; and an evaluating means which selects, as an evaluation object, at least one of the motion of the vehicle, a road surface reaction force, and the slippage of wheels in the future vehicle behavior, and evaluates whether the evaluation object satisfies a predetermined restrictive condition, wherein, when determining the operation command anew, the processing by the vehicle model initializing means, the future drive manipulated variable determining means, and the first future vehicle behavior determining means is carried out to determine the future vehicle behavior, and the processing by the evaluating means is also carried out on the evaluation object of the determined future vehicle behavior so as to determine a new operation command for the actuator on the basis of at least an evaluation result given by the evaluating means, and wherein
the actuator controlling means comprises:
a first reference state determining means for sequentially determining a reference state before the current time, the reference state before the current time being a reference state up to the current time with respect to a predetermined second state amount related to the vehicle motion, the reference state before the current time determined on the basis of at least the drive manipulated variable detected by the drive manipulated variable detecting means before the current time; and a second reference state determining means for determining a future reference state, the future reference state being a reference state in the future after the current time with respect to the second reference state, the future reference state determined on the basis of at least a time series of the future drive manipulated variable that has been determined and the determined reference state before the current time, and the first control law for the first future vehicle behavior determining means to determine the future vehicle behavior is a control law for determining the future vehicle behavior such that, when each value of the time series of an operation command in the future vehicle behavior is input to the initialized vehicle model in a time series manner from the current time side to carry out arithmetic processing of the initialized vehicle model, the second state amount related to the vehicle motion determined by the arithmetic processing approaches the determined future reference state.

45. The vehicle control device according to claim 44, wherein an operation command at arbitrary time k in the future vehicle behavior determined by the first future vehicle behavior determining means is a resultant value of a feedforward component and a feedback component, the first control law for the first future vehicle behavior determining means to determine the future vehicle behavior is a control law which includes processing for determining the feedforward component of the operation command at time k in the future vehicle behavior according to a predetermined first feedforward control law on the basis of at least the value of a drive manipulated variable at time k or time k−1 in the time series of the determined future drive manipulated variable, processing for determining the feedback component of the operation command at time k in the future vehicle behavior according to a predetermined first feedback control law on the basis of the difference between a value at time k−1 in a second model state amount related to a vehicle motion on the initialized vehicle model and a value at time k or time k−1 of the determined future reference state such that the difference is brought close to zero, and processing for combining the feedforward component and the feedback component at time k in the future vehicle behavior to determine an operation command at the time k.

46. The vehicle control device according to claim 45, wherein the feedforward component of the operation command at arbitrary time k in the future vehicle behavior determined by the first future vehicle behavior determining means is constituted of a basic feedforward component and a first auxiliary feedforward component, and the first feedforward control law of the first future vehicle behavior determining means is a control law which includes processing for determining the basic feedforward component of the operation command at arbitrary time k in the future vehicle behavior on the basis of at least a value of a drive manipulated variable at time k or time k−1 in the time series of the determined future drive manipulated variable, and processing for determining the first auxiliary feedforward component of an operation command at each time of the future vehicle behavior in a predetermined pattern that causes at least the first auxiliary feedforward component at the current time in the future vehicle behavior to approach more to zero than a value of the first auxiliary feedforward component at time immediately preceding the current time at which the actuator controlling means attempts to determine a new operation command or to coincide with zero.

47. The vehicle control device according to claim 46, wherein the first control law of the first future vehicle behavior determining means further includes processing for taking, as a provisional value, each value of the time series of an operation command obtained by combining the feedforward component and the feedback component at time k in the future vehicle behavior and inputting the provisional value in the time series manner from the current time side into the initialized vehicle model and carrying out the arithmetic processing of the initialized vehicle model thereby to determine, as a restriction object, at least one of the road surface reaction force and the slippage of a wheel to be combined with each value of the time series of the operation command into a set, processing for determining whether the determined restriction object deviates from a predetermined permissible range, and processing for determining the provisional value as a value constituting the time series of an operation command in the future vehicle behavior if the restriction object to be combined with the provisional value into a set with respect to each of the provisional values does not deviate from the predetermined permissible range, or for determining each value of an operation command in the future vehicle behavior by correcting the first auxiliary feedforward component in the provisional value according to a predetermined rule such that the restriction object that has deviated falls within or approaches to a state to fall within the predetermined permissible range if the restriction object to be combined with the provisional value into a set deviates from the predetermined permissible range.

48. The vehicle control device according to claim 47, wherein if a difference between the provisional value at the current time of an operation command in a case where an operation command at the current time of the future vehicle behavior determined by the first future vehicle behavior determining means is determined as the new operation command and a new operation command is defined as an error for determining a virtual external force, then the first reference state determining means determines, when determining anew a reference state before the current time, the new reference state before the current time on the basis of at least the drive manipulated variable detected by the drive manipulated variable detecting means and a virtual external force determined on the basis of the error for determining the virtual external force such that the error approaches to zero.

49. The vehicle control device according to claim 22, wherein the first future vehicle behavior determining means comprises a means for setting a feedback gain of the first feedback control law at each time in the future vehicle behavior in a predetermined pattern that causes at least a feedback gain of the first feedback control law at the current time in the future vehicle behavior to approach more to a predetermined reference gain than a feedback gain value at time immediately preceding the current time at which the actuator controlling means attempts to determine a new operation command or to coincide with the reference gain.

50. The vehicle control device according to claim 45, wherein the second reference state determining means comprises a means for determining a future basic reference state after the current time with respect to the second state amount on the basis of at least the time series of the future drive manipulated variable that has been determined and the determined reference state before the current time, a means for determining a reference correction amount for correcting the basic reference state, and a means for determining the future reference state by correcting the determined basic reference state by the reference correction amount, and the means for determining the reference correction amount determines, when determining the future vehicle behavior time series by the first future vehicle behavior means, the reference correction amount at each time of the future vehicle behavior according to a predetermined pattern that causes at least the reference correction amount at the current time in the future vehicle behavior to approach more to zero than the value of a reference correction amount at time immediately preceding the current time at which the actuator controlling means attempts to determine a new operation command or to coincide with zero.

51. The vehicle control device according to claim 44, wherein the actual state amount grasping means comprises a means for detecting or estimating the second state amount related to an actual motion of the vehicle, and the first reference state determining means determines, when determining anew the reference state before the current time, a new reference state before the current time on the basis of at least the drive manipulated variable detected by the drive manipulated variable detecting means and a virtual external force determined on the basis of a difference between a past value of the reference state before the current time and the second state amount that has been detected or estimated such that the difference approaches to zero.

* * * * *